US007813451B2

(12) United States Patent
Binder et al.

(10) Patent No.: US 7,813,451 B2
(45) Date of Patent: Oct. 12, 2010

(54) APPARATUS AND METHOD FOR FREQUENCY SHIFTING OF A WIRELESS SIGNAL AND SYSTEMS USING FREQUENCY SHIFTING

(75) Inventors: Yehuda Binder, Hod Hasharon (IL); Ami Hazani, Ra'anana (IL)

(73) Assignee: MobileAccess Networks Ltd. (IL)

( * ) Notice: Subject to any disclaimer, the term of this patent is extended or adjusted under 35 U.S.C. 154(b) by 1226 days.

(21) Appl. No.: 11/329,270

(22) Filed: Jan. 11, 2006

(65) Prior Publication Data
US 2007/0173202 A1 Jul. 26, 2007

(51) Int. Cl.
*H03K 9/00* (2006.01)
(52) U.S. Cl. ............... 375/316; 307/424; 310/160; 324/85; 370/338; 380/220; 455/20; 455/74.1; 455/118; 455/190.1; 455/313; 455/323
(58) Field of Classification Search .............. 375/308, 375/316; 379/413; 725/106
See application file for complete search history.

(56) References Cited

U.S. PATENT DOCUMENTS

| 2,298,435 A | 10/1942 | Tunick |
| 2,411,786 A | 11/1946 | Halstead |
| 2,568,342 A | 9/1951 | Koehler et al. |
| 3,406,344 A | 10/1968 | Hopper |
| 3,511,936 A | 5/1970 | Saltzberg |
| 3,529,088 A | 9/1970 | Hauer |
| 3,651,471 A | 3/1972 | Hasselwood et al. |

(Continued)

FOREIGN PATENT DOCUMENTS

WO 2006052216 A1 5/2006

(Continued)

OTHER PUBLICATIONS

Grayson Evans, The CEBUs Standard User's Guide, 1st edition, May 1996, 317 pages.

(Continued)

*Primary Examiner*—David C Payne
*Assistant Examiner*—Adolf Dsouza
(74) *Attorney, Agent, or Firm*—Nixon Peabody LLP; David F. Crosby

(57) ABSTRACT

Systems, methods and apparatus for improving the coverage of a wireless network based on frequency shifting scheme. A wireless signal in a frequency band is shifted to another distinct band, and carried in the shifted band, using wired or wireless mediums to another location, wherein the wireless signal is shifted back to the original frequency band. The frequency shifting may make use of a conventional frequency shifting schemes such as mixer/filter and heterodyne. In one embodiment the wireless signal is frequency shifted by converting it to other representing signals (such as I/Q components) and forming the frequency-shifted signal from the representations. The system is may be used to increase indoor or outdoor coverage, as well as bridging between indoor and outdoor networks. The medium may use dedicated wiring or existing service wiring in a residence or building, including LAN, telephone, AC power and CATV wiring. The system (in whole or in part) may be enclosed as a stand-alone unit, housed in integrated form as part of a service outlet or as a snap-on/plug-in module. Methods and other systems with different advantageous configurations are also described. This abstract is not intended to limit or construe the scope or meaning of the claims.

25 Claims, 80 Drawing Sheets

U.S. PATENT DOCUMENTS

| | | |
|---|---|---|
| 3,656,112 A | 4/1972 | Paull |
| 3,723,653 A | 3/1973 | Tatsuzawa |
| 3,872,253 A | 3/1975 | Jurschak |
| 3,873,771 A | 3/1975 | Kleinerman et al. |
| 3,875,339 A | 4/1975 | Gruen et al. |
| 3,937,889 A | 2/1976 | Bell, III et al. |
| 3,992,589 A | 11/1976 | Kuegler |
| 4,008,369 A | 2/1977 | Theurer et al. |
| 4,035,838 A | 7/1977 | Bassani et al. |
| 4,054,910 A | 10/1977 | Chou et al. |
| 4,171,467 A | 10/1979 | Evenchik |
| 4,199,761 A | 4/1980 | Whyte et al. |
| 4,200,862 A | 4/1980 | Campbell et al. |
| 4,205,270 A * | 5/1980 | Okatani et al. ............ 455/158.1 |
| 4,206,320 A | 6/1980 | Keasler et al. |
| 4,302,629 A | 11/1981 | Foulkes et al. |
| 4,328,579 A | 5/1982 | Hashimoto et al. |
| 4,332,980 A | 6/1982 | Reynolds et al. |
| 4,339,816 A | 7/1982 | Reed |
| 4,378,470 A | 3/1983 | Murto et al. |
| 4,387,271 A | 6/1983 | Artom |
| 4,388,489 A | 6/1983 | Wigan et al. |
| 4,393,508 A | 7/1983 | Boudault |
| 4,425,642 A | 1/1984 | Moses et al. |
| 4,433,212 A | 2/1984 | Moses et al. |
| 4,442,320 A | 4/1984 | James et al. |
| 4,442,540 A | 4/1984 | Allen |
| 4,443,662 A | 4/1984 | Nakhla |
| 4,449,218 A | 5/1984 | Strehl |
| 4,456,925 A | 6/1984 | Skerlos et al. |
| 4,456,985 A | 6/1984 | Carsten et al. |
| 4,456,986 A | 6/1984 | Carsten et al. |
| 4,459,434 A | 7/1984 | Benning et al. |
| 4,462,113 A | 7/1984 | Iwata |
| 4,467,140 A | 8/1984 | Fathauer et al. |
| 4,468,538 A | 8/1984 | Cripps |
| 4,485,400 A | 11/1984 | Lemelson et al. |
| 4,493,948 A | 1/1985 | Sues et al. |
| 4,500,751 A | 2/1985 | Darland et al. |
| 4,506,387 A | 3/1985 | Walter |
| 4,509,211 A | 4/1985 | Robbins |
| 4,521,881 A | 6/1985 | Stapleford et al. |
| 4,528,422 A | 7/1985 | Cupani |
| 4,546,212 A | 10/1985 | Crowder, Sr. |
| 4,561,020 A | 12/1985 | Matsuda |
| 4,564,940 A | 1/1986 | Yahata |
| 4,577,311 A | 3/1986 | Duquesne et al. |
| 4,577,314 A | 3/1986 | Chu et al. |
| 4,578,535 A | 3/1986 | Simmons |
| 4,578,540 A | 3/1986 | Borg et al. |
| 4,580,291 A | 4/1986 | Ab Der Halden |
| 4,584,690 A | 4/1986 | Cafiero et al. |
| 4,597,077 A | 6/1986 | Nelson et al. |
| 4,604,741 A | 8/1986 | Barsellotti |
| 4,608,686 A | 8/1986 | Barsellotti |
| 4,644,526 A | 2/1987 | Wu |
| 4,646,289 A | 2/1987 | Tsiakas et al. |
| 4,646,296 A | 2/1987 | Bartholet et al. |
| 4,649,551 A | 3/1987 | Sander et al. |
| 4,656,655 A | 4/1987 | Hashimoto |
| 4,665,516 A | 5/1987 | Middleton et al. |
| 4,670,870 A | 6/1987 | Hewinson et al. |
| 4,670,874 A | 6/1987 | Sato et al. |
| 4,672,602 A | 6/1987 | Hargrave et al. |
| 4,672,605 A | 6/1987 | Hustig et al. |
| 4,679,227 A | 7/1987 | Hughes-Hartogs |
| 4,706,274 A | 11/1987 | Baker et al. |
| 4,709,412 A | 11/1987 | Seymour et al. |
| 4,731,821 A | 3/1988 | Jackson, III |
| 4,746,809 A | 5/1988 | Coleman et al. |
| 4,754,326 A | 6/1988 | Kram et al. |
| 4,757,495 A | 7/1988 | Decker et al. |
| 4,757,497 A | 7/1988 | Beierle et al. |
| 4,764,922 A | 8/1988 | Dieter et al. |
| 4,766,402 A | 8/1988 | Crane |
| 4,768,110 A | 8/1988 | Dunlap et al. |
| 4,768,206 A | 8/1988 | Van Gerwen |
| 4,769,837 A | 9/1988 | McCormick et al. |
| 4,776,006 A | 10/1988 | Comerford et al. |
| 4,780,757 A | 10/1988 | Bryer et al. |
| 4,780,758 A | 10/1988 | Lin et al. |
| 4,785,448 A | 11/1988 | Reichert et al. |
| 4,785,472 A | 11/1988 | Shapiro |
| 4,789,895 A | 12/1988 | Mustafa et al. |
| 4,789,994 A | 12/1988 | Randall et al. |
| 4,799,213 A | 1/1989 | Fitzgerald |
| 4,807,225 A | 2/1989 | Fitch |
| 4,821,319 A | 4/1989 | Middleton et al. |
| 4,825,435 A | 4/1989 | Amundsen et al. |
| 4,837,799 A | 6/1989 | Prohs et al. |
| 4,839,743 A | 6/1989 | Best et al. |
| 4,849,811 A | 7/1989 | Kleinerman |
| 4,850,009 A | 7/1989 | Zook et al. |
| 4,864,588 A | 9/1989 | Simpson et al. |
| 4,866,757 A | 9/1989 | Nilssen |
| 4,882,747 A | 11/1989 | Williams |
| 4,885,747 A | 12/1989 | Foglia |
| 4,885,766 A | 12/1989 | Yasuoka et al. |
| 4,885,803 A | 12/1989 | Hermann et al. |
| 4,888,795 A | 12/1989 | Ando et al. |
| 4,890,316 A | 12/1989 | Walsh et al. |
| 4,893,326 A | 1/1990 | Duran et al. |
| 4,901,342 A | 2/1990 | Jones |
| 4,918,688 A | 4/1990 | Krause et al. |
| 4,918,690 A | 4/1990 | Markkula, Jr. et al. |
| 4,924,492 A | 5/1990 | Gitlin et al. |
| 4,932,022 A | 6/1990 | Keeney et al. |
| 4,932,047 A | 6/1990 | Emmons et al. |
| 4,945,404 A | 7/1990 | Miller |
| 4,947,483 A | 8/1990 | Dirr |
| 4,949,187 A | 8/1990 | Cohen |
| 4,953,160 A | 8/1990 | Gupta |
| 4,954,886 A | 9/1990 | Elberbaum |
| 4,955,048 A | 9/1990 | Iwamura et al. |
| 4,969,136 A | 11/1990 | Chamberlain et al. |
| 4,975,896 A | 12/1990 | D'Agosto, III et al. |
| 4,975,906 A | 12/1990 | Takiyasu et al. |
| 4,979,028 A | 12/1990 | Minematsu et al. |
| 4,980,665 A | 12/1990 | Schotz |
| 4,985,892 A | 1/1991 | Camarata |
| 4,989,081 A | 1/1991 | Miyagawa et al. |
| 4,996,709 A | 2/1991 | Heep et al. |
| 4,999,613 A | 3/1991 | Williamson et al. |
| 5,010,399 A | 4/1991 | Goodman et al. |
| 5,036,513 A | 7/1991 | Greenblatt |
| 5,045,948 A | 9/1991 | Streck et al. |
| 5,051,822 A | 9/1991 | Rhoades |
| 5,068,890 A | 11/1991 | Nilssen |
| 5,089,886 A | 2/1992 | Grandmougin |
| 5,090,052 A | 2/1992 | Nakajima et al. |
| 5,095,497 A | 3/1992 | Aman et al. |
| 5,109,222 A | 4/1992 | Welty |
| 5,115,463 A | 5/1992 | Moldavsky et al. |
| 5,142,397 A | 8/1992 | Dockery |
| 5,161,021 A | 11/1992 | Tsai |
| 5,210,788 A | 5/1993 | Nilssen |
| 5,230,086 A | 7/1993 | Saul |
| 5,247,347 A | 9/1993 | Litteral et al. |
| 5,255,268 A | 10/1993 | Cato et al. |
| 5,257,006 A | 10/1993 | Graham et al. |
| 5,265,150 A | 11/1993 | Helmkamp et al. |
| 5,283,637 A | 2/1994 | Goolcharan |
| 5,297,203 A | 3/1994 | Rose et al. |
| 5,321,736 A | 6/1994 | Beasley |

| | | | | | |
|---|---|---|---|---|---|
| 5,321,846 A | 6/1994 | Yokota et al. | 5,937,348 A | 8/1999 | Cina et al. |
| 5,353,334 A | 10/1994 | O'Sullivan | 5,940,400 A | 8/1999 | Eastmond et al. |
| 5,363,432 A | 11/1994 | Martin et al. | 5,949,476 A | 9/1999 | Pocock et al. |
| 5,379,005 A | 1/1995 | Aden et al. | 5,950,149 A | 9/1999 | Fieramosca et al. |
| 5,404,570 A | 4/1995 | Charas et al. | 5,953,670 A | 9/1999 | Newson |
| 5,408,260 A | 4/1995 | Arnon | 5,960,066 A | 9/1999 | Hartmann et al. |
| 5,410,343 A | 4/1995 | Coddington et al. | 5,963,539 A | 10/1999 | Webber, Jr. et al. |
| 5,432,838 A | 7/1995 | Purchase et al. | 5,963,595 A | 10/1999 | Graham et al. |
| 5,452,289 A | 9/1995 | Sharma et al. | 5,977,913 A | 11/1999 | Christ |
| 5,463,616 A | 10/1995 | Kruse et al. | 5,982,363 A | 11/1999 | Naiff |
| 5,481,249 A | 1/1996 | Sato | 5,982,784 A | 11/1999 | Bell |
| 5,489,894 A | 2/1996 | Murray | 5,982,854 A | 11/1999 | Ehreth |
| 5,537,637 A | 7/1996 | Sugita et al. | 5,983,070 A | 11/1999 | Georges et al. |
| 5,539,821 A | 7/1996 | Blonder | 5,986,574 A | 11/1999 | Colton |
| 5,548,592 A | 8/1996 | Komarek et al. | 5,987,303 A | 11/1999 | Dutta et al. |
| 5,550,836 A | 8/1996 | Albrecht et al. | 5,994,998 A | 11/1999 | Fisher et al. |
| 5,553,063 A | 9/1996 | Dickson | 5,995,593 A | 11/1999 | Cho |
| 5,565,855 A | 10/1996 | Knibbe | 5,995,598 A | 11/1999 | Berstis |
| 5,572,575 A | 11/1996 | Yamamoto et al. | 6,002,722 A | 12/1999 | Wu |
| 5,574,964 A | 11/1996 | Hamlin | 6,005,873 A | 12/1999 | Amit |
| 5,579,221 A | 11/1996 | Mun | 6,005,884 A | 12/1999 | Cook et al. |
| 5,587,692 A | 12/1996 | Graham et al. | 6,026,150 A | 2/2000 | Frank |
| 5,600,333 A | 2/1997 | Justice et al. | 6,032,057 A | 2/2000 | Kiiski |
| 5,603,080 A | 2/1997 | Kallander et al. | 6,038,425 A | 3/2000 | Jeffrey |
| 5,610,916 A | 3/1997 | Kostreski et al. | 6,040,759 A | 3/2000 | Sanderson |
| 5,619,251 A | 4/1997 | Kuroiwa et al. | 6,052,380 A | 4/2000 | Bell |
| 5,619,505 A | 4/1997 | Girube et al. | 6,061,357 A | 5/2000 | Olshansky et al. |
| 5,621,455 A | 4/1997 | Rogers et al. | 6,061,392 A | 5/2000 | Bremer et al. |
| 5,625,863 A | 4/1997 | Abraham | 6,069,588 A | 5/2000 | O'Neill, Jr. |
| 5,628,055 A | 5/1997 | Stein | 6,069,899 A | 5/2000 | Foley |
| 5,634,191 A | 5/1997 | Beasley | 6,087,860 A | 7/2000 | Liu et al. |
| 5,646,983 A | 7/1997 | Suffern et al. | 6,088,368 A | 7/2000 | Rubinstain et al. |
| 5,657,358 A | 8/1997 | Panech et al. | 6,094,441 A | 7/2000 | Jung et al. |
| 5,675,375 A | 10/1997 | Riffee | 6,101,341 A | 8/2000 | Manabe |
| 5,696,790 A | 12/1997 | Graham et al. | 6,115,755 A | 9/2000 | Krishan |
| 5,696,861 A | 12/1997 | Schimmeyer et al. | 6,130,893 A | 10/2000 | Whittaker et al. |
| 5,708,705 A | 1/1998 | Yamashita et al. | 6,130,896 A | 10/2000 | Lueker et al. |
| 5,708,961 A | 1/1998 | Hylton et al. | 6,137,865 A | 10/2000 | Ripy et al. |
| 5,734,678 A | 3/1998 | Paneth et al. | 6,141,356 A | 10/2000 | Gorman |
| 5,736,965 A | 4/1998 | Mosebrook et al. | 6,151,480 A | 11/2000 | Fischer et al. |
| 5,748,104 A | 5/1998 | Argyroudis et al. | 6,175,860 B1 | 1/2001 | Gaucher |
| 5,757,803 A | 5/1998 | Russell et al. | 6,192,399 B1 | 2/2001 | Goodman |
| 5,774,789 A | 6/1998 | van der Kaay et al. | 6,202,211 B1 | 3/2001 | Williams, Jr. |
| 5,778,303 A | 7/1998 | Shinozaki et al. | 6,212,227 B1 | 4/2001 | Ko et al. |
| 5,787,115 A | 7/1998 | Turnbull et al. | 6,215,789 B1 | 4/2001 | Keenan et al. |
| 5,802,283 A | 9/1998 | Grady et al. | 6,216,160 B1 | 4/2001 | Dichter |
| 5,809,395 A * | 9/1998 | Hamilton-Piercy et al. .. 725/106 | 6,218,931 B1 | 4/2001 | Asghar et al. |
| 5,812,184 A | 9/1998 | Martinez | 6,240,166 B1 | 5/2001 | Collin et al. |
| 5,812,786 A | 9/1998 | Seazholtz et al. | 6,243,413 B1 | 6/2001 | Beukema |
| 5,815,086 A | 9/1998 | Ivie et al. | 6,243,571 B1 | 6/2001 | Bullock et al. |
| 5,822,678 A | 10/1998 | Evanyk | 6,249,671 B1 | 6/2001 | Tucker et al. |
| 5,828,663 A | 10/1998 | Ikegami | 6,256,296 B1 | 7/2001 | Ruziak et al. |
| 5,832,364 A | 11/1998 | Gustafson | 6,292,467 B1 | 9/2001 | Keller |
| 5,832,365 A | 11/1998 | Chen et al. | 6,292,517 B1 | 9/2001 | Jeffress et al. |
| 5,835,863 A | 11/1998 | Ikenouchi et al. | 6,310,894 B1 | 10/2001 | Counterman |
| 5,838,226 A | 11/1998 | Houggy et al. | 6,317,884 B1 | 11/2001 | Eames et al. |
| 5,841,360 A | 11/1998 | Binder | 6,320,900 B1 | 11/2001 | Liu |
| 5,841,840 A | 11/1998 | Smith et al. | 6,324,268 B1 | 11/2001 | Balachandran et al. |
| 5,841,841 A | 11/1998 | Dodds et al. | 6,330,244 B1 | 12/2001 | Swartz et al. |
| 5,848,150 A | 12/1998 | Bingel | 6,346,875 B1 | 2/2002 | Puckette et al. |
| 5,864,284 A | 1/1999 | Sanderson | 6,349,133 B1 | 2/2002 | Matthews et al. |
| 5,878,047 A | 3/1999 | Ganek et al. | 6,353,599 B1 | 3/2002 | Bi et al. |
| 5,896,443 A | 4/1999 | Dichter | 6,370,149 B1 | 4/2002 | Gorman et al. |
| 5,896,569 A | 4/1999 | Butler et al. | 6,389,125 B1 | 5/2002 | Ubowski |
| 5,905,442 A | 5/1999 | Mosebrook et al. | 6,392,349 B1 | 5/2002 | Crenshaw |
| 5,910,776 A | 6/1999 | Black | 6,393,050 B1 | 5/2002 | Liu |
| 5,912,895 A | 6/1999 | Terry et al. | 6,400,815 B1 | 6/2002 | Gilboy et al. |
| 5,926,531 A | 7/1999 | Petite | 6,400,957 B1 | 6/2002 | Rodrigues et al. |
| 5,930,340 A | 7/1999 | Bell | 6,414,952 B2 | 7/2002 | Foley |
| 5,930,682 A | 7/1999 | Schwartz et al. | 6,424,661 B1 | 7/2002 | Bentley |
| 5,930,719 A | 7/1999 | Babitch et al. | 6,427,237 B1 | 7/2002 | Aranguren et al. |
| 5,936,660 A | 8/1999 | Gurantz | 6,430,199 B1 | 8/2002 | Kerpez |
| 5,937,342 A | 8/1999 | Kline | 6,434,123 B1 | 8/2002 | Park |

| | | |
|---|---|---|
| 6,438,109 B1 | 8/2002 | Karaoguz et al. |
| 6,449,318 B1 | 9/2002 | Rumbaugh |
| 6,452,910 B1 | 9/2002 | Vij et al. |
| 6,452,923 B1 | 9/2002 | Gerszberg et al. |
| 6,470,053 B1 | 10/2002 | Liu |
| 6,473,495 B1 | 10/2002 | Willer |
| 6,480,510 B1 | 11/2002 | Binder |
| 6,483,470 B1 | 11/2002 | Hohnstein et al. |
| 6,483,902 B1 | 11/2002 | Stewart et al. |
| 6,492,897 B1 | 12/2002 | Mowery, Jr. |
| 6,493,875 B1 | 12/2002 | Eames et al. |
| 6,501,942 B1 | 12/2002 | Weissman et al. |
| 6,513,163 B1 | 1/2003 | Silvia et al. |
| 6,522,662 B1 | 2/2003 | Liu |
| 6,522,728 B1 | 2/2003 | Willer |
| 6,522,730 B1 | 2/2003 | Timm et al. |
| 6,522,731 B2 | 2/2003 | Matsumoto |
| 6,526,581 B1 | 2/2003 | Edson |
| 6,532,279 B1 | 3/2003 | Goodman |
| 6,532,280 B1 | 3/2003 | McDonald |
| 6,535,110 B1 | 3/2003 | Arora et al. |
| 6,535,587 B1 | 3/2003 | Kobayashi |
| 6,539,011 B1 | 3/2003 | Keenan et al. |
| 6,546,098 B1 | 4/2003 | Henderson |
| 6,549,616 B1 | 4/2003 | Binder |
| 6,556,581 B1 | 4/2003 | He et al. |
| 6,560,319 B1 | 5/2003 | Binder |
| 6,563,418 B1 | 5/2003 | Moon |
| 6,563,816 B1 | 5/2003 | Nodoushani et al. |
| 6,567,981 B1 | 5/2003 | Jeffrey |
| 6,570,890 B1 | 5/2003 | Keenan et al. |
| 6,572,384 B1 | 6/2003 | Marchevsky |
| 6,573,826 B2 | 6/2003 | Pan |
| 6,574,242 B1 | 6/2003 | Keenan et al. |
| 6,577,231 B2 | 6/2003 | Litwin, Jr. et al. |
| 6,577,631 B1 | 6/2003 | Keenan et al. |
| 6,580,710 B1 | 6/2003 | Bowen et al. |
| 6,580,728 B1 | 6/2003 | Cook et al. |
| 6,580,785 B2 | 6/2003 | Bremer et al. |
| 6,583,719 B2 | 6/2003 | Okada et al. |
| 6,587,473 B2 | 7/2003 | Terry et al. |
| 6,587,479 B1 | 7/2003 | Bianchi et al. |
| 6,587,739 B1 | 7/2003 | Abrams et al. |
| 6,603,808 B1 | 8/2003 | Anne et al. |
| 6,618,578 B1 | 9/2003 | Petite |
| 6,622,304 B1 | 9/2003 | Carhart |
| 6,650,871 B1 | 11/2003 | Cannon et al. |
| 6,653,932 B1 | 11/2003 | Bemaish et al. |
| 6,654,616 B1 | 11/2003 | Pope, Jr. et al. |
| 6,668,328 B1 | 12/2003 | Bell |
| 6,678,321 B1 | 1/2004 | Graham et al. |
| 6,678,721 B1 | 1/2004 | Bell |
| 6,683,531 B2 | 1/2004 | Diamanti et al. |
| 6,690,677 B1 | 2/2004 | Binder |
| 6,693,916 B1 | 2/2004 | Chaplik et al. |
| 6,697,358 B2 | 2/2004 | Bernstein |
| 6,701,406 B1 | 3/2004 | Chang et al. |
| 6,710,721 B1 | 3/2004 | Holowick |
| 6,711,138 B1 | 3/2004 | Pai et al. |
| 6,721,365 B1 | 4/2004 | Yin et al. |
| 6,721,419 B1 | 4/2004 | Stell et al. |
| 6,721,790 B1 | 4/2004 | Chen |
| 6,725,059 B1 | 4/2004 | Bell |
| 6,731,945 B2 | 5/2004 | Do et al. |
| 6,732,315 B2 | 5/2004 | Yagil et al. |
| 6,735,217 B1 | 5/2004 | Webber, Jr. et al. |
| 6,737,984 B1 | 5/2004 | Welles, II et al. |
| 6,738,382 B1 | 5/2004 | West et al. |
| 6,738,597 B1 | 5/2004 | Jeung et al. |
| 6,738,641 B1 | 5/2004 | Elsasser |
| 6,748,080 B2 | 6/2004 | Russ et al. |
| 6,751,441 B1 | 6/2004 | Murray et al. |
| 6,754,186 B1 | 6/2004 | Bullman |
| 6,759,946 B2 | 7/2004 | Sahinoglu et al. |
| 6,763,097 B1 | 7/2004 | Vitenberg |
| 6,771,164 B1 | 8/2004 | Fink |
| 6,771,750 B1 | 8/2004 | Nayler et al. |
| 6,771,773 B1 | 8/2004 | Hanrieder et al. |
| 6,771,774 B1 | 8/2004 | Phan et al. |
| 6,773,632 B1 | 8/2004 | Marshall et al. |
| 6,778,549 B1 | 8/2004 | Keller |
| 6,778,646 B1 | 8/2004 | Sun |
| 6,778,817 B1 | 8/2004 | Bullock et al. |
| 6,781,530 B2 | 8/2004 | Moore |
| 6,782,048 B2 | 8/2004 | Santhoff |
| 6,785,296 B1 | 8/2004 | Bell |
| 6,807,463 B1 | 10/2004 | Cunningham et al. |
| 6,819,760 B1 | 11/2004 | Nayler |
| 6,826,174 B1 | 11/2004 | Erekson et al. |
| 6,831,921 B2 | 12/2004 | Higgins |
| 6,831,975 B1 | 12/2004 | Easwaran et al. |
| 6,836,546 B1 | 12/2004 | Willer |
| 6,839,345 B2 | 1/2005 | Lu et al. |
| 6,842,459 B1 * | 1/2005 | Binder ........................ 370/463 |
| 6,844,809 B2 | 1/2005 | Manis et al. |
| 6,857,132 B1 | 2/2005 | Rakib et al. |
| 6,862,353 B2 | 3/2005 | Rabenko et al. |
| 6,865,193 B2 | 3/2005 | Terk |
| 6,868,072 B1 | 3/2005 | Lin et al. |
| 6,885,674 B2 | 4/2005 | Hunt et al. |
| 6,901,439 B1 | 5/2005 | Bonasia et al. |
| 6,904,134 B2 | 6/2005 | Jeon et al. |
| 6,909,725 B1 | 6/2005 | Chow |
| 6,922,407 B2 | 7/2005 | Wu |
| 6,925,089 B2 | 8/2005 | Chow et al. |
| 6,931,659 B1 | 8/2005 | Kinemura |
| 6,933,835 B2 | 8/2005 | Kline |
| 6,934,754 B2 | 8/2005 | West et al. |
| 6,937,056 B2 | 8/2005 | Binder |
| 6,941,364 B2 | 9/2005 | Kim et al. |
| 6,941,576 B2 | 9/2005 | Amit |
| 6,947,736 B2 | 9/2005 | Shaver et al. |
| 6,950,567 B2 | 9/2005 | Kline |
| 6,961,303 B1 | 11/2005 | Binder |
| 6,961,763 B1 | 11/2005 | Wang et al. |
| 6,963,559 B2 | 11/2005 | Elo |
| 6,963,936 B1 | 11/2005 | Billington et al. |
| 6,965,302 B2 | 11/2005 | Mollenkopf et al. |
| 6,980,089 B1 | 12/2005 | Kline |
| 6,985,072 B2 | 1/2006 | Omidi et al. |
| 6,985,714 B2 | 1/2006 | Akiyama et al. |
| 6,989,733 B2 | 1/2006 | Simonsen et al. |
| 6,993,317 B2 | 1/2006 | Belsak, Jr. |
| 6,995,657 B2 | 2/2006 | Zalitzky et al. |
| 6,996,213 B1 | 2/2006 | De Jong |
| 6,996,837 B1 | 2/2006 | Miura et al. |
| 6,998,964 B2 | 2/2006 | Lomax, Jr. et al. |
| 7,003,102 B2 | 2/2006 | Kiko |
| 7,006,006 B2 | 2/2006 | Witkow et al. |
| 7,009,527 B2 | 3/2006 | Seo |
| 7,009,946 B1 | 3/2006 | Kardach |
| 7,015,797 B2 | 3/2006 | Kaylor et al. |
| 7,016,377 B1 | 3/2006 | Chun et al. |
| 7,027,416 B1 | 4/2006 | Kriz |
| 7,027,483 B2 | 4/2006 | Santhoff et al. |
| 7,027,770 B2 | 4/2006 | Judd et al. |
| 7,035,270 B2 | 4/2006 | Moore, Jr. et al. |
| 7,046,716 B1 | 5/2006 | Miao |
| 7,054,303 B2 | 5/2006 | Miyazaki et al. |
| 7,064,654 B2 | 6/2006 | Berkman et al. |
| 7,088,238 B2 | 8/2006 | Karaoguz et al. |
| 7,095,849 B2 | 8/2006 | Smith et al. |
| 7,099,368 B2 | 8/2006 | Santhoff et al. |
| 7,099,621 B1 | 8/2006 | Chadwick |
| 7,103,240 B2 | 9/2006 | Kline |
| 7,106,721 B1 | 9/2006 | Binder |

| Patent/Pub No. | Date | Name |
|---|---|---|
| 7,113,134 B1 | 9/2006 | Berkman |
| 7,113,574 B1 | 9/2006 | Haas et al. |
| 7,113,763 B2 | 9/2006 | Heinonen et al. |
| 7,117,520 B2 | 10/2006 | Stewart |
| 7,133,729 B1 | 11/2006 | Wang et al. |
| 7,142,560 B2 | 11/2006 | Mansfield |
| 7,142,563 B1 | 11/2006 | Lin |
| 7,149,474 B1 | 12/2006 | Mikhak |
| 7,151,575 B1 | 12/2006 | Landry et al. |
| 7,154,996 B2 | 12/2006 | Strauss |
| 7,155,214 B2 | 12/2006 | Struthers et al. |
| 7,164,886 B2 | 1/2007 | Mowery et al. |
| 7,167,078 B2 | 1/2007 | Pourchot |
| 7,167,525 B2 | 1/2007 | Santhoff et al. |
| 7,167,923 B2 | 1/2007 | Lo |
| 7,181,023 B1 | 2/2007 | Andrews et al. |
| 7,194,251 B2 | 3/2007 | Rubinstein et al. |
| 7,209,719 B2 | 4/2007 | Liebenow |
| 7,209,945 B2 | 4/2007 | Hicks, III et al. |
| 7,257,106 B2 | 8/2007 | Chen et al. |
| 7,257,108 B2 | 8/2007 | Cheston et al. |
| 7,266,344 B2 | 9/2007 | Rodriguez |
| 7,292,859 B2 | 11/2007 | Park |
| 7,299,287 B1 | 11/2007 | Rubinstein et al. |
| 2002/0006137 A1 | 1/2002 | Rabenko et al. |
| 2002/0011923 A1 | 1/2002 | Cunningham et al. |
| 2002/0035624 A1 | 3/2002 | Kim |
| 2002/0037004 A1 | 3/2002 | Bossemeyer et al. |
| 2002/0038459 A1 | 3/2002 | Talmola et al. |
| 2002/0049036 A1 | 4/2002 | Bullock et al. |
| 2002/0075806 A1 | 6/2002 | Shalvi et al. |
| 2002/0128009 A1 | 9/2002 | Boch et al. |
| 2002/0144159 A1 | 10/2002 | Wu et al. |
| 2002/0176567 A1 | 11/2002 | Chen et al. |
| 2002/0198952 A1 | 12/2002 | Bell |
| 2003/0006881 A1 | 1/2003 | Reyes |
| 2003/0016794 A1 | 1/2003 | Brothers |
| 2003/0018975 A1 | 1/2003 | Stone |
| 2003/0067910 A1 | 4/2003 | Razazian et al. |
| 2003/0100288 A1 | 5/2003 | Tomlinson, Jr. et al. |
| 2003/0100330 A1 | 5/2003 | Tomlinson, Jr. et al. |
| 2003/0106067 A1 | 6/2003 | Hoskins et al. |
| 2004/0032373 A1 | 2/2004 | Petros et al. |
| 2004/0073597 A1 | 4/2004 | Caveney et al. |
| 2004/0077310 A1 | 4/2004 | Levy |
| 2004/0083262 A1 | 4/2004 | Trantow |
| 2004/0085976 A1 | 5/2004 | Dale et al. |
| 2004/0090984 A1 | 5/2004 | Saint-Hilaire et al. |
| 2004/0107299 A1 | 6/2004 | Lee et al. |
| 2004/0123322 A1 | 6/2004 | Erkocevic et al. |
| 2004/0125870 A1 | 7/2004 | Yamazaki |
| 2004/0136388 A1 | 7/2004 | Schaff |
| 2004/0151305 A1* | 8/2004 | Binder et al. ............... 379/413 |
| 2004/0158649 A1 | 8/2004 | Ophir et al. |
| 2004/0187156 A1 | 9/2004 | Palm et al. |
| 2004/0203387 A1 | 10/2004 | Grannan |
| 2004/0204040 A1 | 10/2004 | Heijnen |
| 2004/0208167 A1 | 10/2004 | Kishida |
| 2004/0208599 A1 | 10/2004 | Swartz et al. |
| 2004/0235468 A1 | 11/2004 | Luebke et al. |
| 2004/0255332 A1 | 12/2004 | Bertonis et al. |
| 2004/0268160 A1 | 12/2004 | Atkinson et al. |
| 2005/0010954 A1 | 1/2005 | Binder |
| 2005/0034159 A1 | 2/2005 | Ophir et al. |
| 2005/0038875 A1 | 2/2005 | Park |
| 2005/0073968 A1 | 4/2005 | Perlman |
| 2005/0076149 A1 | 4/2005 | McKown et al. |
| 2005/0084004 A1 | 4/2005 | Bione |
| 2005/0086694 A1 | 4/2005 | Hicks et al. |
| 2005/0089061 A1 | 4/2005 | Logvinov et al. |
| 2005/0114325 A1 | 5/2005 | Liu et al. |
| 2005/0136972 A1 | 6/2005 | Smith et al. |
| 2005/0144647 A1 | 6/2005 | Zussman et al. |
| 2005/0152337 A1 | 7/2005 | Wurtzel et al. |
| 2005/0164666 A1 | 7/2005 | Lang et al. |
| 2005/0180561 A1 | 8/2005 | Hazani et al. |
| 2005/0181839 A1 | 8/2005 | Tiainen et al. |
| 2005/0184915 A1 | 8/2005 | Nagel et al. |
| 2005/0226200 A1 | 10/2005 | Askildsen et al. |
| 2005/0226206 A1 | 10/2005 | An |
| 2005/0239400 A1 | 10/2005 | Narikawa |
| 2005/0249245 A1 | 11/2005 | Hazani et al. |
| 2005/0268322 A1 | 12/2005 | Watson |
| 2005/0280598 A1 | 12/2005 | Webb et al. |
| 2006/0007945 A1 | 1/2006 | Schoettle et al. |
| 2006/0018328 A1 | 1/2006 | Mody et al. |
| 2006/0066455 A1* | 3/2006 | Hancock et al. ......... 340/870.01 |
| 2006/0072684 A1* | 4/2006 | Feher ......................... 375/308 |
| 2006/0126617 A1 | 6/2006 | Cregg et al. |
| 2006/0133465 A1 | 6/2006 | Dockemeyer et al. |
| 2006/0152344 A1 | 7/2006 | Mowery, Jr. |
| 2006/0153169 A1 | 7/2006 | Koifman et al. |
| 2006/0172781 A1 | 8/2006 | Mohebbi |
| 2006/0193310 A1 | 8/2006 | Landry et al. |
| 2006/0193313 A1 | 8/2006 | Landry et al. |
| 2006/0210278 A1 | 9/2006 | Cregg et al. |
| 2006/0215680 A1 | 9/2006 | Camagna |
| 2006/0220833 A1 | 10/2006 | Berkman |
| 2006/0222086 A1 | 10/2006 | Frye, Jr. |
| 2006/0235333 A1 | 10/2006 | Couvillon, Jr. |
| 2006/0238250 A1 | 10/2006 | Camagna et al. |
| 2006/0251086 A1 | 11/2006 | Ha et al. |
| 2006/0251094 A1 | 11/2006 | Van Vleck et al. |
| 2006/0251159 A1 | 11/2006 | Huotari et al. |
| 2006/0251179 A1 | 11/2006 | Ghoshal |
| 2006/0274745 A1 | 12/2006 | Wang et al. |
| 2006/0280197 A1 | 12/2006 | Stone |
| 2006/0286958 A1 | 12/2006 | Lee et al. |
| 2006/0291493 A1 | 12/2006 | Schley-May et al. |
| 2007/0002772 A1 | 1/2007 | Berkman et al. |
| 2007/0002876 A1 | 1/2007 | Berkman et al. |
| 2007/0019959 A1 | 1/2007 | Retnasothie et al. |
| 2007/0025368 A1 | 2/2007 | Ha et al. |
| 2007/0047573 A1 | 3/2007 | Logvinov et al. |
| 2007/0054622 A1 | 3/2007 | Berkman |
| 2007/0058666 A1 | 3/2007 | Pratt |
| 2007/0082649 A1 | 4/2007 | Chan |
| 2007/0083668 A1 | 4/2007 | Kelsey et al. |
| 2007/0104168 A1 | 5/2007 | Polson |
| 2007/0112939 A1 | 5/2007 | Wilson et al. |
| 2007/0139188 A1 | 6/2007 | Ollis et al. |
| 2007/0167144 A1 | 7/2007 | Koga et al. |
| 2007/0177495 A1 | 8/2007 | Ametsitsi |
| 2007/0198748 A1 | 8/2007 | Ametsitsi et al. |
| 2007/0206629 A1 | 9/2007 | Choi |
| 2007/0254714 A1 | 11/2007 | Martich et al. |
| 2007/0268886 A1 | 11/2007 | Caspi et al. |

FOREIGN PATENT DOCUMENTS

WO         2007069241 A2         6/2007

OTHER PUBLICATIONS

Mark Hachman, Compaq to Ride the CEBus, EBN, Jan. 22, 1996, 1 page.

Home Automation Buses: Protocols Really Hit Home, EDN, Apr. 13, 1995, 9 pages.

Brian E. Markwalter, et al; CEBus Router Testing, IEEE Transactions on Consumer Electronics, Nov. 1991, vol. 37, No. 4, 8 pages.

J. Hofmann, Cable, Television, and the Consumer Electronic Bus, 9 pages.

Draft IS-60.04 Node Communications Protocol Part 6: Application Layer Specification, Rev. Apr. 18, 1996, 129 pages.

RF Physical Layer and Medium Specification; Revision: IS-60, Aug. 30, 1995, 007414-007430, EIA-600.35, 17 pages.

Symbol Encoding Sublayer; Revisions: May 12, 1995, Draft Copy 007431-007460, EIA-600.37, 30 pages.

Power Line/RF Symbol Encoding Sublayer; Revision May 12, 1995, Draft Copy, 007461-007524, EIA-60028, 64 pages.

Common Application Language (CAL) Specification; Revision SP3484, Rev. Sep. 17, 1996, 007525-007650, EIA 600-81, 126 pages.

CAL Context Description; Revision SP3485, Rev. Feb. 2, 1996, EIA 600-.82, pp. 007651-007667, 17 pages.

Node Medium Access Control Sublayer; Revision IS-60, Feb. 22, 1996, EIA 600.42, pp. 007797-007850, 54 pages.

Description of the Data Link Layer; Revision IS-60, Jan. 31, 1996, EIA 600.41, pp. 007851-007910, 60 pages.

Powerhouse Wireless Remote Controls; pp. 007920-007922, 3 pages.

Powerhouse Wireless Wall Switches; pp. 007923-007925, 3 pages.

JVC VIPSLAN-10 Infrared Wireless LAN system pp. 010714-010723, 10 pages.

VIPSLAN-10 Streaks Off the Wire; LAN Times, Dec. 18, 1995, pp. 010724, 1 page.

VIPSLAN-10, pp. 010725-010735, 11 pages.

JVC Introducing VIPSLAN-10, pp. 010799-010800, 2 pages.

JVC Satellite, pp. 010801-010802, 2 pages.

JVC Node, pp. 010803-010804, 2 pages.

JVC Station, pp. 010805-010806, 2 pages.

JVC PC Card & Mobile, pp. 010807-010808, 2 pages.

JVC Power Hub, pg. 010809, 1 page.

JVC T-Adapter, p. 010810, 1 page.

Optical Wireless Systems and Networks; IEEE Communications, vol. 36, No. 12, Dec. 1998, pp. 70-71, 010811-010814, 4 pages.

GSM Over Ethernet, IEE Review, Mar. 2002, pp. 012090-012095, 6 pages.

High Cost of Wiring Sparks Wireless LAN Alternatives, Computer Technology Review, vol. XIV, No. 3, Mar. 1994, pp. 012856-012863, 8 pages.

VISPLAN-10 Infrared Wireless LAN System, JVC, May 1996, pp. 015124-015133, 10 pages.

JVC introduces Ethernet Compatible Wireless LAN system; Business Wire, Sep. 26, 1995, p. 015134, 1 page.

Ethernet Wireless LAN Systems; BYTE, Feb. 1996, pp. 015135-015137, 3 pages.

JVC introduces first Ethernet compatible wireless LAN system, Business Wire, Nov. 8, 1995, p. 015138, 1 page.

Zeino, et al., Functional Approach to a Hybrid Wireless Network for Mobile Stations, Personal, Indoor and Mobile Radio Communications, 5th IEEE International Symposium, Sep. 18-23, 1994, vol. 3, pp. 994-998.

Pahlavan, et al., Trends in Local Wireless Networks, Communications Magazine, IEEE, Issue 3, vol. 33, Mar. 1995, pp. 88-95.

Dastangoo, et al., Wireless LAN Technologies and Applications, MILCOM '93 Conference record, IEEE, vol. 2, pp. 497-501.

Ophir, et al., 802.11 Over Coax—A Hybrid Coax—Wireless Home Network Using 802.11 Technology, Texas Instruments, 6 pages.

EIA 600.10 Introduction to the CEBUS Standard, Revision Feb. 5, 1995; 19 pages.

* cited by examiner

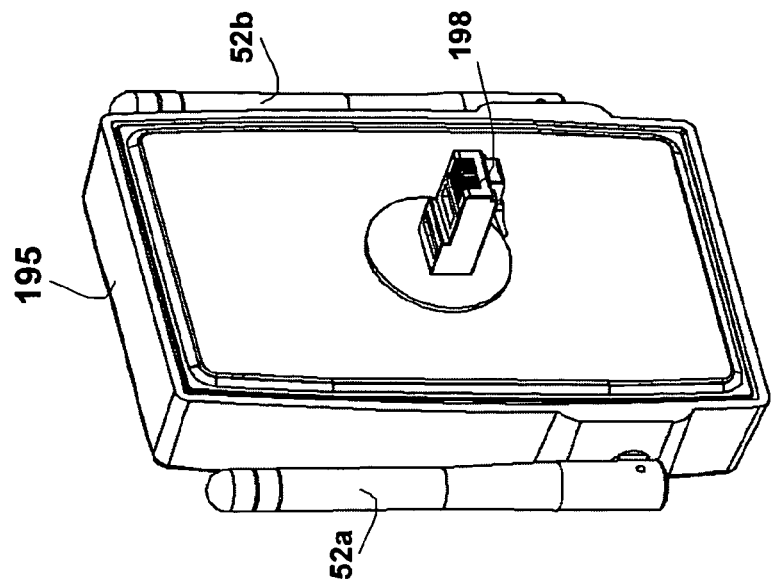
FIG. 19e
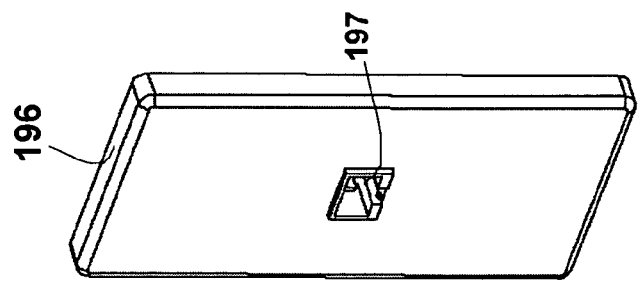
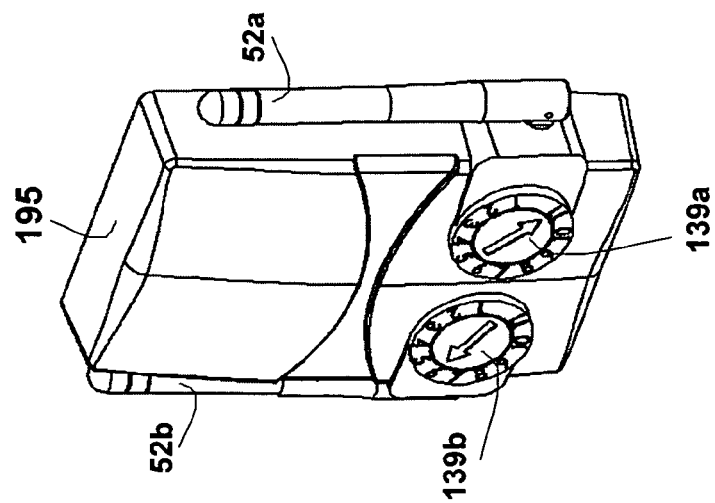
FIG. 19d

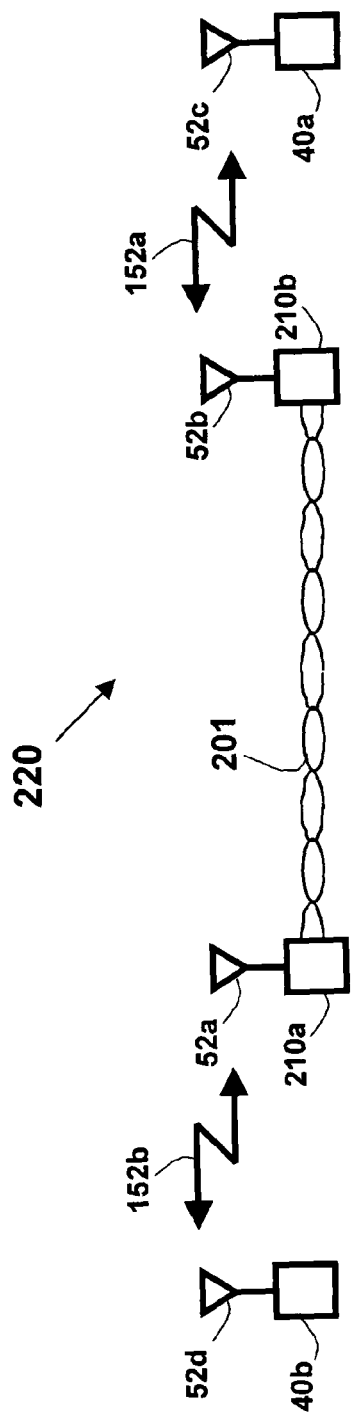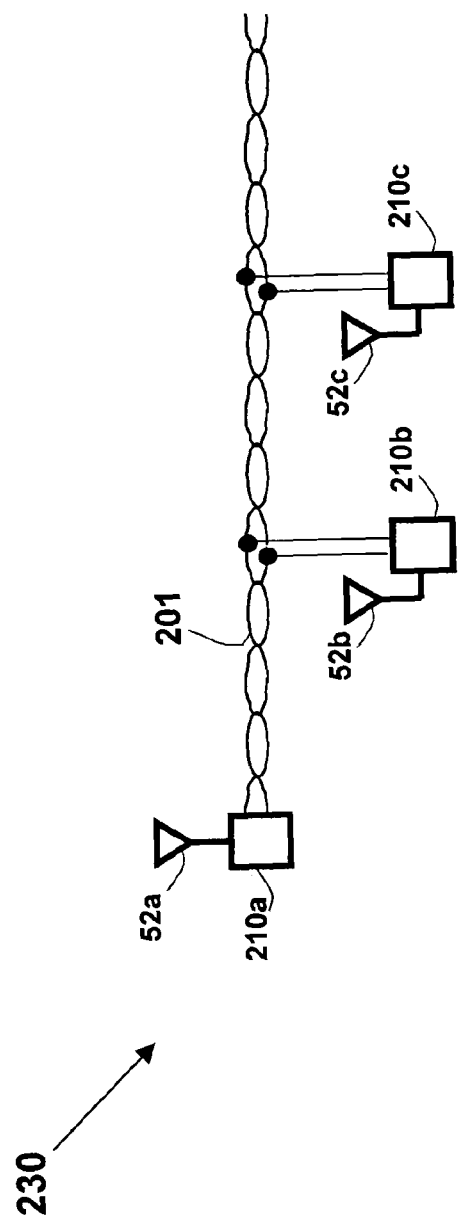

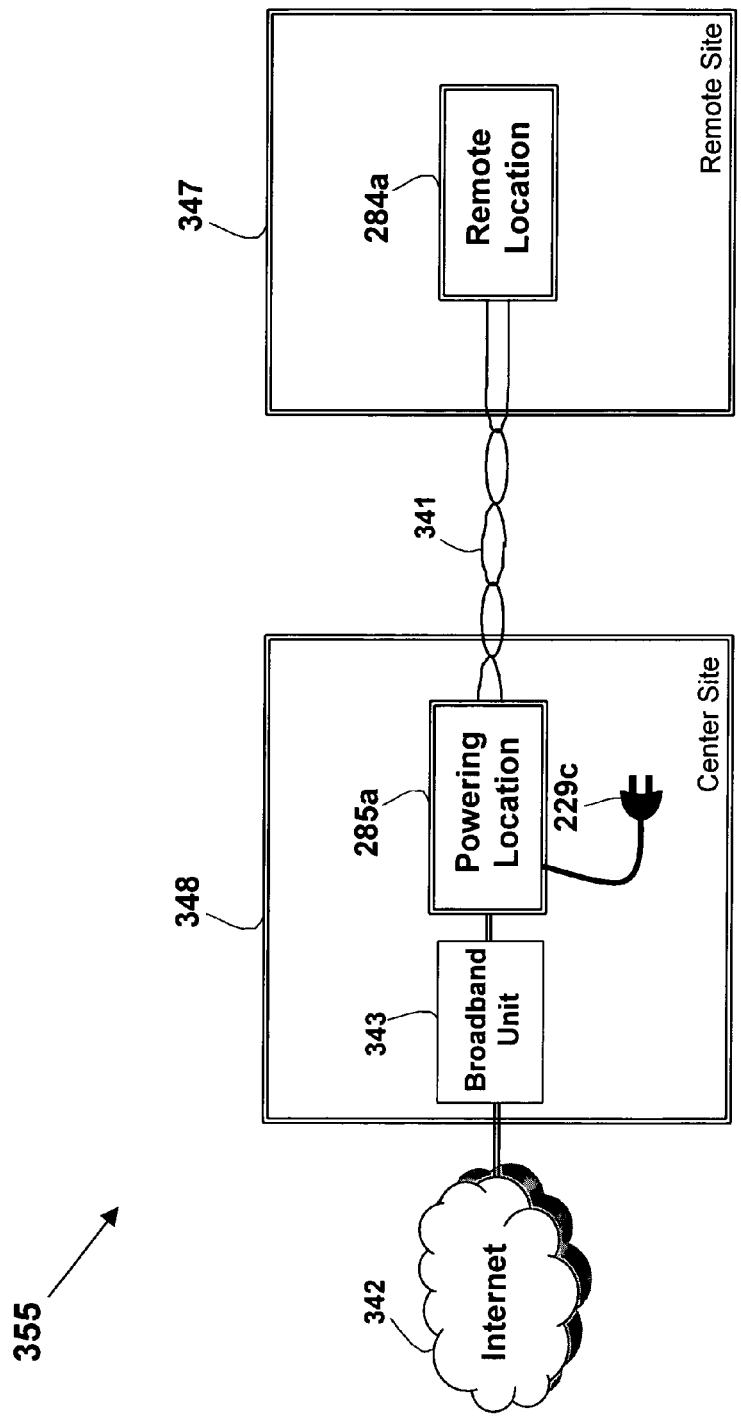

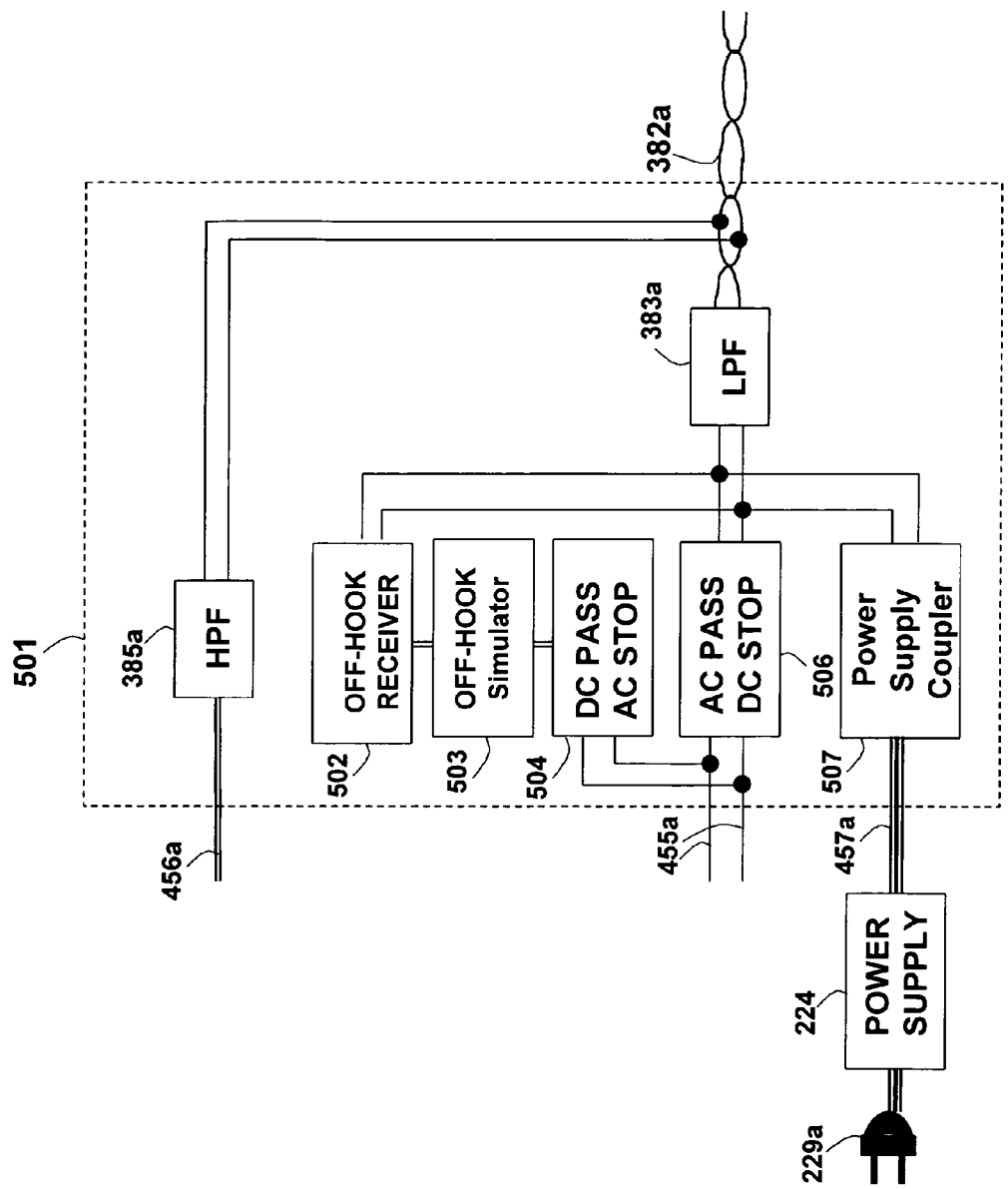

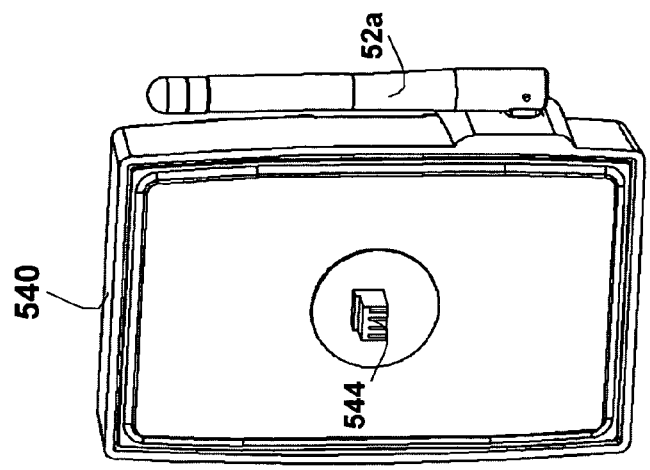
FIG. 54b
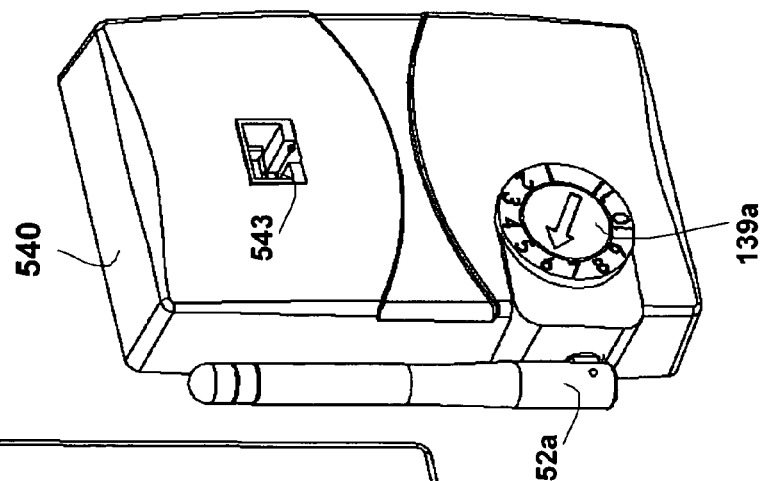
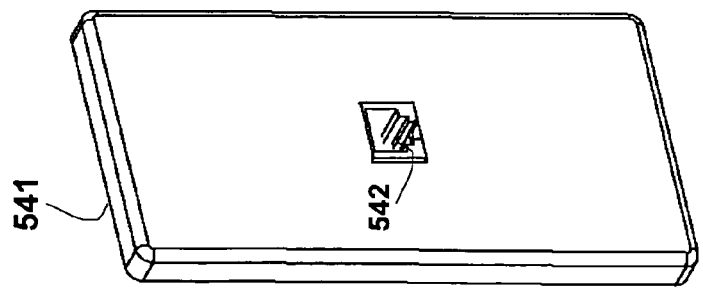
FIG. 54a

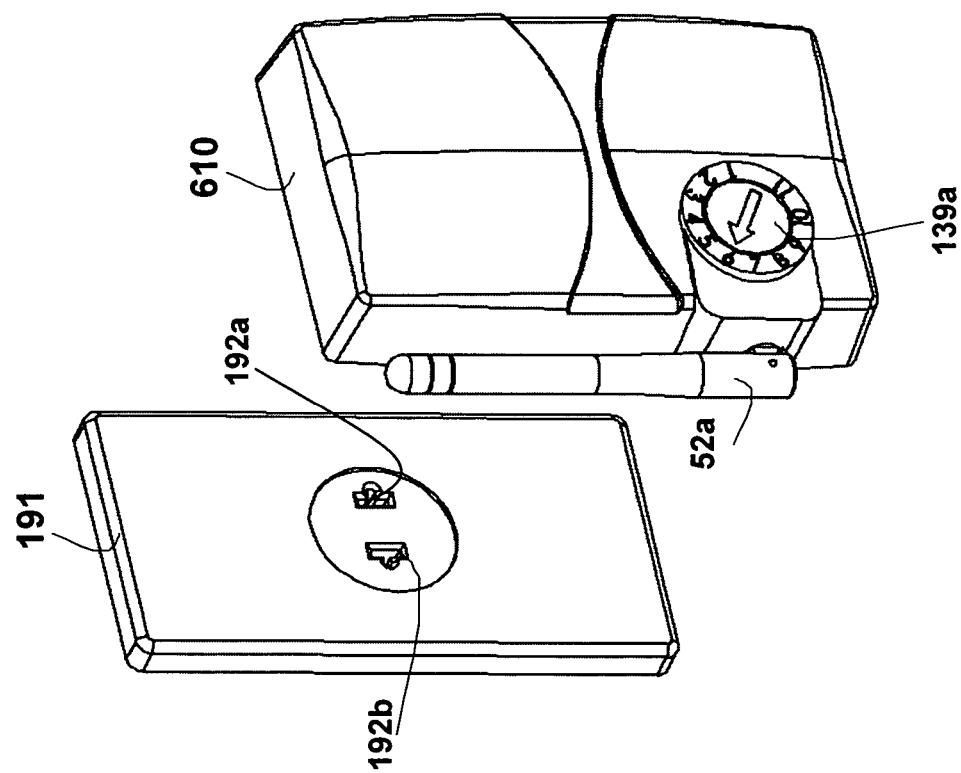

US 7,813,451 B2

APPARATUS AND METHOD FOR FREQUENCY SHIFTING OF A WIRELESS SIGNAL AND SYSTEMS USING FREQUENCY SHIFTING

FIELD OF THE INVENTION

The present invention relates generally to frequency shifting of a signal, and specifically the shifting of wireless signals. More particularly, embodiments of the present invention relate to improving the coverage of wireless networks, using frequency shifted signals over non-wired and wired mediums.

REFERENCES

The following documents are incorporated in their entirety for all purposes as if fully set forth herein:
  a. U.S. Pat. No. 6,862,353 to Rabenko, et al. entitled: "System and Method for Providing Power over a Home Phone Line Network", referred to herein as '353.
  b. U.S. Patent Application Publication 2004/0151305 to Binder, et al. entitled: "Method and System for Providing DC Power on Local Telephone Lines", referred to herein as '1305.
  c. U.S. Patent Application Publication 2005/0010954 to Binder entitled: "Modular Outlet", referred to herein as '0954.
  d. U.S. Patent Application Publication 2005/0180561 to Hazani, et al. entitled: "Outlet Add-On module", referred to herein as '0561.
  e. U.S. Patent Application Publication 2005/0249245 to Hazani, et al. entitled: "System and Method for Carrying a Wireless Based Signal over a Wiring", referred to herein as '9245.
  f. U.S. Pat. No. 6,842,459 to Binder entitled: "A network Combining Wired and Non-Wired segments", referred to herein as '459.
  g. U.S. Pat. No. 6,961,303 to Binder entitled: "Telephone Communication System and Method over Local area Network wiring", referred to herein as '303.

BACKGROUND OF THE INVENTION

Frequency Shifting.

In many applications it is required to frequency shift a signal in the frequency domain, as shown for example by graph 10 of FIG. 1. A first signal 11 is centered around frequency F2, and most of its energy is concentrated between frequencies F1 and F3 along a frequency axis 13. Signal 12 is a frequency up-shifted replica of the first signal 11, centered around frequency F5 and residing between frequencies F4 and F6. With the exception of amplification and/or attenuation, the resulted shifted signal 12 is targeted to be a reliable replica of the first signal 11, substantially having the same characteristics, information and frequency-response waveform, and occupying the same frequency bandwidth (i.e. F6−F4=F3−F1). The first signal 11 was up-shifted by ΔF, hence F5−F2=ΔF. Down frequency shifting of a signal is also known in the art, wherein the replica is shifted to a frequency spectrum lower than the original signal.

Frequency shifting devices are known in the art and commonly make use of a mixer/filter arrangement (e.g. heterodyne). FIG. 2 is a block diagram illustrating a prior art heterodyne-based frequency shifter 20. An original (pre-shifting) signal (i.e. the first signal 11 of FIG. 1) is received via an input port 21, which may be a connector, and fed into a mixer 22. The mixer 22 is also fed with a sine-wave signal having a frequency of F0 from a local oscillator 25. The mixer 22 is typically a nonlinear circuit or device (such as a transistor or a mixer/Schottky diode) having two input signals: The original signal from the input port 21 and a local oscillator 25 signal are multiplied by the mixer 22. One signal at the output of the mixer 22 is equal in frequency to the sum of the frequencies of the input signal and another signal equal in frequency to the difference between the frequencies of the input signals; and (if not filtered out) also the original input signal. In the case of the first signal 11 being received in the input port 21, the mixer 22 outputs will include the original first signal 11 shifted from F2 to F2+F0 and also the original first signal 11 shifted from F2 to F2−F0. In the case wherein up frequency shifting is desired, a band pass filter (BPF) 23 filters out the lower frequencies (around F2−F0) and substantially passes the higher frequency band signal to the output port 24, where the output port 24 may be a connector. In the case wherein the local oscillator frequency 25 is set to ΔF and the BPF 23 is designed to stop all frequencies other than frequencies between F4 to F6, the frequency shifter 20 will output signal 12 upon input of signal 11 in port 21. While the above description refers only to frequency dependent part of the frequency shifter 20, such frequency shifter 20 commonly includes many components involved in amplification, attenuation, limiting, and other functions that impact amplitude of the signals, but have flat frequency response in the relevant frequency spectrum, and thus for simplicity sake are not described.

A super-heterodyne frequency shifter is known in the art for radio receivers and other applications where a signal is required to be substantially frequency shifted. Such a shifter involves two (or more) single heterodyne shifters connected in cascade. FIG. 3 is a block diagram illustrating a prior art shifter 30. The super-heterodyne shifter 30 shifts a signal input in the input port 21, and outputs the shifted signal via the output port 24 using two frequency-shifting stages. The first stage contains a first mixer 22a and a first local oscillator 25a generating a reference signal having a frequency F10, and a first BPF 23a connected to the first mixer 22a output. The signal at the first BPF 23a output serves as the input to the second heterodyne stage containing a second mixer 22b and a second local oscillator 25b generating a reference signal having a frequency F11, and a second BPF 23b connected to the output port 24. In such a shifter, the total frequency shifting will be the sum of both local sine-wave references F10+F11. Similarly, a super-heterodyne shifter may comprise more than two stages, and may be used for up, as well as down, frequency shifting.

Implementing such a heterodyne, and even more, a super-heterodyne shifter requires many components, as described above. Such implementation commonly has a high part count, leading to high cost, a physically large enclosure, added complexity, lower reliability and other disadvantages.

Wireless Home Networking.

A popular approach to home networking (as well as office and enterprise environments) is communication via a radio frequency (RF) distribution system that transports RF signals throughout a building, to and from data devices. Commonly referred to as Wireless Local Area Network (WLAN), such communication makes use of the Industrial, scientific and Medical (ISM) frequency spectrum. In the United States, three of the bands within the ISM spectrum are the A band, 902-928 MHz; the B band, 2.4-2.484 GHz (commonly referred to as 2.4 GHz); and the C band, 5.725-5.875 GHz (commonly referred to as 5 GHz). Overlapping and/or similar bands are used in different regions such as Europe and Japan.

In order to allow interoperability between equipment manufactured by different vendors, few WLAN standards have evolved, as part of the IEEE 802.11 standard group, branded as WiFi (www.wi-fi.org). IEEE 802.11b describes a packet-based wireless communication using the 2.4 GHz frequency band and supporting communication rate of 11 Mb/s, IEEE 802.11a uses the 5 GHz frequency band to carry 54 MB/s and IEEE 802.11g uses the 2.4 GHz band to support 54 Mb/s.

A node/client with a WLAN interface is commonly referred to as STA (Wireless Station/Wireless client). The STA functionality may be embedded as part of the data unit, or alternatively be a dedicated unit, referred to as a bridge, coupled to the data unit. While STAs may communicate without any additional hardware (i.e. ad-hoc mode), such network usually involves Wireless Access Point (e.g. WAP or AP) as a mediation device. The WAP implements a Basic Stations Set (BSS) and/or ad-hoc mode based on Independent BSS (IBSS). STA, client, bridge and WAP will be collectively referred to hereon as a WLAN unit.

FIG. 5 is a graph 50 showing bandwidth allocation for IEEE802.11g wireless communication in the United States along frequency axis 59. In order to allow multiple communication sessions to take place simultaneously, eleven overlapping channels are defined spaced 5 MHz apart, spanning from 2412 MHz as the center frequency for channel number 1 (shown as 55), via channel 2 centered at 2417 MHz (shown as 56) and 2457 MHz as the center frequency for channel number 10 (shown as 57), up to channel 11 centered at 2462 MHz (shown as 58). Each channel bandwidth is 22 MHz, symmetrically (+/−11 MHz) located around the center frequency.

FIG. 4 is a block diagram illustrating a WLAN unit block diagram 40. For sake of simplicity, only IEEE802.11g will be described herein. In general, the wireless physical layer signal is handled in two stages. In a transmission path, first the baseband signal (IF) is generated based on data to be transmitted, using 256 AM (Quadrature Amplitude Modulation) based OFDM (Orthogonal Frequency Division Multiplexing) modulation technique, resulting a 22 MHz (single channel wide) frequency band signal. The signal is then up converted to the 2.4 GHz (RF), and placed in the center frequency of a required channel, and transmitted to the air via an antenna 52. Similarly, the receiving path comprises a received channel in the RF spectrum, down converted to the baseband signal (IF) wherein the data is then extracted.

The WLAN unit 40 connects to the wired medium via a wired port 41 (e.g. supporting IEEE802.3 10/100BaseT (Ethernet) interface). The physical layer of this interface is handled by 10/100BaseT PHY function block 42, converting the incoming Manchester or MLT3 modulated signal (respectively according to the 10BaseT or 100BaseTX coding) into a serial digital stream. Similarly, a WLAN outgoing digital data stream is modulated to the respective coded signal and transmitted via the wired port 41, implementing full duplex communication. The internal digital stream may be of proprietary nature of any standard one such as MII (Media Independent Interface). Such MII to Ethernet PHY 42 (i.e. Ethernet physical layer or Ethernet transceiver) can be implemented based on "LAN83C180 10/100 Fast Ethernet PHY Transceiver" available from SMSC-Standard Microsystems Corporation of Hauppauge, N.Y. U.S.A. While this function can be implemented by using a single dedicated component, in many embodiments this function is integrated into single component including other functions, such as handling higher layers. The PHY block 42 also comprises isolation magnetic components (e.g. transformer-based), balancing, surge protection, and a connector (commonly RJ-45) required for providing a proper and standard interface via the wired port 41.

For the sake of simplicity, in the above description and hereon, only an Ethernet 10/100BaseT interface will be described. However, it will be appreciated that any wired interface, being proprietary or standard, packet or synchronous, serial or parallel, may be equally used, such as IEEE1394, USB, PCI, PCMCIA, or IEEE1284, but not limited to. Furthermore, multiple such interfaces (being of the same type or mixed) may also be used.

In the case wherein the WLAN unit is integrated and physically enclosed within another unit (such as a data unit, e.g. computer) and does not support a dedicated and direct wired interface, part or all of the function of the PHY 42 may be obviated.

MAC (Media Access Control) and higher layers are handles in a MAC layer processor 43, comprising two sub blocks, designated as 10/100BaseT MAC 53 and IEEE802.11g MAC 54. The 10/100BaseT MAC 53 handles the MAC layer according to IEEE802.3 MAC associated with the wired port 41. The 10/100BaseT MAC 53 may be implemented using a "LAN91C111 10/100 Non-PCI Ethernet Single Chip MAC+PHY" available from SMSC—Standard Microsystems Corporation of Hauppauge, N.Y. U.S.A, which includes both the 10/100BaseT MAC 53 and the PHY 42 functionalities. Reference is made to the data sheet of the manufacturer (Agere Systems product brief for WaveLAN™ 802.11a/b/g Chip Set and Agere Systems, WaveLAN™ WL60040 Multimode Wireless LAN Media Access Controller (MAC), Product Brief August 2003 PB03-164WLAN). Similarly, the IEEE802.11 MAC 54 handles the MAC layer according to IEEE802.11g MAC associated with an antenna 52 (or other wireless port). Such IEEE802.11 MAC 54 is designed to support multiple data rates and encryption algorithms, and is commonly based on embedded processors and various memories. The IEEE802.11 MAC 54 may be implemented using "WaveLAN™ WL60040 Multimode Wireless LAN media Access Controller (MAC)" from Agere Systems of Allentown, Pa. U.S.A. All the bridging required in order to connect the wired IEEE802.3 MAC handled by the 10/100BaseT MAC 53 to the wireless IEEE802.11g MAC 54 is also included in the MAC Layer Processor 43, allowing for integration and proper operation.

The data stream generated by the IEEE802.11g MAC 54 is converted to an OFDM-based baseband signal (and vice versa) by a baseband processor 48. In common applications, the baseband processor 48 (i.e. wireless modem and IF transceiver) is implemented by a transmitter/receiver 44 digitally processing the data stream, and an OFDM unit (i.e. I-Q modulator) 45 generating the actual signal. The communication channel in wireless environments imposes various impairments, such as attenuation, fading, multi-path, interferences, and many other impairments. The baseband processor 48 may process the data stream according to the following functions:

a. Packet framing, wherein the data from the MAC 43 is adapted and organized as packets, wherein header, CRC, preamble, control information and end-of-frame delimiter are added;

b. Scrambler;

c. Convolution encoder (such as Viterbi encoder) to allow better robustness against channel impairments such as impulse and burst noise;

d. Puncturer to reduce the required data rate;

e. Interleaver performing permutations on the packet blocks (e.g. bytes) in order to better immunize against error bursts by spreading the information; and f. IFFT (Inverse FFT) modulator to produce separate QAM (Quadrature Amplitude Modulation) constellation sub-carriers.

Using digital to analog conversion, the processed digital data from the transmitter portion of the transmitter/receiver 44 is used to generate the OFDM baseband signal in the modulator 45. The received OFDM baseband signal from functional block 46 is digitized by the modulator 45, processed by the receiver potion of the transmitter/receiver 44, transferred to the MAC Layer Processor 43 and PHY 42 to be transmitted via the wired port 41. Some implementations of WLAN chipsets provide the actual baseband signal, while others provide orthogonal analog I/Q modem signals which need to be further processed to provide the actual real analog form IF (Intermediate Frequency) OFDM baseband signal. In such a case, as known in the art, a Local Oscillator (LO) determining the IF frequency is used to generate a sinewave that is multiplied by the I signal, added to the Q signal multiplied by 90 degrees shifted LO signal, to produce the real analog IF baseband signal. The baseband processor 48 may be implemented based on "WaveLAN™ WL64040 Multimode Wireless LAN Baseband" from Agere Systems of Allentown, Pa. U.S.A. SA5250 Multi-Protocol Baseband from Philips Semiconductors including both baseband processor 48 and IEEE802.11 MAC 54 functionalities may be alternatively used.

The WLAN Transceiver (i.e. RF-IF Converter) 46 shifts the IF OFDM baseband signal from the baseband to the ISM RF band. For example, an OFDM baseband signal symmetrically centered around 10 MHz and required to use channel 2 of FIG. 5, centered at 2417 MHz, is required to be frequency shifted by 2417-10=2407 MHz. Such frequency shifting may use many methods known in the art. A direct modulation transmitter/receiver may be used for frequency shifting, as may be the case where "WaveLAN™ WL64040 Dual-Band Wireless LAN Transceiver" from Agere Systems of Allentown, Pa. U.S.A. is used to directly convert the orthogonal I-Q analog signal to the 2.4 GHz RF band. Alternatively, superheterodyne (e.g. dual conversion) architecture may be used, as described for "SA5251 Multiband RF Transceiver" from Philips Semiconductors. The WLAN Transceiver 46 and the baseband processor 48 compose the wireless path physical layer processor 47.

A T/R Switch 49 is used to connect the antenna 52 to the transmitter path and disconnect the receiver path (to avoid receiver saturation) upon a control signal signaling transmission state of the WLAN unit 40. PIN Diode switch based design is commonly used, such as PIN Diode switch SWX-05 from MCE—KDI Integrated Products of Whippany, N.J. U.S.A. The antenna 52 is coupled via a RF filter 51 in order to ensure transmitting limited to the defined band mask (removing unwanted residual signals), and to filter out noise and out of band signal in the receiving mode. The RF filter 51 may use SAW (Surface Acoustic wave) technology, such as a "2441.8 MHz SAW Filter" from SAWTEK (A TriQuint company) of Orlando, Fla. U.S.A.

Actual implementation of the WLAN unit 40 may also involve amplifiers, attenuators, limiters, AGC (Automatic Gain Control), and similar circuits involved with signal level functions. For example, a Low Noise Amplifier (LNA) is commonly connected in the receive path near the antenna (a.k.a. aerial) 52. An example of LNA includes, but not limited to, the "MAX2644 2.4 GHz SiGe, High IP3 Low-Noise Amplifier". Similarly, a Power Amplifier (PA) may be used in the transmit path, such as the "MAX2247 Power Amplifier for IEEE802.11g WLAN". Both the LNA and the PA are available, for example, from Maxim Integrated Products of Sunnyvale, Calif. U.S.A. For the sake of simplicity, such functions are omitted in FIG. 4 as well as in the rest of this document. Similarly, wherein either a transmitting or a receiving path is described in this document, it should be understood that the opposite path also exists for configuring the reciprocal path.

A non-limited example of a detailed block diagram of a typical physical layer processor 47 is shown in FIG. 6, including a WLAN transceiver 46 shown individually in FIG. 7. A WLAN transceiver 46 is based on direct-conversion and low intermediate-frequency techniques known in the art, such as used in the "Dual-Band Wireless LAN Transceiver Wave-LAN WL54040" from Agere Systems Inc., shown as comprising I/Q modulator 67 and I/Q de-modulator 68. The RF signal received in the antenna 52 is input (via RF filter 51 and TX/RX Switch 49 as shown in FIG. 4) to the I/Q modulator 67 via port 61. The signal is fed into the two mixers 22a and 22b. Both mixers 22a and 22b are connected to a local oscillator 25 based on a quartz crystal 64. The local oscillator 25 may comprise a synthesizer, a VCO (Voltage Controlled Oscillator), a PLL (Phase Locked Loop), and a NCO (Number Controlled Oscillator), as known in the art. The local oscillator 25 is directly fed to mixer 22b. A sine-wave reference signal from the oscillator 25 is fed to the mixer 22a via 90 degrees phase shifter 63a. In addition to the frequency down shifting, the I/Q modulation is obtained wherein the output signal (after proper filtering, not shown in the figure) from mixer 22a is the Quadrature (Q) component over port 65a and the output from mixer 22b is the In-phase (I) component over port 65b of the received RF signal in port 61. The I/Q demodulator 68 receives I/Q components of the signal to be transmitted via ports 66b and 66a respectively. The I and Q component signals are up-frequency shifted by mixers 22c and 22d respectively, wherein the mixer 22d is directly fed from the oscillator 25, while mixer 22c is fed with a 90 degrees phase shifted signal through phase shifter 63b. The outputs of both mixers 22c and 22d are summed by an adder 76 and fed as the RF signal to be transmitted by the antenna 52 (FIG. 4) via port 62. It will be appreciated that the WLAN transceiver 46 further comprises filter, amplifiers, control, timing, and other circuits not described above and omitted for clarity and simplicity sake. As described above, the inputs and outputs of the WLAN transceiver are of analog nature and are either low IF or RF based signals. Hence, most such WLAN transceivers are considered as analog parts and do not include substantial digital processing or digital circuitry.

A baseband processor 48 is typically a digital part including a DSP (Digital Signal Processor) and other digital circuits. In order to adapt between the digital baseband processor 48 and the analog signals to and from the WLAN transceiver 46, a converters set 31 between analog and digital signals is included as the mixed signal part of the processor 48. Analog to digital converters 69a and 69b respectively convert the Q and I signal components received respectively via ports 65a and 65b, to digital representations fed to the OFDM modulator 38. Similarly, the digital Q and I components from the OFDM demodulator 37 are converted to analog using respective digital to analog converters 32a and 32b. The OFDM demodulator 38 and the OFDM modulator 37 are full digital circuits, commonly based on DSP (Digital Signal Processing).

After down frequency shifting and I/Q modulating (by IQ demodulator 67) and after being digitized by analog to digital converters 69a and 69b, the received WLAN signal is input to the OFDM modulator 38. The processing in this block includes frequency handling 39, Fast Fourier Transform (FFT) 71, de-mapper 72, and a descrambler, decoder (commonly Viterbi decoder), and de-interleaver as part of block 73. The modulated signal is output via port 74 to the MAC unit 43.

On the transmit path, data received from the MAC Layer Processor 43 via port 75 is I/Q demodulated by the OFDM demodulator 37. The OFDM demodulator 37 comprises, inter-alia, a scrambler, a coder (usually Viterbi coder) and interleaver as part of block 36, feeding output data to a mapper 35, which in turn feeds to the IFFT unit 34. After cyclic extension 33, the created digital I/Q components are converted to analog by digital to analog converters 32b and 32a, respectively, and the analog signals are respectively outputted to ports 66b and 66a of the WLAN transceiver 46. It will be appreciated that the baseband processor 48 further comprises filters, amplifiers, control, timing, framing, synchronization, and other circuits not described above and omitted for clarity and simplicity sake.

Outlets

The term "outlet" herein denotes an electromechanical device that facilitates easy, rapid connection and disconnection of external devices to and from wiring installed within a building. An outlet commonly has a fixed connection to the wiring, and permits the easy connection of external devices as desired, commonly by means of an integrated connector in a faceplate. The outlet is normally mechanically attached to, or mounted in, a wall or similar surface. Non-limiting examples of common outlets include: telephone outlets for connecting telephones and related devices; CATV outlets for connecting television sets, VCR's, and the like; outlets used as part of LAN wiring (also referred to as "structured wiring") and electrical outlets for connecting power to electrical appliances. The term "wall" herein denotes any interior or exterior surface of a building, including, but not limited to, ceilings and floors, in addition to vertical walls.

Wireless Coverage.

Most existing wireless technologies, such as IEEE802.11x (e.g. IEEE802.11a/g/b), BlueTooth™, UWB (Ultra Wide-Band) and others, are limited to tens of meters in free line of sight environment. In common building environments, wherein walls and other obstacles are present, the range of wireless communication may be dramatically reduced. As such, in most cases a single wireless unit (such as an access point) cannot efficiently cover the whole premises. In order to improve the coverage, multiple access points (or any other WLAN units) are commonly used and distributed throughout the environment.

In order to allow the access points to interconnect in order to form a single communication cluster in which all the WLAN units can communicate with each other and/or with wired data units, a wired backbone is commonly used, to which the access points are connected. Such a network combining wired and wireless segments is disclosed for example in U.S. Pat. No. 6,330,244 to Swartz et al. Such a configuration is popular today in offices, businesses, enterprises, industrial facilities and other premises having a dedicated wiring network structure, commonly based on Category 5 cabling (also referred to as structured wiring). The access point devices interface the existing wiring based on local area network (LAN), commonly by a standard data interface such as Ethernet based 10/100BaseT.

As explained above, installing a dedicated network wiring infrastructure in existing houses is not practical. The prior art discloses using existing AC power wiring also as the wired backbone for interconnecting WLAN units. Examples of such prior art includes U.S. Pat. No. 6,535,110 to Arora et al., U.S. Pat. No. 6,492,897 to Mowery, Jr., U.S. Patent application 2003/0224728 to Heinonen et al., and U.S. Pat. No. 6,653,932 to Beamish et al. There are several drawbacks to using powerlines as a backbone for connecting WLAN units involves several drawbacks. The type of wiring, noise, and the general hostile environment results in a poor and unreliable communication medium, providing low data rates and requiring complex and expensive modems. In addition, the connection of a WLAN unit to the powerline requires both a wireless and a powerline modems for handling the physical layer over the two media involved, as well as a complex MAC to bridge and handle the two distinct protocols involved. As such, this solution is complex, expensive and offers low reliability due to the amount of hardware required.

U.S. patent application '9245 suggests a system 80 including an apparatus 81 for bridging between a wireless link via antenna 52 and a wired medium 83 connected via connector 82 as shown in FIG. 8. However, super-heterodyne scheme is suggested for frequency shifting the wireless signal in order to carry it over a wiring.

In consideration of the foregoing, it would be an advancement in the art to provide a method and system for frequency shifting of a signal, and in particular a wireless signal, in a simple, cost-effective, faithful, reliable, minimum parts count, minimum hardware, or using existing and available components.

Furthermore, it would be highly advantageous to have a method and system for enlarging the coverage of a wireless network, and in particular to bring the coverage to a specific required locations, in a simple, cost-effective, faithful, reliable, minimum parts count, minimum hardware, or using existing and available components.

Similarly, it would be highly advantageous to have a method and system for seamlessly interconnecting separated or isolated coverage areas, in a simple, cost-effective, faithful, reliable, minimum parts count, minimum hardware, or using existing and available components.

Furthermore, it would be highly advantageous to have a method and system for using a wireless signals, wireless technologies, and wireless components for wired communication.

SUMMARY OF THE INVENTION

In one aspect of the present invention, a method and apparatus for frequency shifting of a signal is described. The signal in a first frequency band is I/Q demodulated by an I/Q demodulator into its 'I' and 'Q' components signals, which are modulated by an I/Q modulator to reconstruct the signal over a distinct and non-overlapping second frequency band. Similarly, additional set of an I/Q demodulator and an I/Q modulator may be used to frequency shift from the second frequency band to the first frequency band, thus allowing for bi-directional half-duplex or full-duplex paths. The signal may be a wireless signal, received and transmitted by two antennas, one for each frequency band. Alternatively, a single antenna may be used for both frequency bands. The frequency shifters in all above systems hereinafter may use any frequency-shifting scheme, such as mixer/filter, heterodyne or super-heterodyne, or using I/Q demodulating and modulating as described above.

In another aspect of the present invention, frequency shifting is used in a wireless network for increasing the coverage and seamlessly bridging between two isolated or separated wireless coverage areas. The network is based on two frequency shifters, communicating with each other over a first frequency band. Wireless signal from a first wireless unit is received by one shifter and then frequency shifted to another frequency band, and transmitted to the other shifter. The other shifter shifts the received signal to the original transmitted frequency band and transmits to another wireless unit, being distant from the first wireless unit, thus creating a wireless link between the two wireless units. The other direction is also operative for allowing half-duplex or bi-directional operation.

The communication between the frequency shifters above may also use two additional intermediate frequency shifters (or more), thus having additional frequency shifting to another distinct frequency band, allowing or additional increased reach and distance between the two wireless units.

In another aspect of the present invention, frequency shifting is used in a wireless network for increasing the coverage and seamlessly bridging between two or more isolated or separated wireless coverage areas using an interconnecting wired medium. The network is based on two or more frequency shifters, each covering a distinct area, communicating with each other over the wired medium. Wireless signal from a first wireless unit is received by one shifter and then down frequency shifted for being carried over the wired medium, and transmitted to the other shifter. The other shifter shifts the received signal to the original transmitted frequency band and transmits to another wireless unit, being distant from the first wireless unit, thus creating a wireless link between the two wireless units. The other direction is also operative for allowing half-duplex or bidirectional operation.

Connecting the frequency shifters to the wired medium may make use of a suitable connector, as well as a protection circuitry for accommodating transients, over-voltage and lightning, and any other protection means for reducing or eliminating the damage from an unwanted signal over the wired medium. A band pass filter may also be used for passing only the shifted wireless signals, and rejecting or stopping other signals in the described path. A transformer may be used for isolating and reducing common-mode interferences. Further a wiring driver and wiring receivers may be used in order to transmit and receive the appropriate level of signal to and from the wired medium. Equalizer may also be used in order to compensate for any frequency dependent characteristics of the wired medium.

In another aspect of the present invention, the wired medium concurrently carries a power signal, which may be AC or DC. The power signal is carried over a frequency band distinct from the band used for carrying the shifted wireless signal, using a set of low pass filter (for DC) or a band pass filter (for AC) for coupling the power signal to or from the wired medium, and high pass filter or band pass filter, as warranted, for coupling the shifted wireless signal to and from the wired medium. The power signal may be inserted in one point and extracted in another point, which may be the same point used for connecting a frequency shifter. The power signal carried over the wired medium may be used for powering any connected devices, as well as powering part or all of a frequency shifter and any connected circuitry, using applicable power converter to adapt between the power signal level and type to the voltages (commonly DC) required for the operation of the connected hardware. In one aspect of the invention, the power carrying wired medium is electricity AC power wires, primarily installed for distributing electricity power from a generation station 115V 60 Hz (in North America) in general and in a building in particular.

In another aspect of the present invention, the wired medium concurrently carries a non-power signal, which may be in analog or digital forms. Similarly, a service signal such as analog telephone or CATV related signals may be concurrently carried using FDM. Connecting the various signals to and from the wired medium involves using a set of filters, each allowing for passing or a distinct band of the appropriate signal, and stopping other the signal sharing he wired medium. The added signal may be inserted in one point and extracted in another point, which may be the same point used for connecting a frequency shifter. In another aspect of the present invention, power signal carried in addition to the non-power signals described using a distinct frequency band and coupled to or from the wired medium using the appropriate filter. The power signal may be used to power any device connected to the wired medium.

In another aspect of the present invention, one or more frequency shifters are conductively connected to a wireless unit (such as WAP), which may be forming an integral part such as integrating both into a single enclosure. Alternatively, a frequency shifter and its connected environment may be connectable as an external device to an existing or available wireless unit. The connecting to the wireless unit may be through an attenuator for adjusting the levels of the signal in the path. A splitter may be added in between for sharing the conductive path with an antenna, thus retaining the through-the-air wireless communication of the wireless unit. In a network employing plurality of frequency shifters over a wired medium, one or more may be conductively coupled to a wireless units, allowing wired only, wireless only or any combination thereof for coupling to the wired medium.

In another aspect of the present invention, multiple distinct wired mediums are employed. The data is shared among all the wired mediums by using a single frequency shifter and a splitter. The splitter connects to all the wired mediums thus all of them share the single frequency shifter. This frequency shifter may be coupled wirelessly or conductively to a wireless unit as discussed hereinabove. The devices connected to the other end of each such wired medium can be as described above. Similar to the above, some or all the wired medium may concurrently carry power or other signals, using FDM, phantom channel, split-tap transformer or any other scheme described herein or known in the art.

In another aspect of the present invention there is provided an apparatus for faithful frequency shifting of a first spread-spectrum signal without any protocol conversion from a first frequency band to a second frequency band distinct from the first frequency band, said apparatus comprising: a first port for receiving the first spread-spectrum signal in the first frequency band; a first I/Q demodulator coupled to said first port to receive the first spread-spectrum signal from said first port, for deriving the I and Q component signals of the first spread spectrum signal; a first I/Q modulator coupled to said first I/Q demodulator to receive the first spread spectrum signal I and Q component signals, said first I/Q modulator being operative to reconstruct first spread-spectrum signal and to frequency shift the first spread-spectrum signal to the second frequency band; and a second port coupled to said first I/Q modulator to receive the frequency shifted signal from said first I/Q modulator, for outputting the frequency shifted first spread spectrum signal in the second frequency band. The apparatus may further be operative for faithful frequency shifting of a second spread-spectrum signal without any protocol conversion from the second frequency band to the first distinct frequency band, said apparatus further comprising: a third port for receiving the second spread-spectrum signal in the second frequency band; a second I/Q demodulator coupled to said third port to receive the second spread-spectrum signal from said third port, for deriving the I and Q component signals of the second spread spectrum signal; a second I/Q modulator coupled to said second I/Q demodulator to receive the second spread spectrum signal I and Q component signals, said second I/Q demodulator being operative to reconstruct the second spread-spectrum signal frequency shifted to the first frequency band; and a fourth port coupled to said second I/Q modulator to receive the frequency shifted signal from said second I/Q modulator, for outputting the frequency shifted second spread spectrum signal in the first frequency band.

In another aspect of the present invention there is provided a network for wireless communication of a first wireless signal carried in a first frequency band between first and second wireless units, said network comprising: a first frequency shifter for wireless communication of the first wireless signal with the first wireless unit, said first frequency shifter being operative to frequency shift the first wireless signal between the first frequency band and a second frequency band distinct from the first frequency band; and a second frequency shifter for wireless communication of the first wireless signal with the second wireless unit, said second frequency shifter being operative to frequency shift said first wireless signal between said first frequency band and said second frequency band.

In another aspect of the present invention there is provided an apparatus for frequency shifting without any protocol conversion between a wireless signal in a wireless frequency band carried by a wireless medium and a wired signal in a wired frequency band carried by a wired medium, said apparatus comprising: an antenna for receiving and transmitting the wireless signal;

a wiring connector for connecting to the wired medium; a down frequency shifter for down frequency shifting a signal from the wireless frequency band to the wired frequency band; an up frequency shifter for up frequency shifting of a signal from the wired frequency band to the wireless frequency band; an RF switch coupled between said antenna, said down frequency shifter and said up frequency shifter, said RF switch having first and second states, wherein in the first state said antenna is coupled to said down frequency shifter and in the second state said antenna is coupled to said up frequency shifter; and a wired frequency band switch coupled between said wiring connector, said down frequency shifter and said up frequency shifter, said wired frequency band switch having first and second states, wherein in the first state said wiring connector is coupled to said down frequency shifter and in the second state said connector is coupled to said up frequency shifter; wherein said apparatus is switchable into distinct first and second states, wherein in the first state of said apparatus, said RF switch is in its said first state and said wired frequency band switch is in its said first state for receiving the wireless signal from the antenna, down frequency shifting the wireless signal and transmitting the shifted wireless signal to the wiring connector; and wherein in the second state of said apparatus, said RF switch is in its said second state and said wired frequency band switch is in its said second state for receiving the frequency shifted wireless signal from said wiring connector, up frequency shifting to reconstruct the wireless signal and transmitting the wireless signal to the antenna. The apparatus may be further comprising: a first signal detector coupled to said wiring connector for sensing the presence of a signal in the wired frequency band; and a second signal detector coupled to said antenna for sensing the presence of a signal in the wireless frequency band; wherein said apparatus is operative to shift to its said first state upon sensing the presence of a signal in the wireless frequency band and to shift to its said second state upon sensing the presence of a signal in the wired frequency band.

In another aspect of the present invention there is provided a network for wireless communication of wireless signals among a plurality of wireless units, the wireless signals being carried in a wireless frequency band, the wireless units being interconnected by a wired medium for carrying wired signals in a wired frequency band distinct from and lower in frequency than the wireless frequency band, said network comprising a plurality of frequency shifters each connected to the wired medium, and said network having two distinct states, wherein: in the first state, one of said frequency shifters is operative to wirelessly receive a first wireless signal from one of the wireless units, down frequency shift the received wireless signal to the wired frequency band, and couple the shifted wireless signal to the wired medium, while wherein all other frequency shifters receive the shifted wireless signal from the wired medium, up frequency shift the received shifted wireless signal to the wireless frequency band to reconstruct the first wireless signal, and transmit the reconstructed first wireless signal; and in the second state, one of said frequency shifters is operative to wirelessly receive a second wireless signal from a wireless unit, down frequency shift the received wireless signal to the wired frequency band, and couple the shifted wireless signal to the wired medium, while all other frequency shifters receive the shifted wireless signal from the wired medium, up frequency shift the received shifted wireless signal to the wireless frequency band to reconstruct the second wireless signal, and transmit the reconstructed second wireless signal.

In another aspect of the present invention there is provided an apparatus for coupling a wireless signal to a plurality of wired mediums, for use with a wireless unit having an antenna connector and operative to receive and transmit the wireless signal in a wireless frequency band, and with a plurality of distinct wired mediums, each operative for conducting signals in a wired frequency band, said apparatus comprising: a coaxial connector for connecting to the antenna connector of the wireless unit for receiving and transmitting the wireless signal in the wireless frequency band; a plurality of wiring connectors each for connecting to a distinct wired medium; a frequency shifter connected for frequency shifting between the wireless frequency band and the wired frequency band; an RF attenuator coupled between said coaxial connector and said frequency shifter for substantially attenuating the signal in the wireless frequency band; and a wired band splitter connected to said frequency shifter and having multiple ports, each port connected to a wiring connector, said splitter being operative to share a signal in the wired frequency band with all devices connected thereto. The apparatus may be further operative for wireless communication with a second wireless unit, said apparatus further comprising: an antenna for receiving and transmitting the wireless signal in the wireless frequency band; and an RF splitter connected between said antenna, said attenuator and said coaxial connectors.

In another aspect of the present invention there is provided a network for wireless communication of a wireless signal in a wireless frequency band among a plurality of wireless units interconnected by a plurality of distinct wired mediums, the wired mediums providing a wired frequency band distinct from, and lower in frequency than, the wireless frequency band, each wired medium having first and second ends, said network comprising: a center device coupled to a selected wireless unit and connected to the first end of each of the wired mediums, said center device being operative to frequency shift the wireless signal between the wireless frequency band and the wired frequency band; and a plurality of remote devices, each connected to a second end of one of a respective one of the wired mediums and each coupled to a respective wireless unit, each of said remote devices being operative to frequency shift a signal between the wireless frequency band and the wired frequency band, wherein: said network is operative to the allow said center device to receive the wireless signal in the wireless band from the selected wireless unit, to down frequency shift the wireless signal to the wired frequency band, and to transmit the shifted wireless signal to all connected wired mediums; each of said remote devices is operative to up frequency shift shifted wireless signal from said center device to the wireless frequency -band, to reconstruct the wireless signal, and to transmit the reconstructed wireless signal to the respective wireless unit; said network is operative to allow one of said remote devices to receive a wireless signal in the wireless band from one of the wireless units coupled thereto, to down frequency shift the received wireless signal to the wired frequency band, and to transmit the shifted wireless signal to the connected wired medium; and said center device is operative to up frequency shift the received shifted wireless signal to the wireless frequency band to reconstruct the wireless signal, and to transmit the reconstructed first wireless signal to the coupled wireless unit.

Each of the above frequency shifters may be unidirectional or allow for half-duplex or bi-directional operation, as well as full duplex. In such configuration a threshold detectors are coupled to the receiving ports. The direction of the signal flow is dynamically determined by the network flow. Upon sensing of the presence of a received signal in a port, the shifter is operative to receive the signal from this port (being antenna for wireless signal or connector for the wired medium) and transmit in the other port (being antenna for wireless signal or connector for the wired medium).

In each of above mentioned frequency shifters, one or more of the I/Q modulators and I/Q demodulators mentioned above may be part of a wireless transceiver component commonly available in the market and commonly used in wireless units. Each of the first (and second, where applicable) frequency bands may be selectable from a plurality of possible bands by a control port or a user settable mechanical switch.

The frequency shifters in all above systems may use any frequency-shifting scheme, such as mixer/filter, heterodyne or super-heterodyne, or using I/Q demodulating and modulating as described above.

Each of the signals above may be a spread-spectrum signal such as multi-carrier (e.g. OFDM, DMT and CDMA), or a single carrier (narrow-band) signal. Each of the wireless signals or the wireless communication links above may be WPAN, WLAN, WMAN, WAN, BWA, LMDS, MMDS, WiMAX, HIPERMAN, IEEE802.16, Bluetooth, EEE802.15, IEEE802.11 (such as a, b and g), UWB, ZigBee and cellular such as GSM, GPRS, 2.5 G, 3 G, UMTS, DCS, PCS and CDMA. Similarly, each of the frequency bands above may be part of the ISM frequency bands.

Wherein two distinct frequency bands are discussed above, two non-overlapping channels being part of the same frequency allocated standard may be used.

Any of the above devices, sub-systems and systems, may be in full or in part enclosed in a single enclose. The enclosure may be wall mounted, and may further be constructed to plug into an outlet. Furthermore, the enclosure may be mechanically attached (and detached) to an outlet. The enclosure may also be shaped to substitute a standard outlet, and may be either constructed to have a form substantially similar to that of a standard outlet, or as wall mounting elements substantially similar to those of a standard wall outlet, or have a shape allowing direct mounting in an outlet opening or cavity, or have a form to at least in part substitute for a standard outlet.

Wired medium in any of the embodiment described may be any two conductors or any two wires. In particular, the wired medium may be a UTP, STP, coaxial cable, a telephone wire pair, a CATV coaxial cable, AC power wire pair and LAN cable such as Category 5 or category 6. The wired medium may be outdoors, indoor or connecting there between, and may be accessed via outlets in a building. A suitable connector may be used for connecting to the specific type of the wired medium, such as coaxial connector for connecting to a coaxial cable and a telephone connector for connecting to a telephone wire pair. The wired medium may be a single non-used twisted-pair in a LAN cable, or two such pairs connected in parallel. In another aspect of the present invention, the wired medium is using a phantom channel formed between two wire pairs, such as two twisted wire pairs in a LAN cable used in Ethernet 10BaseT, 100BaseTX or 1000BaseT. Similarly, any PAN, LAN, MAN or WAN wiring may be used as the wired medium.

Furthermore, the topology of the wired medium may be a point-to-point connecting only two devices, one to each end, or may be any multi-point topology such as bus, 'tree', 'star' and point-to-multipoint.

Carrying DC power over the wired medium may use PoE scheme (such as per IEEE802.3af or IEEE802.3at) and components. Multiplexing DC power signal or any low frequency signal (such as POTS analog telephony) may make use of FDM as described or a split-tap transformer. Furthermore, the DC power and POTS may be both simultaneously carried over the same two conductors using non-DC related methods to carry the 'On-Hook' and 'Off-Hook' signals, such as using tones.

In another aspect of the present invention, the phantom channel, being part of a LAN cable or otherwise, is used for carrying a wireless-based signal (such as UWB or shifted wireless signal) with or without the power signal (such as PoE or AC power signal). Power and other signals may be carried over a single phantom channel using FDM.

In another aspect of the present invention, the non-conductive path of one or more frequency shifters is not a radio-based wireless signal propagated over the air. Instead, other non-conductive mediums may be considered such as fiber optic cable. Furthermore, the communication through the air (consisting the non-conductive path) may use physical phenomenon other than electromagnetic radio waves, such as light being either in visible or in the non-visible (e.g. IR and UV) spectrum, or using acoustic waves, either in the audio/voice spectrum, ultrasound or infrasound. In each case, the antenna and other related components are substituted with devices capable to either receive or transmit or both using the mentioned physical phenomenon. Similarly, the shifters and other connected equipment need to be replaced or adjusted to support the required frequency band.

The systems and network according to the invention may be used outdoors to allow increased free-air propagation coverage, or may be used indoors to allow wireless communication between rooms and floors in a building. Similarly, the arrangements may allow for communication between buildings. Furthermore, the methods described may be used to allow bridging between outdoor and indoor communication. Furthermore, a wireless signal may be transported over the wireless or wired medium serving as a backbone between locations using the same frequency band hence faithfully restoring the wireless signal in full or the system may be used to frequency shift the wireless signal between the remote locations.

The above summary is not an exhaustive list of all aspects of the present invention. Indeed, the inventor contemplates that his invention includes all systems and methods that can be practiced from all suitable combinations and derivatives of the various aspects summarized above, as well as those disclosed in the detailed description below and particularly pointed out in the claims filed with the application. Such combinations have particular advantages not specifically recited in the above summary.

It is understood that other embodiments of the present invention will become readily apparent to those skilled in the art from the following detailed description, wherein are shown and described only embodiments of the invention by way of illustration. As will be realized, the invention is capable of other and different embodiments and its several details are capable of modification in various other respects, all without departing from the scope of the present invention as defined by the claims. Accordingly, the drawings and detailed description are to be regarded as illustrative in nature and not as restrictive.

The above and other features and advantages of the present invention will become more fully apparent from the following description, drawings and appended claims, or may be leaned by the practice of the invention as set forth hereinafter. It is intended that all such additional apparatus and advantages be included within this description, be within the scope of the present invention, and be protected by the accompanying claims.

BRIEF DESCRIPTION OF THE DRAWINGS

In order that the manner in which the above recited and other advantages and features of the invention are obtained, a more particular description of the invention briefly described above will be rendered by reference to specific embodiments thereof, which are illustrated in the appended figures and drawings. The invention is herein described, by way of non-limiting example only, with reference to the accompanying figures and drawings, wherein like designations denote like elements. Understanding that these drawings only provide information concerning typical embodiments of the invention and are not therefore to be considered limiting of its scope.

FIGS. 19d and 19e pictorially illustrate various views of an exemplary LAN outlet plug-in unit using a frequency shifter according to the invention;

FIG. 22 illustrates schematically a simplified general network over point-to-point wiring using a frequency shifter according to the invention;

FIG. 23 illustrates schematically a simplified general network over multi-point wiring using a frequency shifter according to the invention;

FIGS. 35a and 35b illustrate schematically simplified general hot-spots networks supporting remote powering according to the invention;

FIGS. 50a and 50b illustrate schematically simplified general functional block diagrams of frequency shifters using a DC powering scheme according to the invention;

FIGS. 54a and 54b pictorially illustrate various views of an exemplary telephone outlet plug-in unit using a frequency shifter according to the invention;

FIGS. 61a, 61b and 61c pictorially illustrate various views of an exemplary AC power outlet plug-in unit using a frequency shifter according to the invention.

DETAILED DESCRIPTION OF EMBODIMENTS

Figure 1:
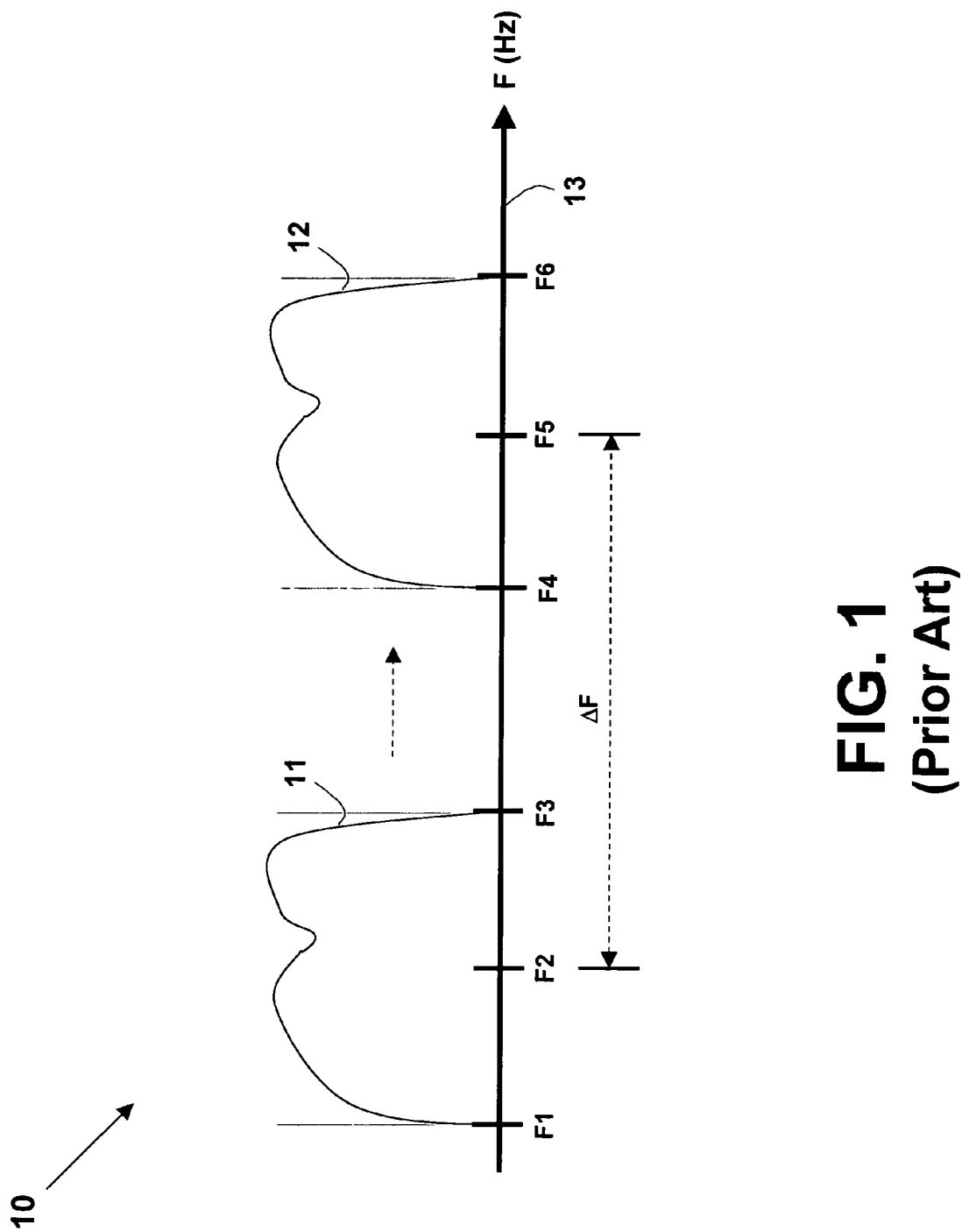
FIG. 1 illustrates schematically the frequency spectrum of an arbitrary signal and its frequency-shifted replica.
Figure 2:
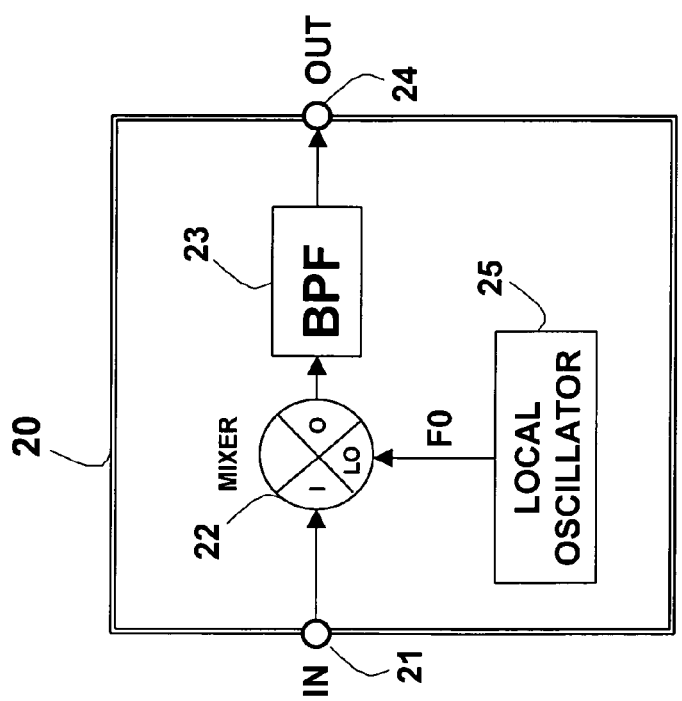
FIG. 2 illustrates schematically a simplified general functional block diagram of a prior art frequency shifter.
Figure 3:
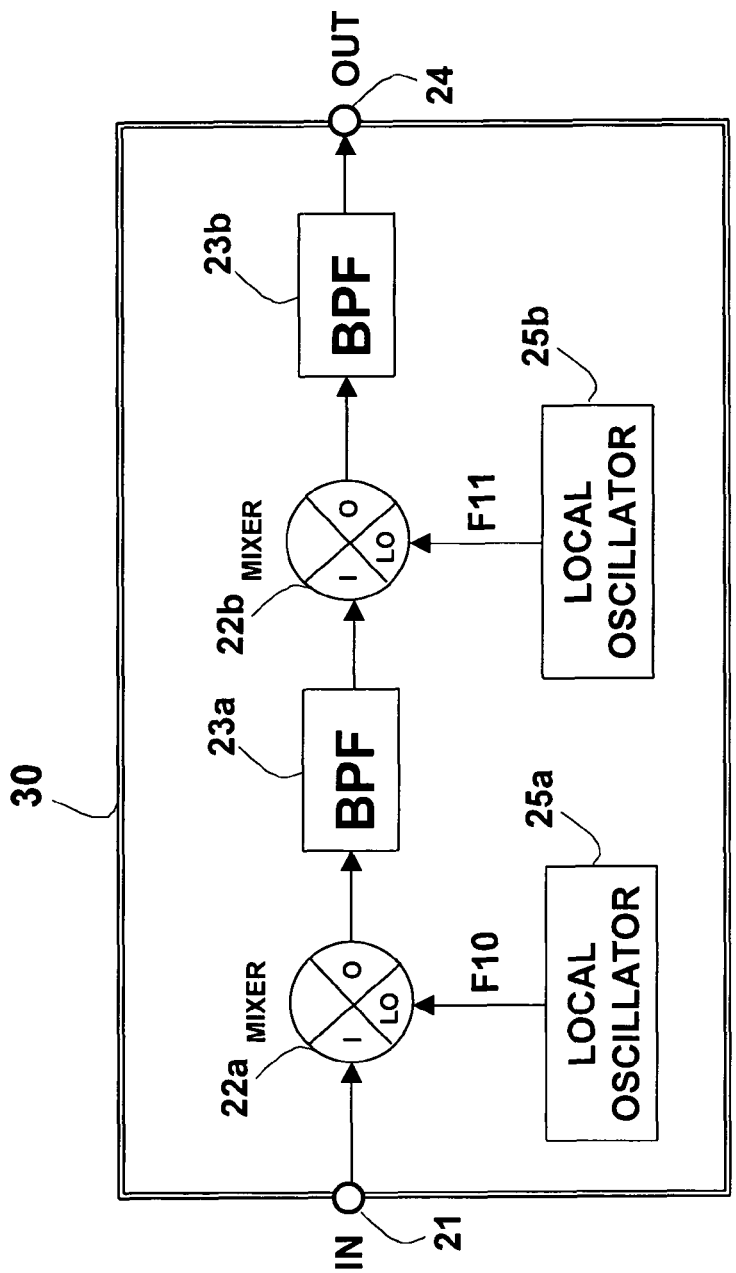
FIG. 3 illustrates schematically a simplified general functional block diagram of a prior art super-heterodyne frequency shifter.

The principles and operation of a network according to the present invention may be understood with reference to the figures and the accompanying description wherein similar components appearing in different figures are denoted by identical reference numerals. The drawings and descriptions are conceptual only. In actual practice, a single component can implement one or more functions; alternatively, each function can be implemented by a plurality of components and circuits. In the figures and descriptions, identical reference numerals indicate those components that are common to different embodiments or configurations. Identical numerical references (even in the case of using different suffix, such as 45a, 45b and 45c) refer to functions or actual devices which are either identical, substantially similar or having similar functionality). It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention.

Wireless to Wireless Frequency Shifting.

Figure 5:
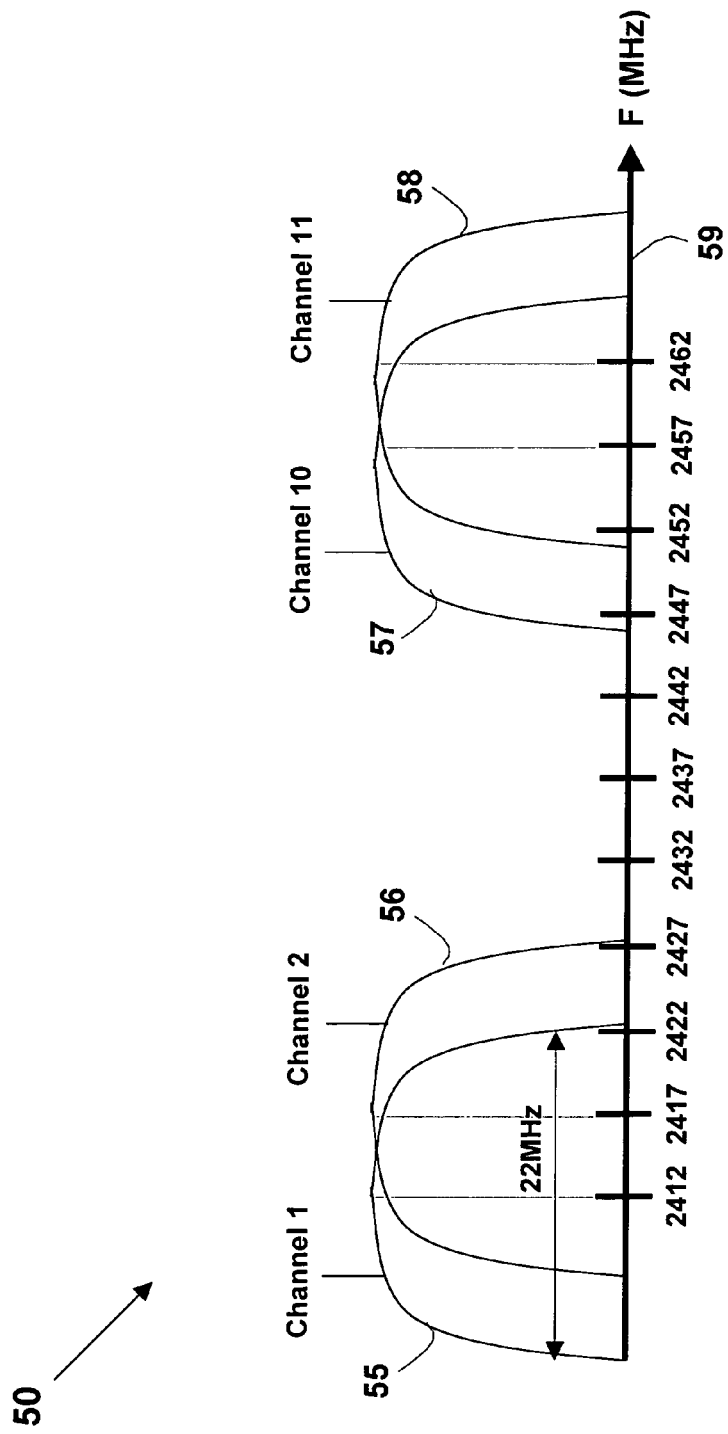
FIG. 5 is a graph that illustrates schematically prior-art frequency spectrum allocations of channels according to the IEEE802.11g standard.
Figure 6:
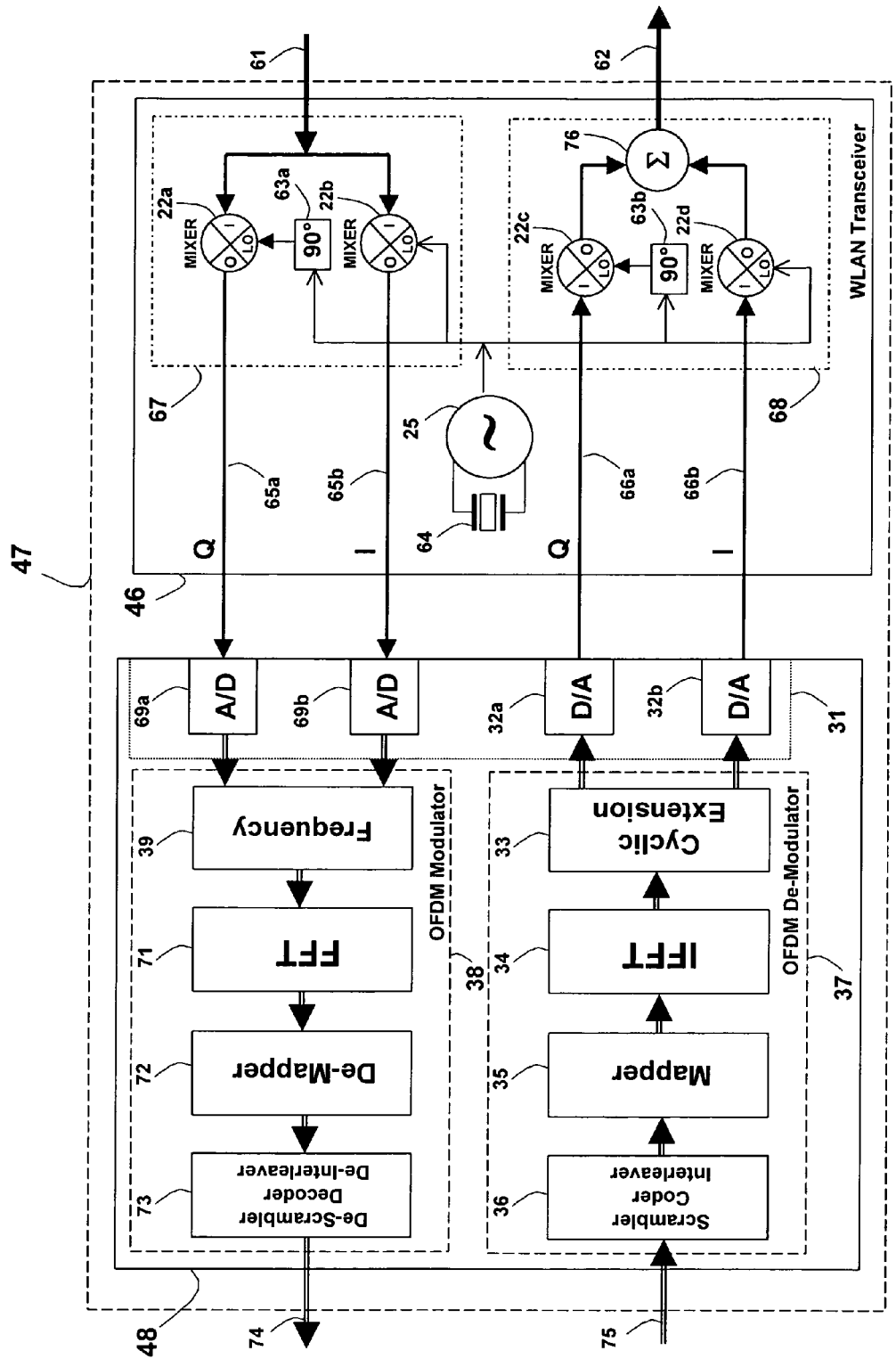
FIG. 6 illustrates schematically a simplified general functional block diagram of a prior art spread-spectrum OFDM modem using I/Q signal representations.
Figure 7:
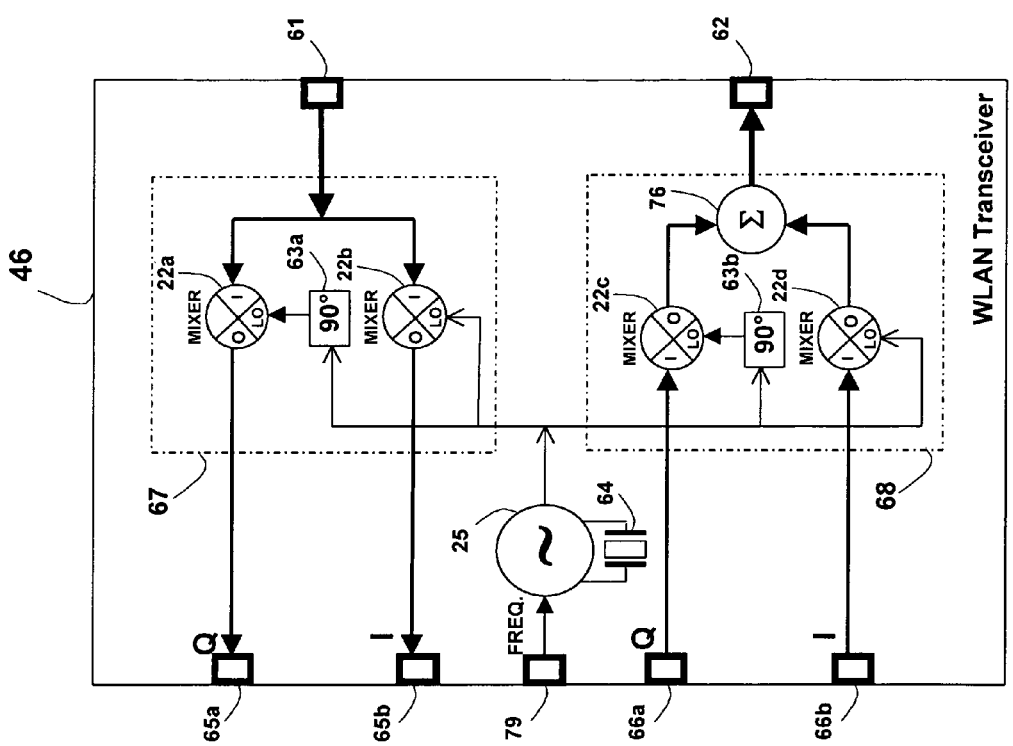
FIG. 7 illustrates schematically a simplified general functional block diagram of a prior art WLAN transceiver.
Figure 8:
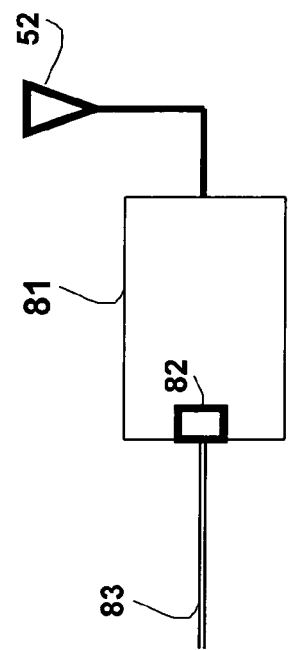
FIG. 8 illustrates schematically a simplified general diagram of a prior art WLAN wireless/wired bridging using frequency shifting.
Figure 9:
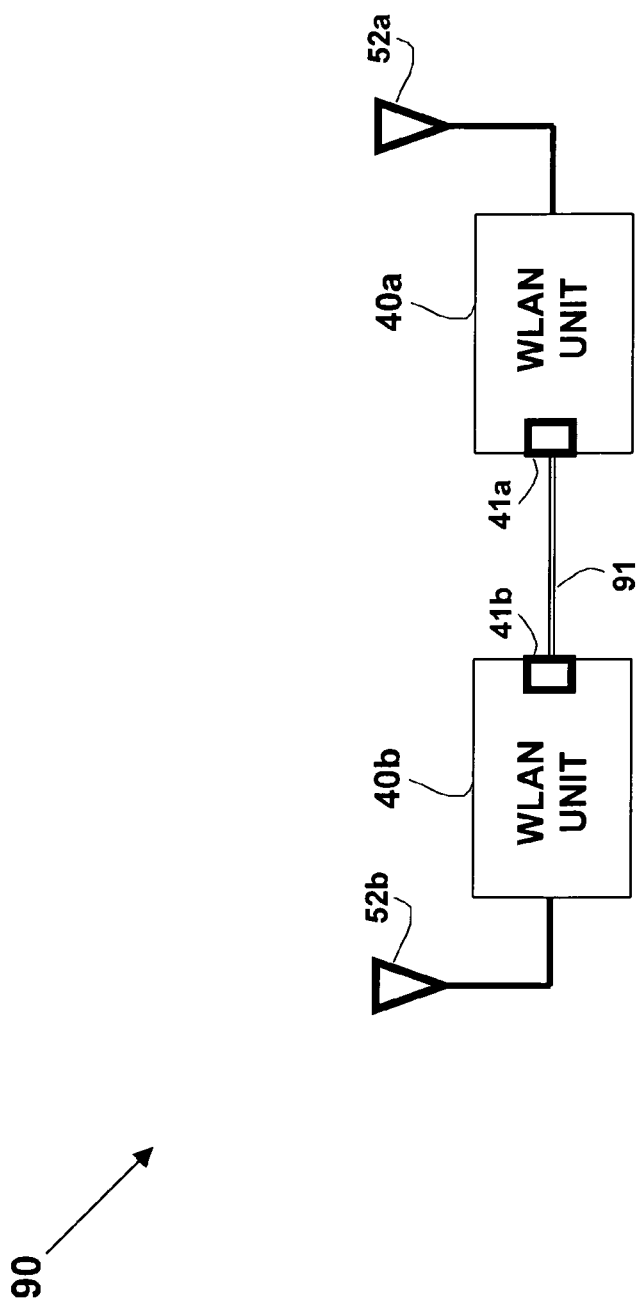
FIG. 9 illustrates schematically a simplified general functional block diagram of a frequency shifter based on back-to-back connection of two WLAN units according to the invention.

According to one embodiment of the invention, a signal is shifted between IEEE802.11g channels. System 90 in FIG. 9 shows a typical system for shifting signal between channels, for a non-limiting example between non-overlapping channels 1 and 11 (similar to FIG. 5 above). System 90 is based on 'back-to-back' connection of two WLAN units 40*a* and 40*b*. WLAN unit 40*b* includes an antenna 52*b*, and is tuned to use channel 11. Digital data stream received in port 41*b* (which may be Ethernet IEEE802.3 10/100BaseT, for example), are converted into a radio-signal employing channel 11 per the IEEE 802.11g standard, and vice versa. Similarly, WLAN unit 40*a* converts between digital data signal at port 41*a* and radio signals available at antenna 52*a* using channel 1. The two digital data ports 41*a* and 41*b* are connected to each other, such that data received from the antenna 52*a* in channel 1 are converted to a digital data stream available in port 41*a*, fed to port 41*b* over connection 91, and then re-converted into a radio signal per the IEEE802.11g standard over channel 11. The reverse direction is operative as well, wherein data received over channel 1 at antenna 52*b* is converted into a digital signal by WLAN unit 40*b* and outputted by port 41*b*, then fed into port 41*a* via connection 91, and converted into radio signals using channel 11 by WLAN unit 40*a*. Hence, the system 90 basically shifts signals between channels 1 and 11, substantially without changing the data carried over these channels, hence performing a signal frequency (channel) shifting.

System 90 shown in FIG. 9 employs two complete WLAN units 40*a* and 40*b*. As such, this solution is expensive, power consuming and bulky. In addition, the digital processing executed in a baseband processor and a MAC processor of each of the WLAN units 40*a* and 40*b* introduce substantial latency to the system 90, causing a received signal to be transmitted after a delay. Such delay may be harmful to latency-sensitive applications such as gaming, wherein interactivity is required, or in the case of multimedia streaming, such as audio or video. In particular, such latency may be detrimental in the growing VoIP over WiFi applications.

Figure 10:
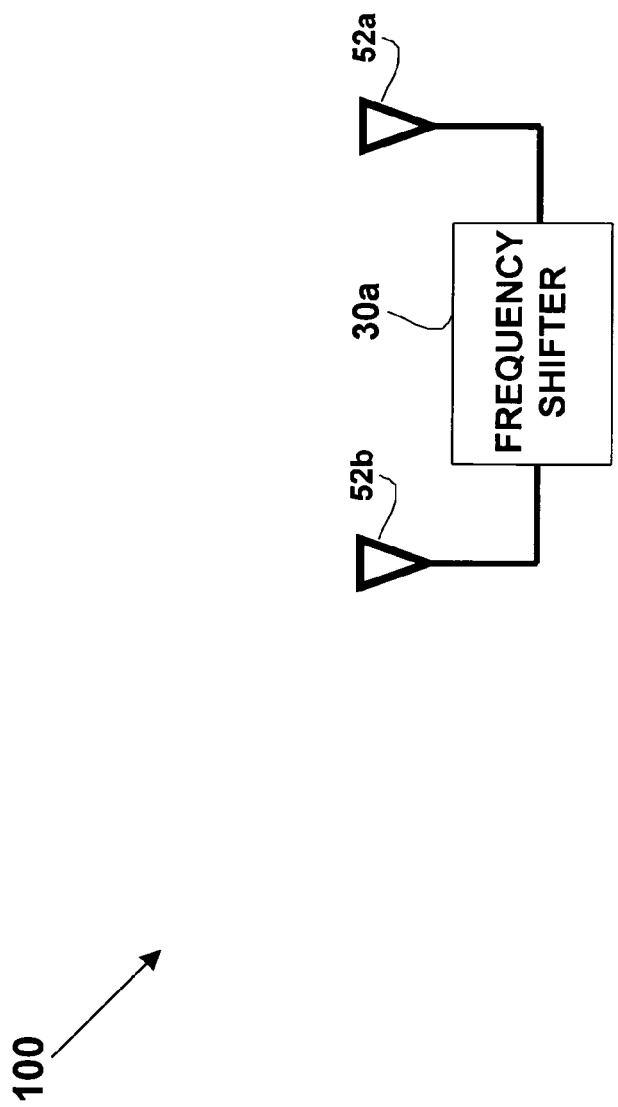
FIG. 10 illustrates schematically a simplified general functional block diagram of a frequency shifter according to the invention.

According to an embodiment of the invention, a signal is shifted between IEEE802.11g channels using an heterodyne frequency shifter 30*a* as shown in FIG. 10. System 100 shown includes two antennas 52*a* and 52*b*, and heterodyne based frequency shifter 30*a* including a mixer/filter and may be implemented similar to heterodyne system 20 or super-heterodyne system 30 as described above in accordance with the prior art. However, since the frequency shifting is relatively small relative to the frequency of the channel, such implementation requires the use of complex, high components count super-heterodyne technique, further involving accurate and expensive filters, and stable and accurate frequency sources.

According to an embodiment of the invention, a radio signal is shifted from one channel to another using I/Q representation of the radio signal. A signal in a specific channel is demodulated to obtain I/Q components of the signal, which are relatively low frequency signals. These I/Q components are then fed to an I/Q modulator, to reconstruct a radio signal, using a distinct channel.

Figure 11:
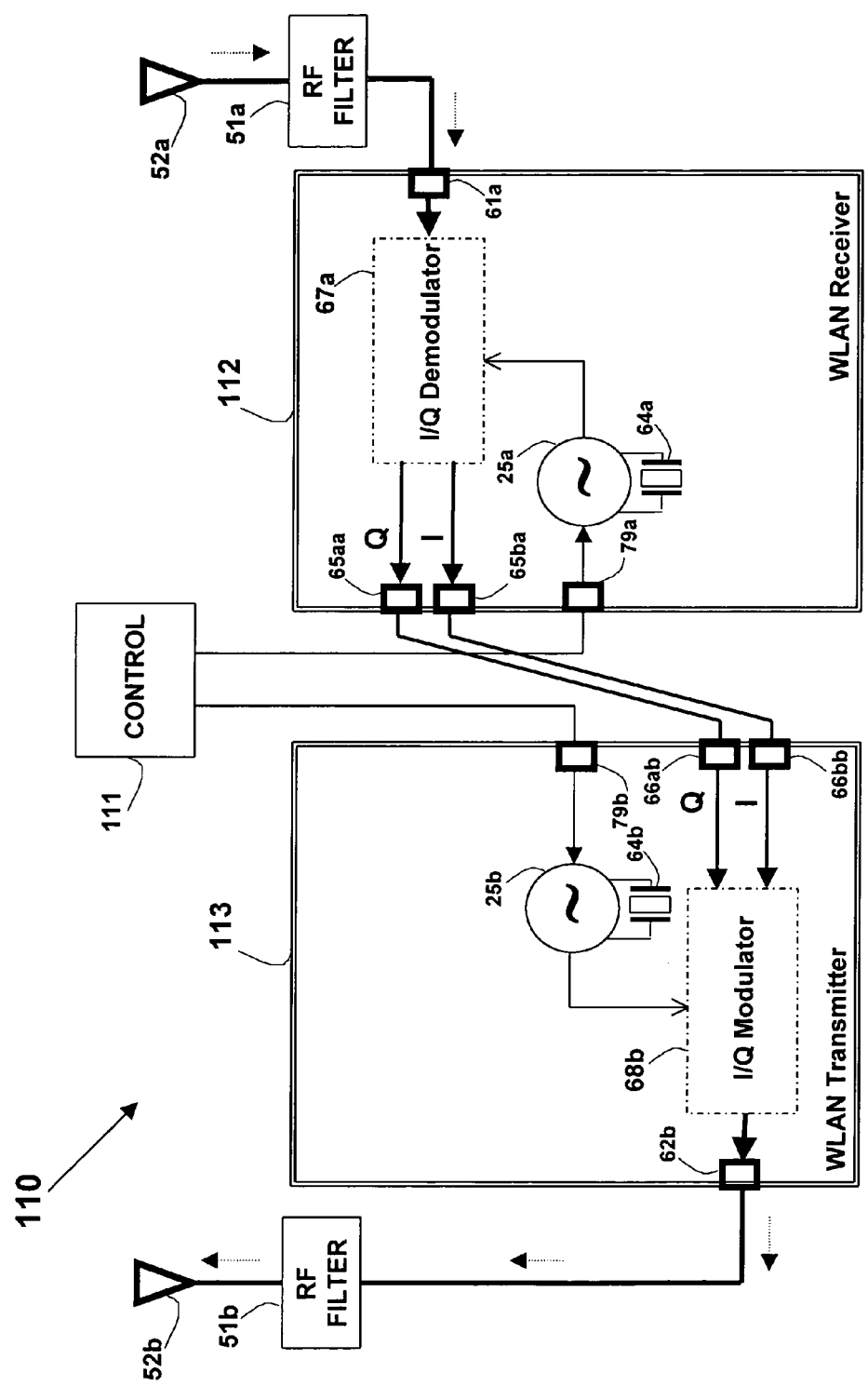
FIG. 11 illustrates schematically a simplified general functional block diagram of a unidirectional frequency shifter according to the invention.

Such a system is exampled as frequency/channel shifting system 110 in FIG. 11, wherein a signal is received in antenna 52*a*, in channel 11, and the system 110 shifts the signal to channel 1 as the output from antenna 52*b*. The received channel 11 radio signal is received by the antenna 52*a*, filtered by RF filter 51*a* and fed to port 61*a* of WLAN receiver 112. The WLAN receiver 112 includes an I/Q demodulator 67*a*, which uses as a frequency reference source 25*a*, stabilized by a crystal 64*a*. The frequency reference source 25*a* is controlled by a control unit 111, which is connected thereto via a frequency control port 79*a*. The control unit 111 sets the frequency reference source 25*a* (via port 79*a*) to a specific channel. In the exampled case wherein the channel 11 carries the signal that is of interest, the control unit 111 sets appropriately the WLAN receiver 112 to process that channel. The I/Q demodulator 67*a*, thus processes the selected channel and respectively outputs the 'Q'. component to port 65*aa* and the 'I' component to port 65*ba*.

The I/Q component signals are fed into WLAN transmitter 113 including I/Q modulator 68*b*. The I/Q modulator 68*b* uses frequency source unit 25*b* stabilized by crystal 64*b*. The frequency reference source 25*b* is set by control unit 111 via port 79*b* to select a specific channel. In the non-limiting example, control unit 111 sets the reference source 25*b* to channel 1. The I/Q modulator 68*b* receives the Q and I components via ports 66*ab* and 66*bb* respectively. The modulator 68*b* then reconstruct the received radio signal (which was received by antenna 52*a*) over channel 1, and feed it to the RF filter 51*b* via port 62*b*. The radio signal is then transmitted to the air by antenna 52*b*. Hence, any signal received in channel 11 in antenna 52*a* will be transmitted as channel 1 from antenna 52*b*. Thus, the above operation of system 110 can be summarized as involving the following steps:

a. Setting channel 11 as the receiving channel.

b. Demodulating the signal received in channel 11 into its baseband I/Q component signals.

c. Setting channel 1 as the transmitting channel.

d. Re-Modulating the received baseband I/Q component signals into the signal to be transmitted over channel 1.

The system 110 shown in FIG. 11 is unidirectional, supporting only 'one way' signal path flow from the receiving antenna 52*a*, through I/Q demodulator 67*a*, and via I/Q modulator 68*b* to transmitting antenna 52*b*. However, most networks nowadays are required to be bi-directional. A bi-directional frequency/channel shifter 120 is shown is FIG. 12. In general, two similar sub-systems A (right side of the figure) and B (left side of the figure) are shown connected in a 'back to back' configuration, wherein each sub-system includes a WLAN transceiver 46, TX/RX switch 49, RF Filter 51 and antenna 52. System 120 allows for a first signal path from antenna 52*a* (channel 11) to antenna 52*b* (channel 1), and a second reciprocal path from antenna 52*b* (channel 1) to antenna 52*a* (channel 11), as will be now described.

Figure 12:
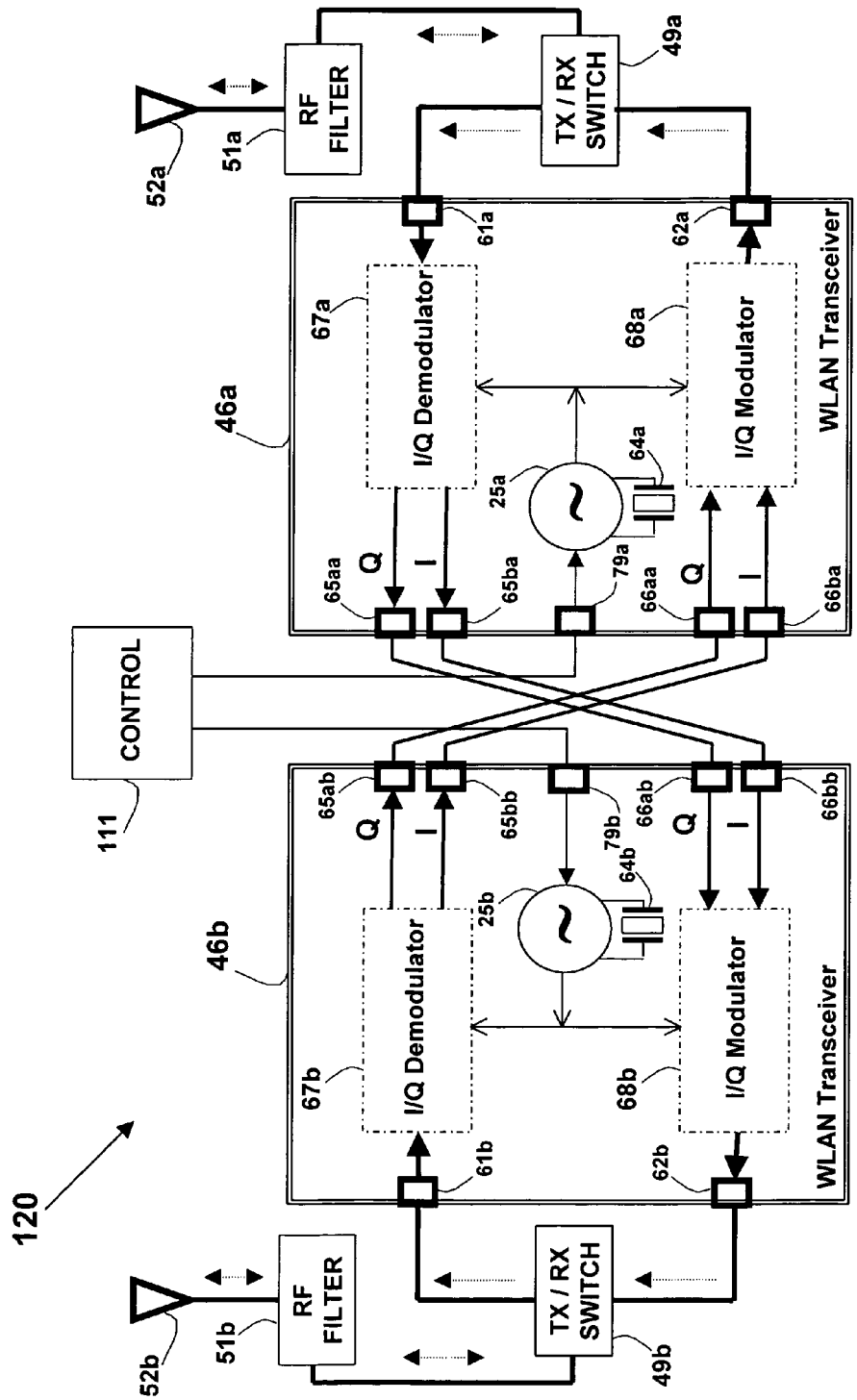
FIG. 12 illustrates schematically a simplified general functional block diagram of a bi-directional frequency shifter according to the invention.

Similar to the above description, control unit 111 of system 120 in FIG. 12 sets the appropriate channels to both A and B sub-systems. I/Q Demodulator 67*a* and I/Q modulator 68*a* are both part of WLAN transceiver 46*a* and both use frequency source 25*a*, based on crystal 64*a*, and are channel controlled by the control block 111 via port 79*a*. Similarly, I/Q Demodulator 67*b* and I/Q modulator 68*b* are both part of WLAN transceiver 46*b* and both use frequency source 25*b*, based on crystal 64*b*, and channel controlled by the control block 111 via port 79*b*. In the non-limiting example of shifting between channels 1 and 11, the control 111 sets the WLAN transceivers 46*a* and 46*b* to channels 11 and 1 respectively.

Referring to FIG. 12, the first signal path involves shifting from channel 11 received in antenna 52*a* to channel 1 transmitted on antenna 52*b*. Similar to system 110 described above, the signal received in antenna 52*a* is filtered by RF Filter 51*a*, and fed via the TX/RX switch 49*a* to port 61a of WLAN transceiver 46*a*. I/Q demodulator 67*a* provides the I/Q component signals, respectively outputted to ports 65*ba* and 65*aa*. The I/Q modulator 68*b*, being part of WLAN transceiver 46*b*, receives the I and Q component signals respectively via ports 66*bb* and 66*ab*, and reconstructs a radio signal over channel 1 which is transmitted through port 62*b*. The radio signal is routed by the TX/RX switch 49*b* to the antenna 52*b* via RF filter 51*b*.

In the reciprocal path, the second signal path involves shifting from channel 1 received in antenna 52*b* to channel 11 transmitted on antenna 52a. Similar to system 110 described above, the signal received in antenna 52b is filtered by RF filter 51b, and fed via the TX/RX switch 49b to port 61b of WLAN transceiver 46b. I/Q demodulator 67b provides the I/Q component signals, respectively outputted to ports 65bb and 65ab. The I/Q modulator 68a, being part of WLAN transceiver 46a, receives the I and Q component signals respectively via ports 66ba and 66aa, and reconstructs a radio signal over channel 11 which is transmitted through port 62a. The radio signal is routed by the TX/RX switch 49a to the antenna 52a via RF filter 51a.

Since by its nature the radio medium is 'half duplex' wherein only a single transmitter is allowed, system 120 shown in FIG. 12 has one of the signal paths operative at a time. For example, two states may be provided, wherein in a first state a packet may be shifted from channel 11 to channel 1, and wherein in a second state the consecutive packet will be shifted from channel 1 to channel 11. System 130 shown in FIG. 13 further shows the elements in control of the frequency shifter 120 states.

The channels to and from the wireless signal is shifted may be fixed in the system, and may not be selected by a user or installer. However, it is preferred that the channels involved in frequency shifter 120 may be set during installation, configuration, and maintenance. In one embodiment according to the invention, the channels are selected by a user or an installer using mechanical setting of two mechanical switches 139a and 139b, which are respectively controlling the channel selection for sub-systems 'A' and 'B'. The switches may be set to any of the operative 11 channels in IEEE802.11g, and are coupled to the control unit 111, which reads the status of the switches and accordingly configures the WLAN transceivers 46a and 46b. In addition to system 120, Band Pass Filter (BPF) 131a is shown connected to detector block (DET) 132a. The BPF 131a is connected in parallel to the path of the signal received from the antenna 52a, and passes only channel 1. The signal level in channel 1 is checked by DET 132a, typically based on a level threshold detector. Upon sensing a signal presence in channel 1, DET 132a notifies the control unit 111 via connection 134a. Similarly, The BPF 131b is connected in parallel to the path of the signal received from the antenna 52b, and passes only channel 11. The signal level in channel 11 is checked by DET 132b, typically based on a level threshold detector 134b. Upon sensing a signal presence in channel 11, DET 132b notifies the control unit 111 via connection 134b. While shown in system 130 that the received signal level is measured after the RF filter 51 and before the TX/RX switch 49, other embodiment may use connection at other points along the signal path, such as at the I/Q 65a and 65b ports. In addition, signal presence detection may use more complex mechanisms other than simple threshold crossing.

In addition to the former described functionalities of control unit 111, the control unit 111 is also connected to control TX/RX switches 49a and 49b, using respective connections 133a and 133b. Each such TX/RX switch 49 is operative to have two distinct states; in a 'receive' state, a signal arriving from antenna 52a is routed to port 61 of WLAN transceiver 46; and in a 'transmit' state, a signal to be transmitted at port 62 of WLAN transceiver 46 is routed to the antenna 52. Typically and as a default, the TX/RX switch 49 is in a 'receive' state unless commanded otherwise.

Upon sensing a signal in channel 1 in antenna 52a by DET 132a, the control unit 111 sets TX/RX switch 49b to shift to a 'transmit' state. TX/RX switch 49a remains in its 'receive' state. Thus, a path of a signal from antenna 52a to antenna 52b is established. Similarly, upon sensing a signal in channel 11 in antenna 52b by DET 132b, the control block 111 sets TX/RX switch 49a to shift to a 'transmit' state. TX/RX switch 49b remains in its 'receive' state. Thus, a path of a signal from antenna 52b to antenna 52a is established.

Figure 14:
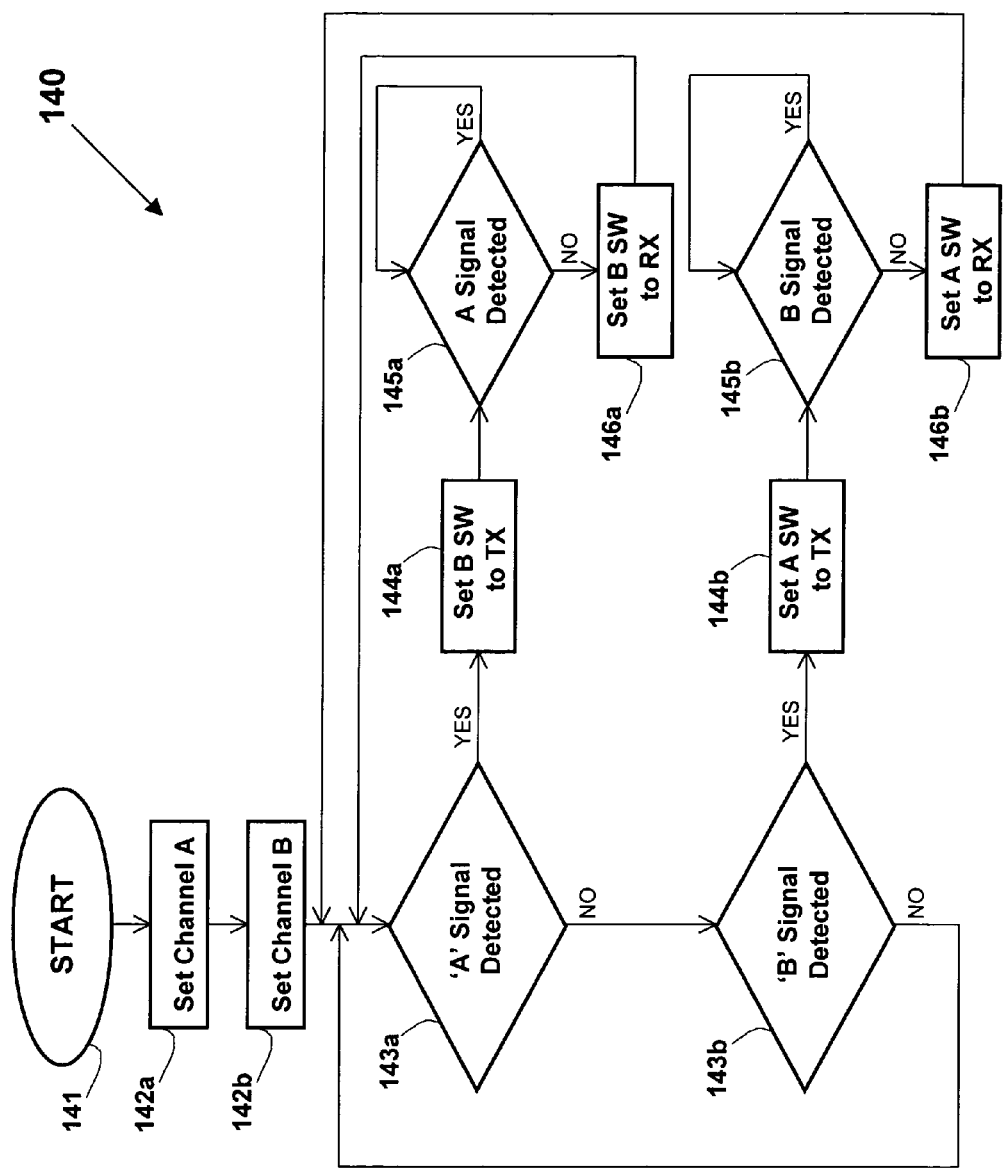
FIG. 14 illustrates schematically a simplified general functional flow chart of a frequency shifter control according to the invention.

A flow chart 140, functionality of which is to be executed by the control unit 111 as part of the operation of the system 130 is shown in FIG. 14. In this regard, and with regard to all flowcharts, each block represents a module, step, segment, or portion of code, which comprises one or more executable instructions for implementing the specified functionality. It should also be noted that in some alternate implementations, the functions noted in the blocks may be occur out of the order noted in the figures. Upon power up (or following start up routine such as self test) the control unit 111 starts with block 141. As is shown by block 141 TX/RX Switches 49a and 49b are set to normal 'receive' state, wherein no signal is transmitted to the air. As is shown by block 142a, the channel of sub-system A is set, by setting the WLAN transceiver 46a via port 79a, for example based on the reading of switch 139a. As is shown by block 142b, the channel of sub-system B is set, by setting the WLAN transceiver 46b via port 79b, for example based on the reading of switch 139b. In the above non-limiting example, WLAN transceiver 46a will be set to channel 1, while WLAN transceiver 46b will be set to channel 11. As is shown by block 143a, connection 134a is checked in order to sense presence of a received signal in the selected channel in sub-system A. In the case such a signal is indeed detected, control unit 111 instructs TX/RX switch 49b to 'transmit' state (block 144a). As long as there is a signal present in antenna 52a (in the appropriate channel), the system will remain in this state (block 145a).

Upon sensing loss of signal, TX/RX switch 49b will resume to 'receive' state (block 146a) and the system will resume idle state until a signal is detected in either A or B sub-systems. Similarly, in step 143b, connection 134b is checked in order to sense presence of a received signal in the selected channel in sub-system B. In the case such a signal is indeed detected, control unit 111 instructs TX/RX switch 49a to enter a 'transmit' state (block 144b). As long as there is a signal present in antenna 52b (in the appropriate channel), the system will remain in this state (block 145b). Upon sensing loss of signal, TX/RX switch 49a will resume to 'receive' state (block 146b) and the system will resume idle state until a signal is detected in either A or B sub-systems.

The control unit 111 may be based on a discrete logic or an integrated device, such as a processor, microprocessor or microcomputer, and may include a general-purpose device or may be a special purpose processing device, such as an ASIC, PAL, PLA, PLD, Field Programmable Gate Array (FPGA), Gate Array, or other customized or programmable device. In the case of a programmable device as well as in other implementations, a memory is required. The memory may include a static RAM, dynamic RAM, flash memory, ROM, or any other data storage medium. The memory may include data, programs, and/or instructions that are executable by the processor.

Figure 13:
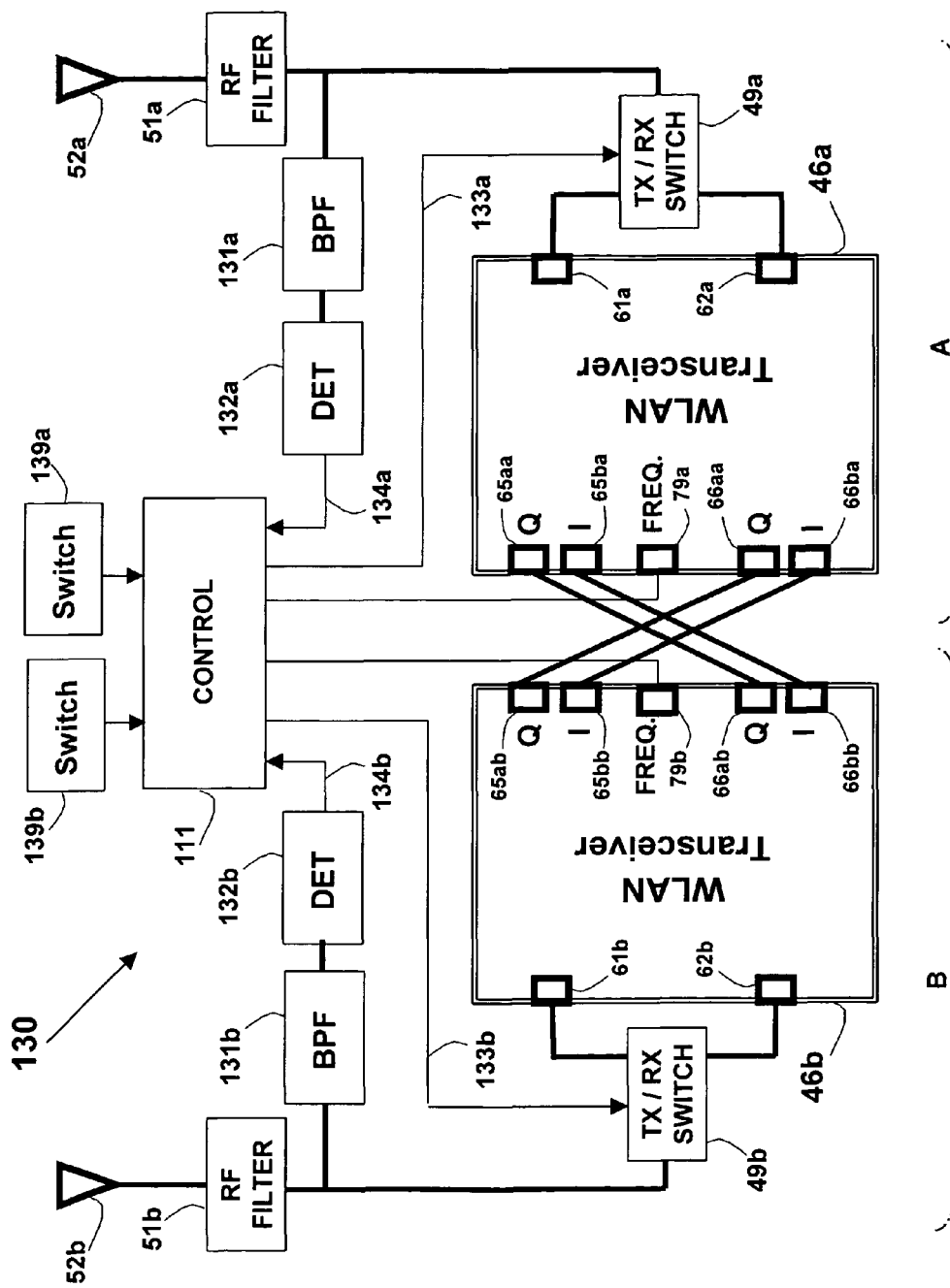
FIGS. 13, 13a, 13b and 13c illustrate schematically a simplified general functional block diagram of frequency shifters according to the invention.
Figure 13A:
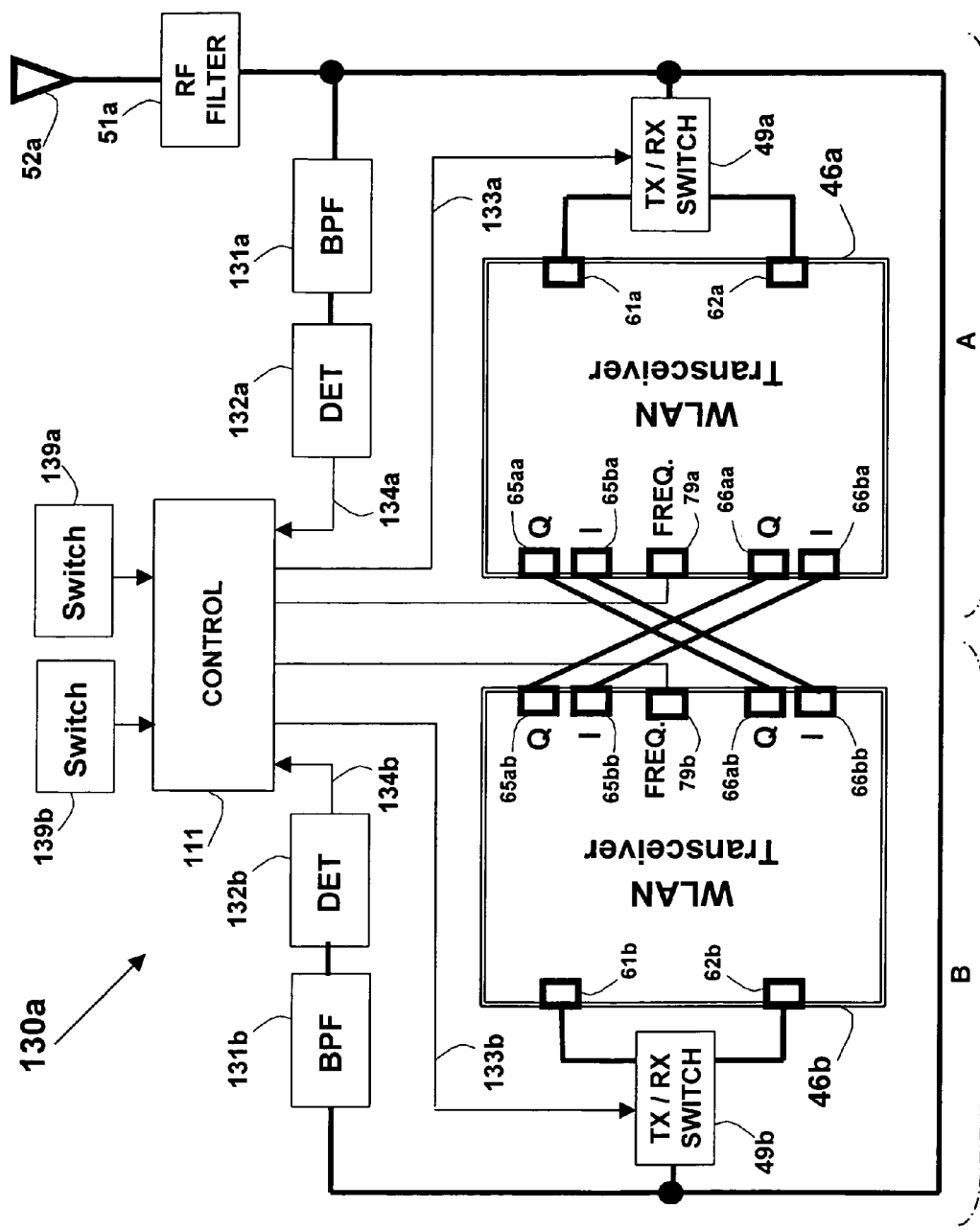

While system 130 in FIG. 13 above was described with regard to two different antennas 52a and 52b, respectively serving sub-systems 'A' and 'B', and each used for another non-over-lapping channel, it is apparent that a single antenna 52 may as well be used, serving both sub-systems. Such configuration is simpler since the cost, mechanical design, and other complexities derived from the presence of two antennas are minimized when a single antenna is used. Using a single antenna is in particular contemplated in the case wherein the two radio frequency bands between which the shifting is made are close to each other, such as two channels in the 2.4 GHz band employed in IEEE802.11g. Using a single antenna is exampled as system 130a in FIG. 13a, wherein antenna 52a (as well as the RF Filter 51a) are shared by both systems, and the antenna 52a is connected in parallel to both sub-system 'A' BPF 131a and TX/RX switch 49a and to sub-system 'B' BPF 131b and TX/RX switch 49b.

System 120 has numerous advantages over the prior art and typical frequency shifters, examples of which include:

a. WLAN transceivers 46a and 46b, as well as other parts of frequency shifter 120 make use of the same components widely used for standard and common WLAN units. As such, such components are readily available in the market and are low priced due to the large volume of manufactured WLAN units. Furthermore, such components are highly integrated today, allowing for minimum parts count, low space/weight requirements and low power consumption, together with high reliability. Furthermore, system 90 involves both RF/analog and digital hardware in the data path, requiring specific voltages and converters, not required in the substantially RF/analog only path of frequency shifter 120.

b. When compared with system 90 implementation, frequency shifter 120 does not include any digital processing, and further does not involve any WLAN or Ethernet MAC handling, or any higher layer support. Frequency shifter 120 is basically a physical layer unit, and as such the hardware involved with such processing is obviated. Furthermore, installing such a system is easy since related configuration; monitoring, management and similar processes are obviated. Essentially, the only configuration required is setting the required channels to be shifted.

c. Since there is no MAC digital processing or any other digital handling of the signal, there is no associated delays in the signal flow, thus the delay through the system is minimal and is practically zero. As such, frequency shifter 120 can be used in latency-sensitive applications such as streaming audio or video, as well as interactive applications such as gaming. In particular, the frequency shifter 120 can be used for carrying VoIP data, known to be latency-sensitive. Furthermore, such systems can be easily serialized as described hereinafter without affecting the total latency of the network.

d. In many systems the I/Q signals are available as part of the system as shown for system 40 above. Hence it is simpler and easier to use these existing signals than generating other.

While the invention has been exampled above with regard to shifting frequency between two channels of the WLAN IEEE802.11g standard, it will be appreciated that such frequency shifting will be applicable to any frequency shifting of a wireless signal, from any frequency to any other non-overlapping frequency, without relating to channel boundaries or any standards. Furthermore, while the above description related to spread-spectrum signals, being DSSS (Direct Sequence Spread Spectrum) or FHSS (Frequency Hopping Spread Spectrum) any type of signals may be similarly frequency shifted, including narrow-band. Such frequency shifting can be unidirectional (i.e. 'one-way') as described relating to system 110 in FIG. 11, or bi-directional as described relating to frequency shifter 120 in FIG. 12.

Frequency shifting was described above using 'I' and 'Q' representations of a signal.

Similarly, any other low frequency or any other single or multiple types of signals that faithfully represent a signal, and can be used in order to generate the replica of the signal, may be equally used. Preferably, signals used as part of generating the end signal are used. Such representation may be frequency-dependent relating signals (such as I and Q above) or represent any other than frequency characteristics of a signal.

Figure 15:
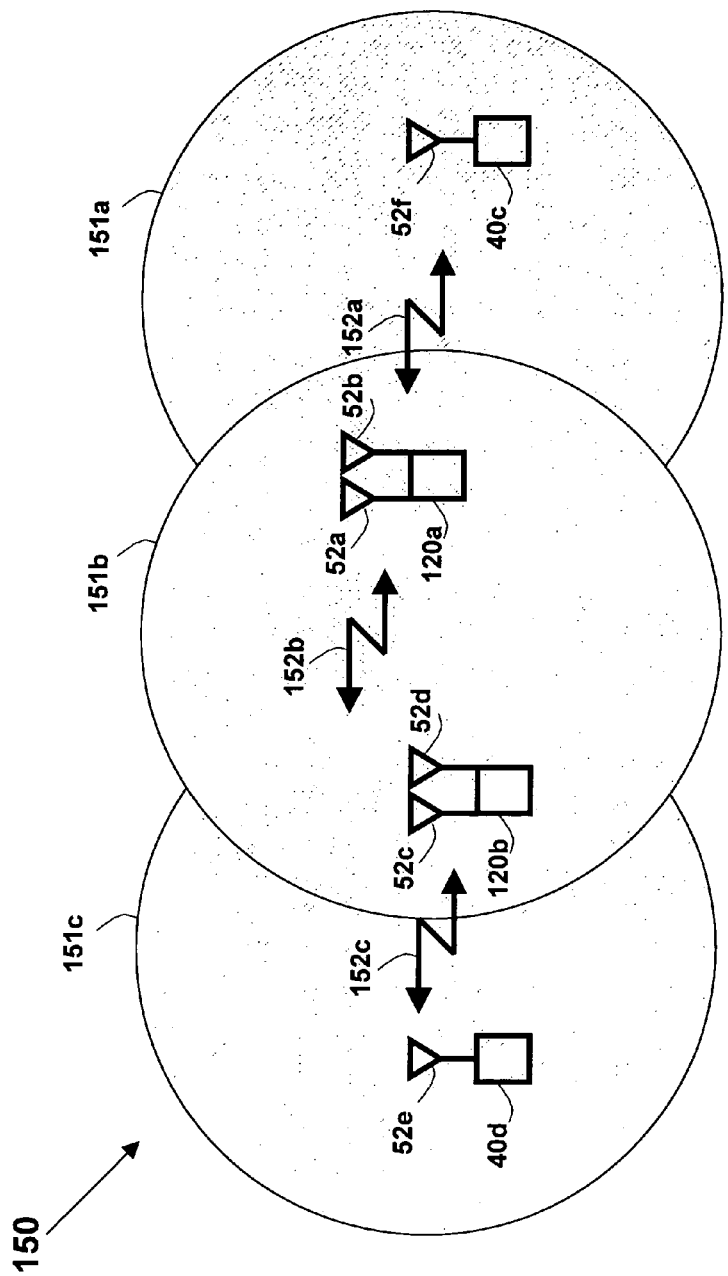
FIG. 15 illustrates schematically a simplified increased coverage general network using a frequency shifter according to the invention.

According to one embodiment of the invention, frequency shifting is used to increase the coverage of a wireless network. An improved coverage wireless network 150 is shown in FIG. 15, where the network contains two WLAN units 40d (including an antenna 52e) and 40c (including an antenna 52f). WLAN unit 40d coverage area is shown as circle 151c, and the area 25 covered by WLAN unit 40c is shown as circle 151a. For a non-limiting example, WLAN unit 40d may be an IEEE802.11g Access-Point, while WLAN unit 40c may be a corresponding client device, both set to communicate over channel 1. The areas shown as 151a and 151c (referred to herein as "communication islands") are not overlapping, hence there is not a direct wireless communication between WLAN units 40d and 40c. Using frequency shifters can connect the two separated communication islands 151a and 151c. Frequency shifters 120b (including two antennas 52c and 52d) and 120a (including antennas 52a and 52b) are added.

The sub-systems associated with antenna 52d of frequency shifter 120b and with antenna 52a of frequency shifter 120a are set to a channel distinct from channel 1, such as channel 11.

Frequency shifters 120b and 120a are located such that they communicate with each other over a wireless communication link 152b using channel 11, and the frequency shifters 120b and 120a are both within the coverage circle 151b. The sub-system associated with antenna 52c of the frequency shifter 120b is set to channel 1, and being within the area 151c is operative to communicate over the wireless communication link 152c with WLAN unit 40d. Similarly, the sub-system associated with antenna 52b of the frequency shifter 120a is set to channel 1, and being within the area 151a is operative to communicate over a wireless communication link 152a with WLAN unit 40c.

The operation of wireless network 150 involves two states. In one state, WLAN unit 40d is transmitting over channel 1. The transmitted signal is received by antenna 52c over the communication link 152c. Frequency shifter 120b shifts the signal to channel 11 and transmits the shifted signal to antenna 52a using channel 11 over communication link 152b. The signal received by antenna 52d in channel 11 is frequency shifted by frequency shifter 120a to channel 1, hence reconstructing the original signal over the originally transmitted channel. The shifted signal is transmitted from antenna 52b over channel 1 via the communication link 152a to WLAN unit 40c. In the other state, the reciprocal data path is affected, wherein signal transmitted from WLAN unit 40c over channel 1 is shifted to channel 11 by frequency shifter 120a and communicated over link 152b to frequency shifter 120b. Frequency shifter 120b shifts the signal back to channel 1, and communicates the signal to WLAN unit 40d over communication link 152c.

Since the communication between the two frequency shifters 120a and 120b over communication link 152b in the area 151b uses a frequency band (channel 11) which is distinct from the channel or frequency band used in areas 151a and 151b (channel 1), there is no interference between the two signals. It should also be noted that since there is practically no delay in the operation of the frequency shifters 120a and 120b, the total network 150 performance is not degraded, and for all practical purposes and applications, the performance will be as if WLAN units 40c and 40d are in the same area and communicate directly with each other. It should be noted that the direction of the signal flow is controlled by the WLAN units 40c and 40d in a manner similar to the way that such management would be executed if these units were in direct wireless communication link with each other. The added frequency shifters will automatically adapt to the network state, thus allowing seamless operation in the wireless network 150, without requiring any additional management capabilities or any other alterations in the WLAN units 40, allowing the use of standard and available devices.

While the invention has been exampled above with regard to shifting frequency between two channels of WLAN IEEE802.11g standard, it will be appreciated that such frequency shifting will be applicable to any frequency shifting of a wireless signal, from any frequency to any other non-overlapping frequency, without relating to any channel boundaries or any standards. The network will function in full as long as the communication link 152b uses a frequency band which does not overlap the frequency band used by communication links 152a and 152c. Furthermore, while the invention has been exampled above with regard to links 152a and 152c using the same channels, distinct channels or distinct frequency bands may be equally used. In this case, the frequency shifters 120b and 120a will need to be set to the proper frequency bands. Furthermore, while the invention has been exampled above with regard to only two frequency shifters 120a and 120b, it should be appreciated that additional frequency shifters maybe added, resulting in additional coverage areas.

Figure 16:
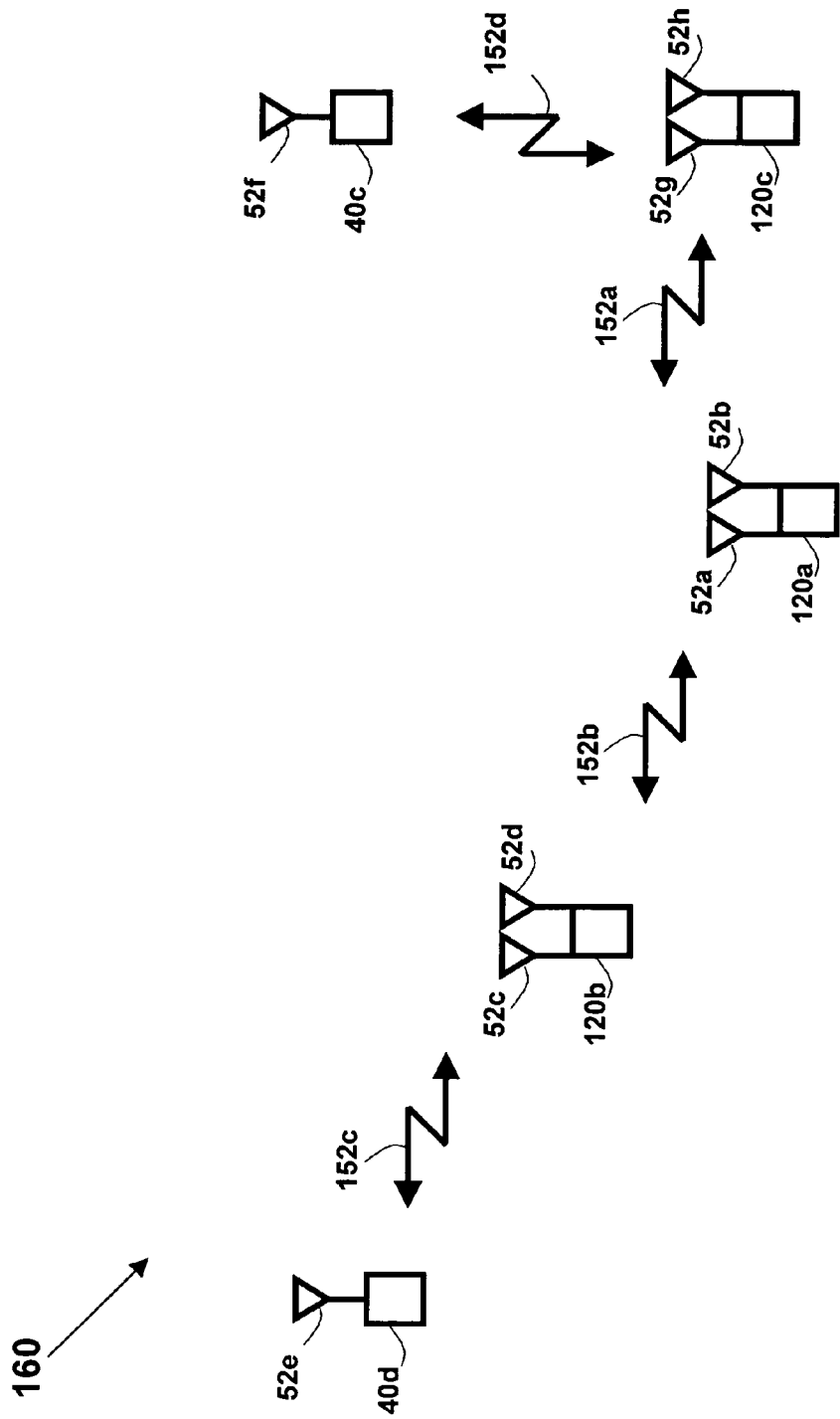
FIG. 16 illustrates schematically a simplified general increased coverage network using multiple frequency shifters according to the invention.

While network 150 is shown as having a single 'bridging' wireless communication link 152b for coupling the two distinct coverage islands 151a and 151b, multiple distinct communication links may be employed, for coupling more distant location. A non-limiting example of a network employing two distinct 'bridging' wireless communication links is shown as network 160 in FIG. 16. WLAN units 40d and 40c are shown in distant locations having no direct communication link. Frequency shifters 120b, 120a, and 120c are added in order to allow the seamless communication between the WLAN units 40c and 40d, both assumed to be using channel 1. Communication link 152b is operative to wirelessly couple frequency shifters 120b and 120a over channel 6. Similarly, communication link 152a is operative to wirelessly couple frequency shifters 120c and 120a over channel 11. A signal transmitted by WLAN unit 40d over channel 1 is shifted by frequency shifter 120b to channel 6 and carried by link 152b to frequency shifter 120a, wherein it is shifted to channel 11 and carried over link 152a to frequency shifter 120c, which in turn shifts the signal back to the original channel 1, for communicating with WLAN unit 40c via link 152d. While exampled with the non-overlapping channels 1, 6 and 11, any other non-overlapping frequency bands may be equally employed.

While systems 150 and 160 were described as using frequency shifters 120, it will be appreciated that shifters such as those used in systems 90 and 100 described above may be equally used as a substitute.

Figure 17:
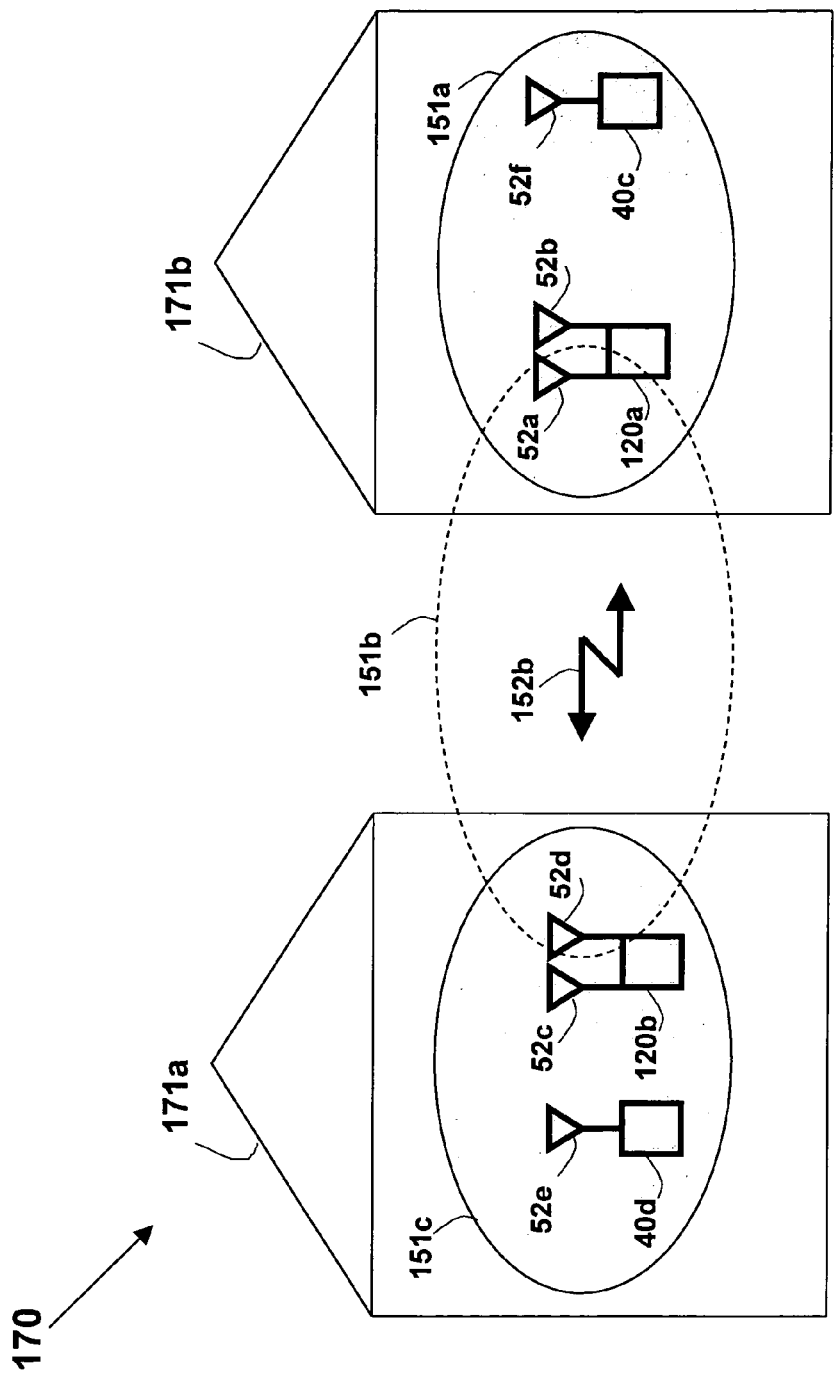
FIG. 17 illustrates schematically a simplified general network including two buildings and using two frequency shifters according to the invention.

Buildings are known to be hostile to radio-frequency, the basis of wireless applications and devices. Stout construction and building materials, such as steel, thick or mirrored glass windows, concrete, multiple stairwells, and elevator shafts degrade, dilute, and obstruct wireless signals, making uniform coverage a major challenge. These obstacles may be handled according to one embodiment of the invention as shown in FIG. 17. The figure shows a network including two buildings 171a and 171b. In each of the buildings 171a and 171b there is a wireless network having a respectively limited coverage wireless network 151c and 151a respectively. WLAN units 40d and 40c are located in the respective buildings 171a and 171b, and cannot be interconnected due to the limited coverage within the building. Similar to system 150 described above, frequency shifters 120a and 120b are respectively added in buildings 171b and 171a respectively, thus allowing communication between the involved WLAN units 40d and 40c over a wireless link 152b. While shown as different buildings, the same scenario may apply to neighboring apartments in a Multiple Dwelling Units or different rooms in the same building or apartment.

Systems 150 and 170 have been demonstrated to interconnect isolated short-range areas. According to one embodiment of the invention, a WLAN communication link is used to interconnect two or more isolated (W)PAN (Wireless Personal Area Network) systems. The reach of a PAN is typically a few meters, hence such networks are confined to a limited space, such as in-room communication. IEEE 802.15 is the working group of the IEEE 802, which specializes in Wireless PAN (WPAN) standards. Non-limiting examples of WPAN systems include:

a. Bluetooth, which according to IEEE 802.15.1 standard, for example, operates over license-free ISM band at 2.45 GHz. An ad-hoc network of computing devices using Bluetooth technology protocols is known as piconet.
 b. Ultra-Wide-band (UWB), which according to the IEEE 802.15.3 standard, for example, uses a wavelet (some times referred to as wireless USB).
 c. ZigBee, which according to IEEE 802.15.4 standard, for example, offers low data rate and low power consumption.
 d. IEEE 802.11a, commonly considered as WLAN, but since it works in 5 GHz spectrum its reach is considerably limited, thus IEEE802.11a be also considered as WPAN.

Any of the above technologies, as well as proprietary networking schemes, may be used for communication links 152a and 152c in network 150, respectively covering areas 151a and 151c. Interconnecting the covered areas may make use of WLAN technologies, used to implement communication link 152b in network 150. Currently widespread WLAN technologies (e.g. WiFi) are based on IEEE 802.11 and include IEEE 802.11b which describes a communication using the 2.4 GHz frequency band and supporting a communication rate of 11 Mb/s, IEEE 802.11a uses the 5 GHz frequency band to carry 54 MB/s and IEEE 802.11g uses the 2.4 GHz band to support 54 Mb/s.

In a similar way, the backbone network used for coupling the PANs may be based on a MAN (Metropolitan area Network) such as HIPERMAN or WiMAX, and may be based on IEEE 802.16, or any wireless WAN (Wide Area Network). Typically wireless MAN and WAN technologies are used for Broadband Wireless Access (BWA) and are commonly based on either LMDS (Local Multipoint Distribution Service) using microwave signals operating between 26 GHz and 29 GHz bands supporting point-to-multipoint service up to 5 miles, or MMDS (Multichannel Multipoint Distribution Service) which uses microwave bands from 2 GHz to 3 GHz.

In a similar way, the network 150 or 170 may be used to interconnect WLAN systems using WAN or MAN technologies. In such configuration, networks 151a and 151c represent WLAN based systems, interconnected by a link 152b using WAN, MAN or BWA, which may be based on LMDS or MMDS, offering communication within area 151b.

Some wireless technologies, in particular microwave signals used in the WAN and MAN arenas, are using frequencies above 2-3 GHz where the radio path is not reflected or refracted to any great extent. Propagation in such frequencies requires a Line-of-Sight (LOS), that rely on a line of sight between the transmitting antenna and the receiving antenna. Using the concept of network 150 allows for NLOS (Non-LOS) wireless networks to interconnect over a LOS-based communication link. In the non-limiting example of system 170 in FIG. 17, the communication link between frequency shifters 120*a* and 120*b*, using respectively antennas 52*a* and 52*d*, may be above 2-3 GHz, hence requiring LOS between the units. However, communication within the buildings 171*a* and 171*b* with the respective frequency shifters may be well below the gigahertz spectrum, hence allowing NLOS operation.

Wireless technologies are known to use either licensed frequency bands or unlicensed frequency band, such as the frequency bands utilized in the Industrial, scientific and Medical (ISM) frequency spectrum. In the US, three of the bands within the ISM spectrum are the A band, 902-928 MHz; the B band, 2.4-2.484 GHz (referred to as 2.4 GHz); and the C band, 5.725-5.875 GHz (referred to as 5 GHz). Overlapping and/or similar bands are used in different regions such as Europe and Japan. According to one embodiment of the invention, frequency shifting is used to bridge between wireless networks using licensed and unlicensed bands. In the non-limiting example of system 170 in FIG. 17, the wireless networks in areas 151*a* and 151*b* are respectively confined within buildings 171*b* and 171*a* respectively, and as such, may use licensed frequency bands, since there is a low risk of interfering to or being interfered by another service rightfully using the same licensed spectrum. However, the communication link 152*b* in area 151*b* is external to the building and as such may use (according to the local law) only an unlicensed band. Similarly, in-building networks may use unlicensed bands such as WLAN IEEE802.11g described above, while the wireless signal for communicating the internal networks between the buildings may use a licensed spectrum, thus being more robust and less susceptible to other signals over the same frequency band.

Figure 18:
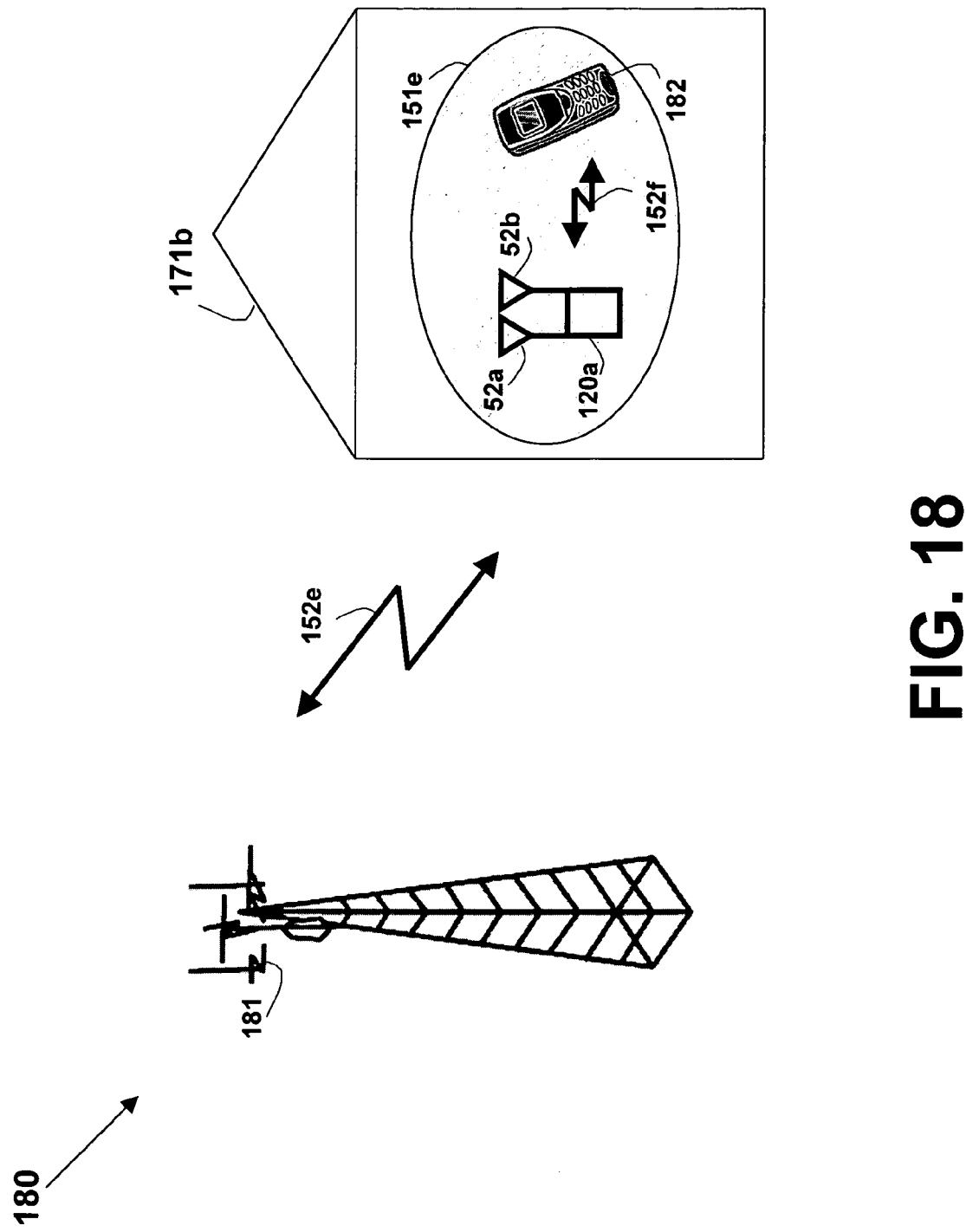
FIG. 18 illustrates schematically a simplified general increased in-door coverage network using a frequency shifter according to the invention.

According to one embodiment of the invention, frequency shifting is used to improve coverage in a building to a communication tower, such as communication between a cell phone and base-station. Such a configuration is shown as system 180 in FIG. 18. A cell phone 182 is shown in building 171*b*, communicating with a base-station over communication tower 181 over communication link 152*e*. In order to improve the in-building reception, a frequency shifter 120*a* is provided, preferably located in the building in a location wherein a reasonable signal and good communication is available with the tower 181 via antenna 52*a*. Optimally, the frequency shifter 120*a* is located in a place where there is a clear and non-interfered LOS to the tower 181. The signal from the tower 181, via link 152*e*, is shifted to another frequency and re-transmitted to the air via antenna 52*b* covering area 151*e*, linking with the cellular device 182 via link 152*f*.

Attenuation.

The coverage of a wireless system is typically limited, among other factors, by two aspects: the power level of the transmitted signal and the receiver sensitivity. The design goal in wireless transmitters is to transmit the maximum available power, in order to allow distant receivers to receive a decent signal after attenuation through the air. The transmitting power is typically limited by either regulatory requirements (such as those imposed by the FCC in the U.S.), maximum power defined by the relevant standard, such as IEEE802.11g, and practical implementation limitations, such as available power to consume, size of the antenna, and the transmitter, limited heat dissipation and so forth. However, high radio power levels derive the following disadvantages:

a. High transmitting power level interfere with other radio networks operating in or around the same frequency band, and add to general environmental radio pollution;

b. Radio radiation may create health hazards to human beings and other animals;

c. A security breach may happen since the transmitted radio signal may be received by eavesdropping.;

d. Higher transmitting power warrants more expensive, complex and large components such as power amplifiers; and e. The power consumption may be reduced since less power is required to be transmitted, and similarly less receiving circuitry is required. This is especially important in mobile or battery-operated devices.

In a similar way, the design goal of radio receivers is typically to increase the sensitivity in order to allow increased coverage. However, such low sensitivity may result in higher degree of interference from unwanted remote radio transmitters, and may further cause higher susceptibility to a surrounding noise in the radio bands, thus reducing the overall communication performance.

In systems based on the present invention, the radio signal is 'brought' to the required location. The frequency shifters described above may be located near the stations that are required to communicate with each other. As a non-limiting example, in a building having multiple rooms, a frequency shifter may be installed only in rooms wherein wireless devices are present, and the relevant sub-system in each such shifter is required to only cover the room and communicate only with WLAN units in the room. As such, the radio transceiving functionalities in each room (not to include the shifted frequency band used to connect the two shifters) are not required to have a large covered area, but rather a limited (in room) coverage. Testing of experimental systems has shown that using 10 dB or more attenuation in the transmitting power (relative to a nominal power used as a maximum in IEEE802.11g standard and in common available WAPs), as well as 10 dB degrading the receiving sensitivity, has not effected the performance in a typical room in a building or residence. In the non-limiting example of network 150, shown in FIG. 15 described above, the communications link 152*c* and the covered area 151*c* coupling WLAN unit 40*d* and frequency shifter 120*b* may not require the full range since they may be located adjacent to each other. Similarly, the communications link 152*a* and the covered area 151*a* coupling WLAN unit 40*c* and shifter 120*a* may not require the full range since they may be located adjacent to each other. This may apply in a similar way to system 170 shown in FIG. 17 described above, wherein the communication within the house (such as link 151*c* between WLAN unit 40*d* and shifter 120*b*) may not require a large distance since the devices may be located close to each other.

Figure 13B:
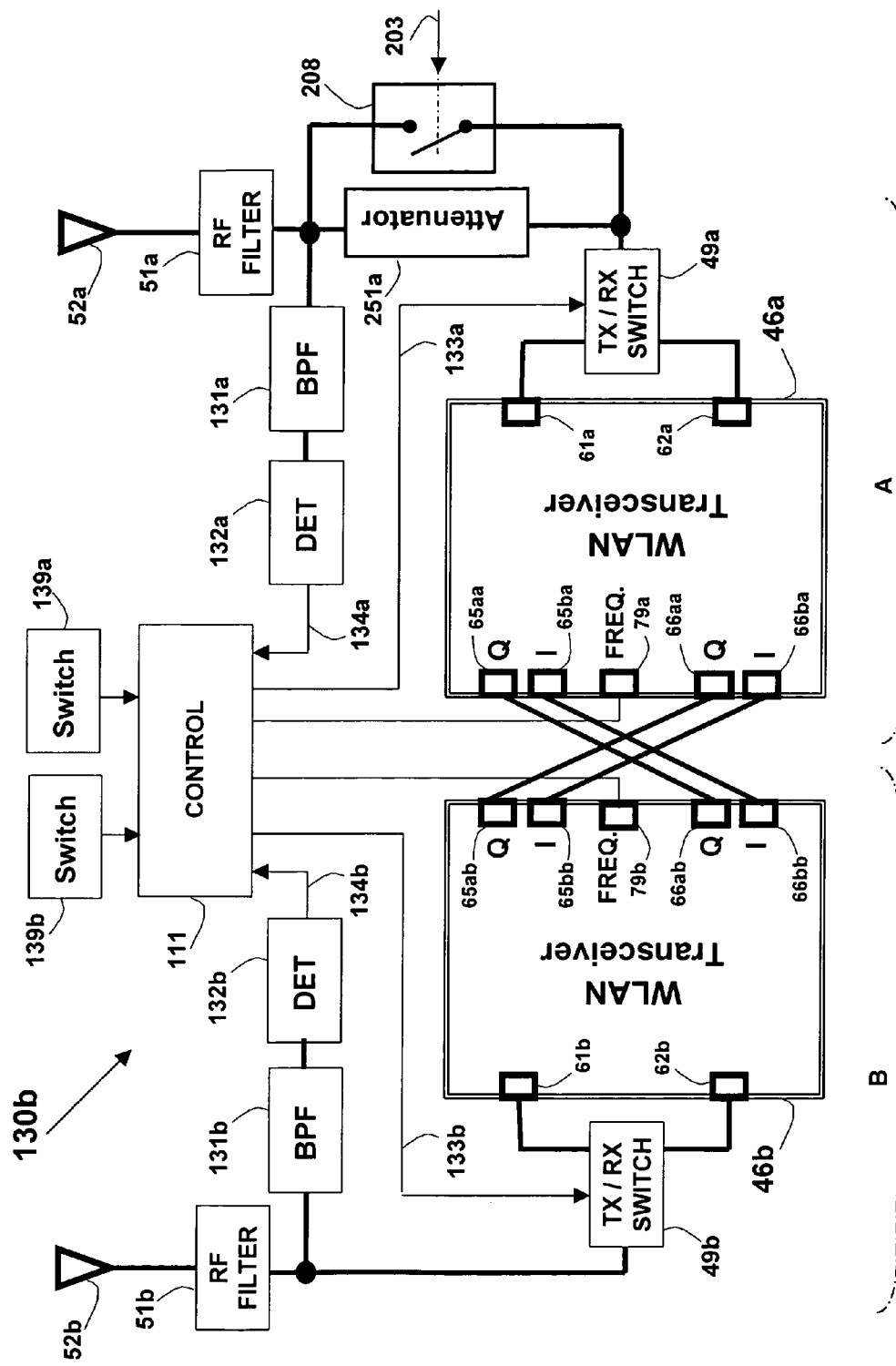

In such scenario, it will be advantageous to reduce the nominal transmit power level used for communication with the devices located nearby. Such a shifter 130*b* is shown in FIG. 13*b*, and is based on shifter 130 shown in FIG. 13. However, an RF attenuator 251*a* is inserted between the RF filter 51*a* and the TX/RX switch 49*a*. The attenuator 251*a* attenuates the transmitted signal sent to the antenna 52*a*, thus reducing the energy transmitted to the air from that antenna 52*a*. Similarly, a signal received from the air by antenna 52*a* will be attenuated hence effectively reducing the receiver sensitivity. It is apparent that such attenuator 251*a* may be installed any way along the RF radio signal path, such as between the RF filter 51*a* and the antenna 52*a*. Other ways of attenuation such as mismatching and mechanically effecting the antenna construction may as well be used.

Figure 13C:
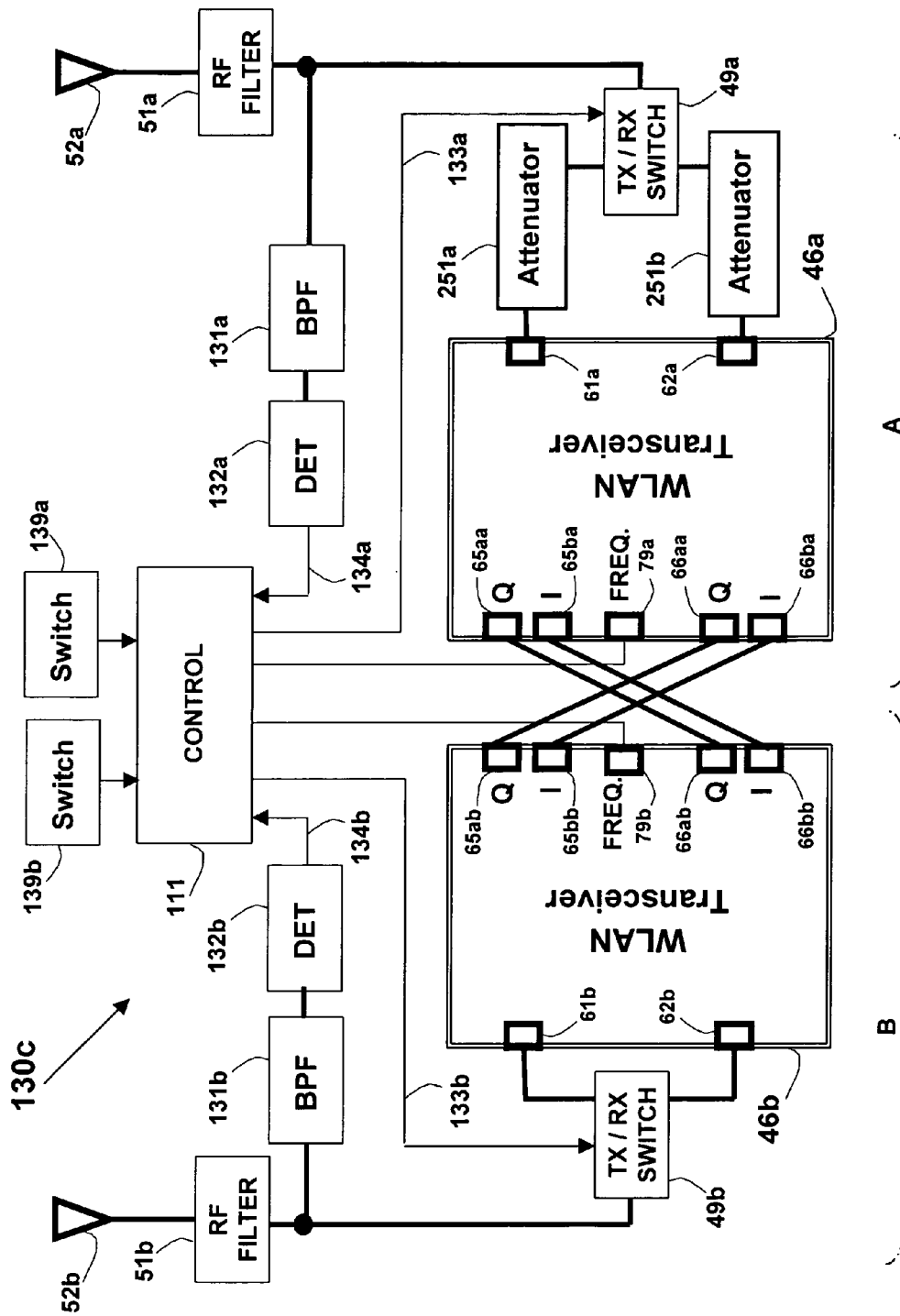

In another embodiment according to the present invention shown as system 130*c* in FIG. 13*c*, two attenuators 251*a* and 251*b* are used. Attenuator 251*a*, connected between the TX/RX switch 49a and port 61a of the WLAN transceiver 46a, affects the receiving path, and thus impacts the receiver sensitivity, without any effect on the transmitted signal. It is apparent that such attenuator may be located anywhere along the receiving path. Similarly, attenuator 251b connected between the TX/RX switch 49a and port 62a of the WLAN transceiver 46a, affects the transmitting path, and thus impacts the transmitted signal, without any effect on the receiver sensitivity. It is apparent that such attenuator may be located anywhere along the transmitting path. Such configuration allows for selecting different attenuation levels for each path, and not a single value to both paths as shown in system 130b. In some scenarios, it may be contemplated to use attenuation only in one path, such as in the receiving path only. In this case only attenuator 251a will be used, and attenuator 251b will be removed. Similarly, in the case of attenuating only the transmitting energy, only attenuator 251b will be used. While the attenuation function was described above as using an attenuator 251, it is apparent that the attenuation functionality may be executed without using an actual attenuator 251, but rather by controlling gain of an amplifier or other methods known in the art.

In some cases it may be beneficial to select between a few levels of attenuation, or even to avoid any attenuation altogether. This may be implemented by bypassing the RF switch 251 by a parallel connected RF switch 208, as shown in FIG. 13b for system 130b. Upon closing the RF switch 208 contacts, the attenuator 251a is bypassed and no attenuation is inserted, retaining the former maximum transmitting power level and sensitivity. Such a switch 208 is controlled by port 203, which may be operated locally or remotely, or mechanically operated by the installer/user/operator. In the latter case, RF switch 208 is a mechanical switch. Similar bypassing switches may be connected across attenuators 251a and 251b in system 130c.

Plug-in Device.

One approach to adding functionality to existing outlets is by using a plug-in module. Such plug-in modules are described in US Patent Application Publication US 2002/0039388 to Smart et al. entitled 'High data-rate powerline network system and method', US Patent Application Publication US 2002/0060617 to Walbeck et aL entitled 'Modular power line network adapter', and also in US Patent Application Publication US 2003/0062990 to Schaeffer, JR et al. entitled 'Powerline bridge apparatus'. Modules using HomePlug™ technology are available from multiple sources such as part of PlugLink™ products by Asoka USA Corporation of San Carlos, Calif., USA. HomePlug is a trademark of HomePlug Powerline Alliance, Inc. of San Ramon, Calif., USA. Various types of snap-on devices are also described in U.S. Patent application 2005/0180561.

Figure 19A:
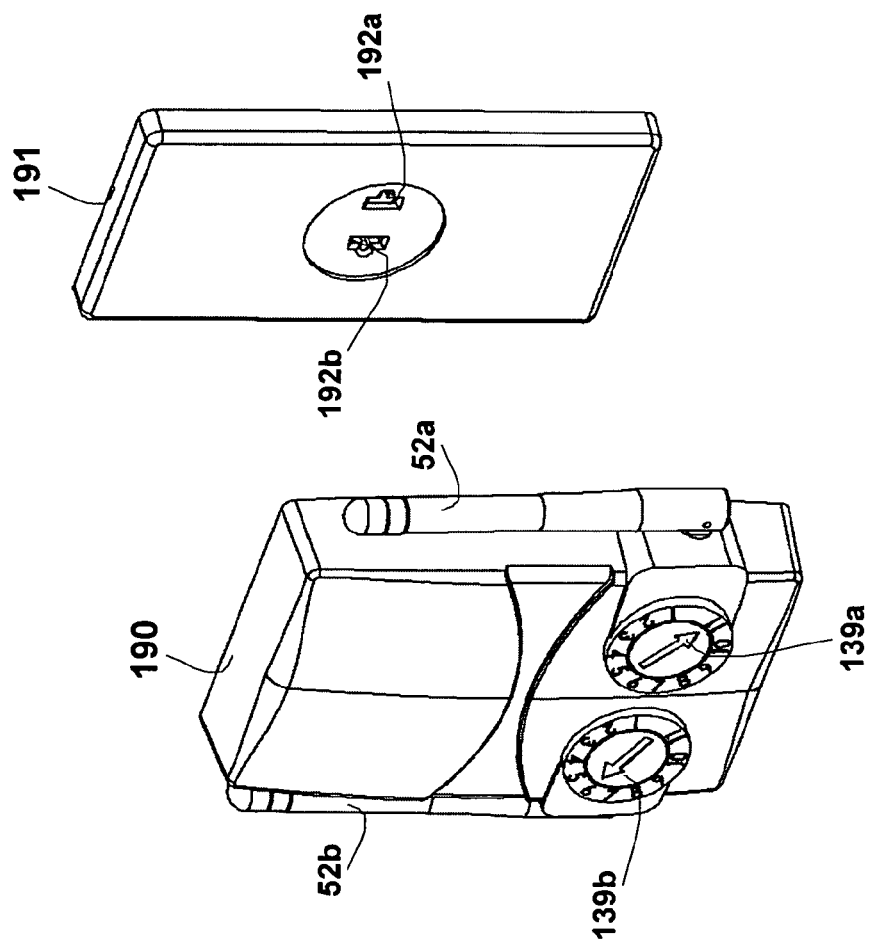
FIGS. 19a, 19b and 19c pictorially illustrate various perspective views of an exemplary AC power outlet plug-in unit using a frequency shifter according to the invention.
Figure 19C:
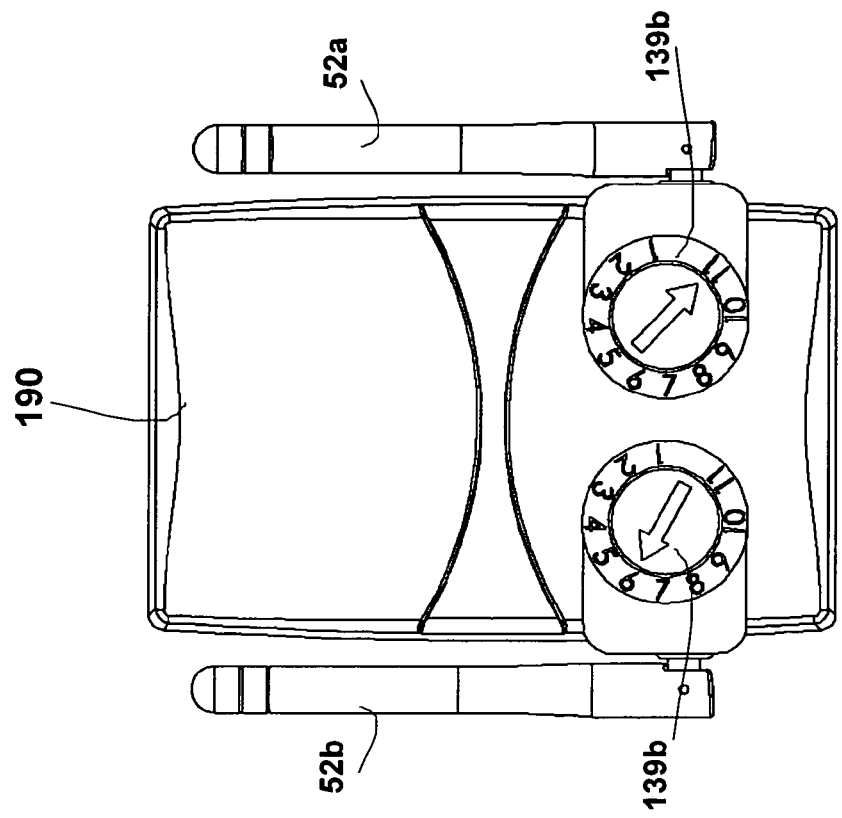
Figure 19B:
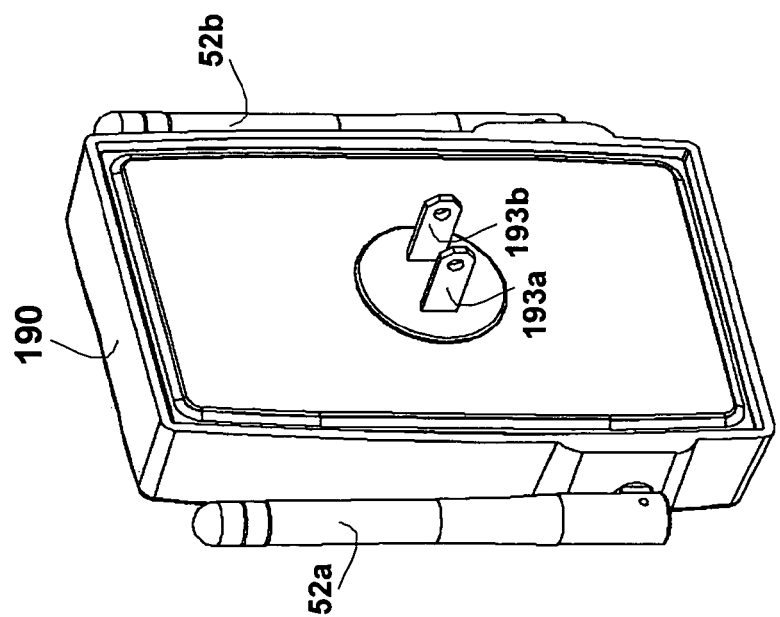

Any of the frequency shifters described above, such as systems 20, 30, 90, 110, 120, and 130 and their derivatives may be housed as an outlet plug-in enclosure. In one embodiment according to the invention, a plug-in into an AC power outlet is used as such enclosure. A mechanical outline of such a plug-in unit 190 is generally shown in FIG. 19a, with a perspective rear view in FIG. 19b and front view in FIG. 19c. A North-American style AC power outlet 191 is shown, having two power sockets 192a and 192b. The frequency shifter 130, for example, enclosed as plug-in module 190 is shown to have two power prongs 193a and 193b respectively mating with sockets 192a and 192b, providing electrical connection as well as mechanical support, enabling the plug-in unit 190 to be easily attached to the outlet 191. Antennas 52a and 52b are shown, as well as two corresponding channel selecting mechanical rotary switches 139a and 139b, each having 11 positions for selecting one out of the 11 channels of the IEEE802.11g. In the example shown, rotary switch 139a controlling the 'B' sub-system channel is set to channel 6, while rotary switch 139b controlling the 'A' sub-system channel is set to channel 11. The power connection via prongs 193a and 193b is used to supply AC power to the unit 190 for powering its internal circuits, preferably via a power supply including an AC/DC converter, for converting the 110VAC 60Hz power from the outlet 191 to the DC voltage or voltages required for proper operation of the frequency shifter 190.

While the frequency shifter 190 was described as a plug-in module to an AC power outlet, it is apparent that a frequency shifter may be equally plugged-in to any outlet, being an AC power, telephone, CATV or LAN (such as Structured Wiring based on Category 5, 6 or 7 wiring) outlet. While the shifter 190 was described as being both powered from and mechanically supported by the attached AC power outlet, such coupling may be only for power feeding or only for mechanical support.

A mechanical outline of a plug-in unit 190 for attaching to a LAN outlet is generally shown in FIG. 19d, with a perspective rear view in FIG. 19e. A typical LAN outlet 196 is shown, comprising a LAN connector 197, such as an RJ-45 jack. The frequency shifter 130, for example, enclosed as plug-in module 195 is shown to have a RJ-45 plug 198 respectively mating with LAN connector 197, providing electrical connection as well as mechanical support, enabling the plug-in unit 195 to be easily attached to the outlet 196. Antennas 52a and 52b are shown, as well as two corresponding channel selecting mechanical rotary switches 139a and 139b, each having 11 position for selecting one out of the 11 channels of the IEEE802.11g. In the example shown, rotary switch 139b controlling the 'B' sub-system channel is set to channel 6, while rotary switch 139b controlling the 'A' sub-system channel is set to channel 11. In one embodiment according to the invention, the LAN wiring connected to the outlet 196 via jack 197 carries a power signal, for example according to PoE (Power over Ethernet) IEEE802.3af standard, explained below. The plug-in module 195 serves as a PD (Powered Device) and is powered from the LAN wiring, typically via DC/DC converter, as described below.

Outlets

The term "outlet" herein denotes an electromechanical device, which facilitates easy, rapid connection and disconnection of external devices to and from wiring installed within a building. An outlet commonly has a fixed connection to the wiring, and permits the easy connection of external devices as desired, commonly by means of an integrated standard connector in a faceplate. The outlet is normally mechanically attached to, or mounted in, a wall or similar surface. Non-limiting examples of common outlets include: telephone outlets for connecting telephones and related devices; CATV outlets for connecting television sets, VCR's, and the like; outlets used as part of LAN wiring (i.e. "structured wiring") and electrical outlets for connecting power to electrical appliances. The term "wall" herein denotes any interior or exterior surface of a building, including, but not limited to, ceilings and floors, in addition to vertical walls.

Functional Outlet approach.

This approach involves substituting the existing service outlets with 'network' active outlets. Outlets in general (to include LAN structured wiring, electrical power outlets, telephone outlets, and cable television outlets) have evolved as passive devices being part of the wiring system house infrastructure and solely serving the purpose of providing access to the in-wall wiring. However, there is a trend towards embedding active circuitry in the outlet in order to use them as part of the home/office network, and typically to provide a standard data communication interface. In most cases, the circuits added serve the purpose of adding data interface connectivity to the outlet, added to its basic passive connectivity function.

An outlet supporting both telephony and data interfaces for use with telephone wiring is disclosed in U.S. Pat. No. 6,549,616, entitled 'Telephone outlet for implementing a local area network over telephone lines and a local area network using such outlets' to Binder. Another telephone outlet is described in U.S. Pat. No. 6,216,160 to Dichter, entitled 'Automatically configurable computer network'. An example of home networking over CATV coaxial cables using outlets is described in WO 02/065229 published 22 Aug. 2002 entitled: 'Cableran Networking over Coaxial Cables' to Cohen et al. Such outlets are available as part of HomeRAN™ system from TMT Ltd. of Jerusalem, Israel. Outlets for use in conjunction with wiring carrying telephony, data and entertainment signals are disclosed in US Patent Application Publication US2003/0099228 to Alcock entitled 'Local area and multimedia network using radio frequency and coaxial cable'. Outlets for use with combined data and power using powerlines are described in US Patent Application Publication US2003/0062990 to Schaeffer et al. entitled 'Powerline bridge apparatus'. Such power outlets are available as part of PlugLAN™ by Asoka USA Corporation of San Carlos, Calif. USA.

While the active outlets have been described above with regard to networks formed over wiring used for basic services (e.g. telephone, CATV, and power), it will be appreciated that the invention can be equally applied to outlets used in networks using dedicated wiring. In such a case, the outlet circuitry is used to provide additional interfaces to an outlet, beyond the basic service of single data connectivity interface. For example, it may be used to provide multiple data interfaces, where the wiring supports a single such data connection. An example of such an outlet is the Network JackTm product family manufactured by 3Com™ of Santa-Clara, Calif., U.S.A. In addition, such outlets are described in U.S. Pat. No. 6,108,331 to Thompson entitled 'Single Medium Wiring Scheme for Multiple Signal Distribution in Building and Access Port Therefor', as well as U.S. Patent Application US 2003/0112965 Published Jun. 19, 2003 to McNamara et al. entitled 'Active Wall Outlet'.

While the active outlets have been described with regard to outlets and networks based on conductive media such as wires and cables, it will be appreciated that such outlets are equally applicable in the case wherein the network medium is non-conductive, such as fiber-optical cabling. Active outlets supporting data interfaces and based on fiber optic cabling are described in U.S. Patent Application US 2002/0146207 Published Oct. 10 2002 to Chu, entitled 'Fiber Converter Faceplate Outlet', as well as in U.S. Pat. No. 6,108,331 to Thompson entitled 'Single Medium Wiring Scheme for Multiple Signal Distribution in Building and Access Port Therefor'. As such, the term 'wiring' as used in this application, as well as in the appended claims, but not limited to, should be interpreted to include networks based on non-conductive medium such as fiber-optics cabling.

While the outlets described above use active circuitry for splitting the data and service signals, passive implementations are also available. An example of such a passive outlet is disclosed in PCT Publication WO 02/25920 to Binder entitled 'Telephone communication system and method over local area network wiring'. Such outlets are available as part of the etherSPLIT™ system from QLynk Communication Inc. of College Station, Tex. USA. The above-described outlets are complete and self-contained devices. As such, they can be easily installed in new houses instead of regular passive simple outlets.

In one embodiment according the invention, the frequency shifter is housed, at least or in part, in an outlet, being an AC power, telephone, CATV or LAN outlet.

Wireless/Wired.

Figure 20:
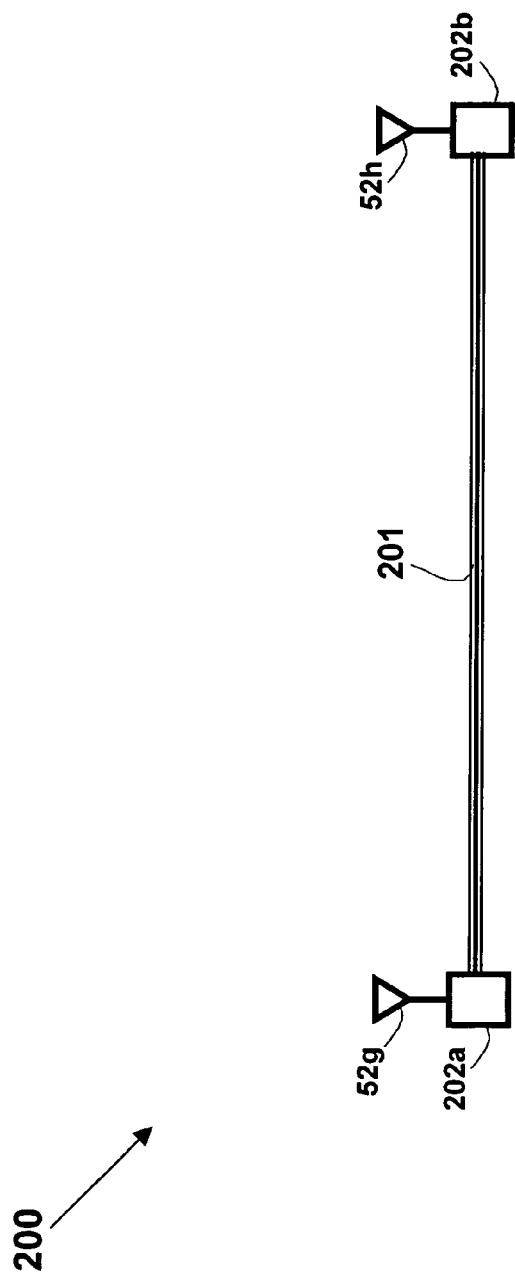
FIG. 20 illustrates schematically a simplified general prior-art network including wired and wireless communication.

Carrying wireless signal over a cable is known in the art, as described in U.S. Patent publication '9245. A typical prior-art system is shown in FIG. 20. Typically, in such a system 200, the wireless signal is carried between two wireless units 202a and 202b over a coaxial cable 201 as a point-to-point scheme, wherein the wireless units 202a and 202b are each connected a different end of the cable 201. Coaxial cables are known to be expensive and difficult to install, maintain, and repair, in particular when compared to a twisted-pair wiring. US Patent Application Publication 2005/0249245 to Hazani et al. entitled: 'System and Method for Carrying a Wireless based Signal over Wiring', teaches carrying wireless signals over a medium other than coaxial cable, such as a telephone wire-pair. However, Hazani, et al. describes frequency shifting using a super-heterodyne based implementation.

According to one embodiment of the invention, frequency-shifted wireless signals are carried over a metallic medium such as wiring. An example wherein a IEEE802.11g signal is carried over a twisted wire pair will be described hereinafter. In this non-limiting example, channel 6 is shifted to the 8÷30 MHz frequency band and carried over a single twisted wire pair.

Figure 21:
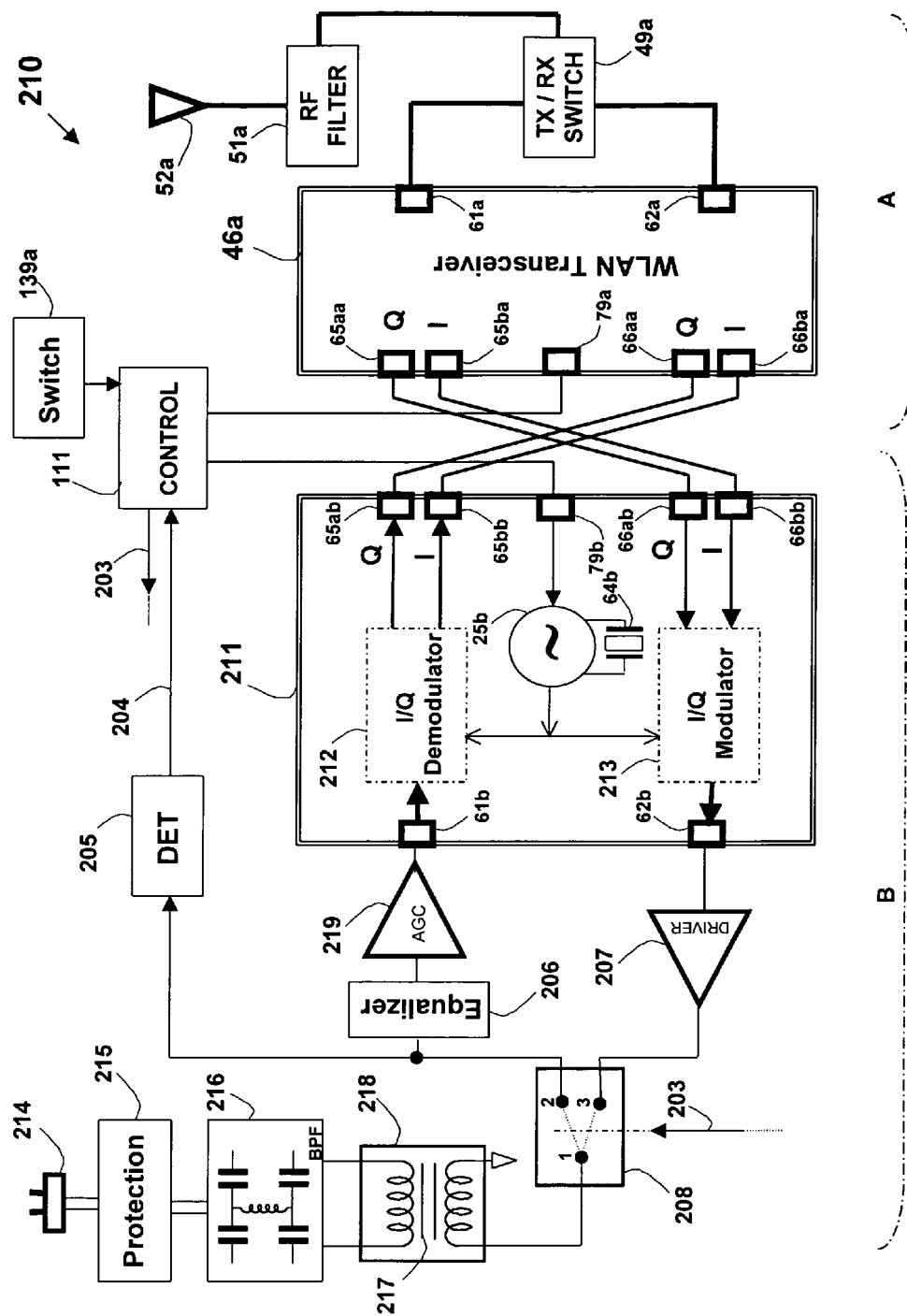
FIG. 21 illustrates schematically a simplified general functional block diagram of a frequency shifter used between wired and wireless links according to the invention.

A frequency shifter for bridging between wireless (IEEE802.11g channel 6) and wired (using 8-30 MHz band) mediums is shown as system 210 in FIG. 21. The sub-system 'A' of system 210, including antenna 52a, RF filter 51a, WLAN transceiver 46a, as well as the corresponding part of control unit 111 are identical or similar to the corresponding sub-system of systems 120 and 130 described above respectively with regard to FIGS. 12 and 13. The sub-system 'A' is set to channel 6 by switch 139a coupled to the control unit 111, used by the control unit 111 for setting via port 79a, thus converting between channel 6 and its I/Q component signals. However, the 'B' sub-system is modified to work around 19 MHz center frequency, thus allocating the frequency-shifted 22 MHz bandwidth signal between 8 MHz and 30 MHz.

The sub-system 'B' of system 210 is in principle similar to the sub-system 'B' described above, for example, in FIG. 13a, however adapted for the wired medium interface. Connector 214 is used to couple to a wire pair. The connector 214 may be RJ-11, for example. The received signal from the wire pair via the connector 214 is passed through a protection block 215, for handing surges, over-voltage, lightning, and ensuring a safe and undamaged operation on the system 210, and for meeting the required safety and ESD/EMC requirements imposed by the UL/FCC in the U.S.A. and CE/CENELEC in Europe. The protection block 215 may be based on, for example, P3100SC '275V SIDACTOR® Device' from Littelfuse of Des Plaines, Ill., U.S.A. Band Pass Filter (BPF) 216 is provided for passing only the frequency band required (in our example 8-30 MHz) and filtering out any noises or signal outside this frequency band. As a non-limiting example, a passive filter based on serially connected four capacitors of 150 pF each and a 1.8μHy inductor connected in parallel, have been used, functioning as a High Pass Filter (HPF) and thus rejecting all low frequencies. An isolation block 218, typically based on a transformer 217, is provided in order to reject common-mode signals and to adapt between the balanced signal carried over the wire pair to the non-balanced internal circuitry in the system 210. Similar to the TX/RX switch 49 described above, a TX/RX switch 208 is used, adapted to switch the 8÷30 MHz signal between receive and transmit states. In the 'receive from wire pair' state, the received signal is routed between ports 1 and 2, to an equalizer 206. The equalizer 206 is used to compensate the frequency dependent characteristics of the wire pair medium, such as frequency tilt. The resulting signal is fed to a buffer/amplifier 219 having an AGC functionality, in order to adjust to the proper signal level required by I/Q modulator 212 connected via port 61b. Such AGC amplifier 219 may be based on RF2637 'Receive AGC Amplifier' from RF Micro Devices, inc. of Greensboro, N.C. U.S.A. The Q and I component signals are outputted via respective ports 65ab and 65bb to the WLAN transceiver 46a, to be frequency shifted to channel 6 and transmitted via antenna 52a as described above.

The signal path from the antenna 52a to the wire pair 201 via connector 214 is reciprocal to the above. The signal received in channel 6 is demodulated to its Q and I component signals, respectively fed to the I/Q modulator 213 via the respective ports 66ab and 66bb. The combined signal at the target frequency band 8÷30 MHz is connected to a line driver 207 via port 62b. The line driver 207 is adapted to drive the signal to the wired medium, and may be based on EL5130 '500 MHz Low Noise Amplifier' from Intersil Corporation headquartered in Milpita, Calif., U.S.A. TX/RX switch 208 in the 'transmit to wire pair' state routes the signal through ports 3 and 1 to the isolation unit 218. Such a switch may be based on TS5V330 'Quad SPDT Wide-Bandwidth Video Switch with Low On-State Resistance' from Texas Instruments Incorporated of Dallas Tex., U.S.A. The balanced signal is filtered by the BPF 216, and fed through the protection block 215 to the wire pair 201 via connector 214. The center frequency of the sub-system 'B' is sent from the control unit 111 to the reference frequency source 25b and the related crystal 64b, via port 79b.

I/Q Demodulator 212 and I/Q modulator 213 may be implemented as separated circuits, or can be integrated into a single component 211, which may be based on Maxim MAX2450 3V, Ultra-Low-Power Quadrature Modulator/Demodulator from Maxim Integrated Products of Sunnyvale, Calif. A U.S.A. In some cases, WLAN transceivers such as 46 may also be used, if the required wired frequency band is supported. Similar to the discussion above involving systems 120 and 130, wherein system 210 is not idling, it may be in two states. In the first state the signal is received from the air via antenna 52a and fed after frequency downshifting to the wire pair via connector 214. In the second state the signal is received from the wire pair 201 via connector 214 and transmitted after frequency up-shifting to the air via antenna 52a. The two states are determined by control unit 111 in a way similar to the description above, subject to the required changes of controlling TX/RX Switch 208 via connection 203, and determining the signal availability over the wire pair by detector (DET) 205, connected to the control unit 111 via connection 204. Such a detector 205 may be based on LTC5507 '100 kHz to 1 GHz RF Power Detector' from Linear Technology Corporation of Milpitas, Calif., U.S.A.

While system 210 has been described as supporting two-way operation, it would be apparent that a one-way operation may be implemented as well. The unidirectional operation may involve either from the air to the wire-pair or from the wire-pair 201 to the air. In each such an embodiment, the functions and parts not used in the operation may be obviated.

While the invention has been exampled above with regard to a channel of WLAN IEEE802.11g standard, it will be appreciated that such frequency shifting will be applicable to any frequency shifting of any wireless signal, from any frequency to any other frequency, without relating to channel boundaries or any standards. Similarly, while the system was described above involved carrying the signal over the wire pair 201 in the 8-30 MHz frequency spectrum, it will be appreciated that the frequency band may be equally used.

Using frequency shifting for increasing the coverage of a wireless network based on a wired medium as the backbone is shown as system 220 in FIG. 22. As part of the system 220 a WLAN unit 40b (including antenna 52d) is located in a remote location (or hidden for wireless communication purposes) from WLAN unit 40a (including antenna 52c), and as such there is no communication link between the WLAN units. A twisted pair 201 is provided, having end-points that are in proximity to the WLAN units. A frequency shifter 210a having antenna 52a is connected to one end of the wire pair 201, and another frequency shifter 210b (including antenna 52b) is connected to the other end of the twisted wire pair 201. A radio signal transmitted by WLAN unit 40b via antenna 52d is received in antenna 52a of the shifter 210a, allowing for a wireless communication link 152b between the two wirelessly coupled devices. The received signal is down frequency shifted and transmitted to the wire pair 201. The signal propagates through the wire pair 201 and is received at the other end by shifter 210b, which up-shifts and reconstructs the original signal, which is transmitted over the air from antenna 52b to antenna 52c over wireless communication link 152a. The opposite direction is reciprocal, wherein the wireless signal from antenna 52c is regenerated over link 152b after being conveyed over the twisted wire pair 201.

Since the latency through the shifters 210a and 210b and the wire pair 201 is small and can be practically ignored, WLAN unit 40b and 40a are considered for all practical purposes to be wirelessly in direct communication. The system 220 may be in one out of states, each state is defined by the direction of the signal flow, are controlled by the WLAN units 40 in the same manner as if the WLAN units 40 were in direct wireless communication, and the added backbone (including the wire pair 201, and shifters 210a and 210b) is automatically adapting to support the required configuration. As such, no alterations or modifications are required to the WLAN units 40, allowing for the use of standard and available devices.

Twisted wire pair 201 may be a UTP (unshielded Twisted Pair), FTP (Foiled Twisted Pair), S/STP (Screened Shielded Twisted Pair) or an STP (Shielded Twisted Pair), as well as any other type used in wired LAN cabling, such as "structured wiring". Furthermore, such cabling may conform to ELA/TIA-568, such as category 1, 2, 3, 4, 5 or 6. In addition, the two conductors of the wire pair 201 may be conducting paths over a Printed Circuit Board (PCB). Similarly, coaxial cable may be used, such as RG-59/U. In addition, any two conductors or any two wires, even if they were not specifically manufactured for carrying data or any communication, such as power cables, may be used. Wireless networks, in general, typically support large dynamic range in order to compensate for the fading, loss, and attenuation through the air. In addition, spread-spectrum is used in order to accommodate interferences and other impairment associated with the radio-based over the air communication medium. For example, IEEE802.11g uses OFDM modulation and typically supports above the 90 dB dynamic range. As such, carrying a wireless signal over a wired medium allows for high attenuation and distortion, allowing carrying the signal over a wired medium having poor transmission capability, while still offering large reach added to robust and reliable operation. Yet, these advantages are obtained without using any dedicated modem or any special processing. For example, an experimental system 220 was built and (without any equalizer 206) had over 1500 foot reach over a relatively low-grade category 3 twisted wire pair 201. The connection to each side of the wire pair 201 commonly employs a connector, preferably a standard based connector.

Wireless systems are typically built to accommodate the effect of multi-path, causing constructive and destructive interference as well as phase shifting of the signal. Powerful algorithms and complex line code modulations such as spread-spectrum are commonly used in order to provide a reliable communication even in a severe multi-path environment.

While system 220 in FIG. 22 was shown to include only two shifters 210a and 210b connected in a point-to-point topology to the two ends of the twisted wire pair 201, any number of shifters 210 interconnected via the wired medium in any topology may be used. One non-limiting example is system 230 shown in FIG.23. System 230 uses a single wire pair 201, interconnecting shifters 210a, 210b and 210c, respectively including antennas 52a, 52b and 52c. While shifter 210a is connected to one end of the cable or wire pair 201, shifters 210b and 210c are connected to distinct points along the wire pair 201, leaving the other end of the wire pair 201 open. Other 'bus' topologies, including 'star', 'tree', and any other shared medium or point-to-multipoint topologies may be equally used. In any wired network other than point-to-point having properly defined and terminated end-points, a reflection occurs in all points wherein the characteristic impedance is not continuous along the signal propagation. Hence, a reflection signal will be generated at least in the non-terminated/non-connected end of the wire pair 201. In the case wherein shifter 210a is not terminated, its connection point will cause reflections as well. Such reflections are basically electrically equal in their characteristics to the multi-path phenomenon described above. Since system 230 uses wireless signal and wireless end units (such as 40b and 40a in system 220) which are built to accommodate such impairments, system performance will not be substantially degraded relative to the reflection-free system 220. Hence, there is no need to add any hardware or functionality to the shifters 210 to specifically adapt to any specific topology.

Wireless communication is considered a shared medium environment. Similarly, in system 230 the wire pair 201 served as a shared communication medium to the connected shifters 210. In both cases a channel access method mechanism is used in order to enable only a single transmitter at a time to transmit to the shared physical communication medium and to handle collisions. In an IEEE802.11g (i.e., WiFi) network, a Carrier Sense Multiple Access with Collision Avoidance (CSMA/CA) scheme is employed. Since the shifters based wired backbone, including shifters 210a, 210b and 210c and the interconnecting wire pair 201 are practically 'transparent' to the coupled WLAN units 40 (due to the low latency and to the fact that the signals are faithfully replicated), there is no need to modify the shifters 210 in any way to support the CSMA/CA or any other channel access method. The wireless network affected by the WLAN units and the wired backbone functions as if all the WLAN units are within a direct communication link with each other.

While the invention has been so far exampled by a wire pair 201 carrying only the frequency-shifted wireless signal, other signals can be concurrently carried over the same wire pair 201. For example, TDM (Time Division/Domain Multiplexing) may be used, wherein another signal uses the wire pair 201 in the idle period wherein no signal is propagated through the wired medium. In such a case, the other signal may use the same or partly the same frequency spectrum used by the frequency-shifted wireless signal. Alternatively, FDM (Frequency Division/Domain Multiplexing) may be used, wherein the other signal uses a frequency band distinct from the one used by the frequency-shifted wireless signal.

Figure 24:
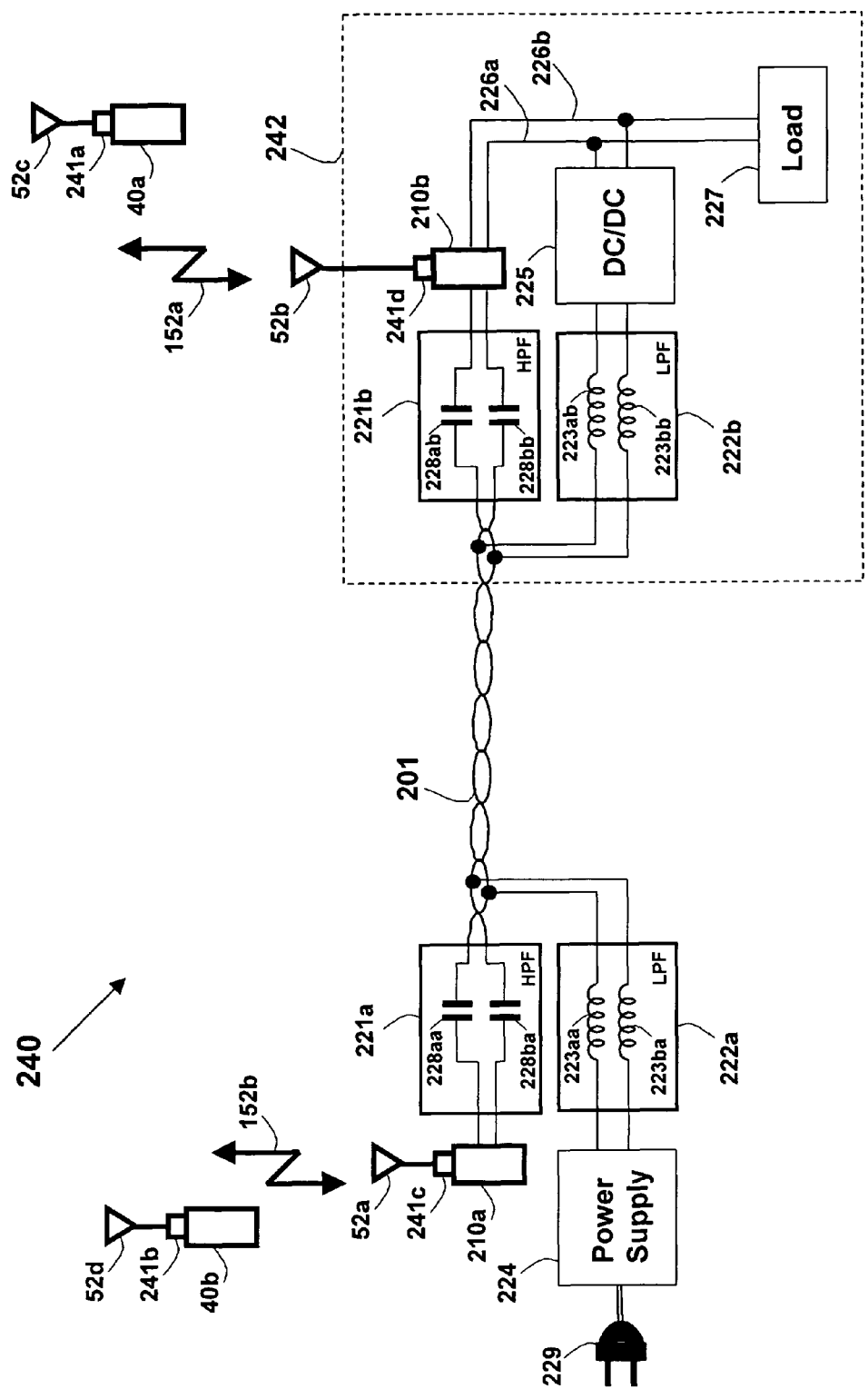
FIG. 24 illustrates schematically a simplified general network over point-to-point wiring supporting remote powering and using a frequency shifter according to the invention.

As described above, frequency shifting in general and in particular according to the invention, allows for increasing a wireless network coverage and allows for connecting wirelessly-separated areas, and this is provided with the advantages of minimum parts count, high reliability, higher degree of integration, and low power consumption. Furthermore, in many cases the wireless coverage is required in an outdoor environment or another location requiring hardened implementation, such as operating over a wide temperature range, in a vibrating or shock-susceptible mechanical stress and so forth. Similarly, such a remote location may be limited in space and lacking a nearby power source. The low power consumption of the shifter 210 allows for remote feeding of a frequency shifter 210 over the same wire-pair. Such a system 240 is shown in FIG. 24, using FDM to carry DC power (effectively 0 Hz) and frequency-shifted wireless signals in a higher frequency band (e.g. 8-30 MHz). While remote power feeding is known in the art, high voltage is typically used in order to compensate for the wiring resistance caused voltage drop. For example, a 120 VDC is used to remotely power feed some of the DSL equipment. Using such voltage level may be problematic since many safety standards such as UL/EEC 60950 and EN60950 limit the voltage level in many applications to 60 VDC. The low power consumption of a frequency shifter allows for using such lower than 60 VDC voltage level, and as such the common 48 VDC voltage level may be used and yet support long wiring as well as low diameter/high resistance types of wires.

System 240 is based on system 220 shown in FIG. 22, wherein WLAN 40b and 40a communicate via the wired backbone including wire pair 201 and interconnecting shifters 210a and 210b. Two HPFs (High Pass Filter) 221a and 221b are connected respectively between shifters 210a and 210b and the corresponding end of the wire pair 201. The HPFs 221 allow passing of the shifted wireless signal band (8-30 MHz in the above example) and block the DC signal available over the wire pair 201, and as such, operation of system 220 is fully restored and is not affected. HPF 221 may be built by simple serially connected capacitors 228aa and 228ba, since the signal lower frequency component (8 MHz) is substantially above the DC signal. In some cases, BPF may be used for passing only the frequency shifter wireless signal. Similarly, HPF 221b comprises serially connected capacitors 228ab and 228bb. Other types of filters may be used, such as filter 216 described above. In some cases, the filter 221 may substitute the filter 216 in the shifter 210, and filter 216 may thus be obviated. LPFs 222a and 222b are connected to the end of the wire pair 201 respectively in parallel to the connection of BPFs 221a and 221b. The filters 222 are operative to pass only DC, and may comprise two serially connected inductors, such as inductors 223aa and 223ba in LPF 222a, and inductors 223ab and 223bb in LPF 222b. Power supply 224 is typically fed from the AC power mains (115 VAC/60 Hz in the US and 220 VAC/50 Hz in Europe) and commonly includes an AC/DC converter. The DC power signal is passed through LPF 222a and is fed to the wire pair 201. A system 242 is located at and connected to the other end of the wire pair 201, and includes a DC/DC converter 225, A LPF 222b, a load 227, an HPF 221b and frequency shifter 210b. The DC/DC converter 225 is connected to receive the DC power signal from the wire pair 201 through the LPF 222b, and provides a DC power output for powering any load. A general load 227 may be connected to the DC/DC converter 225 outputs to be fed therefrom. In one embodiment, the DC/DC converter 225 DC output power is connected to feed the frequency shifter 210b via connections 226a and 226b, thus relieving this side of the wire pair 201 to be connected to any local power source. In another embodiment, the DC/DC 225 feeds both a load 227 and the frequency shifter 210b.

Figure 24A:
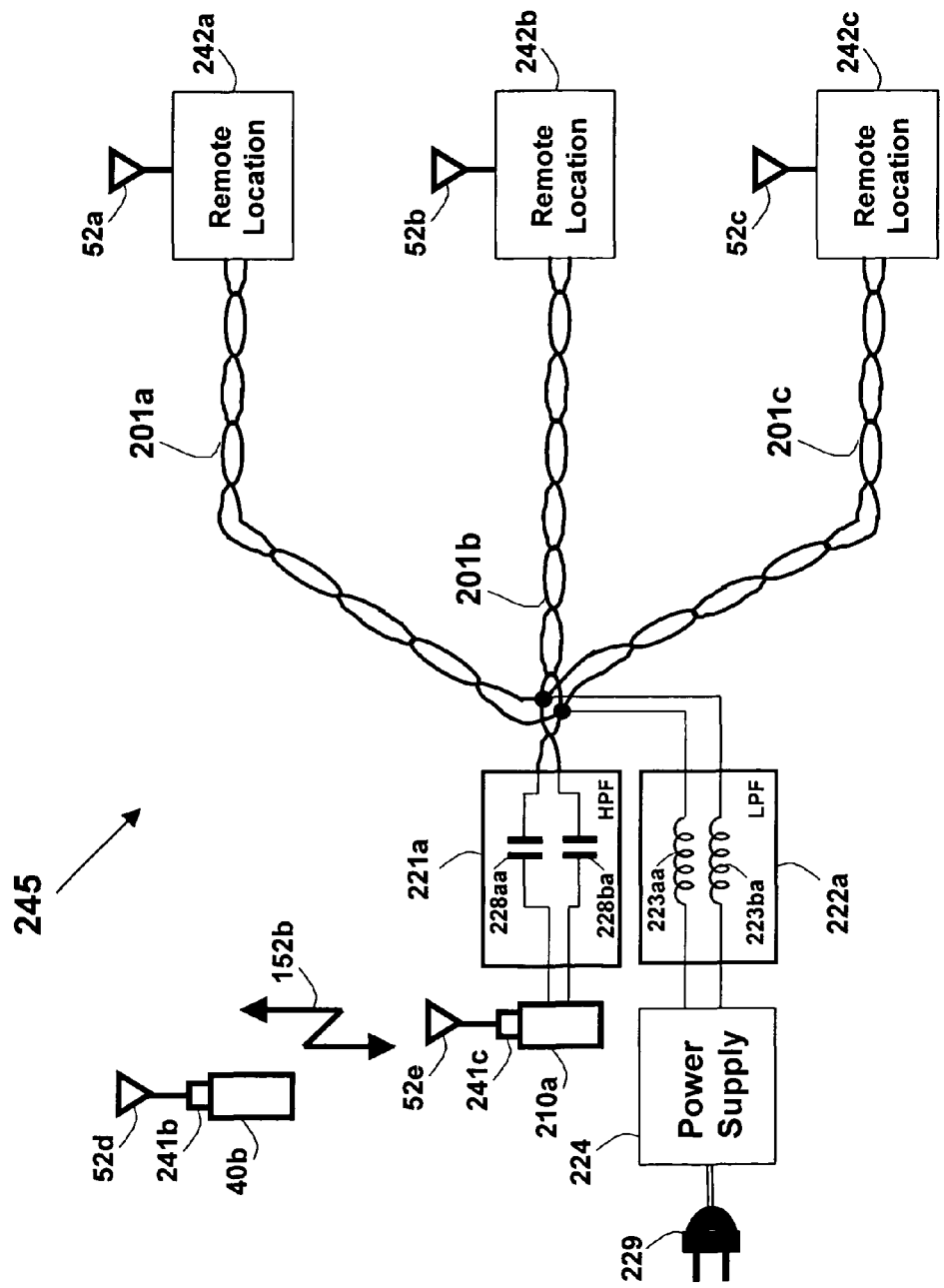
FIG. 24a illustrates schematically a simplified general network over 'star' topology wiring supporting remote powering and using a frequency shifter according to the invention.

While system 240 is shown in FIG. 24 to have a single fed location at the other end of the wire pair 201 including the load 227 or shifter 210b, or both, it should be apparent that multiple such remote locations may be connected along the cable 201, such as shown in FIG. 23, and not limited to a point-to-point topology. Each such connected location needs to have an LPF 222b and a power converter such as DC/DC Converter 225, operative for converting the input voltage from the wire pair 201 to the application operational voltage or voltages. Furthermore, a combination of wire-powered and local-powered locations may be employed. Some powered locations may be having only a shifter 210 powered, or having other loads 227 powered, or wherein both the shifter 210 and a load 227 are remotely powered. A non-limiting example of a 'star' or 'point-to-multipoint' topology network is shown in FIG. 24a showing a system 245. The system 245 shows three remote locations 242a, 242b and 242c, respectively including antennas 52a, 52b and 52c, and respectively connected via wire pairs 201a, 201b and 201c to the center location HPF 221a and LPF 222a. All or part of the remote locations 242 may be remotely powered, and one or more such remote locations 242 may include a remotely powered load 227. Furthermore, each of the wire pairs 201 may contain different types of wire pairs, for example wire pair 201a may be a UTP, wire pair 201b may be a coaxial cable, and wire pair 201c may be an STP.

While system 240 was described with a DC power feeding, an AC power feeding may also be employed. In such a case, the power supply 224 will generate an AC signal and will include an AC/AC converter, and the DC/DC converter 225 will be substituted with AC/DC converter. In the case the AC power is using a low frequency band signal, the LPFs 222a and 222b will be adapted to pass this low frequency. In the case higher frequency is used, the LPFs 222a and 222b will be substituted with BPFs adapted to substantially pass the frequency of the AC power signal carried over the wire pair 201.

Various types of antennas 52 (or any other radio ports) are used in WLAN units. Among those are PCB printed antennas, chip antennas, as well as panel and dome antennas. Furthermore, the antennas may be omni-directional or directional. Typically, the antennas are coupled to the WLAN unit enclosure using mating coaxial connectors, such as SMA, N-Type and IPX, providing both the electrical connection as well as the mechanical attachment. In many cases, the antenna connection allows for easy disconnection and connection by means of snapping or screwing. The couplings of the antennas 52d and 52c to the respective WLAN units 40b and 40a are designated as ports 241b and 241a respectively, as shown in system 240 (FIG. 24) and system 245 (FIG. 24a). Any type of antenna may be used for shifter 210, and similarly any antenna coupling (either electrical or mechanical or both) may be used. In particular, any type of antenna that is suitable for WLAN units 40, hence suitable to work in the appropriate frequency range, is equally suitable to be used for shifter 210 communicating over the same frequency band. For example, any antenna for IEEE802.11g WLAN unit is operative in the 2.4 GHz band and as such may be used in a shifter 210 wirelessly communicating with such WLAN unit. The couplings of the antennas 52a and 52b to the respective shifters 210a and 210b are designated as ports 241c and 241d respectively, as shown in system 240 (FIG. 24) and system 245 (FIG. 24a).

Figure 25:
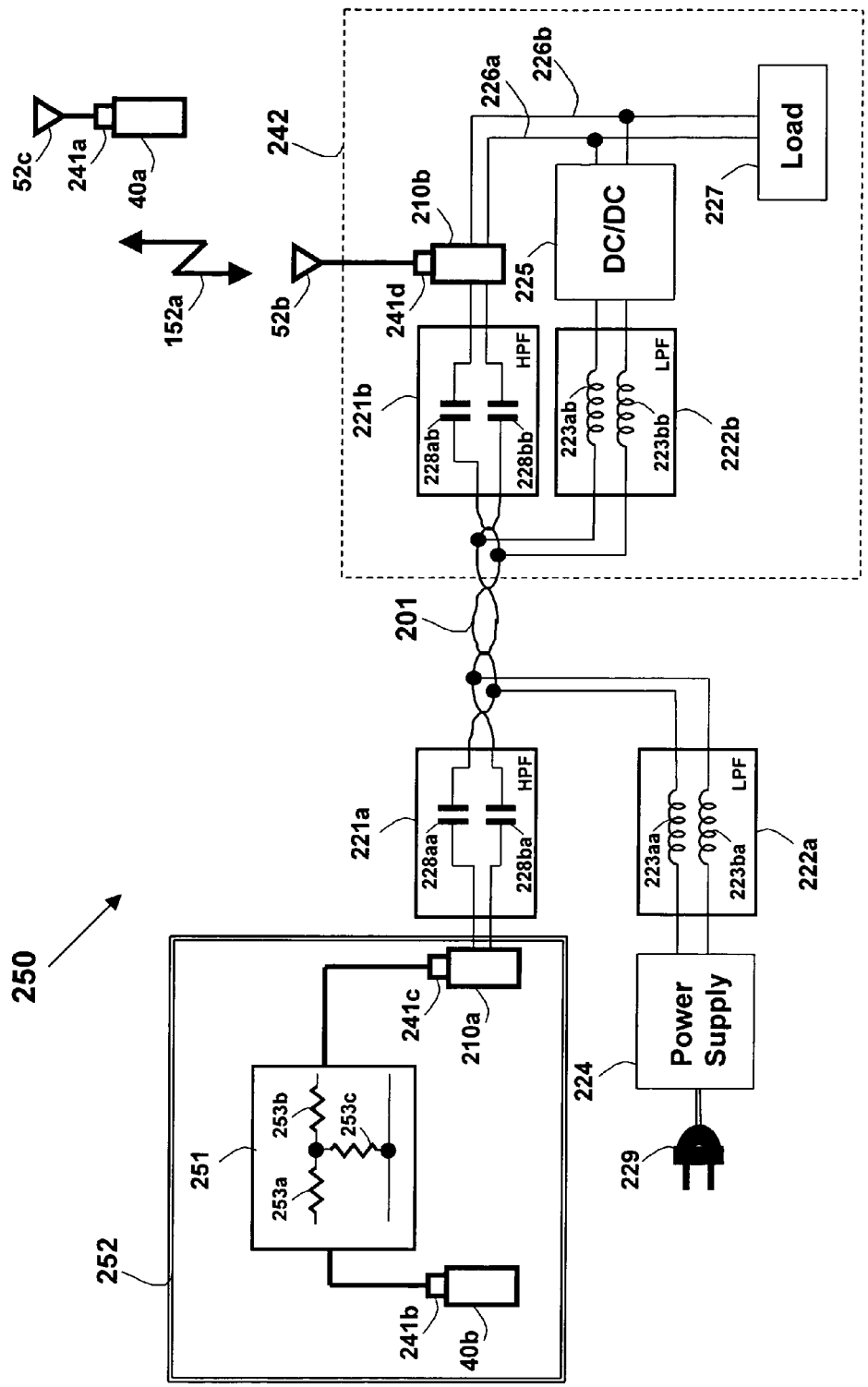
FIG. 25 illustrates schematically a simplified general network allowing distant coverage area using a frequency shifter according to the invention.

The invention has been so far described with regard to wireless communication link 152 between the shifters (either 120 or 210) and the WLAN unit 40. However, a direct conductive connection may also be used. In one non-limiting example, there is a direct connection between the antenna ports of the WLAN unit and the shifter. Such a system 250 is shown in FIG. 25. In general, system 250 is based on system 240, shown in FIG. 24. However, in contrast to system 240 where the WLAN unit 40b was wirelessly coupled to the shifter 210a via the respective antennas 52d and 52a over wireless link 152b, in system 250 there is a metallic (or any other conductive) connection between the units. Antennas 52d and 52a are removed (or bypassed), and there is a wired connection between port 241b of WLAN unit 40b to port 241c of shifter 210a, therefore there is no radio radiation in the location of WLAN unit 40b, since WLAN unit 40b and shifter 210a are both without any antenna. Since typically a wireless receiver is design to receive signals after being attenuated via the propagation through the air, a direct connection may either damage or saturate the receiving unit. In order to avoid such phenomenon, an attenuator 251 is connected between both antenna ports 241b and 241c. The attenuator 251 should be impedance matched t6 both ports since it mimics antenna to the connected unit, and should at least attenuate the transmitted signal to meet the maximum properly operable received signal. On the other hand, the attenuator 251 should not attenuate the signal such that the communication between the connected units will be degraded. In general, any attenuator working in the required frequency band and properly matched may be used. Attenuation values of 10 dB at least and 80 dB maximum are recommended. Active as well as passive based scheme of an attenuator scheme may be used. A simple 'PI' or 'T' topology, single or multi stages resistor-based may as well be used, offering low cost and minimum space requirements. A simple one stage 'T' type attenuator is shown in FIG. 25, containing of two resistors 253a and 253b connected in series, and one resistor 253c connected in parallel. In an experimental 50 Ω impedance matching system, a value of 40 dB was implemented by using a nominal value of 49 Ω for resistors 253a and 253b, and a value of 1 Ω for resistor 253c.

The metallic connection between units 40b and 210a, and since they are typically adjacently located, may contemplate to house both WLAN unit 40b and shifter 210a, as well as the connecting cable and the attenuator 251 in a single enclosure 252, as shown in FIG. 25.

Such a system 250 can be employed in many cases wherein the WLAN unit 40b (such as a WAP—Wireless Access Point) is located in one place, while the wireless coverage is required elsewhere, in a remote location. In one non-limiting example, a power supply may be available only in a one place, while the coverage required at the other places not in the same vicinity. In this case, the WLAN unit 40b will be located at the place where the power source (e.g., AC power outlet) is provided, and since only a small part of power is required in the remote location, it will be carried over the wire pair, with the shifted wireless signal, to the remote location, where the actual wireless coverage is required. For example, a WAP may be located in a basement of a building and connected to be powered from a nearby AC power outlet, and the wire pair will allow the actual wireless communication in a preferred location such as in a ceiling in another part of the building, wherein the antenna location is optimized by means of providing wide coverage or a coverage in a specific place. Similarly, space constraints may also impose localizing the WAP, having more hardware and thus typically being larger in size than the shifter 210, in a place remote from the location, where the actual wireless coverage area is required. Other consideration may involve locating the WLAN unit 40b in a place accessible for easy configuration, installation, and maintenance, while keeping the wireless antenna practically elsewhere. Furthermore, the WLAN unit 40b may be integrated with other devices such as an ADSL modem, for example, which is required to be connected to a nearby telephone outlet.

Figure 4:
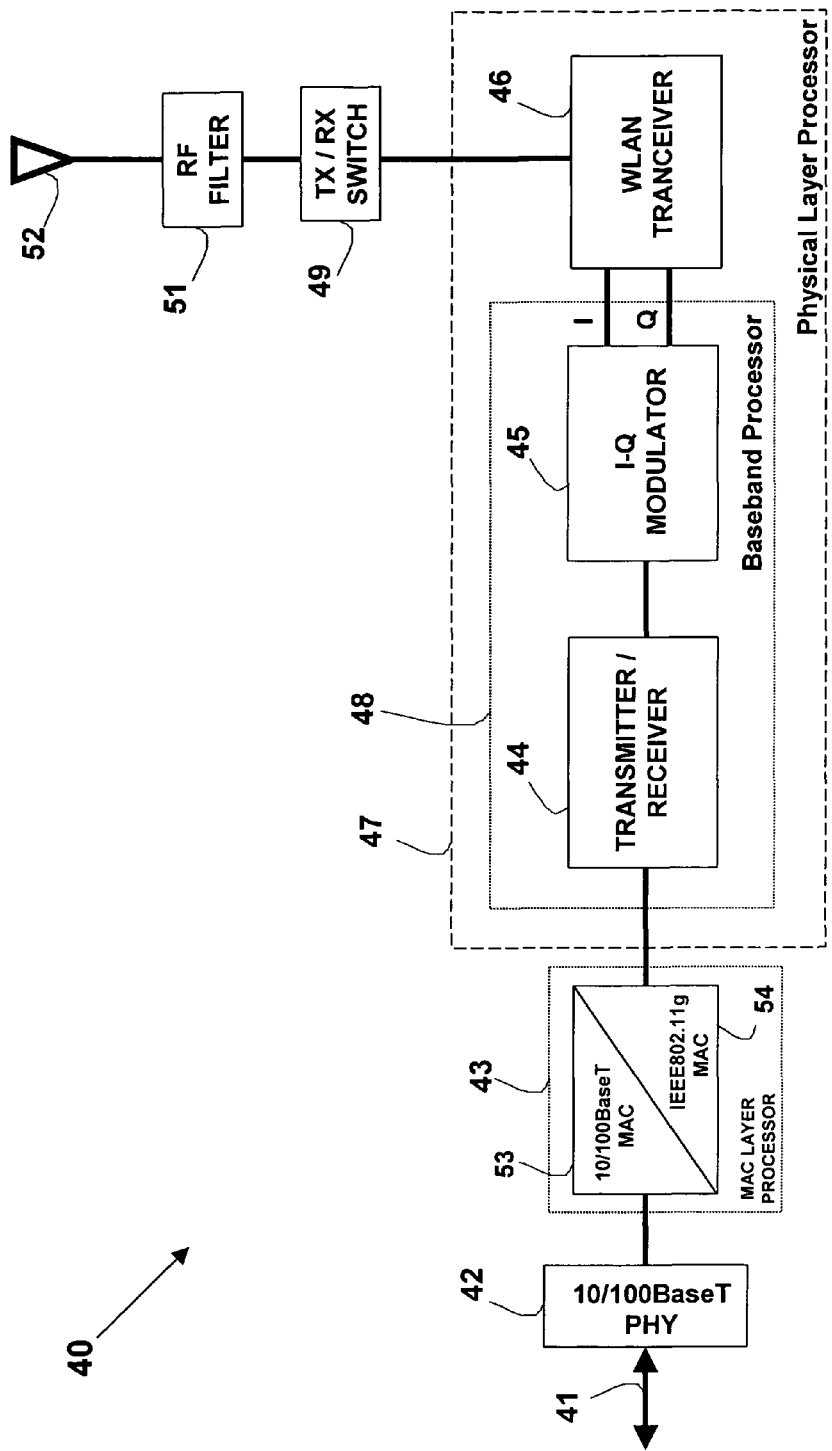
FIG. 4 illustrates schematically a simplified general functional block diagram of a prior art WLAN unit.

Device 252 was shown above as part of system 250 in FIG. 25, and includes a WLAN unit 40b, attenuator 251, and shifter 210a. During operation, data received in port 41 of WLAN unit 40b is I/Q converted, and then modulated and frequency up-shifted to 2.4 GHz radio signal, as described above regarding FIG. 4, exampled with regard to the IEEE 802.11g system. The radio signal is attenuated by attenuator 251 and fed to shifter 210a, where the radio signal is demodulated to and down-shifted to an I/Q signal, and then modulated again to a signal to be carried over the wire pair 201. Since there is no need for radio communication near device 252, there is no need to create the 2.4 GHz radio signal, and there can be a direct conversion between the wired data signal received in port 41 and the signal carried over the wire pair 201. A system 260 carrying such direct conversion is shown in FIG. 26.

Figure 26:
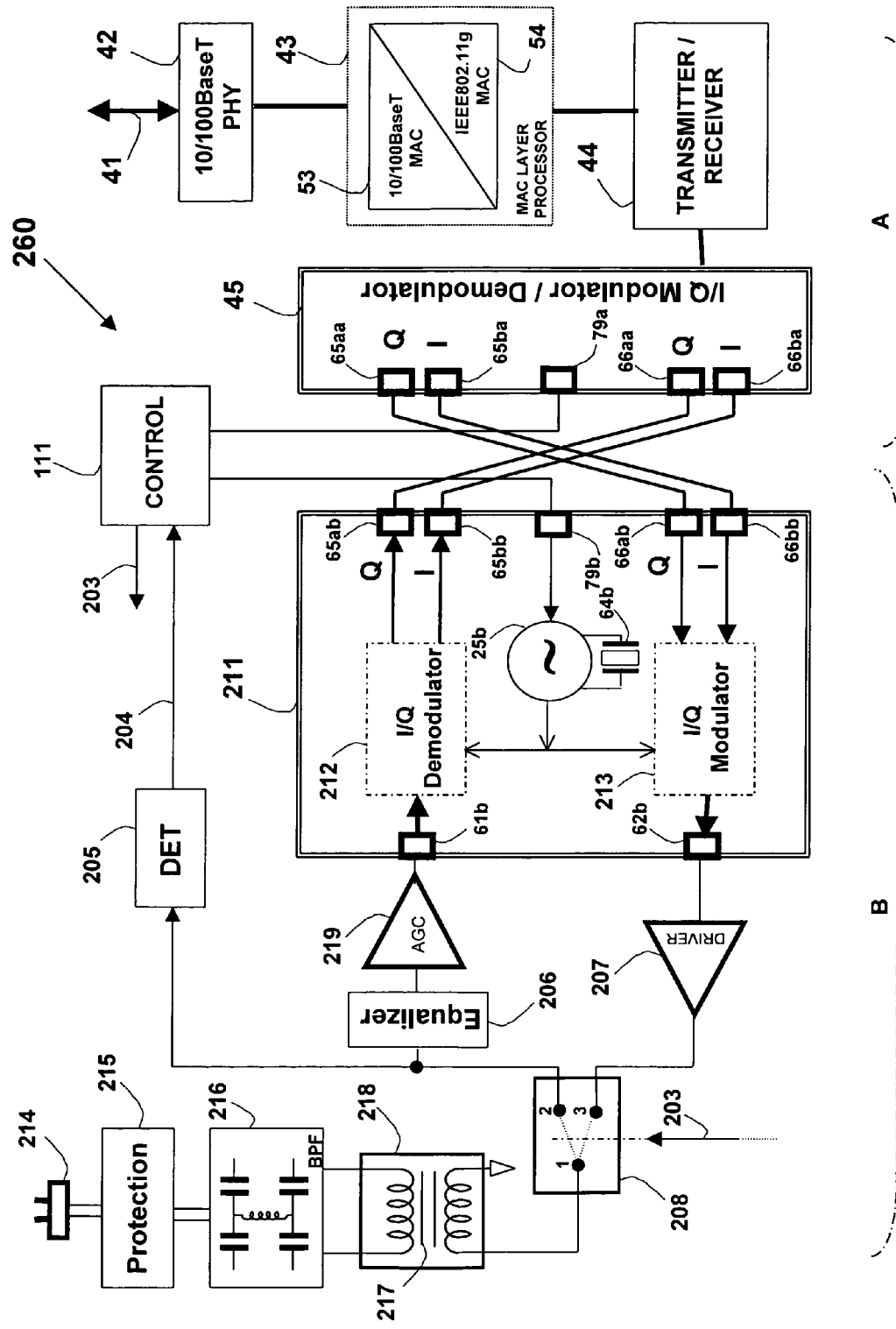
FIG. 26 illustrates schematically a simplified general functional block diagram of a WLAN unit based frequency shifter according to the invention.

System 260, shown in FIG. 26, provides at least similar or identical functionality as device 252, yet being less complicated and using less hardware. The 'B' sub-system of system 260 is identical or at least similar to the 'B' sub-system described for system 210 in FIG. 21 above, and is used for converting between the signal at connector 214 and its I/Q component signals at ports 65 and 66 of unit 211. The 'A' sub-system is identical or at least similar to the relevant part of WLAN unit 40 shown in FIG. 4 above, and contains I/Q modulator/demodulator 45, transmitter/receiver 44, MAC layer processor 43, Ethernet 10/100BaseT PHY 42, and wired port 41. This 'A' sub-system is operative to convert between data signals (such as IEEE 802.3 10/100BaseT) at port 41 and their I/Q component signals at ports 65 and 66 of I/Q Modulator/Demodulator 45. Similar to that described above, the two I/Q component signals, representing the data signals at port 41 and the wired signals at port 214 are connected in a 'back-to-back' configuration, operative to convert signals between the two ports 214 and 41 via their I/Q representations. Hence system 260 may be a substitute to unit 252 shown in FIG. 25.

The direct metallic connection between WLAN unit 40b and shifter 210a, shown included in system 252 as part of system 250 in FIG. 25, has multiple advantages. First, such configuration allows for separating the physical location of a wireless unit 40b, such as WAP, from the required coverage area by link 152a. Second, compared to wireless coupling such as 152b in system 240, such wired/conductive connection allows a controlled signal level in input of the receivers of both connected units, as well as connection which is more robust and highly immune from wireless interference and external noise. As such, it may be contemplated to use such direct and metallic based coupling even in the case where a wireless coverage area is required near the WLAN unit 40b. A system 270 shown in FIG. 27 allows for a conductive connection between the WLAN unit 40b and shifter 210a, without eliminating or degrading the wireless communication functionality of the WLAN unit 40b. In general, system 270 is based on system 240, wherein a splitter 271 is added between the antenna port 241b and the antenna 52a of WLAN unit 40b. The splitter 271 allows a signal to pass between the antenna 52a and the antenna port 241b of the WLAN unit 40b, thus substantially retaining the full functionality of system 240, allowing WLAN unit 40c to wirelessly communicate with WLAN unit 40b over the air using wireless communication link 152b. In addition, the third port of the splitter 271 is connected to shifter 210a via attenuator 251, thus forming a direct metallic connection similar to the connection shown for system 250. In some embodiments internal attenuation of the splitter 271 may suffice, hence obviating the need for attenuator 251. In other embodiments, only the value of attenuation will be amended (typically reduced), taking into account the attenuation of attenuator 271 in this path. Hence, both functionalities of systems 240 and 250 are substantially retained.

Figure 27:
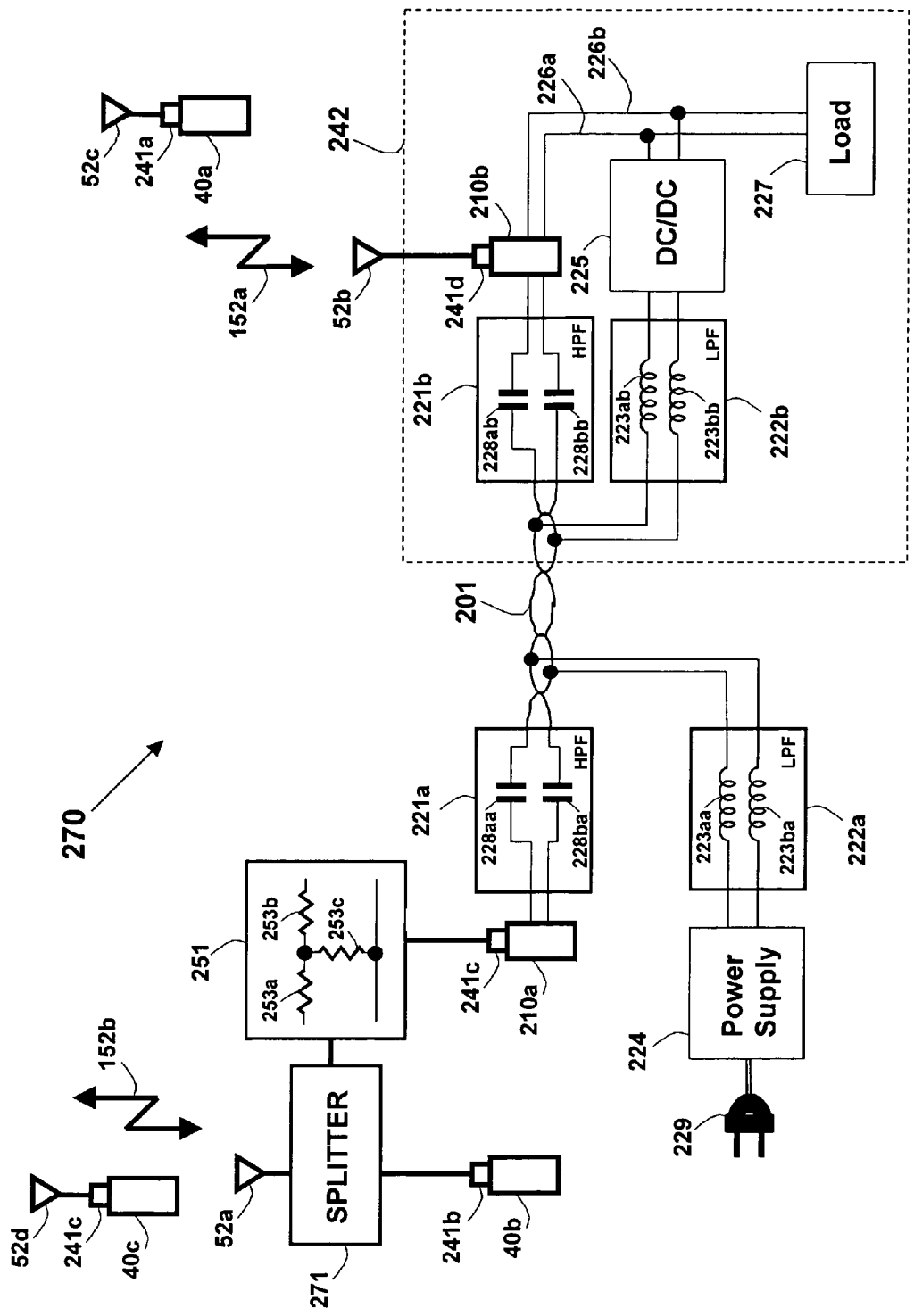
FIG. 27 illustrates schematically a simplified general increased coverage network supporting remote powering and using a frequency shifter according to the invention.

System 240 in FIG. 24 shows a wireless couplings 152a and 152b in both locations. System 250 in FIG. 25 shows a wired coupling through the attenuator 251 in one location, and a wireless communication link 152a in the other location. System 270 in FIG. 27 shows a combined wireless link 152b and wired connection (through attenuator 251) in one location, and through the air wireless communication link 152a in the other location. It should be appreciated that each location is independent from the other location, and each such location may be any of the above options, independently from the other location or locations. A non-limiting example is shown as system 275 in FIG. 27a, where both locations combine both wired and wireless links. In the powering location (left side of the figure) the arrangement is similar to the one showed in FIG. 27, wherein WLAN unit 40b is metallically connected to shifter 210a through splitter 271a and attenuator 251a. A wireless communication between WLAN unit 40b and another WLAN unit 40c is retained through antenna 52a coupled to the splitter 271a. Similarly, the powered/remote location combines both wired and wireless coupling, wherein WLAN unit 40a is metallically connected to shifter 210b through splitter 271b and attenuator 251b. A wireless communication between WLAN unit 40a and another WLAN unit 40d is retained through antenna 52b coupled to the splitter 271b. In a similar way, other options may be implemented independently in all connected locations, being powering or powered sites, and of course also in the case wherein line powering is not implemented at all.

Figure 27A:
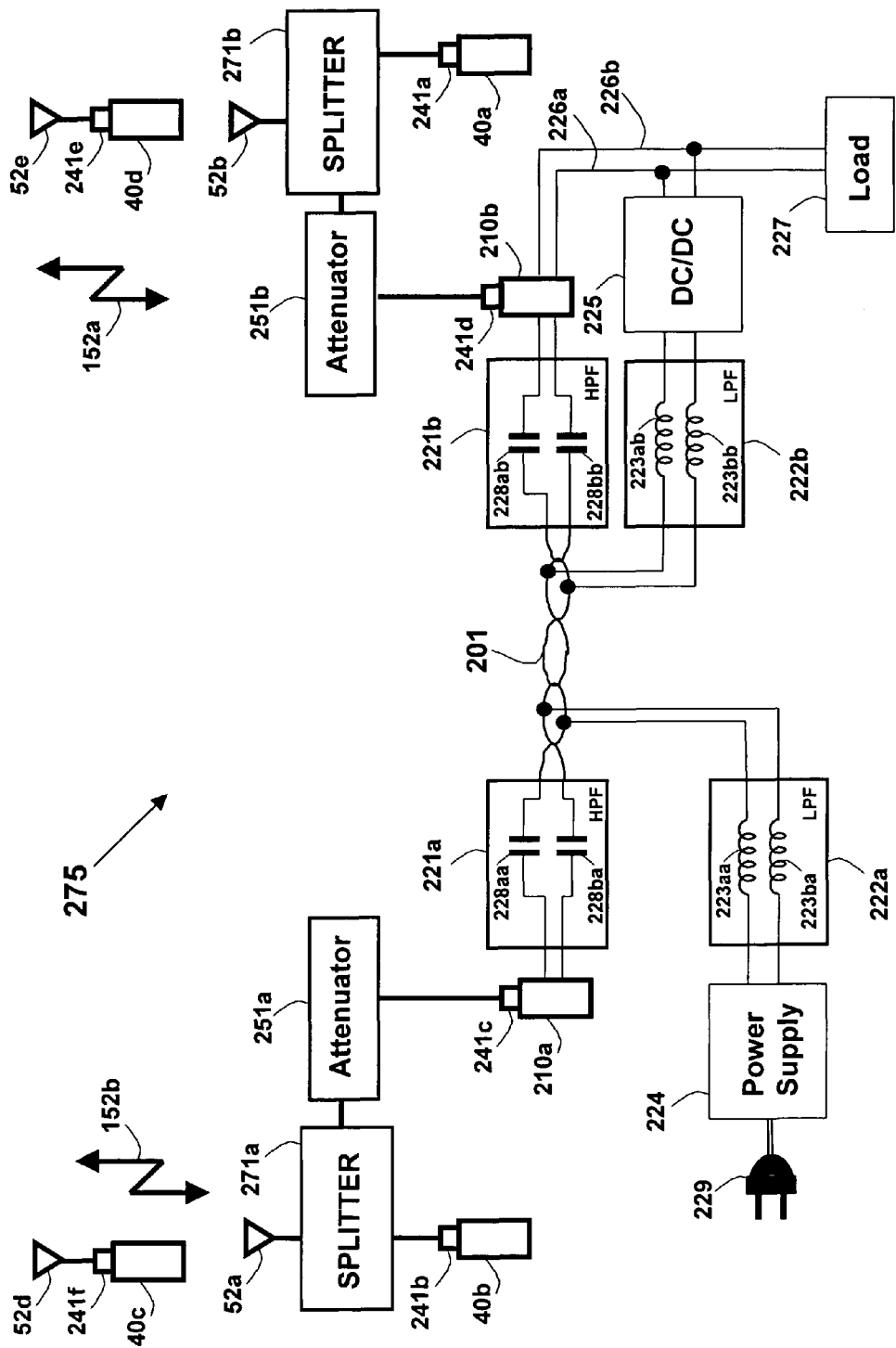
FIG. 27a illustrates schematically a simplified general increased coverage network supporting remote powering and using a frequency shifter according to the invention.
Figure 27B:
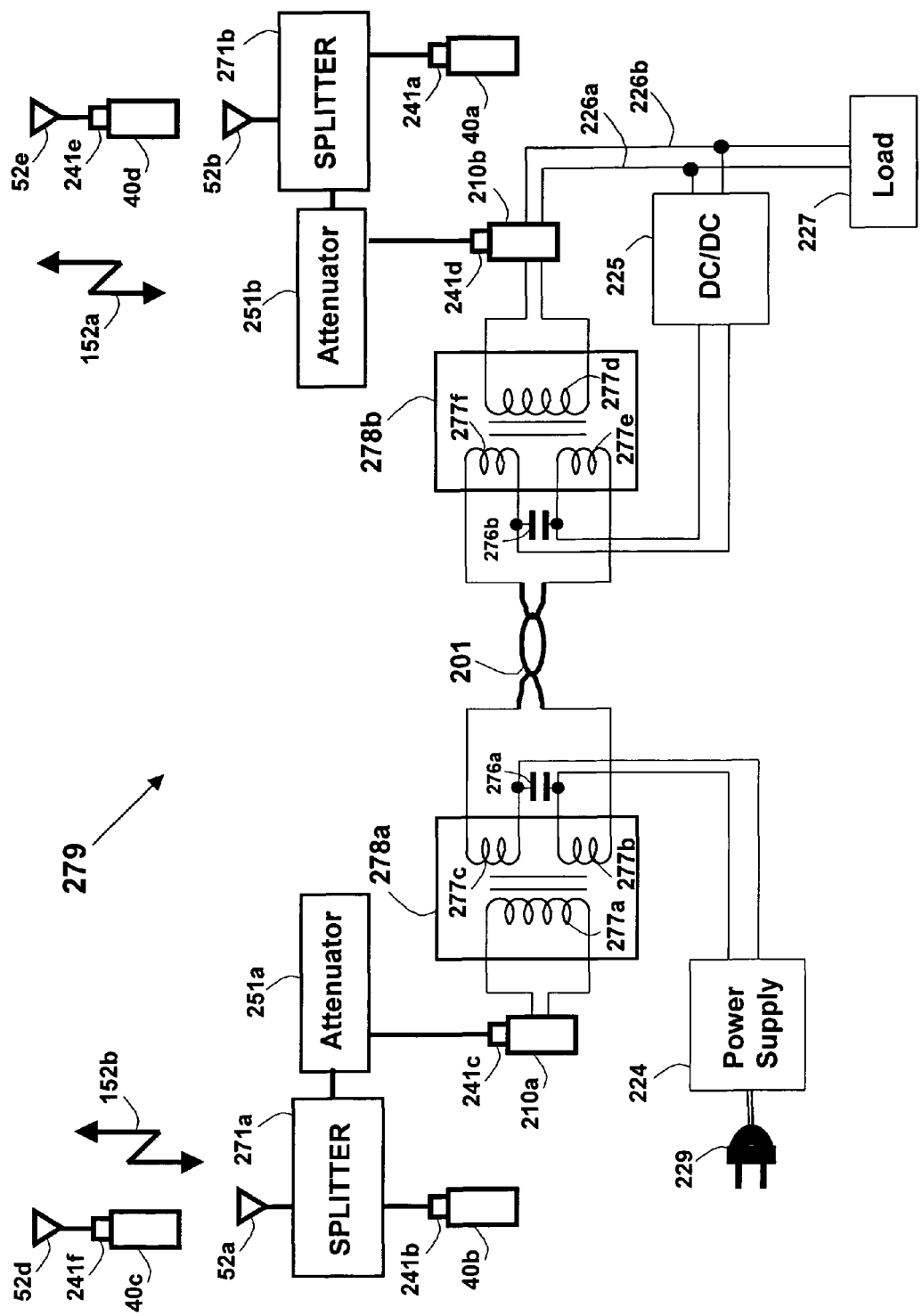
FIG. 27b illustrates schematically a simplified general network supporting remote powering using split-tap transformer and using a frequency shifter according to the invention.

While the embodiments above have been described with regard to a set including a LPF 222 and an HPF 221 as means for combining and separating the DC (or AC) power signal and the frequency shifted wireless signal, an embodiment based on a split center tap transformer may as well be used, as shown for system 279 in FIG. 27b. A transformer 278a and capacitor 276a are provided as a substitute to the HPF 221a and LPF 222a of system 275 and are connected to one end of the wire pair 201. Similarly, a transformer 278b and capacitor 276b are provided as a substitute to the HPF 221b and LPF 222b of system 275, and are connected to the other end of the wire pair 201. Such split center-tap transformer arrangement is known in the art and typically only used for telephony applications. The transformer 278a includes a primary winding 277a connected to the shifter 210a, and the secondary winding is split into two separated secondary windings 277c and 277b, connected to each other by a capacitor 276a, which is connected to the DC power supply 224. The secondary windings 277c and 277b are connected to the wire pair 201. The capacitor 276a value is substantially low impedance in the shifted wireless signal frequency band (e.g. 8-30 MHz as above), hence the shifted wireless signal to and from shifter 210a is transparently passed to the wire pair 201. The capacitor 276a exhibits a high impedance value to the DC signal, thus allowing the DC current to flow to the wire pair 201 through the secondary windings 277c and 277b.

Similarly in the other end of the wire pair 201, The transformer 278b includes a primary winding 277d connected to the shifter 210b, and two separated secondary windings 277f and 277e, connected to each other by a capacitor 276b, which is connected to the DC/DC converter 225. The secondary windings 277f and 277e are connected to the wire pair 201. The capacitor 276b value is substantially low impedance in the shifted wireless signal frequency band (e.g. 8-30 MHz as above), hence the shifted wireless signal to and from shifter 210b is transparently passed to the wire pair 201. The capacitor 276b exhibits a high impedance value to the DC signal, thus allowing the DC current to flow from the wire pair 201 through the secondary windings 277f and 277e to the DC/DC converter 225.

Figure 28:
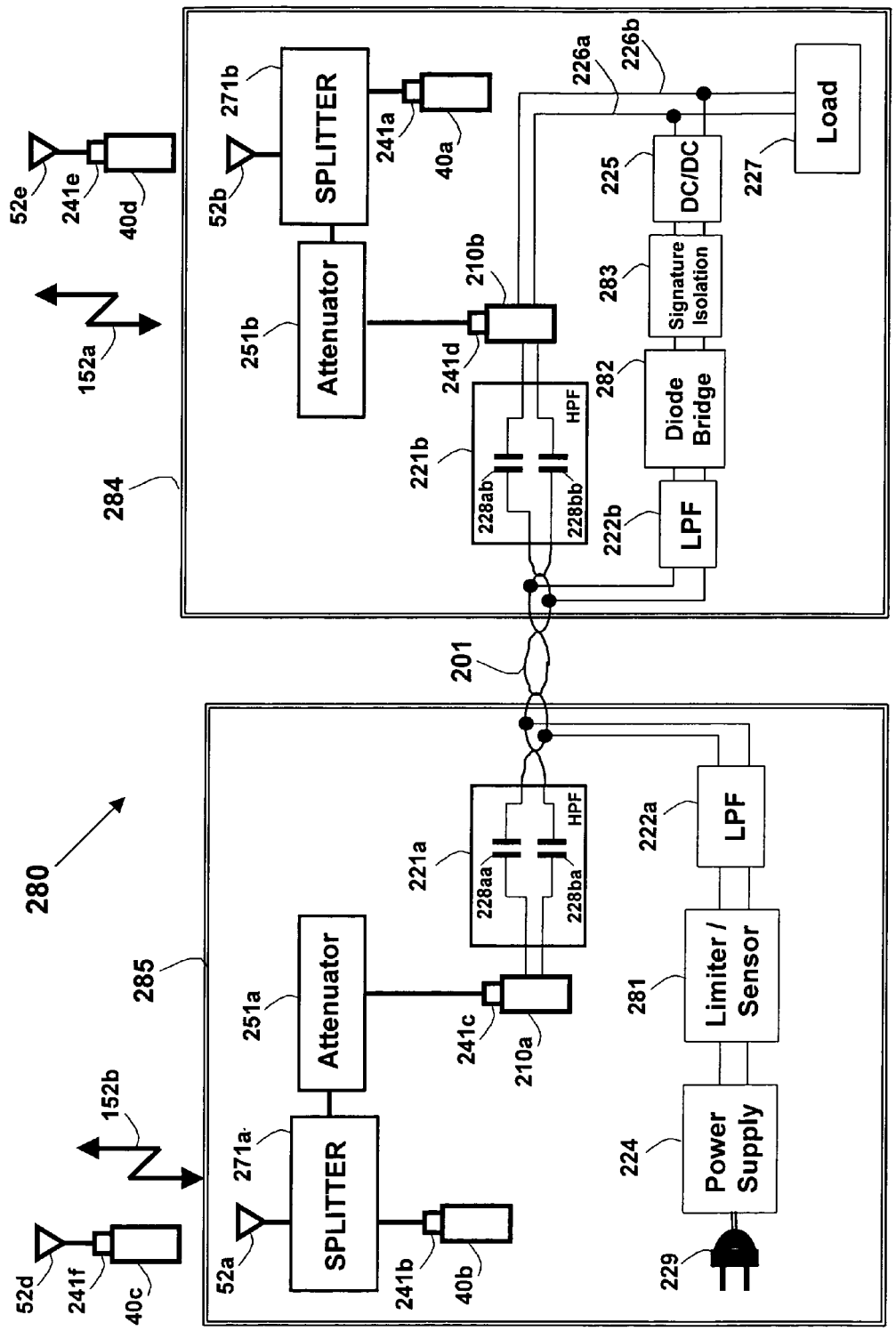
FIG. 28 illustrates schematically a simplified general increased coverage network supporting improved remote powering and using a frequency shifter according to the invention.

Referring now to FIG. 28, showing a system 280, which is based on system 275 shown in FIG. 27a. In this system 280 a Limiter/Sensor 281 is added between the power supply 224 and the LPF 222a. The Limiter/Sensor 281 includes a current limiter and other protection means, for limiting the current in the wire pair 201, for example in the case of a short circuit between the two conductors of wire pair 201. The Limiter/sensor 281 may use a fuse, either resettable or one-time, or an active circuit of current limiter known in the art. Such current limiting is required, for example, to meet safety standards. The Limiter/Sensor 281 may also include a switch, either mechanical or electronic, which may be, for example, controlled by a processor or other control means. The switch may connect or disconnect the power to pair according to a predefined logic or rules. In one embodiment, the Limiter/sensor 281 includes a current sensing/metering function, allowing the powering site to identify that a remote load is connected at the remote location. If such a load is not present, the switch may disconnect the power in order to avoid unnecessary DC voltage over the wire pair 201.

The remote site 284 is shown as including all the hardware conductively coupled to the remote side of the wire pair 201, including the shifted wireless signal handling functions, such as HPF 221b, shifter 210b having an antenna port 241d, attenuator 251b, splitter 271b coupled to antenna 52b, and WLAN unit 40a coupled to the splitter 271b via antenna port 241a. The remote location 284 similarly comprises all power handling functions such as LPF 222b, Diode bridge 282, Signature/isolation block 283, and DC/DC converter 225, and may also include the DC powered load 227. The powering site/location 285 is shown as including all the hardware conductively coupled to the other side of the wire pair 201, including the shifted wireless signal handling functions such as HPF 221a, shifter 210a having an antenna port 241c, attenuator 251a, splitter 271a coupled to antenna 52a, and WLAN unit 40b coupled to the splitter 271a via antenna port 241b. The powering location 285 similarly comprises all power handling functions such as LPF 222a, Limiter/sensor 281, and Power Supply 224, which is AC powered and fed via AC plug 229.

The Diode Bridge 282 added between the LPF 222b and the DC/DC converter 225 is used in order to accommodate a potential wire swapping that will result in a reversed DC voltage polarity. The Diode Bridge 282 typically comprises four diodes and outputs the proper polarity of the DC voltage even in the case of a reversed input voltage polarity. The Signature/Isolation block 283 is added between the Diode Bridge 282 and the DC/DC converter 225. Such Signature/Isolation block 283 typically comprises a specific load for indicating the limiter/sensor 281 of the presence of a powered device in the remote location. Furthermore, this function may also be used to classify the type of the remote location 284, and for example may relate to the power consumption of the remote location 284. An isolation function may also be included in the Signature/Isolation block 283 for allowing passing of the power only after power detection and classification, and for ensuring such DC power feeding that will not damage the connected units. Such isolation function may be implemented by using a FET transistor based switch. The added blocks Limiter/Sensor 281, Diode bridge 282, and the Signature/Isolation 283 may conform to the PoE (Power over Ethernet) standard described in more detail below.

System 245 shown above in FIG. 24a describes a network having multiple remote locations 242a, 242b and 242c, connected to the 'center' location using respective three wire pairs 201a, 201b, and 201c. Such configuration has the following disadvantages:

1. Since all the wire pairs 201a, 201b and 201c are connected to each other, a short circuit in any one of the wire pairs 201 will result a whole system shutdown, for both the communication of the shifter wireless signal and for the DC power carried over these wire pairs.
2. Such topology is known to be inferior to a 'point to point' topology as a communication medium, since proper terminations cannot be adequately employed, thus creating impedance mismatch and reflections.
3. It is more difficult to locate and isolate a fault in the system, thus complicating the maintenance of such configuration.

Point-to-point topology is long known to solve the above disadvantages and to provide a better medium for both DC power carrying and for conveying the shifted wireless signal. According to one embodiment according to the present invention, the system 240 shown in FIG. 24, system 280 shown in FIG. 28 or any other similar system is duplicated in each remote location, hence creating a full and independent replica for each remote location or each wire pair 201. Such a system is complex, costly, requires a lot of space, and is highly power consuming. One alternative solution is shown as system 290 in FIG. 29. In such a system 290, only one WLAN unit 40b, preferably being an access point, is used and shared by all locations. Such configuration allows for the use of a single WLAN unit 40b, thus reducing the total complexity, cost, space and power consumption, as well as reducing installation and maintenance requirements. Similar to the above discussion (for example relating to system 270 shown in FIG. 27), a splitter 271a is added between the WLAN unit 40b antenna port 241b and the antenna 52a. This connection allows for local wireless communication in the vicinity of the WLAN unit 40b. In the case that such wireless coverage is not required in this location, antenna 52a (as well as the respective port of the splitter 271a) may be obviated. In contrast to the three ports splitter 271 shown as a part of system 270 of FIG. 27, splitter 271 a provides a port for each required remote location. System 290 is exampled as including three remote locations 284a, 284b, and 284c connected via wire pairs 201a, 201b and 201c, respectively, each connected to the relevant splitter 271a port via the respective connections 291a, 291b and 291c. In order to support three remote locations, as well as antenna 52a and WLAN unit 40b port, a total of five ports are required (four ports in the case wherein antenna 52b is not used). It should apparent that any number of remote locations 284 may be equally supported, simply by adding ports in the splitter 271a and by providing the appropriate systems. Supporting a remote location 284a is provided by attenuator 251a, which is connected between the connection 291a and the shifter 210a, and wherein the shifter 210a connects to the wire pair 201a through the HPF 221a, similarly to that explained above. Similarly, the remote location 284b is provided by attenuator 251b, which is connected between the connection 291*b* and the shifter 210*b*, and wherein the shifter 210*b* connects to the wire pair 201*b* through the HPF 221*b*. Similarly, the remote location 284*c* is provided by attenuator 251*c* which is connected between the connection 291*c* and the shifter 210*c*, and wherein the shifter 210*c* connects to the wire pair 201*c* through the HPF 221*c*. While three attenuators 251*a*, 251*b* and 251*c* are shown, it is apparent that a single attenuator 251 may be used, connected between the antenna port 241*b* of WLAN unit 40*b* and the splitter 271*a*, and thus obviating the need to provide attenuator per each remote location 284. As can be seen from the FIG. 29, all the communication links are based on separated wire pairs 201, each connected in a point-to-point topology to enable superior communication characteristics such as long distance and robust operation.

In one embodiment according to the present invention, no remote powering is employed, and each location is locally powered. In an alternative embodiment, as in system 290 shown in FIG. 29, common functions can be integrated into a single device or function. A single AC main power connection 229 is used, feeding a single power supply 224. However, the power supply 224 should now be able to remotely feed all remotely powered locations 284. The DC power signal at the power supply 224 is feeding the Limiter/sensor 281*a*, which connects to the wire pair 201*a* through the LPF 222*a*. Similarly, remote location 284*b* is fed from the Limiter/sensor 281*b*, which connects the wire pair 201*b* through the LPF 222*b*. Remote location 284*c* is fed from the Limiter/Sensor 281*c*, which connects the wire pair 201*c* through the LPF 222*c*. As can be seen from FIG. 29, all the power links are based on separated wire pairs 201, each connected in a point-to-point topology and controlled independently, such that a short circuit in one of the wire pairs 201 will effect only the communication and powering of the single specific remote location connected to the shorted circuit pair, allowing all other remote locations to continue to fully function properly.

Figure 29:
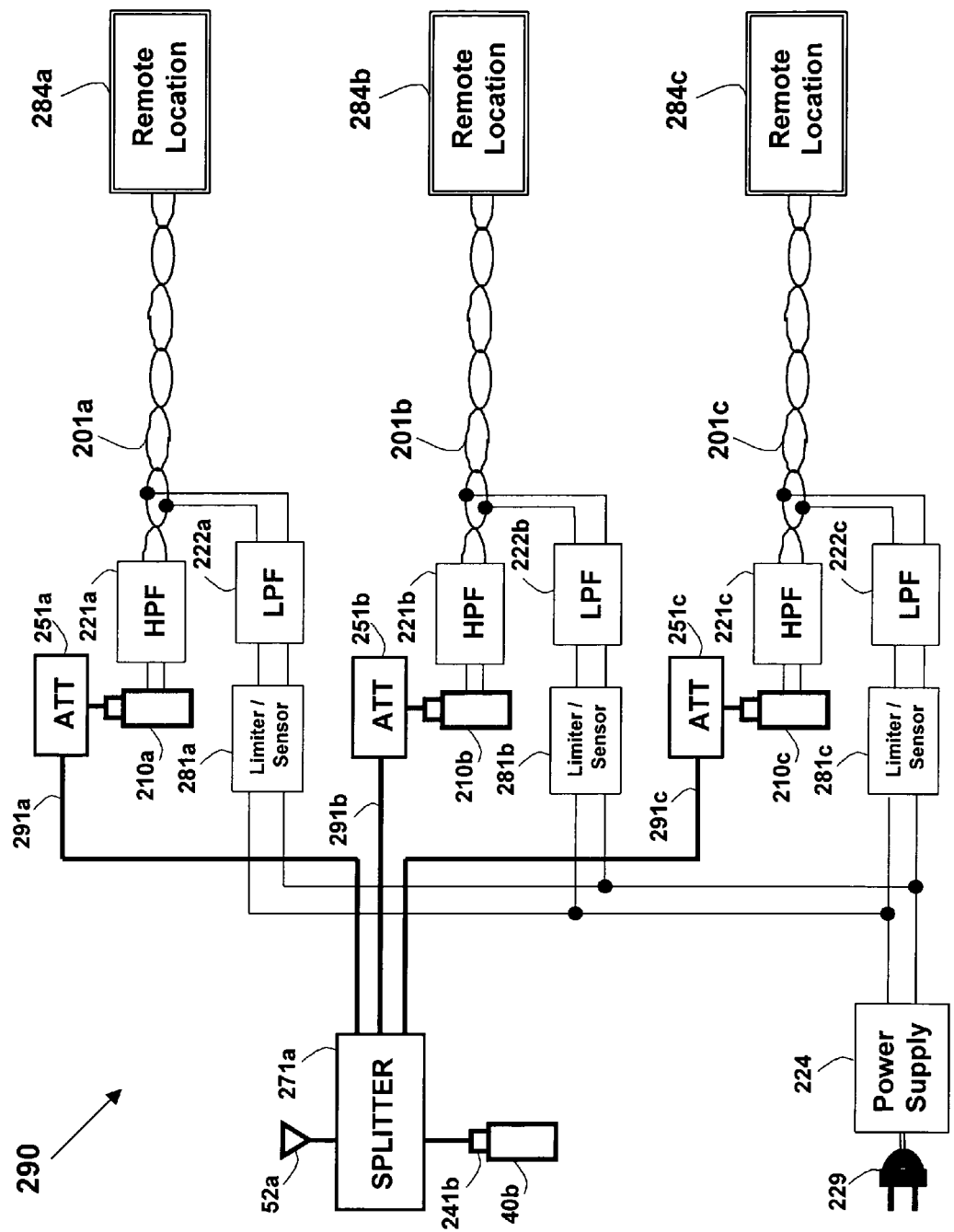
FIG. 29 illustrates schematically a simplified general network supporting remote powering over multiple wire pairs using a RF splitter according to the invention.
Figure 30:
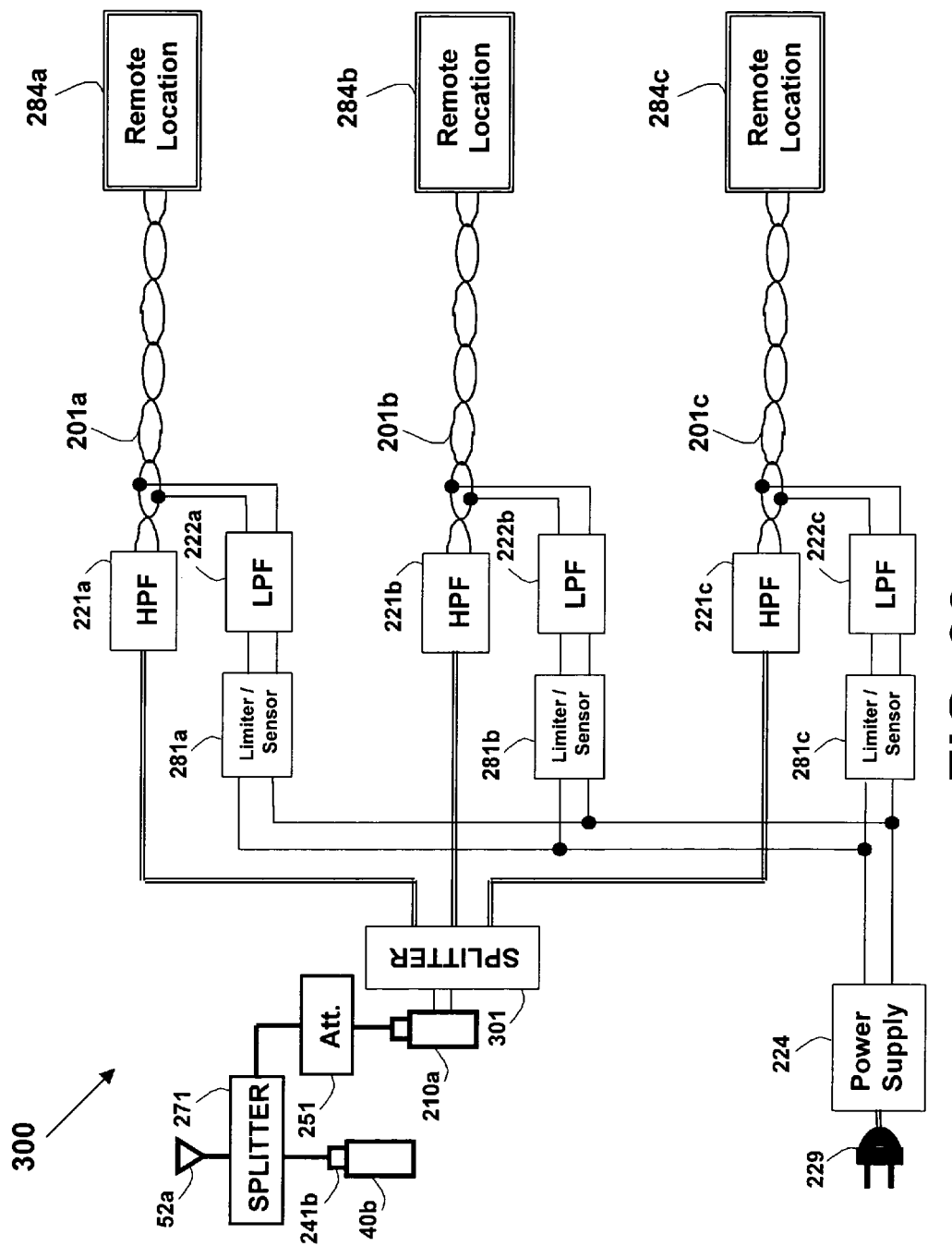
FIG. 30 illustrates schematically a simplified general network supporting remote powering over multiple wire pairs using a low-frequency splitter according to the invention.

System 290 was shown in FIG. 29 as being based on splitting the RF signal in the radio frequency band, such as 2.4 GHz band for IEEE802.11g applications. Furthermore, a shifter 210 and attenuator 251 were provided for each remote location 284. A simpler configuration using a single shifter 210 and single attenuator 251 is shown as system 300 in FIG. 30. Similar to system 270, the WLAN unit 40*b* is connected to a three-way splitter 271 through the antenna port 241*b*. Another port of splitter 271 is connected to antenna 52*a*, and the third port is connected to attenuator 251, which is in turn connected to a single shifter 210*a*. However, in contrast to the embodiments described above, the shifter 210*a* is not connected to couple to a single remote location 284, but the shifter 210*a* is connected to a multi-port splitter 301. Distinct from splitter 271, splitter 301 is handling a much lower frequency, relating to the actual wireless shifter signal that is expected to be carried over the wire pair 201. In the example described above, a frequency band of only 8-30 MHz is required to be supported by the splitter 271. Each splitter port is provided for each remote location, connected to the HPF 221 provided for each such remote location 284. A buffer or amplifier may be required between the splitter port and the HPF 221 in order to support an appropriate signal level.

LAN Wiring.

Figure 31:
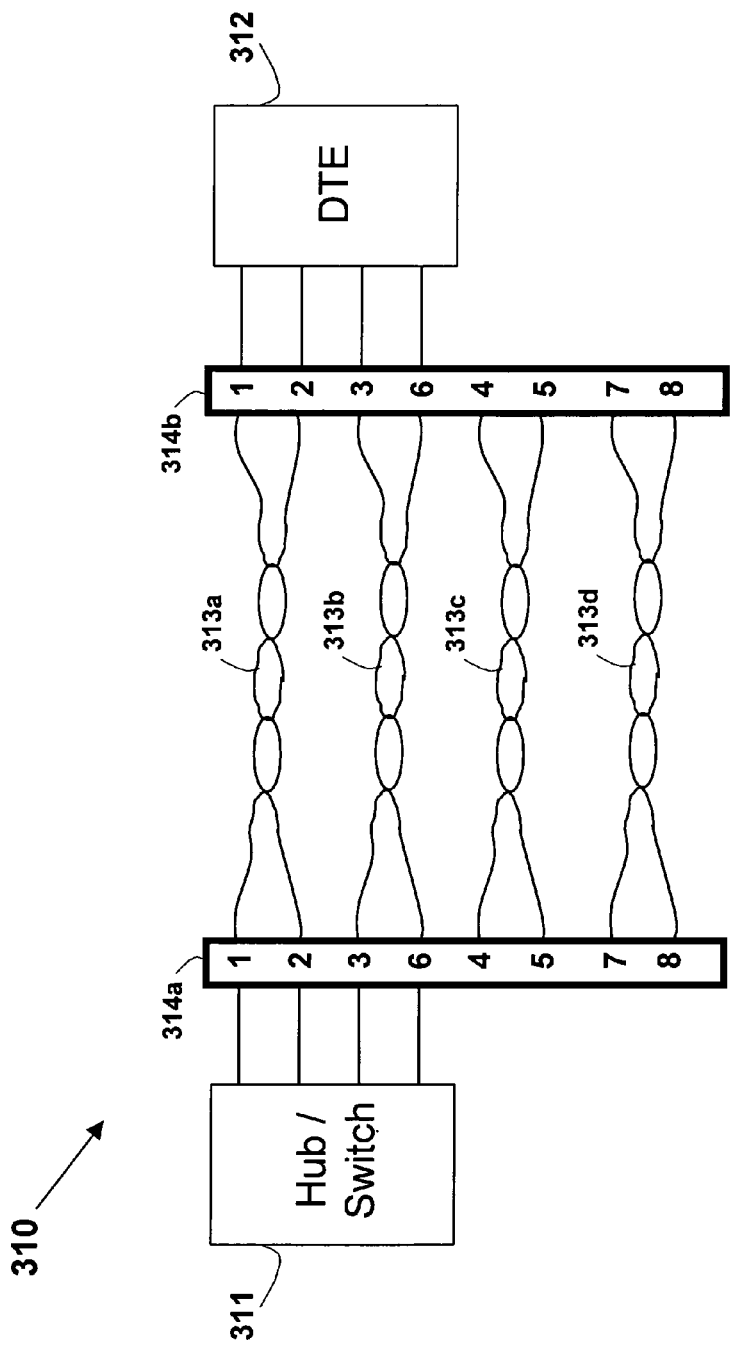
FIG. 31 illustrates schematically a simplified general prior-art Local Area Network.

FIG. 31 shows a part of a typical prior art LAN environment 310. Such a network commonly uses 10BaseT or 100BaseTX Ethernet IEEE802.3 interfaces and topology, and features a hub/switch 311 as a concentrating device, into which all devices are connected. Data terminal Equipment (DTE) devices 312 are connected to the hub/switch 311 via a straight-through LAN cable typically containing of four pairs designated as 313*a*, 313*b*, 313*c* and 313*d* and via connectors 314*a* and 314*b*, each typically containing a plug and a jack. Additional intermediate connections may exist in the communication link such as patch panels and wall outlets. The pairs may be UTP or STP. Data connectors 314*a* and 314*b* may be, for example, type RJ-45 connectors, and the pairs 313 may be, for example, part of a Category 5 cabling. Similarly, category 3, 4, 5e, 6, 6e and 7 cables may be equally used. Such configuration is described, for example, in EIT/TIA-568 and EIA/TIA-570. Although FIG. 31 refers to the hub 311 as a concentrating device, it is to be understood that any type of device having multiple network interfaces and supporting a suitable connectivity can be used, non-limiting examples of which include shared hubs, switches (switched hubs), routers, and gateways. Hence, the term "hub" herein denotes any such device without limitation. Furthermore, network 310 can be any LAN or any packet-based network, either in-building or distributed, such as a LAN or the Internet.

Figure 32:
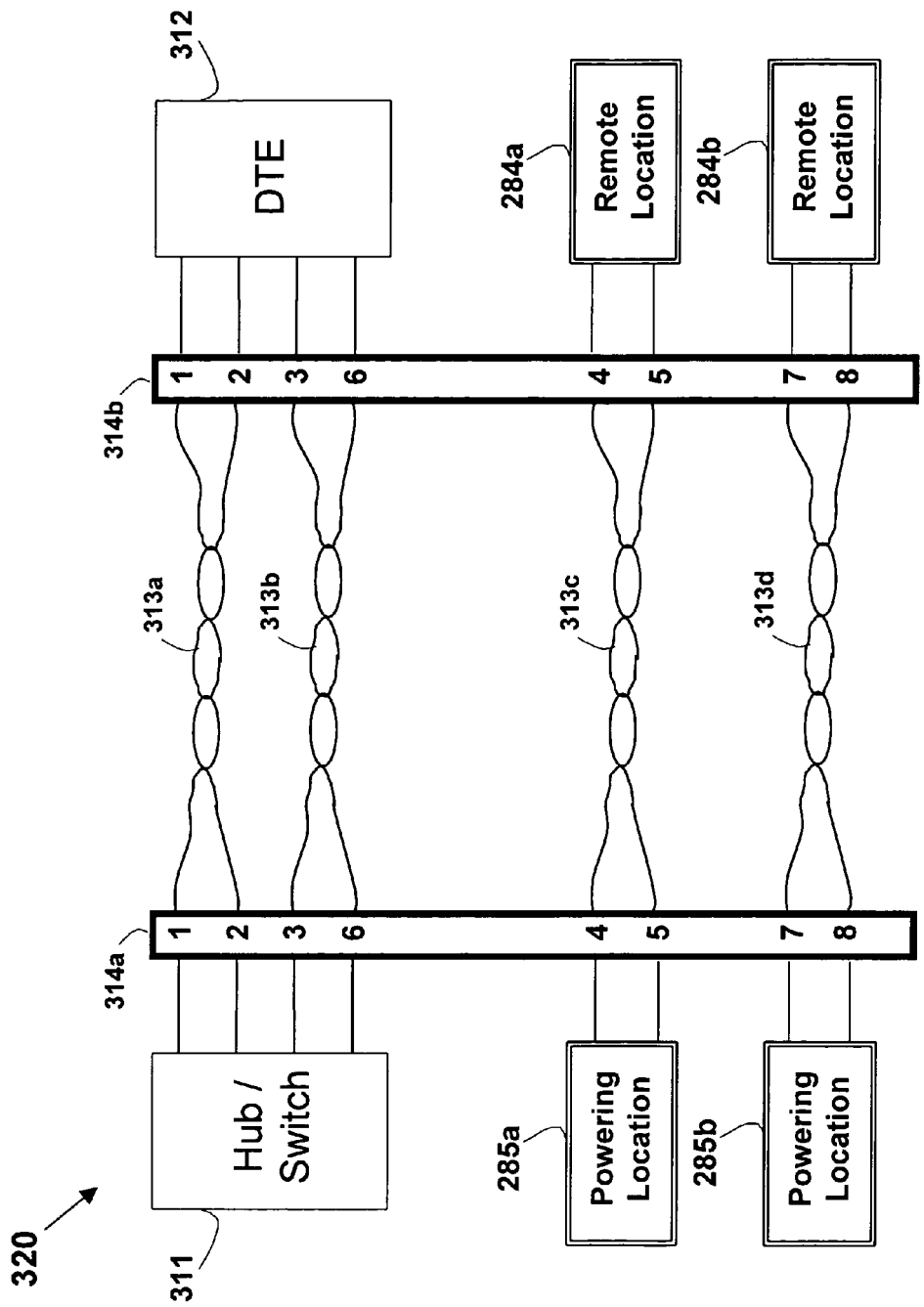
FIGS. 32 and 32a illustrate schematically a simplified general networks over LAN wiring according to the invention.

Ethernet communication links based on 10BaseT and 100BaseTX standards require two wire pairs (four conductors) for communication, each carrying unidirectional digital data. Since most cables include four wire pairs, two pairs 313*c* and 313*d* are commonly wired but not used for communication, as shown in FIG. 31. In one non-limiting example according to the invention, one or both wire pairs 313*c* and 313*d* are used for carrying the shifted wireless signal from the hub/switch 311 location, commonly a communication room or closet, to the DTE 312 location over the pre-existing or new LAN cabling. Such a system 320 is shown in FIG. 32. Wire pair 313*c* being a spare pair in a LAN cable connecting pins/circuits 4 and 5 in the connectors 314*a* and 314*b* is shown as the wired medium. A powering location system 285*a*, described above as part of system 280 is connected to the cable in the same side as the Hub/switch 311, and a remote location 284*a*, described above as part of system 280 is connected to the cable in the DTE 312 cable end side. In such arrangement the full functionality of system 280 is retained, wherein the wire pair 313*c* is serving as the wire pair medium 201 of system 280. In a similar way, wire pair 313*c* may contain the wire pair 201 in all the systems described herein. While the powering location 285*a* is described as connected in the hub/switch 311 side and remote location 284*a* is described as connected in the DTE 312 side, it is apparent that the units may be swapped to have the remote location 284*a* in the hub/switch 311 side and the powering location 285*a* in the DTE 312 side. Furthermore, in the other spare wire pair 313*d* connecting pins 7 and 8 may be equally used, as shown in the FIG. 32 wherein the wire pair 313*d* connects powering location 285*b* and remote location 284*b*. In one non-limiting example according to the invention, both wire-pairs 313*c* and 313*d* are used, each independently connecting a pair of locations, such that wire pairs 313*c* and 313*d* respectively connect powering locations 285*a* and 285*b* to the respective remote locations 284*a* and 284*b*. In such an arrangement, two different channels of two distinct wireless signals are carried to the remote location, offering increased coverage in the remote site for both signals or both channels.

Figure 32A:
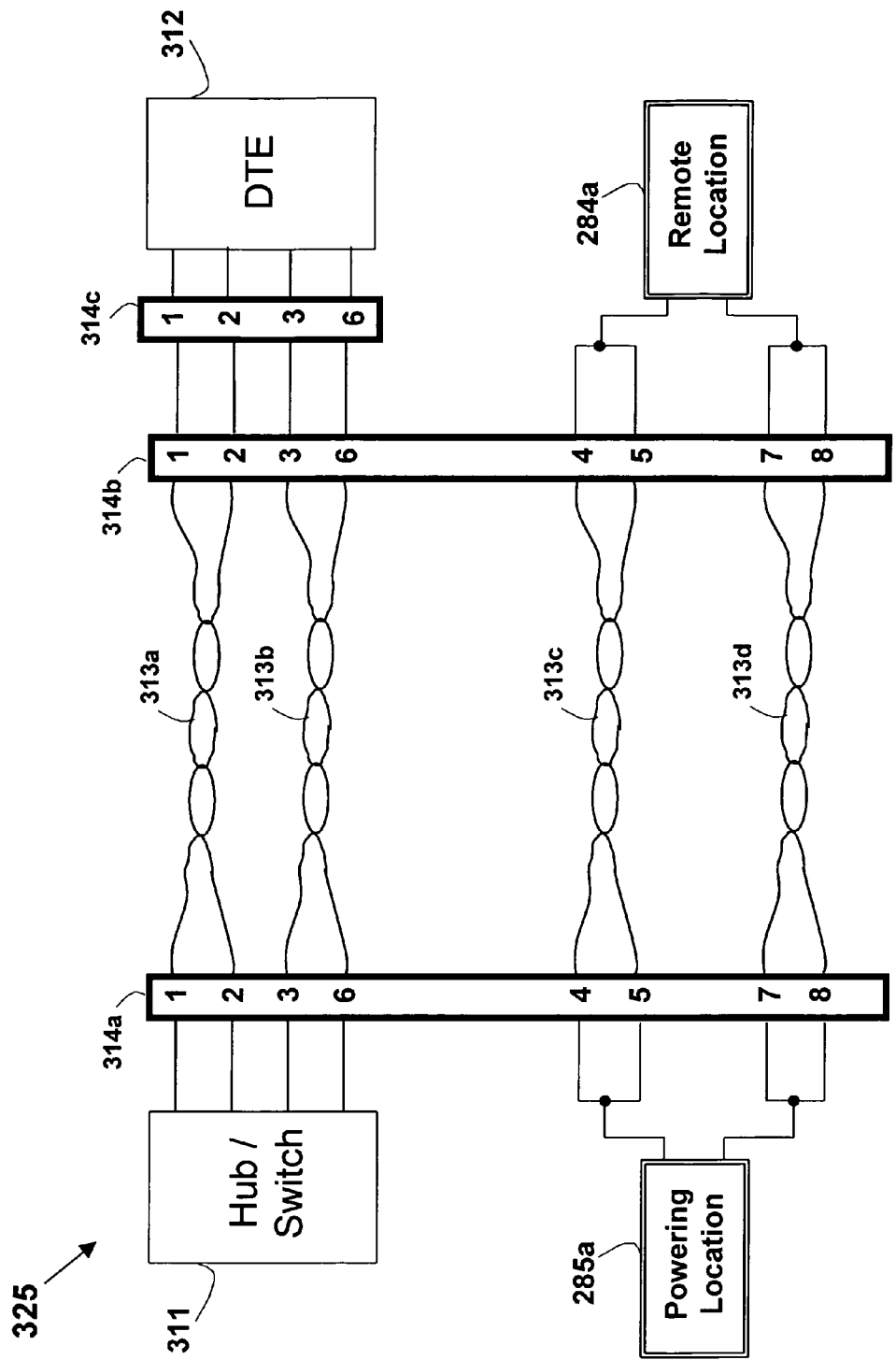

In one embodiment according to the present invention, the two spare pairs 313*c* and 313*d* are used together to improve carrying of a single shifted wireless signal. Such a system 325 is shown in FIG. 32*a*, showing connecting pins 4 and 5 together in each side of the cable. Similarly, pins 7 and 8 are connected to each other, and hence each such pair provides a single conductive path, and the two pairs thus provide a communication/power path using both pairs. Being connected in parallel, the attenuation of the shifted wireless signal as well as the DC power drop due to resistance of the wires are substantially lowered, thus improving both the communication and DC power carrying of the cable. In some embodiments, the DTE 312 will connect to the LAN cable 313 via additional connector 314c, preferably an RJ-45 jack or plug.

While system 320 was described above based on system 280, wherein the wire pair 313c (or 313d or both) are carrying both a DC power signal and the shifted wireless signal using a set of LPF 222 and HPF 221 in both sides, the split-tap transformer arrangement described above for system 279 may be equally used. Furthermore, while system 320 was described above based on system 280 wherein the wire pair 313c (or 313d or both) is carrying both a DC power signal and the shifted wireless signal, it is apparent that carrying the DC power signal may not be implemented, and only the shifted wireless signal will be carried as described for system 220 above, for example. While system 320 was described above as having two fully independent sets of powering/remote locations, it is apparent that the concept of sharing hardware in the powering site as described above for systems 290 and system 300 is equally applicable, where either wire pairs 313 sharing the same cable (such as 313c and 313d in FIG. 32) or for such pairs in a configuration wherein each pair is part of a different or separated cables.

Figure 33:
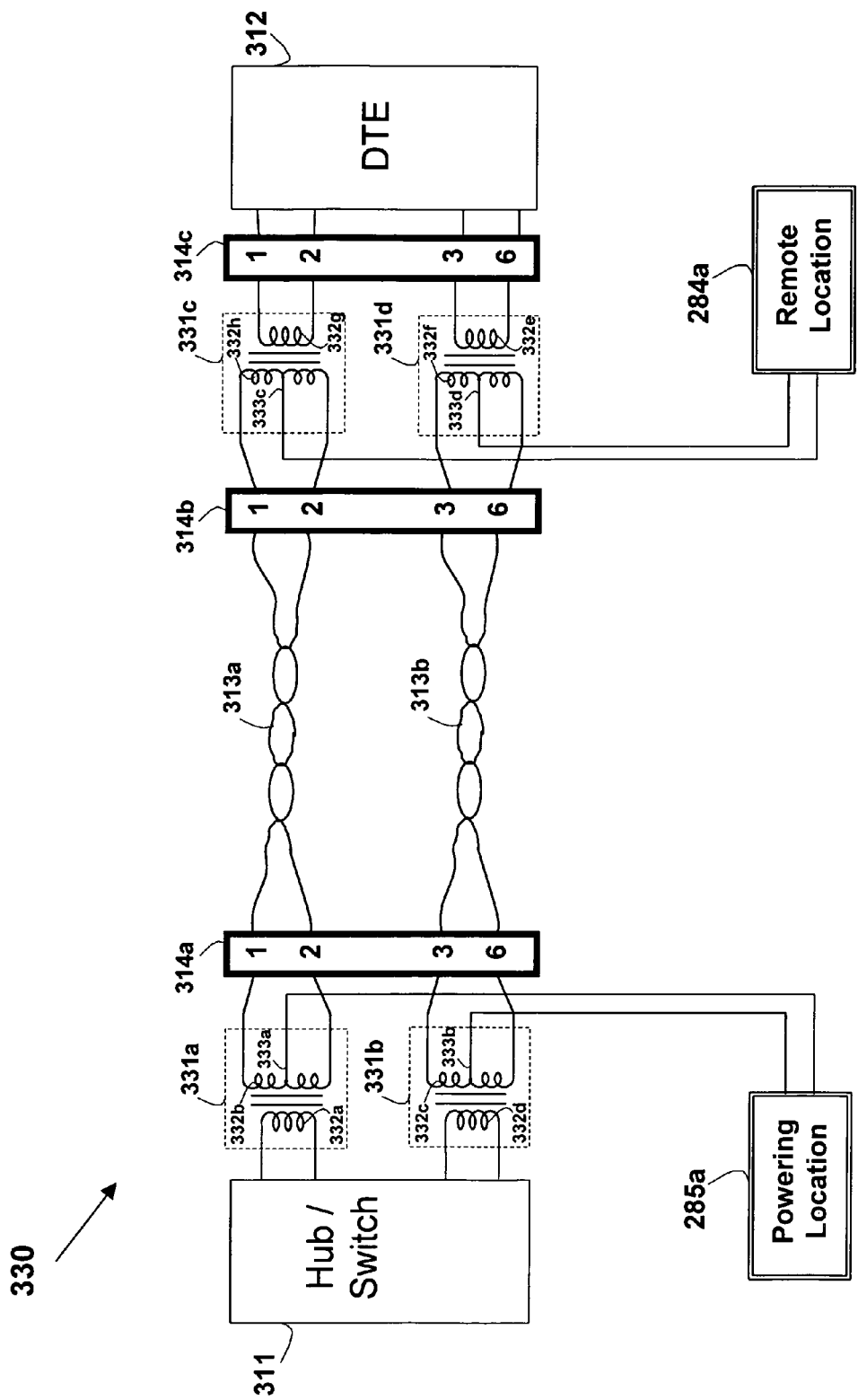
FIG. 33 illustrates schematically a simplified general network over LAN wiring using phantom path according to the invention.

In one embodiment according to the present invention, the shifted wireless signal is carried over a phantom channel over LAN cable, as exampled in system 330 in FIG. 33. Carrying a telephone signal over such a phantom channel is described in Patent '303. The phantom channel uses a differential potential between wire-pairs 313a and 313b, and is formed by adding the two transformers 331a and 331b between the hub/switch 311 and the connector 314a, as well as adding the two transformers 331c and 331d between the connector 314b and the DTE 312. Transformer 331a comprises a primary winding 332a and a center-tapped secondary winding 332b, having a center-tap connection 333a. Similarly, transformer 331b comprises a primary winding 332d and a center-tapped secondary winding 332c, having a center-tap connection 333b. Transformer 331c comprises a primary winding 332g and a center-tapped secondary winding 332h, having a center-tap connection 333c. Similarly, transformer 331d comprises a primary winding 332e and a center-tapped secondary winding 332f, having a center-tap connection 333d. All transformers allow for transparent passing of the digital data signal between the hub/switch 311 and the DTE 312, hence the Ethernet communication link (either based on 10BaseT or 100BaseTX) functionality is fully retained, commonly via an RJ-34 jack 314c and mating plug. A phantom path is formed between the center-taps connections 333a and 333b in one side, and the corresponding center-taps connections 333c and 333d. This path is used by the Powering Location 285a and the Remote Location 284a each located and connected to another end of the cable.

While transformers 331 in system 330 were described as being independent and added to the hub 311 and the DTE 312, such transformers may be integrated into the same enclosure with these units. Furthermore, since most such devices have built-in isolation transformers before connecting to the medium, these transformers may be used for forming the phantom channel as well, thus obviating the need to add any additional transformers. While exampled with a phantom channel relating to using a phantom channel over a LAN, it should be apparent that any similar phantom channel may be used. While system 330 was described above based on system 280 wherein the phantom channel is carrying both a DC power signal and the shifted wireless signal using a set of LPF 222 and HPF 221 in both sides, the split-tap transformer arrangement described above for system 279 may be equally used. Furthermore, while system 330 was described above based on system 280 wherein the phantom channel is carrying both a DC power signal and the shifted wireless signal, it is apparent that carrying the DC power signal may not be implemented, and only the shifted wireless signal will be carried as described for system 220 above, for example. While system 330 was described above as having two fully independent sets of powering/remote locations, it is apparent that the concept of sharing hardware in the powering site as described above for systems 290 and system 300 is equally applicable for multiple phantom channels carried over separated cables.

A recent technique known as Power over Ethernet (PoE) (i.e., Power over LAN—PoL) and standardized under IEEE802.3af, also explained in U.S. Pat. No. 6,473,609 to Lehr et al. titled: "Structure Cabling System", describes a method to carry power over LAN wiring, using the spare pairs and the phantom mechanism. Such technology, as well as others, may be used to provide power to any of the modems/adaptors described above, in the case where appropriate cabling (such as CAT. 5) is used as the wired medium. The powering scheme described above may use this standard as well as using non-standard proprietary powering schemes.

In Gigabit Ethernet 1000BaseT system, the four pairs in the LAN cable are all used for carrying the data signal. In such configuration, each two pairs may serve as a single phantom channel, hence allowing the carrying of two distinct shifted wireless signals. The powering scheme will be similarly implemented.

While the invention was exemplified above with regard to using a phantom channel by carrying a signal differentially between two or more twisted pairs, it is apparent that using such phantom arrangement may be apply to any type of wiring mentioned herein or in any configuration wherein two pairs of conductors are used. Furthermore, while the invention was exemplified above with regard to carrying DC or AC power signals and other power related signals over the phantom low frequency band and a shifted wireless signal above this band using FDM, it is apparent that any type of signal may be used as a substitute to the shifted wireless signal and carried over the higher frequency band, being analog or digital, and being wired or wireless based. In one non-limiting example, UWB is carried over the phantom channel. Furthermore, any of said signals, and in particular the wireless based signals, may be carried over the phantom channel without the presence of the power signal, thus obviating the need for the filters described above.

Hot spots.

Hot spots are known as locations providing wireless access to the Internet to mobile computers such as laptops and PDAs (Personal Digital Assistant). The wireless access is commonly based on WiFi such as IEEE802.11g. Hotspots are often found near or in restaurants, train stations, airports, cafes, libraries, universities campuses, schools, hotels, and other public places. In some locations a payment is required in order to access the Internet, while in other locations free access is provided. In most cases, however, some type of authentication is required.

Figure 34:
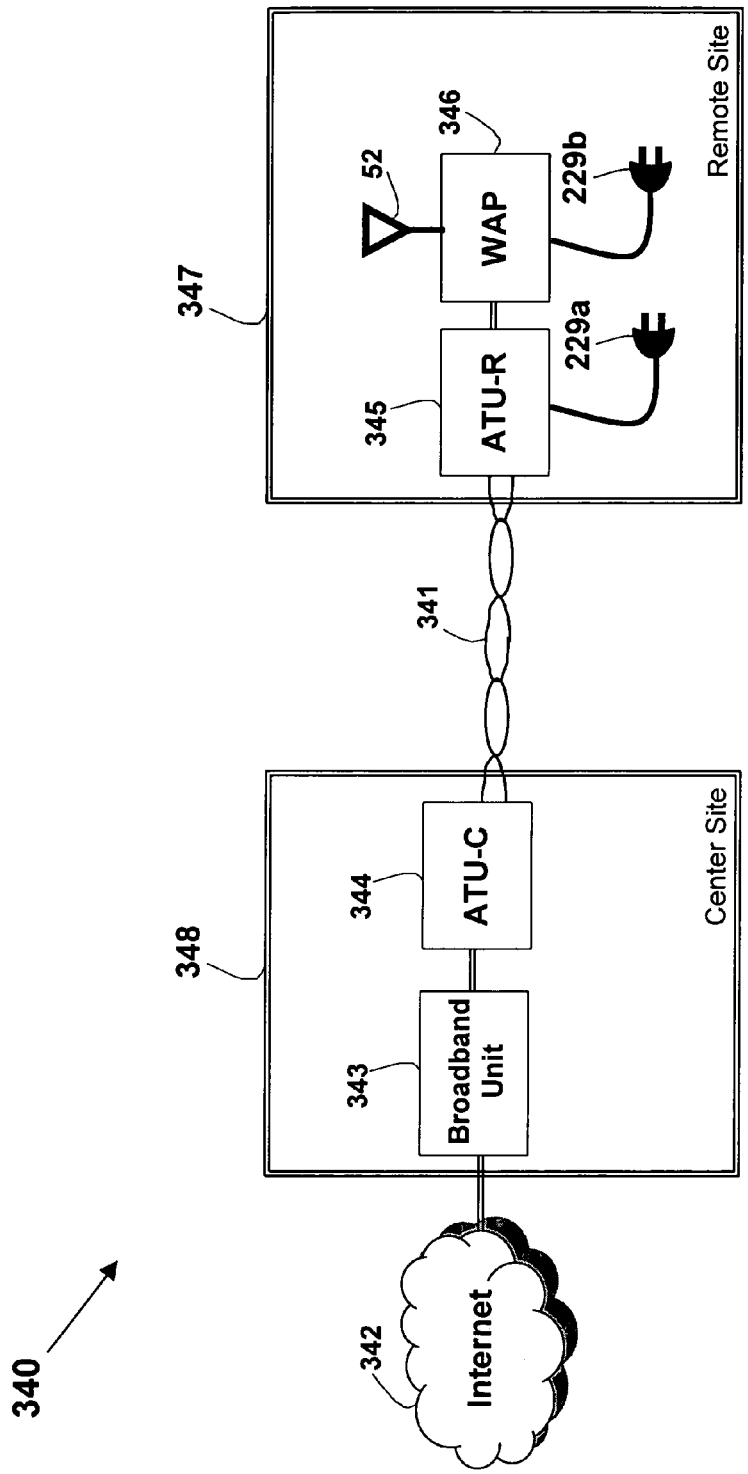
FIG. 34 illustrates schematically a simplified general prior-art hot-spot arrangement using a telephone wire-pair.

In many cases, a hotspot application makes use of pre-existing wiring. In many cases, an existing telephone wire-pair that was primarily installed for carrying an analog telephone signal (POTS—Plain Old Telephone Service) is used to carry the data to the required location. A typical system 340 is shown in FIG. 34, showing a remote site 347 and a center site 348 locations connected via such a telephone wire pair 341. In one embodiment the telephone wire pair is a 'subscriber line' (i.e., Local-Loop, Subscriber Loop, 'Last Mile')

wire pair, connecting a subscriber site 347 to a telephone exchange (e.g. CO—Central Office, telephone switch) site 348. Such pairs are carried as cable bundles either underground or over the ground over telephone poles, and enter the subscriber building through a connection box/junction box, typically mounted in the outside wall of the building or in the basement. In another embodiment the telephone wire pair is inside a building (e.g. enterprise, factory, hotel, hospitals, dormitories, campuses, universities, residential house, office building, multi-stories building, warehouse, MDU—Multiple Dwelling Unit and so forth), commonly connecting between a central location 348, typically a communication room or communication closet, and a room or rooms in the building. In many applications, the central site 348 also comprises a PBX or PABX and general communication to a network (WAN or LAN) external to the building, such as a PSTN or CATV. Typically, outlets are used for connecting to the telephone wire-pair in the building. In one embodiment the remote site 347 is a telephone-oriented location such as a public telephone booth.

In order to enable a digital data communication over the telephone wire-pair, typically a dedicated DSL (Digital Subscriber Line) technology is employed, such as ADSL (Asymmetric Digital Subscriber Line). ADSL technology is known in the art to carry digital data over a single telephone wire pair 341 (using for example ADSL per ANSI Ti.413, G,DMT per ITU G.992.1, G.Lite per ITU G.992.2, ADSL2 per ITU G.992.3 and ADSL2+ per ITU G.992.5 standard). Other ADSL derivatives, other DSL technologies such as VDSL (Very high bit Rate Digital Subscriber Line), HDSL and SHDSL, as well as their derivatives and flavors may be equally employed. In most DSL systems, a DSL modem 344 (such as ATU-C: ADSL Terminal Unit—CO) is connected to the center side of the wire pair 341, and a mating DSL modem 345 (such as ATU-R: ADSL Terminal Unit—Remote) is connected to the other end in a point-to-point connection. The ATU-R unit 345 is powered through an internal (or external) power supply fed from the AC power grid via AC power plug 229*a*. The digital data to and from the wire pair 341 is coupled to the WAP unit 346, commonly by an Ethernet (such as 10BaseT or 100BaseT) connection. The wireless communication in the remote site 347 is provided by the Wireless Access Point (WAP) unit 346, which includes an antenna 52 for radio interface. Similarly, any other type of WLAN unit 40 may be employed. The WAP unit 346 is powered through an internal (or external) power supply fed from the AC power grid via AC power plug 229*b*.

The center site 348 is connected to the Internet 342 via a broadband unit 343, which connects to the Internet using any type of medium such as wired or wireless, such as through PSTN, CATV, fiber or BWA. The data to and from the Internet is coupled to the wire pair 341 using the DSL modem 344, which may be part of a DSLAM (DSL Access Multiplexer).

The disadvantages described above are applicable to the arrangement 340 shown in FIG. 34. A product family named "LoopStar™ Span-Powered G.SHDSL Wi-Fi solution" available from ADC Telecommunications, Inc. from Minneapolis, Minn. USA, offers an improved solution wherein the telephone wire pair concurrently carries a DC power signal for remotely powering the remote site 347, thus obviating the need for a local AC power supply through AC plugs 229*a* and 229*b*. However, a hazardous voltage of 130VDC is used for remotely powering ('span-powering') the remote site 347, required in order to feed both the power-hungry DSL modem 345 and the WAP unit 346 and for providing a long enough distance over the telephone wire pair 341.

Figure 35A:
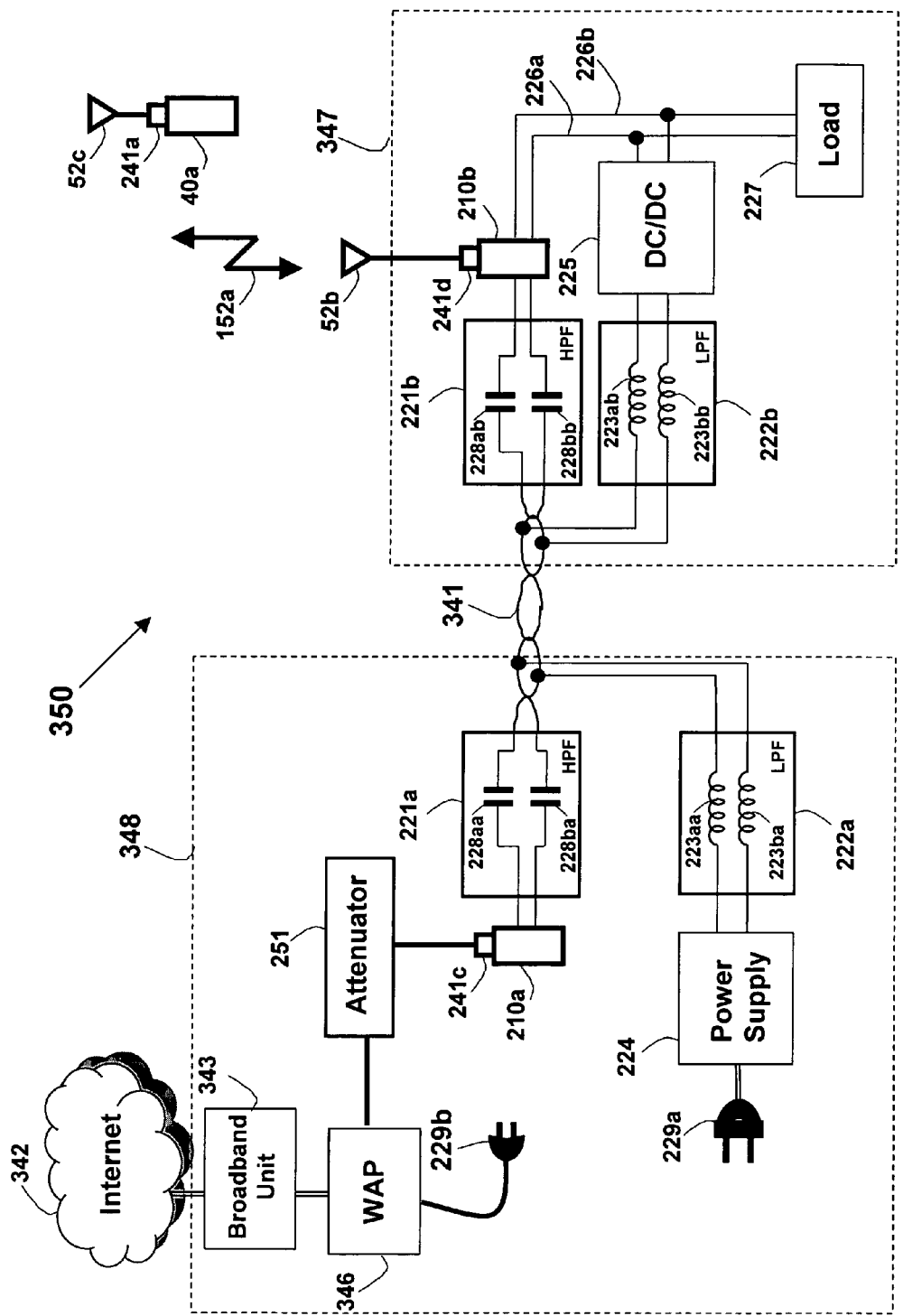

Any of the above described systems employing a wire pair may as well be implemented for such hotspot application, wherein the wire pair 201 (or plurality of such wire pairs) is substituted with a telephone wire pair such as 341. Such implementation may only require changing the equalizer 206 of system 260 to be adapted to the characteristic of a telephone wire-pair in general or specifically to the telephone wire pair 341 to be used. Similarly, protection 215 of system 260 may need to be adapted to the specific environment. As a non-limiting example, long and outdoor wire pair 341 may require hardened lightning protection (known as primary lightning protection) while in-building (in-door) application may require only a secondary lightning protection. System 350 shown in FIG. 35*a* is an example of adapting system 250 shown in FIG. 25 for hot-spot application. The telephone wire pair 341 is used as a specific example for the general wire pair 201. The WAP unit 346 is moved from the remote site 347 to the center site 348, wherein it replaces the general WAN unit 40*b*. A more general system 355 is shown in FIG. 35*b*, shows a general powering location 285*a* and a general remote location 284 connected via the telephone wire pair 341 as a specific example or a wire pair 201. As explained above, such configuration allows the use of a lower powering voltage such as 48VDC.

Cellular.

Figure 36:
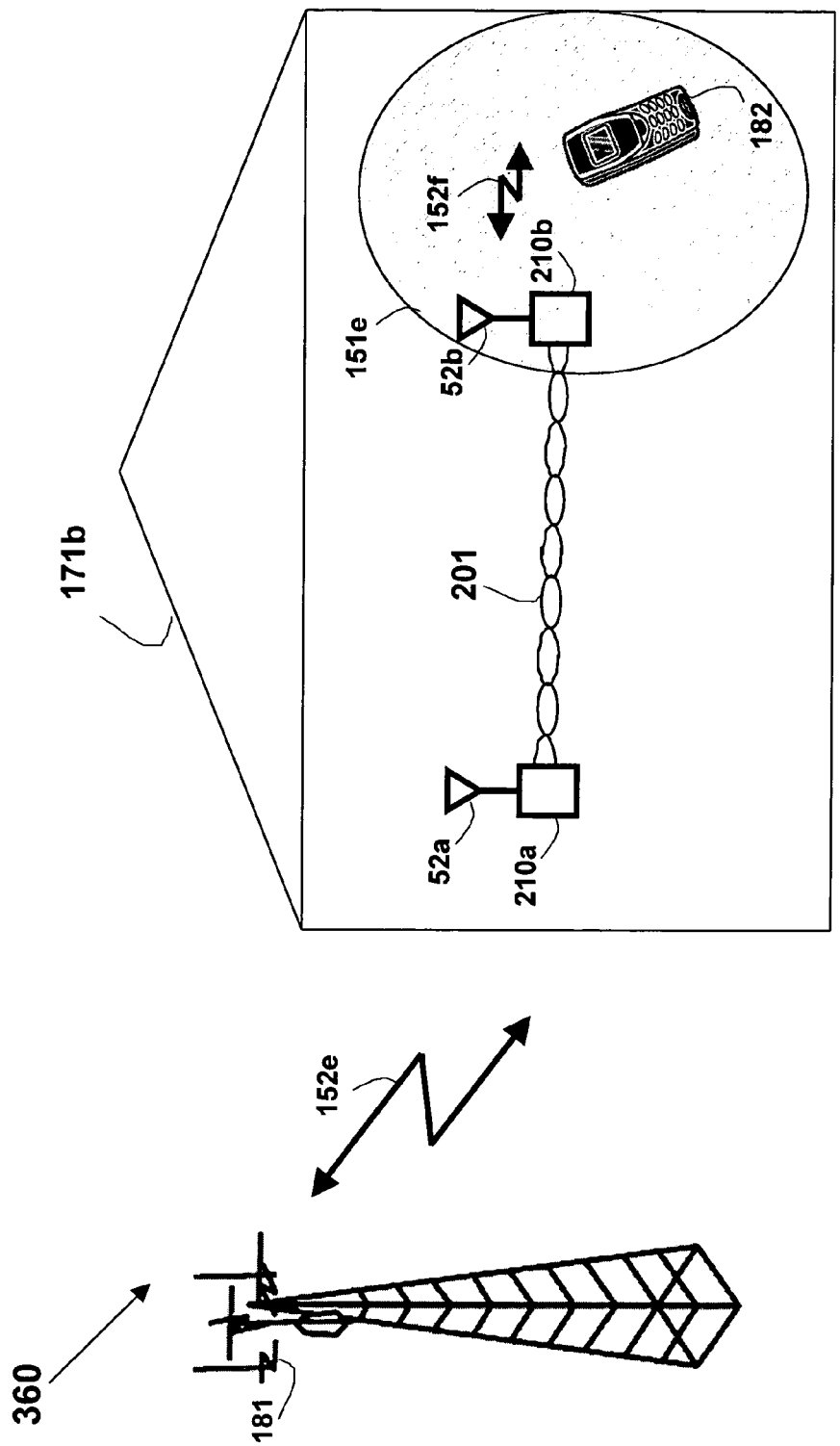
FIG. 36 illustrates schematically a simplified general increased in-door coverage network according to the invention.

According to one embodiment of the invention, frequency shifting is used to improve coverage in a building to a communication tower, such as communication between a cell phone and base-station, similar to the system 180 described above, however using a wired connection between the frequency shifters. Adaptation of system 220 for such application is shown as system 360 in FIG. 36. A cell phone 182 is shown in building 171*b*, communicating with a base-station over communication tower 181 over communication link 152*e*. In order to improve the in-building reception, two frequency shifters 210 are provided, each connected to the ends of the wire pair 201. A frequency shifter 210*a* is provided, preferably located in the building in a location wherein a reasonable signal and good communication is available with the tower 181 via antenna 52*a*. Optimally, the frequency shifter should be located in a place where there is a clear and non-interfered LOS to the tower 181. The signal from the tower 181 via link 152*e* is shifted to another frequency and re-transmitted over the in-building wire pair 201 to frequency shifter 210*b* having antenna 52*b* covering area 151*e*, linking with the cellular device 182 via link 152*f*. Any one of the systems described above such as 230, 240, 245, 270, 275, 279, 280, 290, 300, 320 and 325 and their derivatives can equally be used for such cellular application, in order to allow cellular reception and coverage in locations having poor or no cellular communication coverage. In such arrangement, the cellular frequency band is used instead of the IEEE802.11g frequency band exampled above.

Plug-in.

Figure 37A:
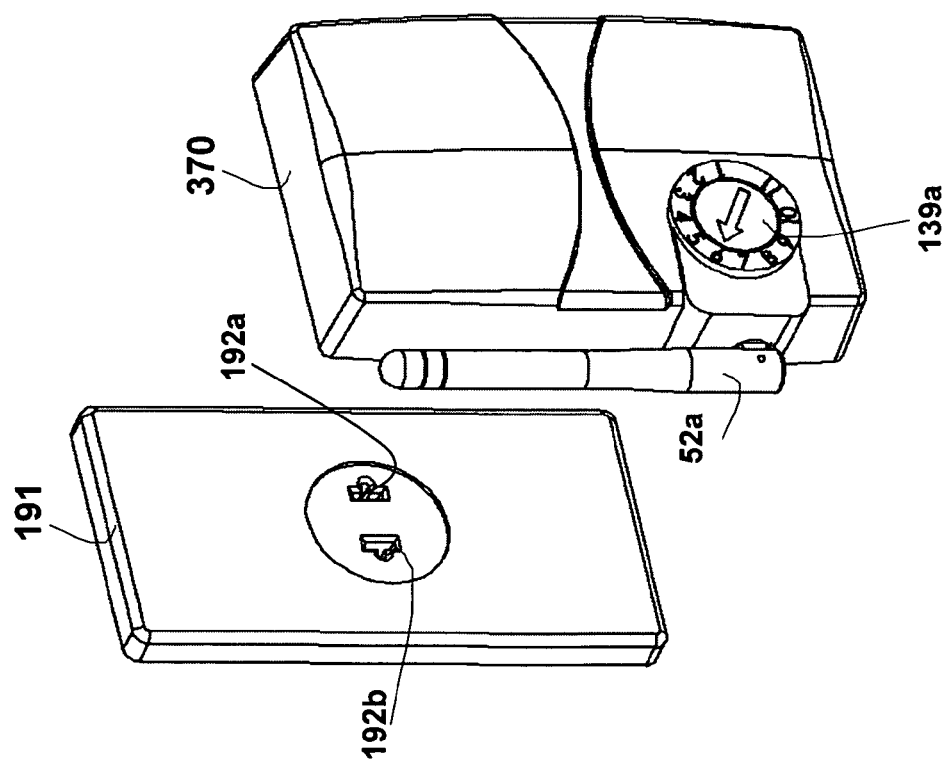
FIGS. 37a, 37b, and 37c pictorially illustrate various views of an exemplary AC power outlet plug-in unit using a frequency shifter according to the invention.
Figure 37C:
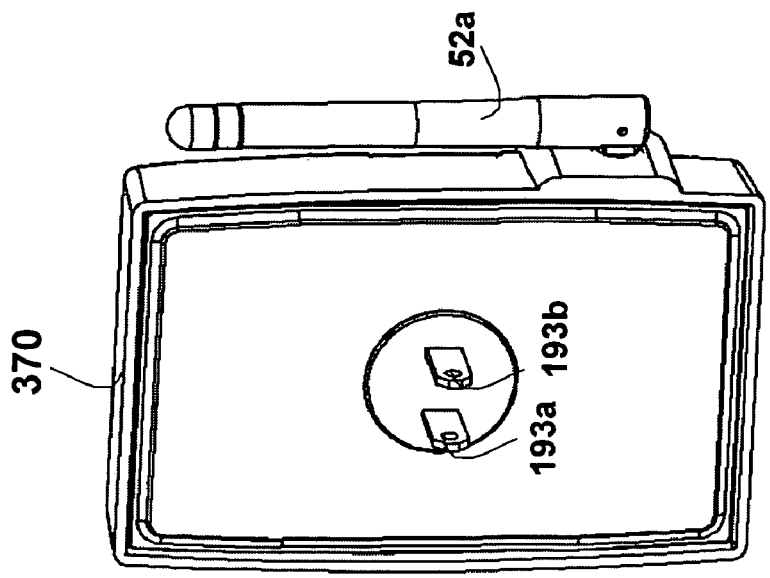
Figure 37B:
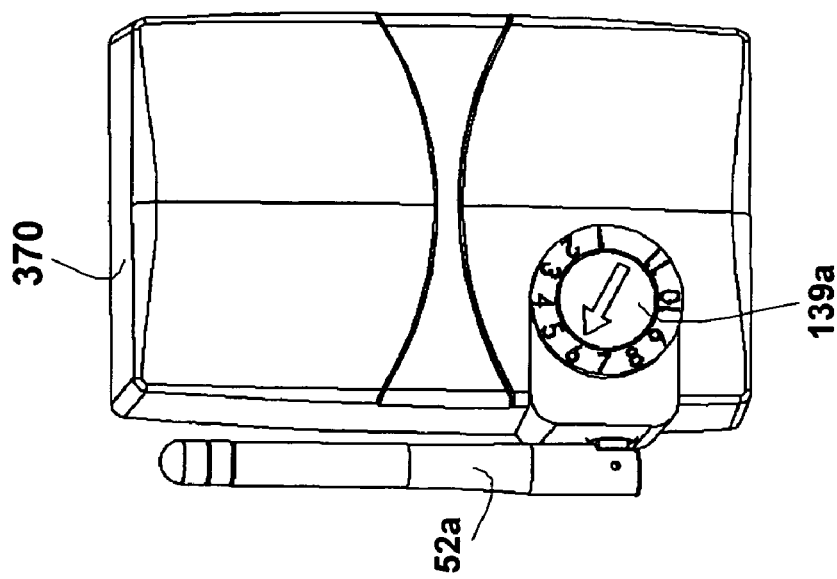

Similar to the above discussion regarding enclosing the systems in a plug-in form or as an outlet, one or both sides connected to the wire pair 201 as part systems described above and their derivatives may be housed as an outlet plug-in enclosure. In one embodiment according to the invention, a plug-in into an AC power outlet is used as such enclosure. A mechanical outline of such a plug-in unit 370 is generally shown in FIG. 37*a*, with a perspective rear view in FIG. 37*c* and front view in FIG. 37*b*. A North-American style AC power outlet 191 is shown, having two power sockets 192*a* and 192*b*. The frequency shifter 210, for example, enclosed as plug-in module 370 is shown to have two power prongs 193*a* and 193*b* respectively mating with sockets 192*a* and 192*b*, providing electrical connection as well as mechanical support, enabling the plug-in unit 370 to be easily attached to the outlet 191. Antenna 52*a* is shown, as well as a channel selecting mechanical rotary switch 139*a* having 11 positions for selecting one out of the 11 channels of the IEEE802.11g. In the example shown, rotary switch 139*b* controlling the 'A' sub-system channel is set to channel 6. The power connection via prongs 193*a* and 192*b* may serve as AC plug 229 above and used to supply AC power to the unit 370 for powering its internal circuits, preferably via a power supply including an AC/DC converter, for converting the 110VAC 60 Hz power from the outlet 191 to the DC voltage or voltages required for proper operation of the frequency shifter 210.

While the shifter 210 was described as a plug-in module to an AC power outlet, it is apparent that a frequency shifter may be equally plugged-in to any outlet, being an AC power, telephone, CATV, or LAN (such as Structured Wiring based on Category 5, 6 or 7 wiring) outlet. While the shifter 210 was described as being both powered from and mechanically supported by the attached AC power outlet, such coupling may be only for power feeding or only for mechanical support.

Figure 37E:
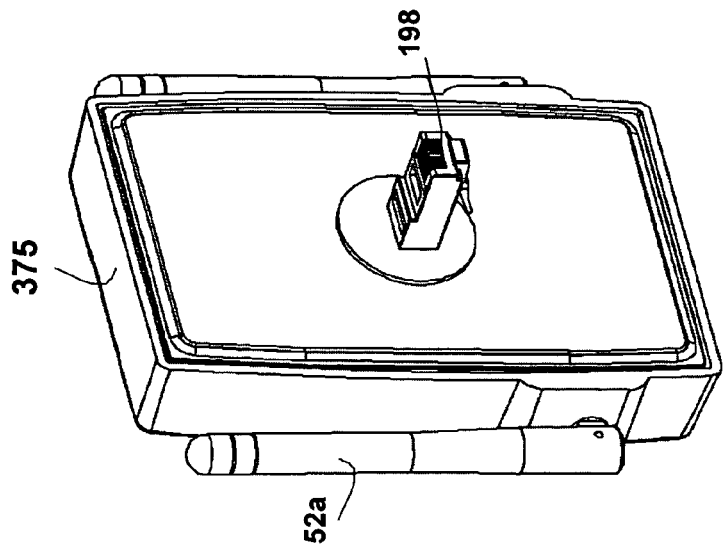
FIGS. 37d, 37e, and 37f pictorially illustrate various views of an exemplary LAN outlet plug-in unit using a frequency shifter according to the invention.
Figure 37D:
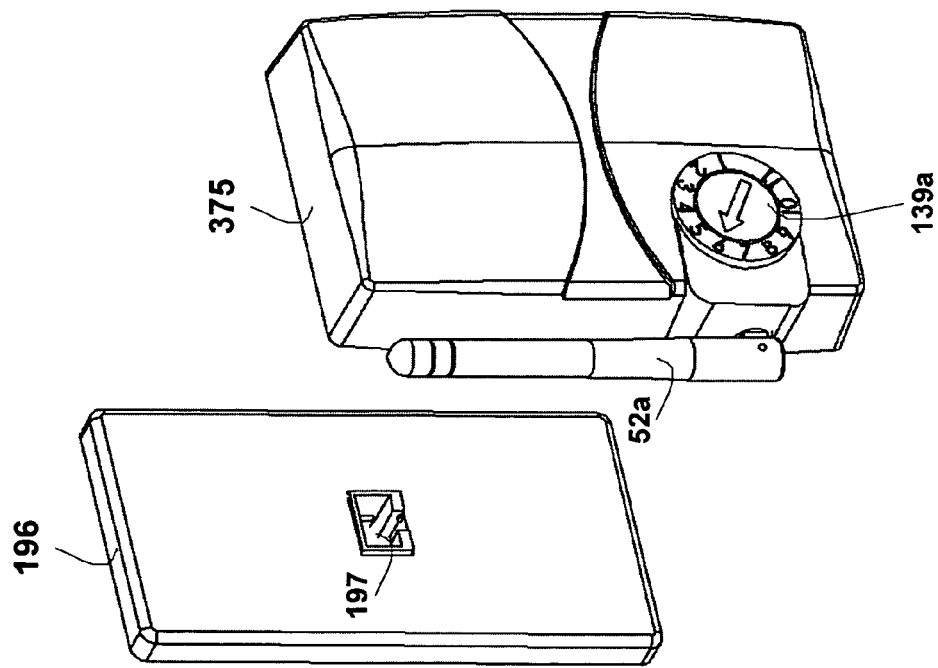

A mechanical outline of a plug-in unit 375 for attaching to a LAN outlet is generally shown in FIG. 37*d*, with a perspective rear view in FIG. 37*e*. A typical LAN outlet 196 is shown, comprising a LAN connector 197 such as RJ-45 jack. The frequency shifter 284, for example, enclosed as plug-in module 375 is shown to have an RJ-45 plug 198 respectively mating with LAN connector 197, providing electrical connection as well as mechanical support, enabling the plug-in unit 375 to be easily attached to the outlet 196. Antenna 52*a* is shown, as well as a channel selecting mechanical rotary switch 139*a*, having 11 positions for selecting one out of the 11 channels of the IEEE802.11g. In the example shown, rotary switch 139*a* controlling the 'A' sub-system channel is set to channel 6. In one embodiment according to the invention, the LAN wiring connected to the outlet 196 via jack 197 carries a power signal, either using a proprietary implementation or for example according to PoE (Power over Ethernet) IEEE802.3af standard, explained above. The plug-in module 375 serves as a PD (Powered Device) and is powered from the LAN wiring, typically via DC/DC converter, as described above.

Figure 37F:
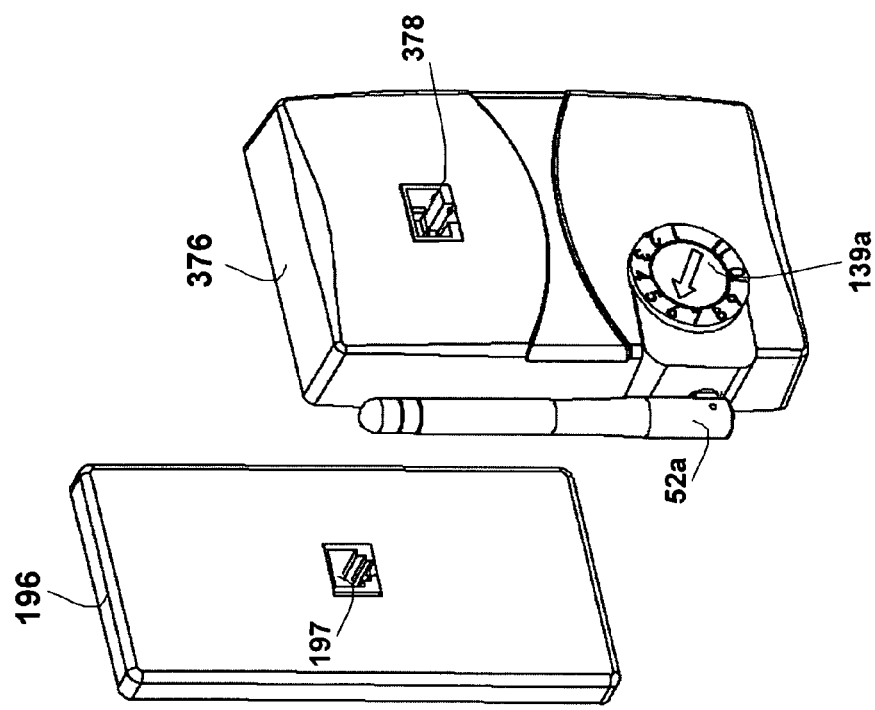

Since the RJ-45 jack may cover the LAN jack 197 thus obviating the connection of other LAN devices, an RJ-45 jack 378, implementing connector 312*c* above, may be used as a transparent 'pass-through' path retaining the capability to connect LAN units to the cable. Such a plug-in module 376 is shown in FIG. 37*f*.

Telephony.

The term "telephony" herein denotes in general any kind of telephone service, including analog and digital service, such as Integrated Services Digital Network (ISDN).

Analog telephony, popularly known as "Plain Old Telephone Service" ("POTS") has been in existence for over 100 years, and is well designed and well engineered for the transmission and switching of voice signals in the 300-3400 Hz portion (or "voice band" or "telephone band") of the audio spectrum. The familiar POTS network supports real-time, low-latency, high-reliability, moderate-fidelity voice telephony, and is capable of establishing a session between two end-points, each using an analog telephone set.

The terms "telephone", "telephone set", and "telephone device" herein denote any apparatus, without limitation, which can connect to a Public Switch Telephone Network ("PSTN"), including apparatus for both analog and digital telephony, non-limiting examples of which are analog telephones, digital telephones, facsimile ("fax") machines, automatic telephone answering machines, voice (e.g. dial-up) modems, and data modems.

The terms "data unit", "computer", and "personal computer" ("PC") are used herein interchangeably to include workstations, Personal Digital Assistants (PDA) and other data terminal equipment (DTE) with interfaces for connection to a local area network, as well as any other functional unit of a data station that serves as a data source or a data sink (or both).

In-home telephone service usually employs two or four wires, to which telephone sets are connected via telephone outlets.

While the invention has been exampled above with regard to carrying power and shifted wireless signal over the same wire pair using FDM, it is apparent that any other type of signal can be carried frequency multiplexed over the wire pair, such as analog or digital signals. In one embodiment according to the invention, the signal carried is a service signal in a building such as an analog telephone signal (POTS) carried over the telephone wire pair in a building that was primarily installed for carrying the telephone signal.

Figure 38:
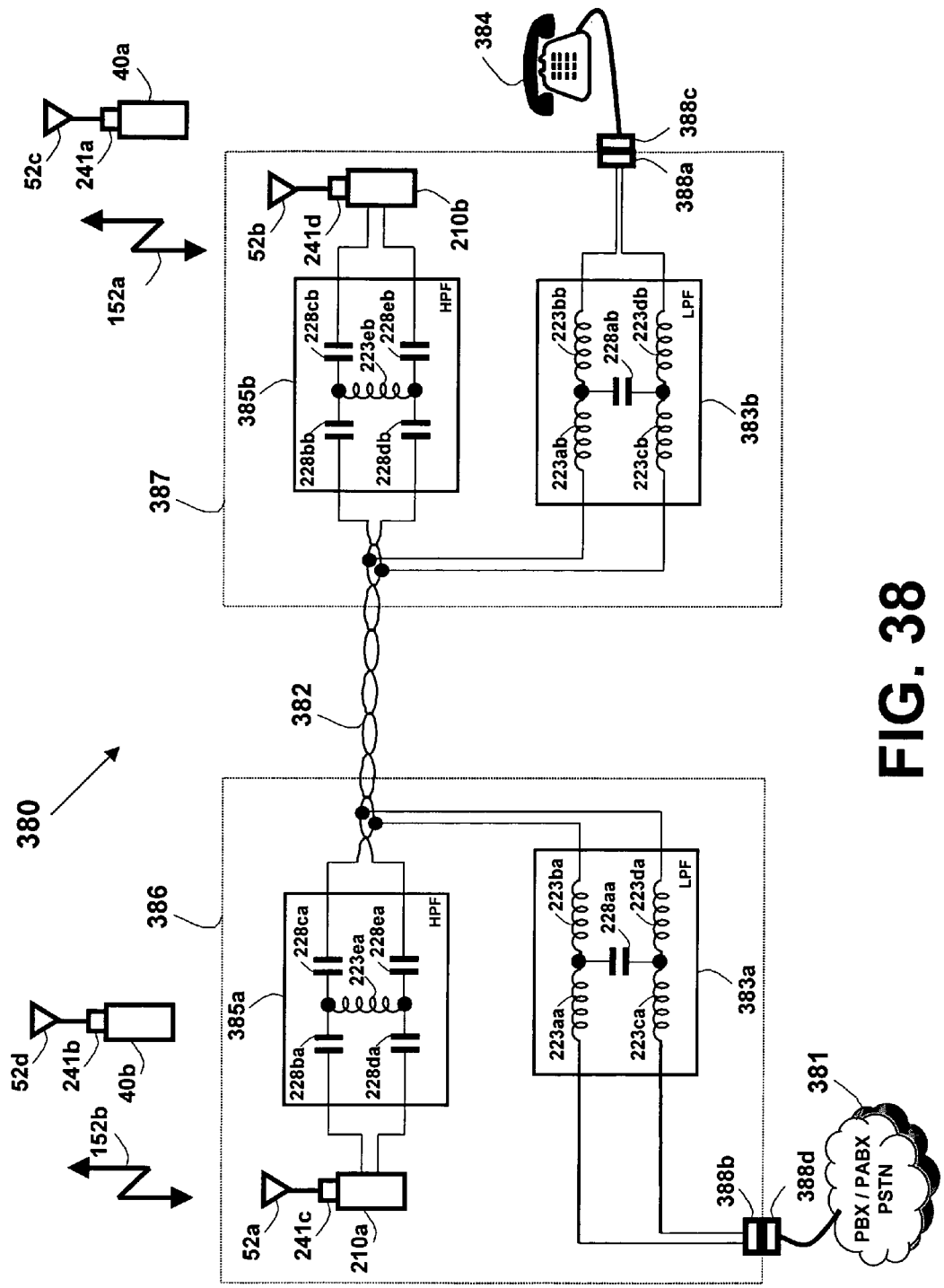
FIG. 38 illustrates schematically a simplified general network over a telephone wire pair according to the invention.

The system 380 shown in FIG. 38 is based on system 240 shown in FIG. 24 adapted to carry an analog telephone signal instead of a power signal over the medium. The medium 382 is a telephone wire pair substituting the general wire pair 201 and is either new or pre-existing, and may be primarily installed to carry the analog telephone signal. However, the invention also applies to the case where the wire pair 382 is any other two wired or two conductors, such as described above with regard to wire pair 201. In the shifted wireless signal path, HPFs 221*a* and 221*b* used to block the DC power signal are respectively substituted with HPFs 385*a* and 385*b*. HPFs 385*a* and 385*b* are aimed to transparently pass a shifted wireless signal 393 and to stop or reject other signals that may share the same wire pair 382 such as an analog telephone signal 391 and ADSL signal 392. In one embodiment, a passive filter 385*a* is used, comprising two capacitors pairs, one pair including capacitors 228*ba* and 228*ca*, and the other pair including capacitors 228*da* and 228*ea*, each pair connected in series to each of the two conductors carrying the signal. An inductor 223*ea* in connected in parallel to the signal path connected to the capacitor pair connection points. In one exemplary implementation, the capacitors 228 were selected all to be 150 pF and the inductor 223 ea was selected to be 1.8 µHy. Similarly, a mating passive filter 385*b* is used, comprising two capacitors pairs, one pair including capacitors 228*bb* and 228*cb*, and the other pair including capacitors 228*db* and 228*eb*, each pair connected in series to each of the two conductors carrying the signal. An inductor 223*eb* in connected in parallel to the signal path connected to the capacitor pair connection points. In one exemplary implementation, the capacitors 228 were selected all to be 150 pF and the inductor 223*eb* was selected to be 1.8 µHy.

The analog telephone signal may be provided from any type of analog telephone signal source such as PBX, PABX, exchange or the PSTN network, or may be sourced from a VoIP or digitally based telephony through an appropriate gateway or adaptor. The coupling to the medium 382 may involve connectors 388 such as telephone plug 388*d* and jack 388*b*. In one example, RJ-11 type is used as the telephone connectors 388, commonly used in North America. However, any standard or non-standard connectors may be equally used. LPFs 383*a* and 383*b* are used as a substitute to the DC pass filters 222*a* and 222*b*, and are designed to pass the analog telephone signal 391 (and the ADSL signal 392, if required), and stop or reject the shifted wireless signal 393. In one embodiment, a passive filter 383a is used, comprising two inductors pairs, one pair including inductors 223aa and 223ba, and the other pair including inductors 223ca and 223da, each pair connected in series to each of the two conductors carrying the signal. A capacitor 228aa is connected in parallel to the signal path connected to the inductors pair connection points. In one exemplary implementation, the capacitor 228aa was selected to be 560 pF, the inductors 223aa and 223ca were selected to be 2.2 µHy, and the inductors 223ba and 223da were selected to be 3.9µHy. Similarly, a mating passive filter 383b is used, comprising two inductors pairs, one pair including inductors 223ab and 223bb, and the other pair including inductors 223cb and 223db, each pair connected in series to each of the two conductors carrying the signal. A capacitor 228ab is connected in parallel to the signal path connected to the inductors pair connection points. In one exemplary implementation, the capacitor 228ab was selected to be 560 pF, the inductors 223ab and 223cb were selected to be 3.9 µHy, and the inductors 223bb and 223db were selected to be 2.2 µHy. The telephone service is terminated in a telephone set 384, which may represent any device capable of connecting to an analog telephone signal, non limiting examples are facsimile, dial-up modem, and answering machines. The connection to the telephone set 384 may make use of the telephone connectors 388 set, such as telephone plug 388c and telephone jack 388a. In one embodiment, all the functions in the location ('center' location/site) connected to the PBX 381, are enclosed or integrated into a single function or a single enclosure 386. Such a unit 386 comprises the shifter 210a, the HPF 385a, the LPF 383a, and telephone connector 388b. Similarly, the remote site may be referred to as a single function or enclosure 387, comprising shifter 210b, HPF 385b, LPF 383b and telephone connector 388a.

While system 380 and other systems herein are described as based on point-to-point involving only two units, each connected to opposite ends of the wire pair 382, it is apparent that any topology and any number of units may share the same wire pair 382, as described above for system 230.

Figure 39:
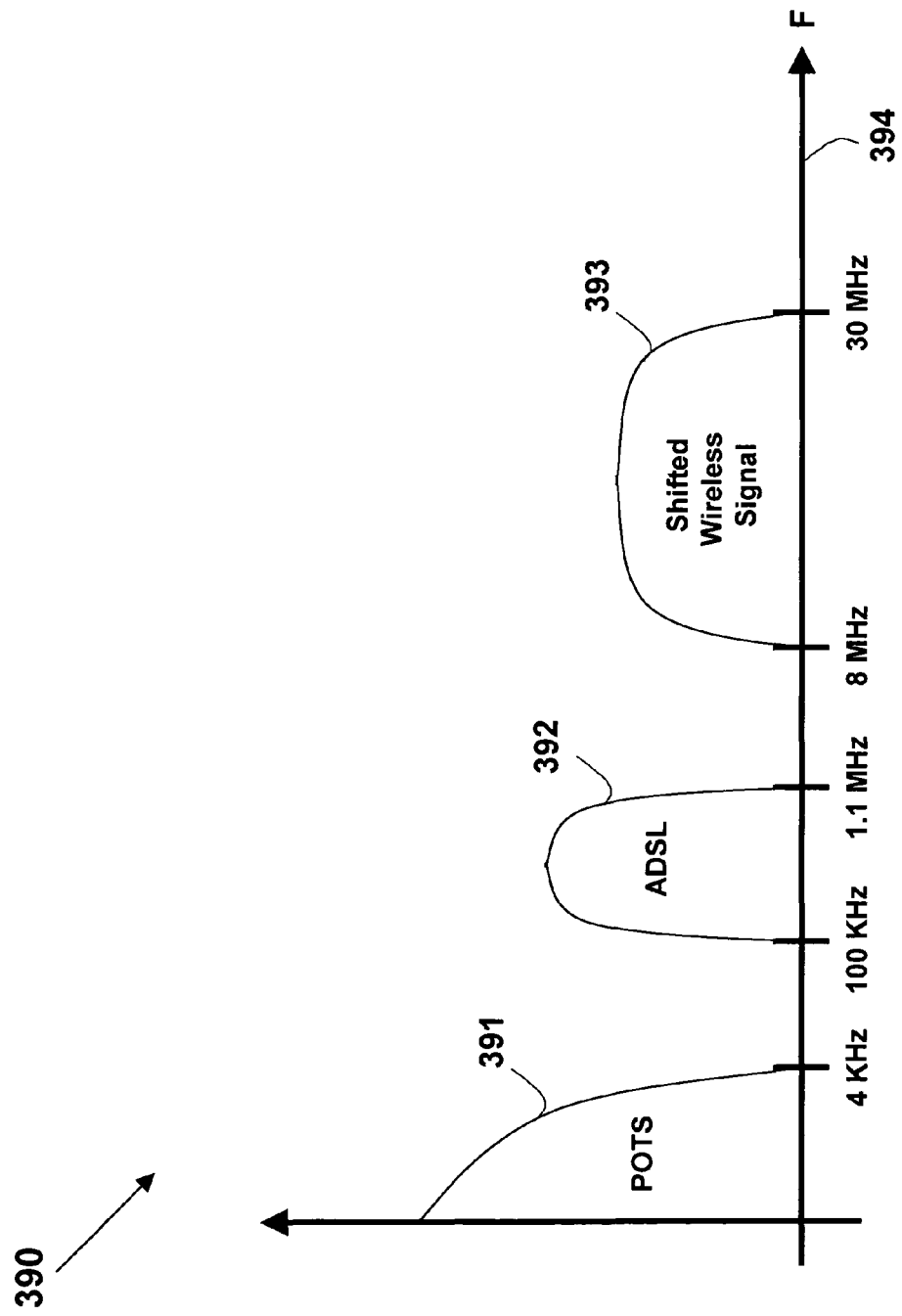
FIG. 39 illustrates schematically frequency spectrum allocations over a telephone wire-pair according to the invention.

The various signals and their corresponding frequency bands are shown in graph 390 in FIG. 39. Owing to FCC regulation in North America regarding radiated electromagnetic emission, the usable frequency band is considered to extend up to 30 MHz. Hence, a spectrum allocation for a baseband signal occupying 22 MHz may be between 8 MHz and 30 MHz (centered around 19 MHz), as shown in curve 393 being part of graph 390 in FIG. 39, illustrating the various power levels allocation along the frequency axis 394. Such allocation allows for ADSL signal 392 using the 100 KHz (or 25 KHz) to 1.1 MHz and the POTS signal curve 391.

Figure 40:
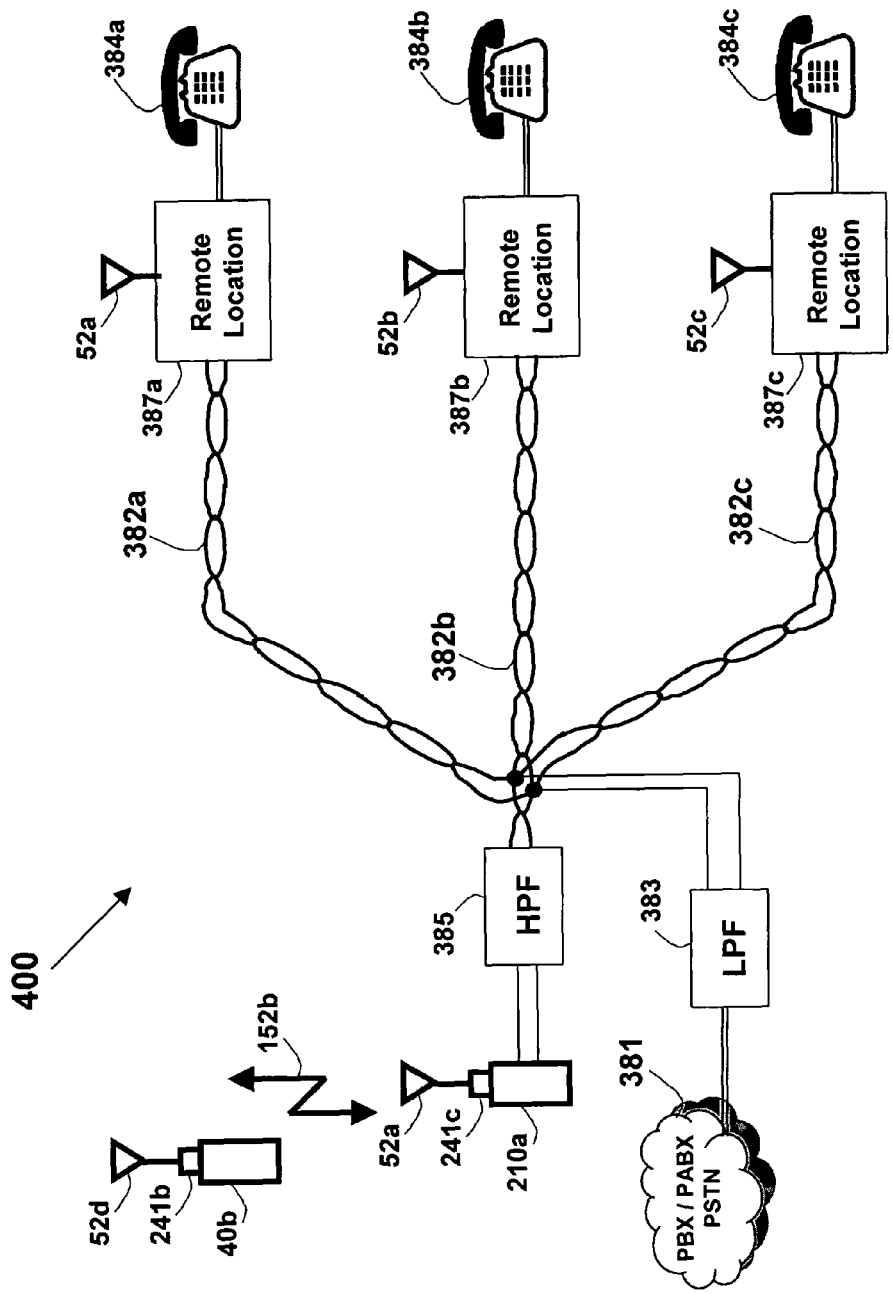
FIG. 40 illustrates schematically a simplified general network provided over multiple telephone wire pairs according to the invention.

System 245 shown in FIG. 24a may similarly be adapted for carrying an analog telephone signal instead of a DC power signal. Such a system 400 is shown in FIG. 40, and is based on three telephone wire pairs 382a, 382b and 382c. The wire pairs 382a, 382b and 382c respectively connect the center location to the remote locations 387a, 387b and 387c (described above as part of system 380), which are respectively connected or connectable to analog telephone sets 384a, 384b and 384c. In the center location, the HPF 221a in system 245 is substituted with an HPF 385 (described above), and the DC power relating units such as plug 229, Power Supply 224, and LPF 222a are substituted with PBX 381, coupled to the wire pairs 382 via LPF 383 described above.

Figure 41:
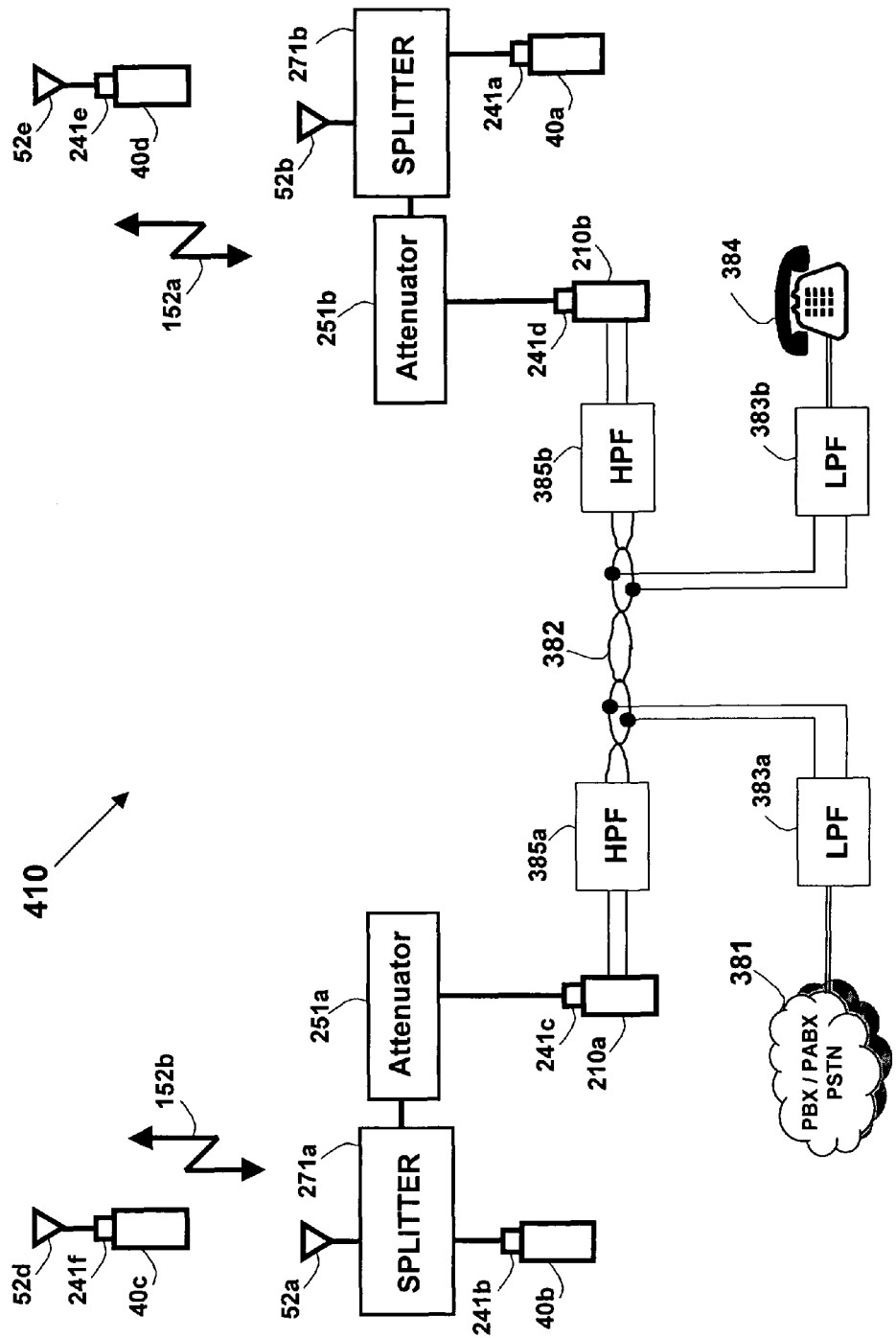
FIG. 41 illustrates schematically a simplified general wired and wireless network provided over a telephone wire pair according to the invention.
Figure 42:
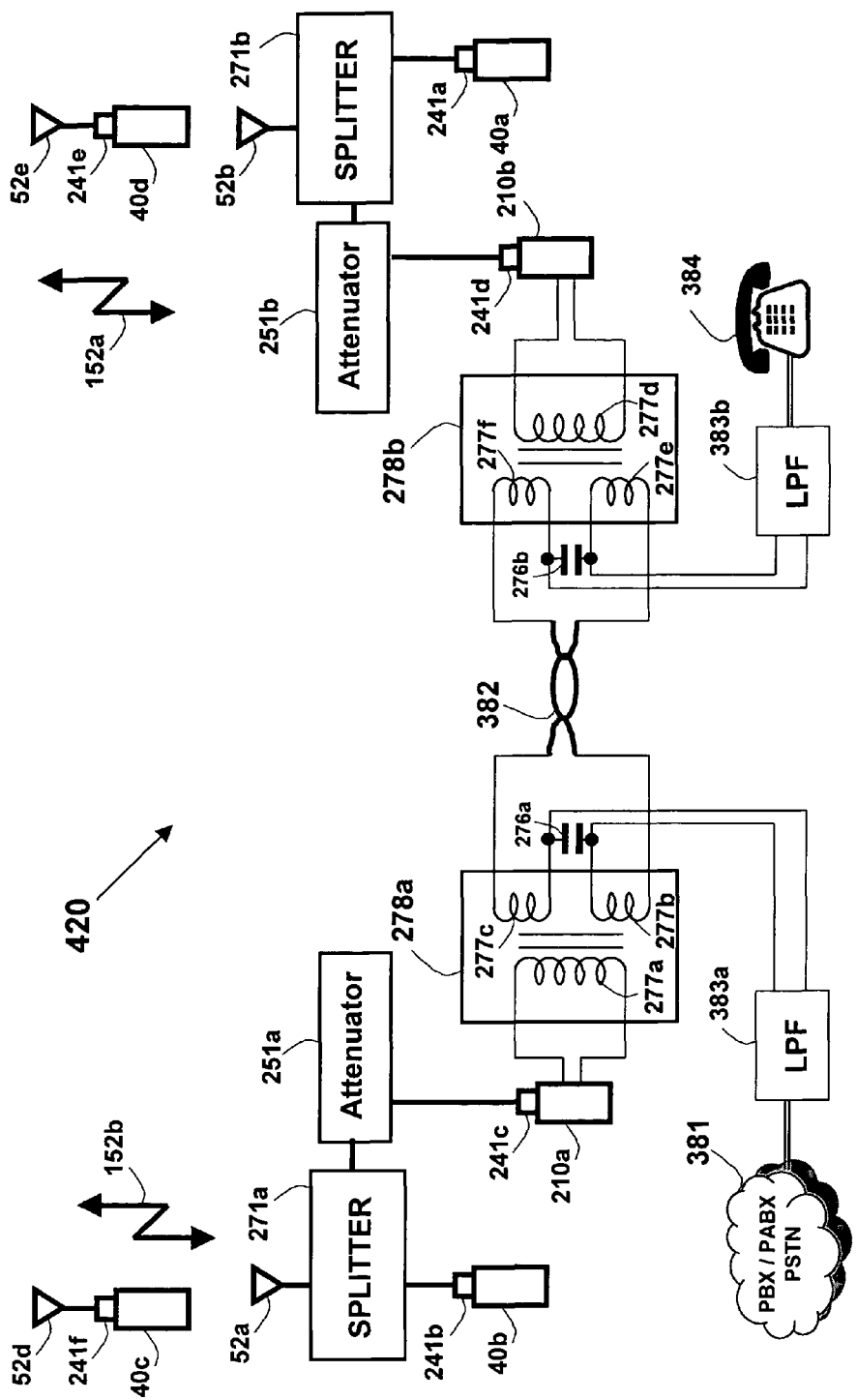
FIG. 42 illustrates schematically a simplified general network provided over a telephone wire pair using split center-tap transformer according to the invention.

System 275 shown in FIG. 27a may similarly be adapted for carrying an analog telephone signal instead of a DC power signal. Such a system 410 is shown in FIG. 41, and is based on a telephone wire pair 382 connecting the center and remote locations. Similar to the above, HPFs 221a and 221b are respectively replaced with HPFs 385a and 385b, and the DC power related parts are omitted and replaced with the PBX 381 (or connection thereto) and LPF 383a in the center location and LPF 383b and telephone set 384 in the remote location. In a similar way, system 279 is adapted to form system 420 shown in FIG. 42, using wire pair 382 and to carry an analog telephone signal instead of the DC power signal.

Figure 41A:
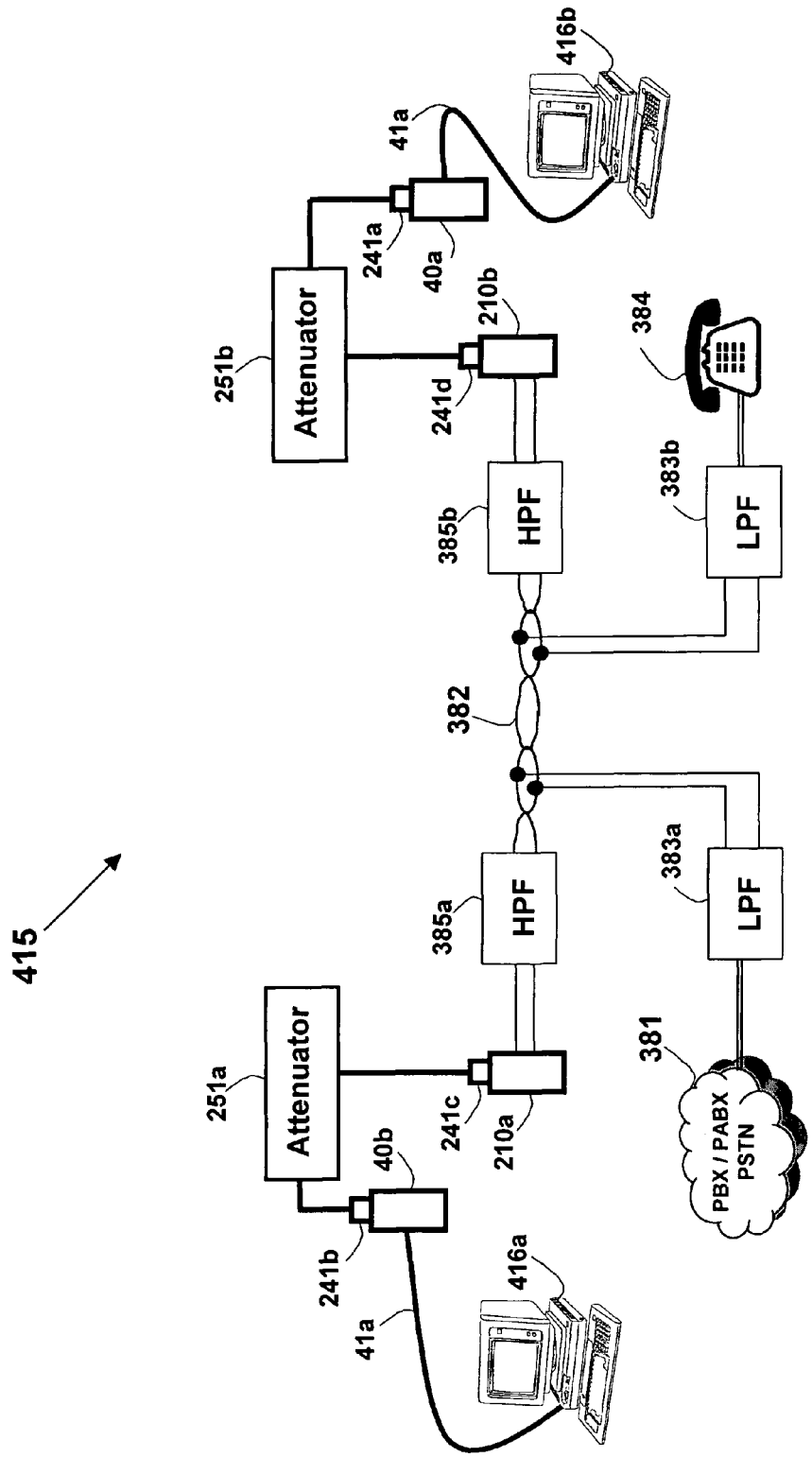
FIG. 41a illustrates schematically a simplified general wired only network provided over a telephone wire pair according to the invention.

While system 410 shown in FIG. 41 was described as focusing on improving the coverage, it is apparent that this system also carries wired data between WLAN units 40a and 40b over the wire pair 382. It is apparent that such a system as well as any similar wired-medium based system may be used only for exchanging data between two wired remote data units, without any radio communication link involved. Such a system 415 is shown in FIG. 41a, and may be considered as a simplified version of system 410. Two data-unit 416a and 416b, which are pictorially exampled as a personal computer, but may be any DTE (Data Terminal Equipment), are respectively connected via WLAN unit wired ports 41a and 41b (e.g., Ethernet 10/100BaseT per IEEE802.3 or USB) to the respective WLAN units 40b and 40a. The two computers 416 can communicate over the wire pair 382. It is apparent that such communication may also take place in system 410. Such a system may be a replacement to other technology used to carry data over wiring in general and over a telephone wire pair in particular, such as DSL and VDSL.

Figure 43:
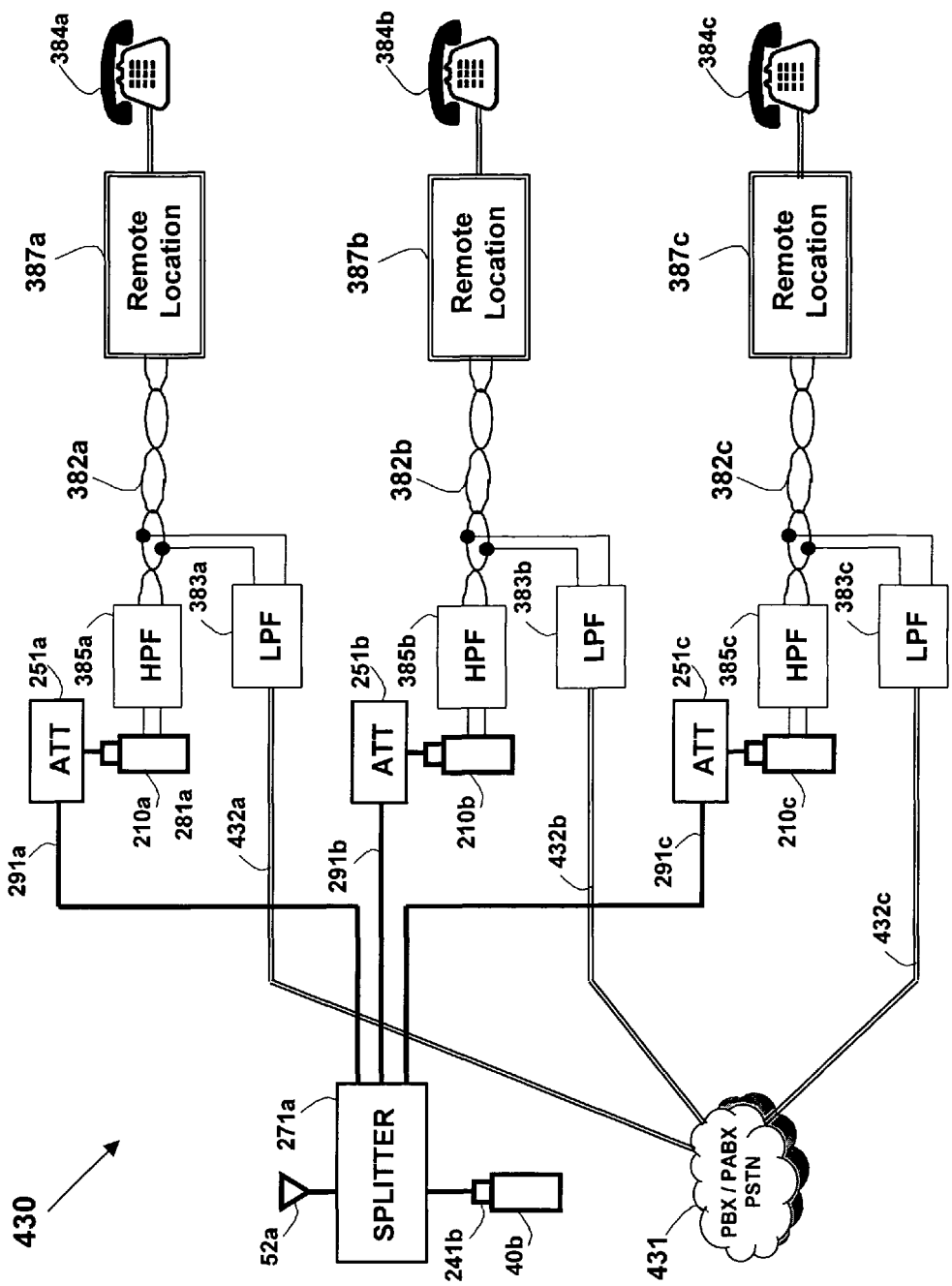
FIG. 43 illustrates schematically a simplified general network provided over multiple telephone wire pairs using RF splitter according to the invention.
Figure 44:
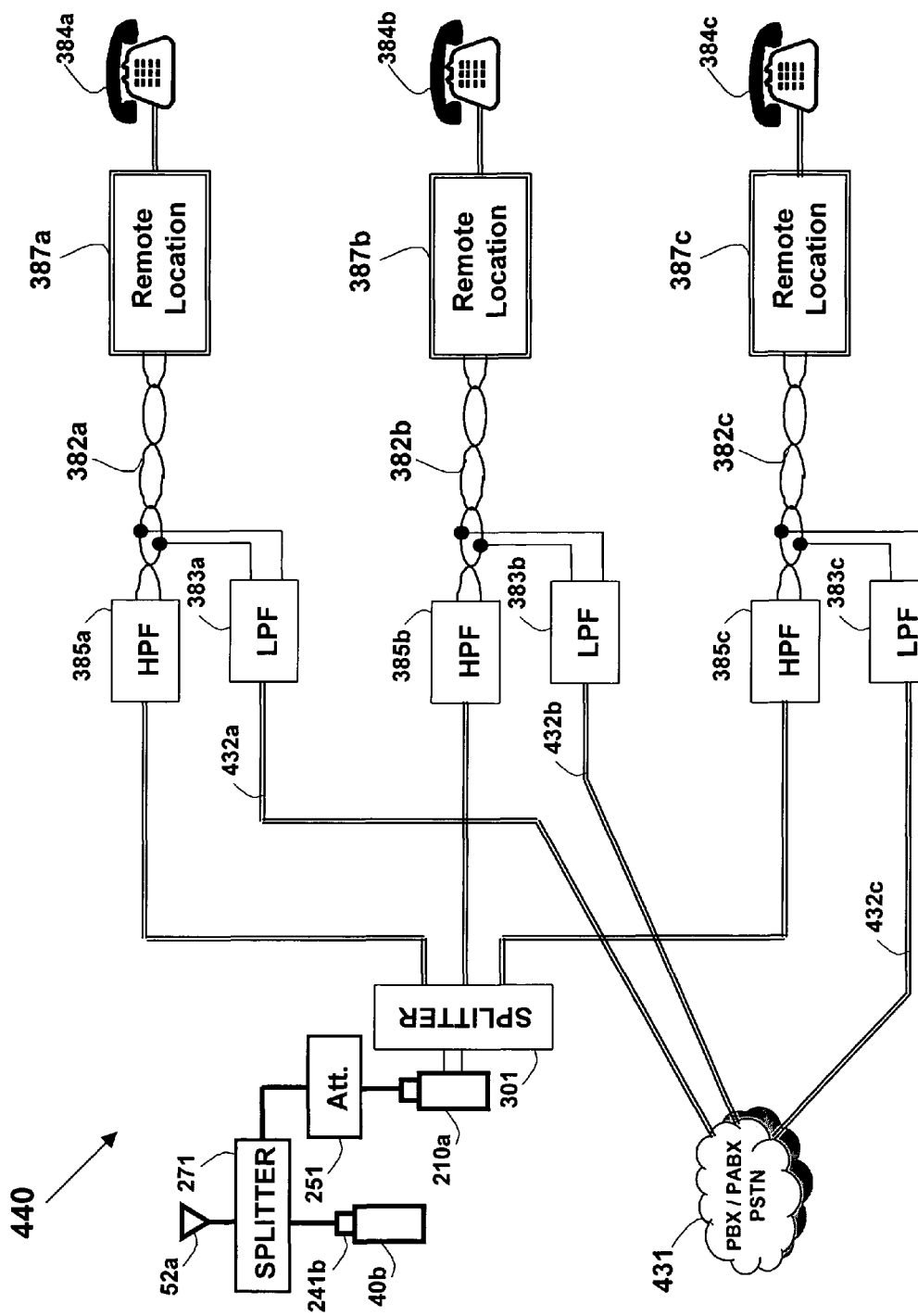
FIG. 44 illustrates schematically a simplified general increased coverage network provided over multiple telephone wire pairs using a low-frequency splitter according to the invention.

While in the embodiments described above the same analog telephone signal is distributed to all remote locations, it is apparent that in a similar way, multiple distinct analog telephone signals may be carried to multiple locations. Such arrangement is suitable to any environment where multiple distinct telephone wire pairs are distributed from a single center location to multiple remote locations, such as in any PBX environment, typically found in hotels, multi-unit dwelling, apartment building, dormitories and residential buildings employing a PABX/PBX. Such a system 430 is shown in FIG. 43, based on system 290 shown in FIG. 29. System 430 is based on three telephone wire pairs 382a, 382b and 382c respectively connecting remote locations 387a, 387b and 387c to the center location, and allowing respectively telephone sets 384a, 384b and 384c to connect to the center location via the remote locations 387. The shifted wireless signal is carried similarly to system 290 above, wherein the HPFs 385a, 385b and 385c are respectively used to connect to the telephone wire pairs 382a, 382b and 382c. However, three distinct telephone service signals are sourced from the PBX 431 via ports 432a, 432b and 432c. The ports are respectively connected to LPFs 383a, 383b and 383c, enabling three distinct telephone signals to be carried to the telephone sets 384a, 384b and 384c. For example, each such telephone set can connect to make a different telephone conversation, independently from the other telephone sets. System 440 shown in FIG. 44 offers the same telephony functionality based on handling of the shifted wireless signal as per system 300 shown in FIG. 30.

In the above embodiments the telephone signal 391 and the shifted wireless signal 393 are carried using FDM over the single wire pair 201 or 382. In the general case shown as part of system 450 in FIG. 45, the coupling to the wire pair 382 involves two LPFs 383a and 383b respectively for the center site and for the remote site, respectively having ports 455a and 455b for connecting to PBX 381 and telephone set 384. Similarly, the frequency shifters are coupled to the wire pair using two HPFs 385a and 385b respectively for the center site and for the remote site, respectively having ports 456a and 456b for connecting to frequency shifters 210. In many applications, such as the hot-spot environment described above, it is beneficial to also concurrently carry a power signal over the same wire pair, for powering part or all of the remote location. According to one embodiment shown as system 450 in FIG. 45, the FDM is used to also carry the power signal. Such powering system is described in the '353 patent, and involves carrying the power signal as an AC power signal, carried over a distinct frequency band. For example, the AC power may be using any one of a few frequencies in the 10 KHz-100 KHz frequency band, being above the telephone band 391, yet below the ADSL band 392. For example, a 20 KHz AC power signal may be used. System 450 shows such an arrangement, wherein AC power is derived from the AC power grid using AC power plug 229*a*, feeding an AC/AC converter for generating the 20 KHz AC power signal. This AC power signal is fed to the wire pair 382*a* through BPF (Band Pass Filter) 451*a* via port 457*a*. BPFs 451*a* and 451*b* are designed to pass the AC power signal and to stop/reject both the analog telephone and the shifted wireless signals. In the case of the presence of ADSL signal 392 or any similar signal, the LPFs 383*a* and 383*b* may pass the ADSL signal, while all other filters block this frequency band. In the remote side, the BPF 451*b* extract the AC power signal, and feeds AC/DC converter 453, which it turn sources DC power signal via port 457*b*. The resulting DC power signal is feeding the load 227, which may include the frequency shifter 210 and any other equipment in the remote locations. The functions that are in charge of accessing the wire pair 382*a* are forming filters set 458 in the center site, which includes BPF 451*a*, HPF 385*a* and LPF 383*a*. Similarly, the functions that are in charge of accessing the wire pair 382*a* form the group 459 in the remote site, which includes BPF 451*b*, HPF 385*b*, AC/DC 453 and LPF 383*b*.

Hot-Spot.

Systems 350 and 355 shown above in FIGS. 35*a* and 35*b* respectively teach a hot-spot application, where DC power and shifted wireless signals are carried over a single telephone wire pair 341. System 460 shown in FIG. 46 further allows for carrying a power signal from the center to the remote site over the same telephone wire pair 382. The AC power mechanism described in system 450 (of FIG. 45) is employed, allowing for AC power to be carried from the power source 229*a* and the AC/AC converter 454, through BPF 451*a* to the wire pair 382, which is connected to the remote location BPF 451*b*. The extracted AC power is DC converted by AC/DC converter 453, and the resulting DC power signal is shown to power any power consuming elements such as WLAN unit 40*a* and shifter 210*b*, as well as any additional active circuits.

Figure 49:
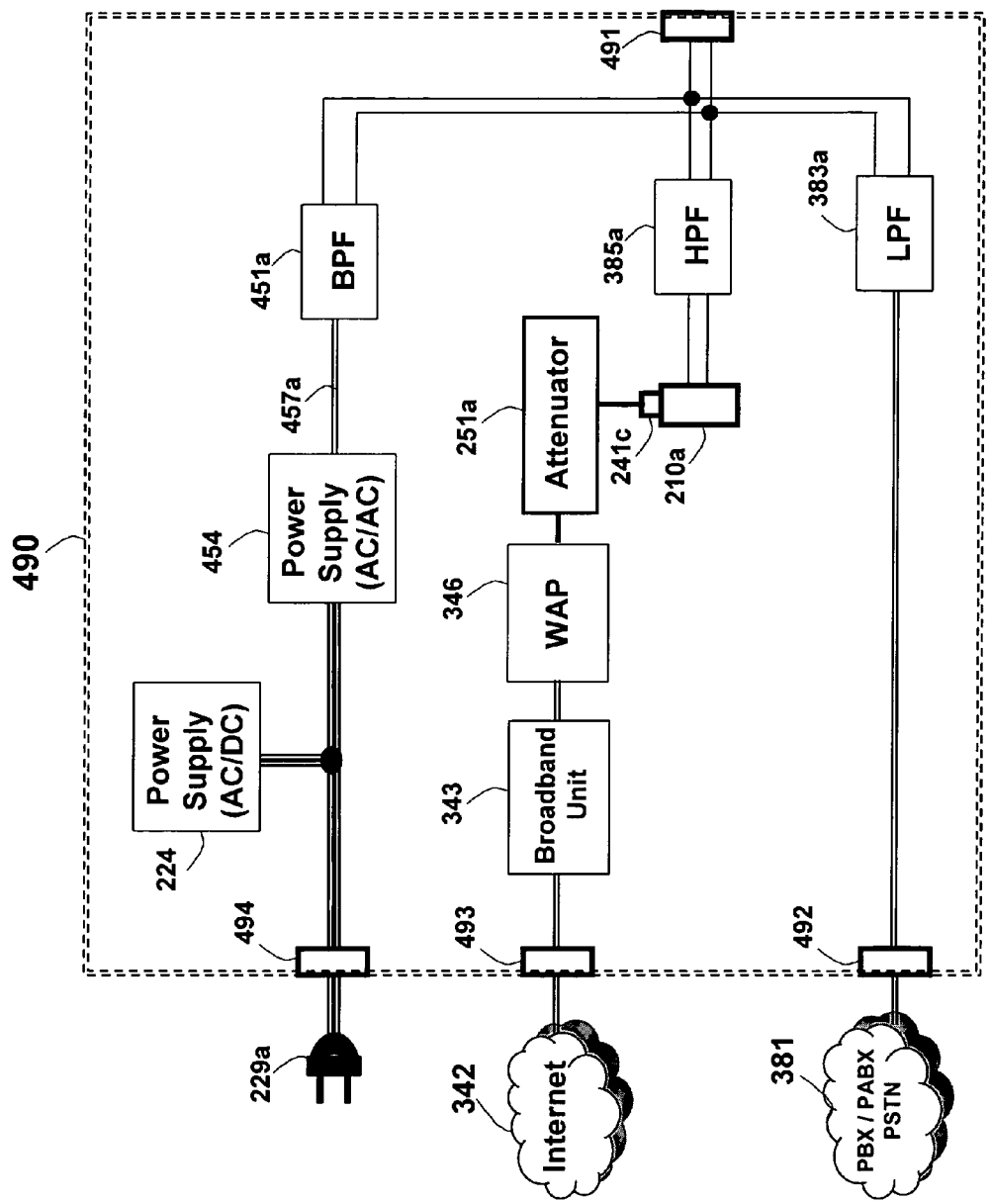
FIGS. 49, 49a and 49b illustrate schematically simplified general functional block diagrams of devices employing a frequency shifters according to the invention.

The parts of system 460 located in the powering location may be grouped into a single device 490 shown in FIG. 49. A connector 491 is provided for connecting to the wire pair 382, and a telephone connector 492 is provided for connecting to the PSTN 381. The broadband unit 343 connects to the Internet 342 via connector 493, and the AC powered is provided using the power connector 494. The AC/DC power supply 224 is fed from the AC supply power and feeds all the circuits within the device 490.

Figure 47:
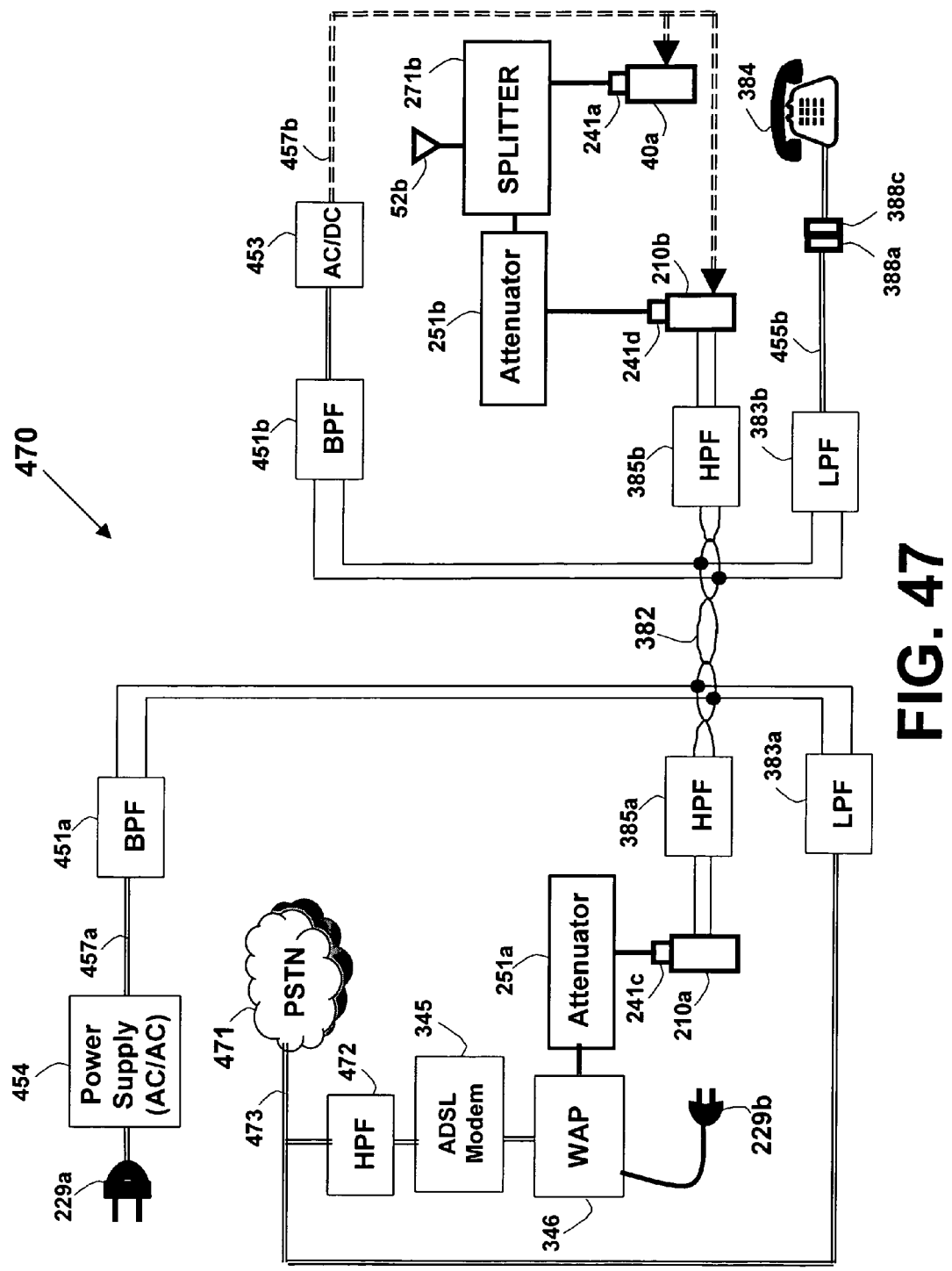
FIG. 47 illustrates schematically a simplified general hot-spot network provided over a telephone wire pair according to the invention.

While system 460 was shown as interfacing the Internet 342 (or any other data network) and the PSTN 381 via different connections, in some hot-spot and other applications, a single connection may be used for both data and analog telephony, for example using a single telephone pair carrying both ADSL and analog telephony as known in the art. A system 470 shown in FIG. 47 refers to such a configuration. The system 470 is connected to a PSTN network 471 via a telephone wire pair carrying data as ADSL and analog telephony using FDM as shown in graph 390. ADSL filter 472 (typically an HPF) passes the ADSL signal to the ADSL modem 345, which in turn exchanges data with the WAP 346. The analog telephone signal is filtered by LPF 383*a* and coupled to the telephone wire pair 382 (which is distinct from the wire pair 473). In the remote side, the analog telephone signal is filtered by LPF 383*b* and coupled to telephone set 384 via the telephone connectors 388*a* and 388*c* and connection 455*b*.

Figure 49A:
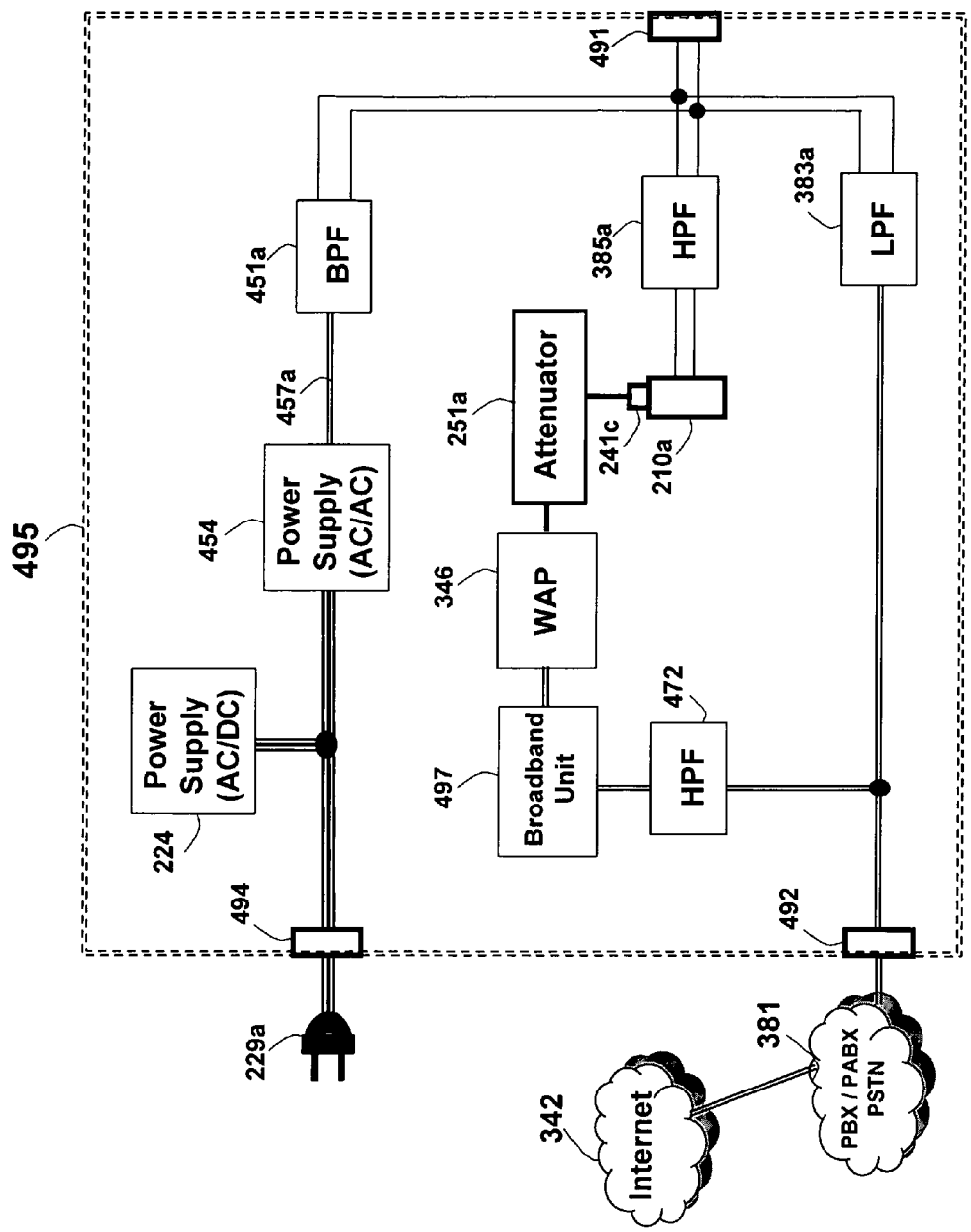

The parts of system 470 located in the powering location may be grouped into a single device 495 shown in FIG. 49*a*. A connector 491 is provided for connecting to the wire pair 382, and a telephone connector 492 is provided for connecting to the PSTN 381. The broadband unit 343 connects to the Internet 342 via the telephone connector 492, and the AC powered is provided using the power connector 494. The AC/DC power supply 224 is fed from the AC supply power and feeds all the circuits within the device 495.

While the invention has been described above with regard to a telephone wire pair, it is apparent that a spare pair in a LAN cable or using phantom channel may as well be used as the wired medium in a similar way as described in systems 320, 325 and 330 above. The powering related circuits should be substituted with an analog telephone signal handling in a similar way to the system described above.

In-Building Telephone.

Figure 48A:
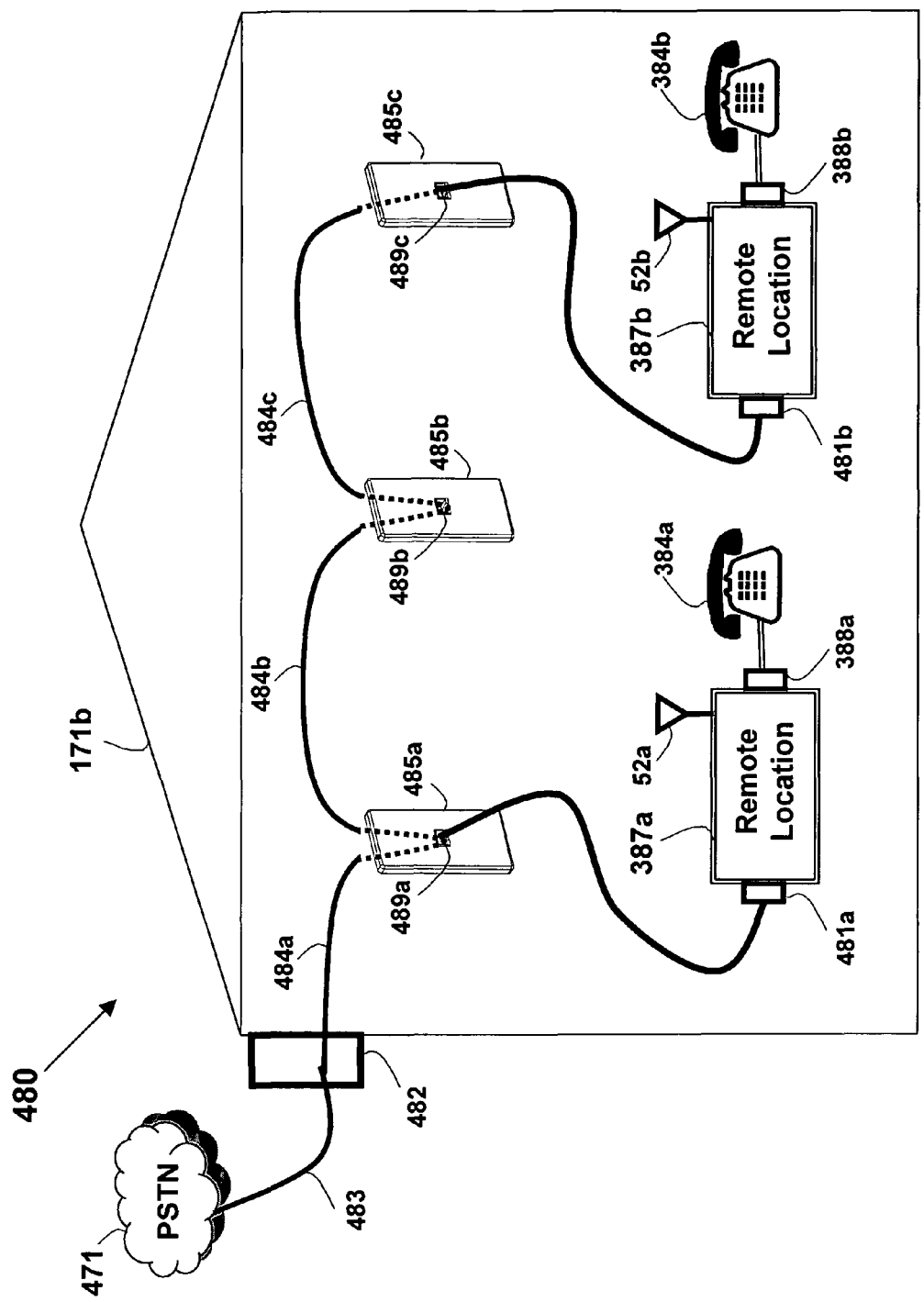
FIGS. 48a, 48b and 48c illustrate pictorially and schematically simplified general networks provided over a telephone wire pair in a building according to the invention.

The telephone wire-pair 382 may also contains an in-building telephone wire pair. Typically such in-building telephony wiring comprises a single wire-pair or two wire-pairs (for supporting two distinct telephone lines/numbers). An example is shown as system 480 in FIG. 48*a*, wherein the in-building telephone wiring contains three telephone wire-pairs 484*a*, 484*b* and 484*c*, connected in series (known as 'daisy-chain' configuration). Other topologies such as star (i.e. home-run) and other mixed topologies are also common. Access to the telephone wire pair 484 is available by means of telephone outlets, comprising a telephone connector. In the example of system 480, three North-American type telephone outlets 485*a*, 485*b* and 485*c* are shown, respectively mounting telephone connectors (typically RJ-11 jack) 489*a*, 489*b* and 489*c*. A telephone wire pair segment 484*c* connects outlets 485*c* and 485*b*. Similarly, a telephone wire pair segment 484*b* connects outlets 485*a* and 485*b*. The connection between the in-building wiring and the external wiring 483 (the 'local loop' or the 'subscriber line') that connects to the PSTN 471 (typically to a near central Office) is performed in a connection fixture known as the Junction-Box or NID 482 (Network Interface Device), typically serving as the Demarcation-Point between the telephone service provider and the building owner. In the case of a single family home, the NID 482 is commonly mounted on a wall outside the building or in the basement. In the case of multi-unit dwellings, office buildings, and factories the NID 482 may be installed in a dedicated communication room or closet. A telephone wire pair 484*a* is shown to connect the outlet 485*a* to the NID 482.

In the case where the in-building telephone wire pair 484 is used as the telephone wire pair 382 in the above described embodiments, the connection to the wiring commonly employs connecting to the telephone connector 495 in the wall mounted outlet 485. In the system 480, two remote locations 387*a* and 387*b* are shown, each comprising the functions described above for the relevant sub-system being part of system 380. The remote locations 387*a* and 387*b* respectively include antennas 52*a* and 52*b*, and are shown connected to the respective telephone sets 384*a* and 384*b*, and use the respective ports 481*a* and 481*b* for connecting to the telephone outlets. In such a system 480 the telephone service functionality is fully retained, since the telephone sets 384 are effectively connected to the PSTN 471 as if no hardware was added. However, the in-building telephone wiring doubles as a backbone for carrying the shifted wireless signal from one point (e.g., one room) to another point in the building (e.g. another room). Hence, similar to the benefits of the systems described above, the effective coverage of the wireless signal is increased; and allows removal of 'dead spots' or areas of poor wireless reception. In another embodiment, one of the remote locations 387 is located in the home having optimum reception of an external wireless signal such as a cellular signal, as explained with regard to system 360 above, wherein the in-building telephone wire pair 484 serves as the connecting medium 201. Similar to the above, the system 480 improves the cellular coverage in the building; however the need for installing new cabling is obviated by using the existing telephone wire pair 484.

While system 480 demonstrates application of system 380 for in-building environment, wherein the telephone wire pair 484 in the building serves as the telephone wire-pair 382 and is connected to via outlets, all other systems described above may as well be similarly implemented. For example, system 460 may be implemented where all the units in the center location that are connected to one end of the wire pair 382 (left side of the Figure) may be integrated into a single enclosure and connected to one outlet, while all the remote location parts will be integrated into a second device that will be connected to another outlet in the building.

Figure 48B:
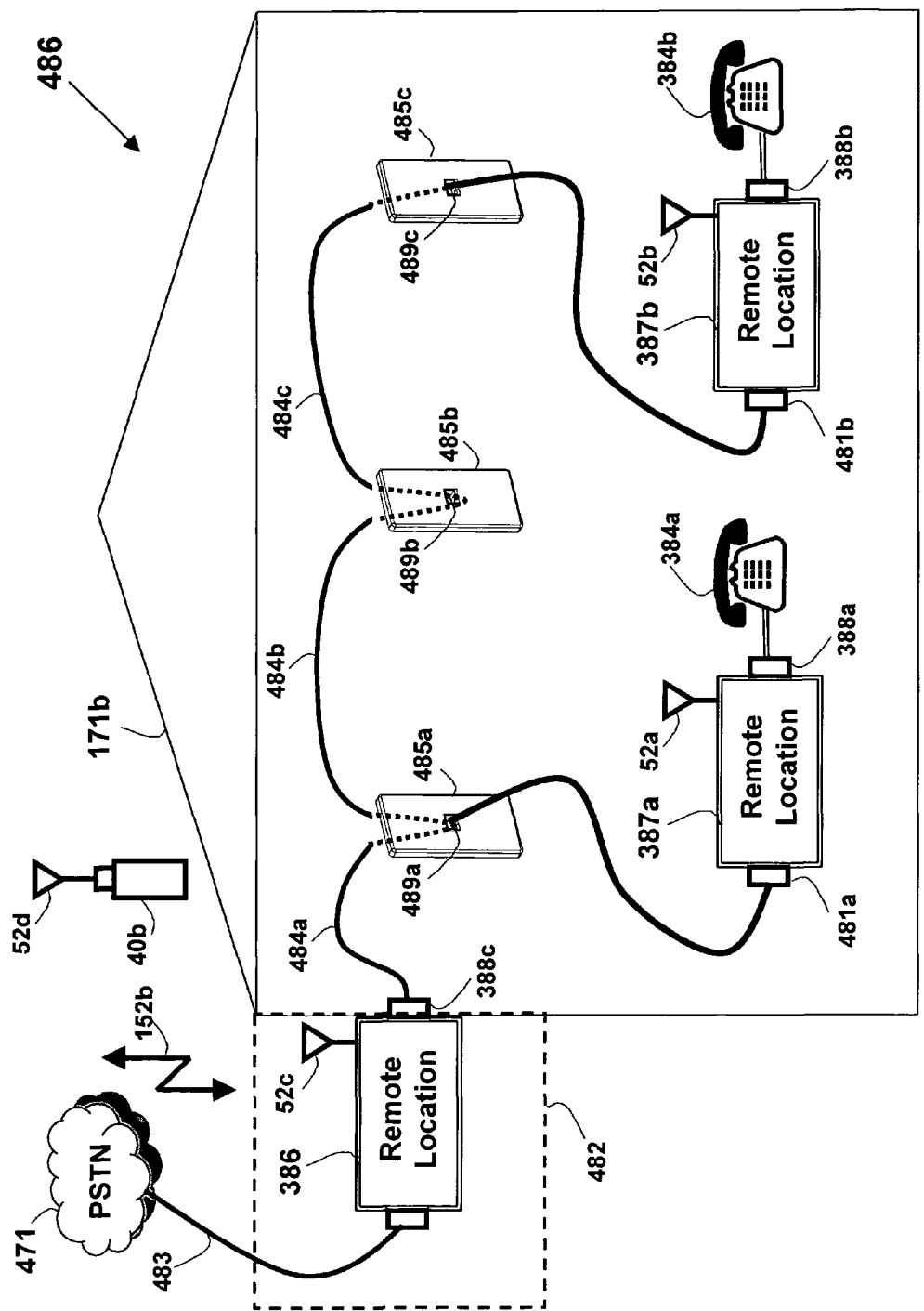
Figure 48C:
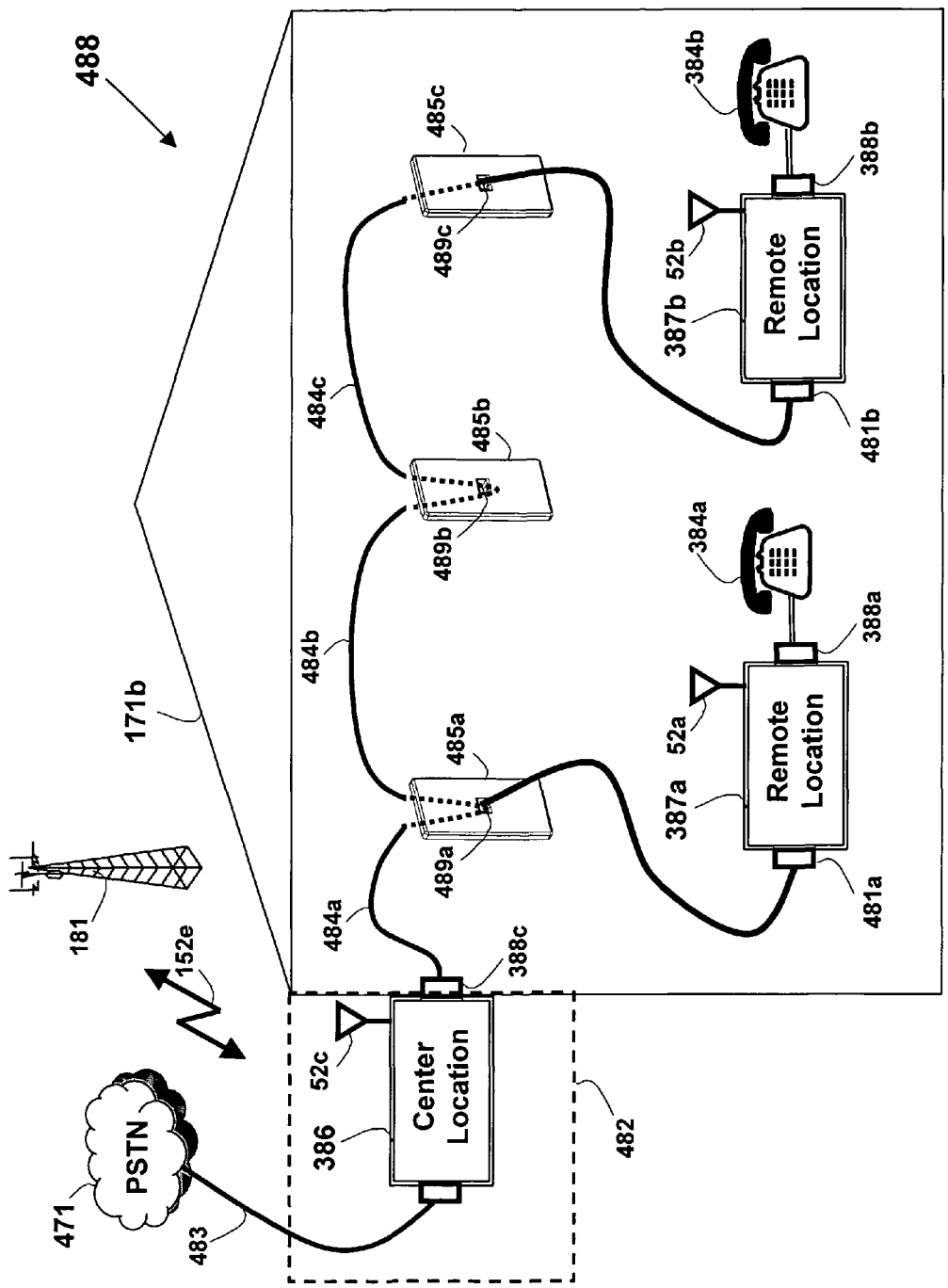
Figure 49B:
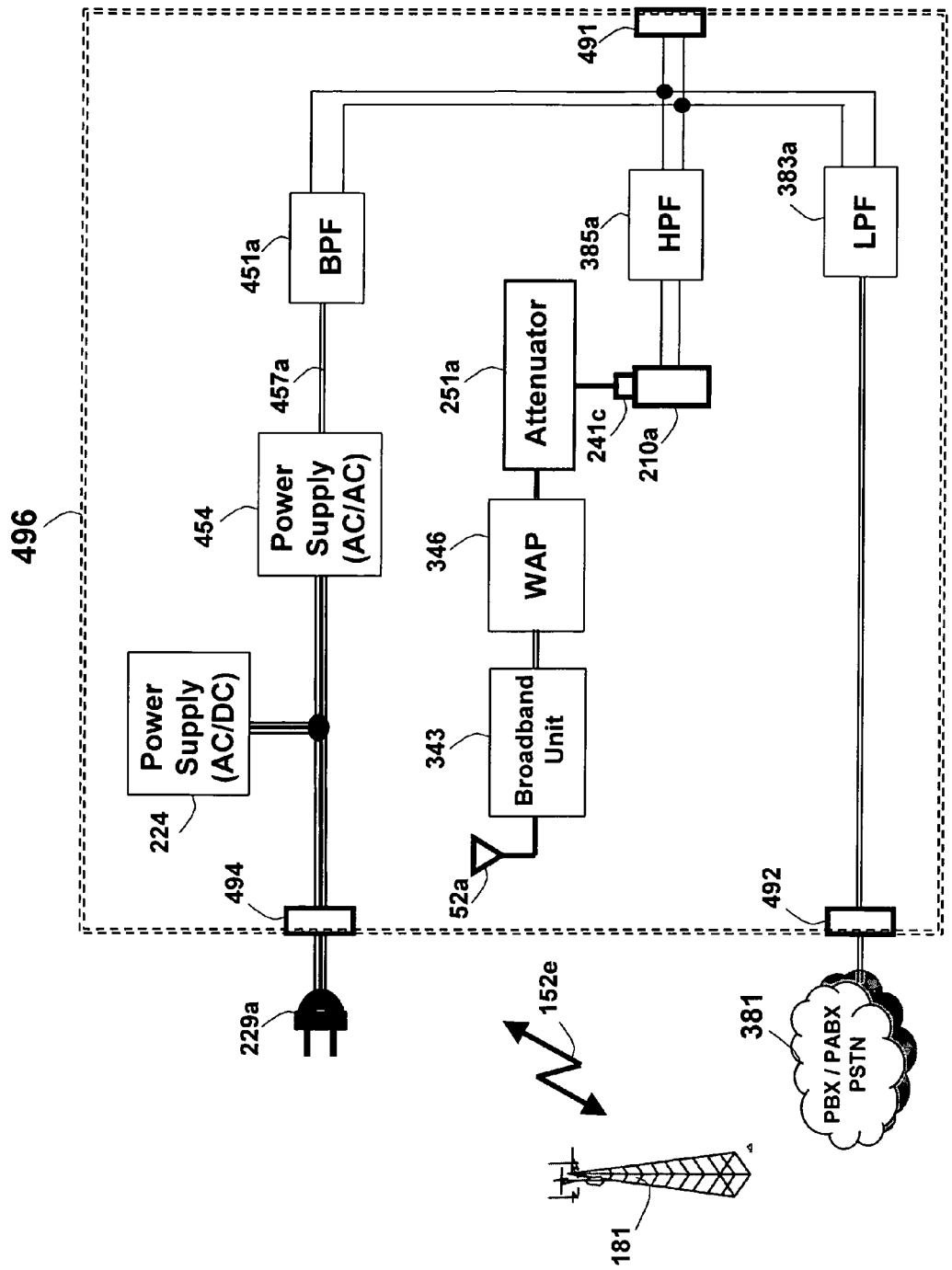

While system 480 improves the wireless communication and coverage from one location in the building to another location in the building, the described mechanism may also support enabling external wireless communication to reliably communicate with units in the buildings, thus overcoming at least some of the obstacles described above. Such advantage may be obtained by installing a frequency shifter in the NID itself, as shown for system 486 in FIG. 48b. In this system 486, a center location 386 (shown above in FIG. 38 as part of system 380) is installed in the NID 482, between the in-building telephone wire pair 484a connected via port 388c and the PSTN 471 via the connection 483. The center location 386 includes antenna 52c for communicating with external antenna 52d of WLAN unit 40b, which may be a hot-spot, for example. The radio signal received via the wireless communication link 152b is down frequency shifted and transmitted over the in-building telephone wire pair 484 to remote locations 387a and 387b, and vice-versa for a radio signal received by one of the remote locations 387 and communicated to the external center location 386. In this way, the radio signal need not penetrate the building walls, but is rather penetrating the house via telephone wiring of the house. Similarly, the cellular communication with a cellular tower or cellular antenna 181 (via radio communication link 152e) may be significantly improved, as shown for system 488 in FIG. 48c and discussed above regarding system 360 in FIG. 36. The center location 386 located in the NID may be grouped into a single device 496 shown in FIG. 49b.

It is apparent that systems 460 and 470 may be implemented in a similar way, wherein part of the system is located in the NID, received by wired digital data (e.g., via fiber, ADSL or VDSL), and includes a WAP 346 for transmitting and receiving wirelessly. However, the actual radio transmission and reception is inside the building using devices connected to the telephone outlets. In this configuration the telephone service provider can access, install and remotely manage the equipment located in the NID, but still enable a wireless coverage in the house using the existing telephone wire-pairs. Furthermore, the in-building devices may be powered from the NID.

DC Powering.

The POTS system involves using the DC power signal over the telephone wire pair for 'Off-Hook' and 'On-Hook' signaling, as well as for powering the telephone set from the CO or PBX/PABX. Hence, carrying additional power over the same telephone wire pair requires using a distinct frequency band above the analog telephone signal (typically 0-4 KHz), thus an AC power signal is contemplated, as described above in the arrangement 450. The arrangement was described as using two filter sets designated as 458 for the powering location and 459 for the remote powered site.

US Patent Application Publication '1305 teaches a system and method for carrying a DC power signal over a telephone wire pair, without interfering with the 'On/Off Hook' signaling. The concept is based on carrying the 'Off/On-Hook' signals not as DC signals, but rather converting them into non-DC signals such as tones, and thus freeing the DC frequency for carrying DC power. The tones representing the 'On/Off Hook' signals are generated at the telephone set interface, carried over the telephone wire pair, and re-converted to DC signals at the port connecting to a CO or PBX, and thus are transparently carried over the system. In general, the embodiments described in Publication '1305 may be used in conjunction with the present invention, wherein the phone-lines modem PNC (designated as numeral 93 in Publication '1305) used for transceiving digital data over the telephone wire pair is substituted with the shifter 210 for coupling a shifted wireless signal to and from the wire pair.

Figure 45:
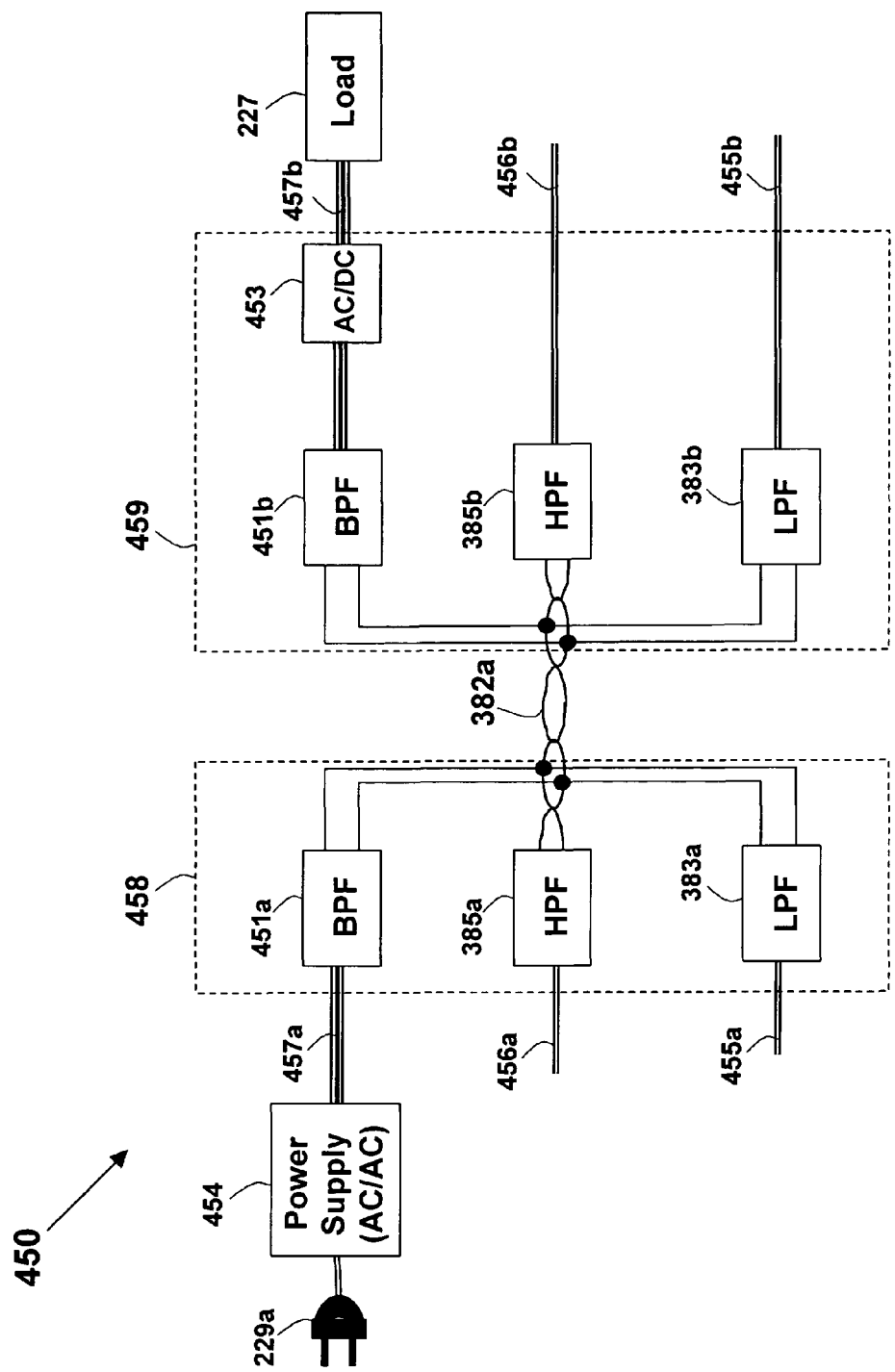
FIG. 45 illustrates schematically an arrangement for carrying power over a telephone wire pair according to the invention.
Figure 46:
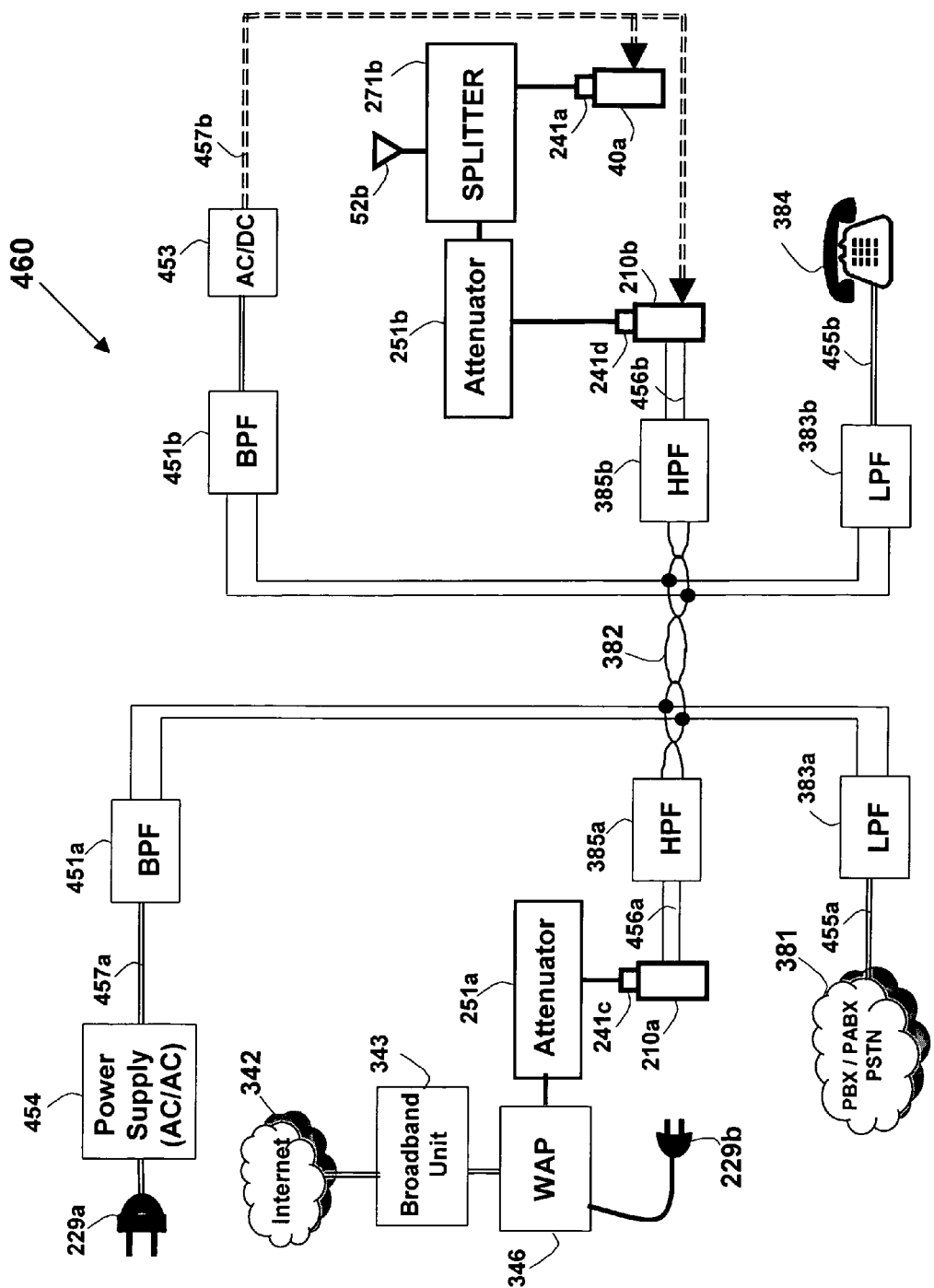
FIG. 46 illustrates schematically a simplified general network carrying power, telephone and data over a telephone wire pair according to the invention.
Figure 50B:
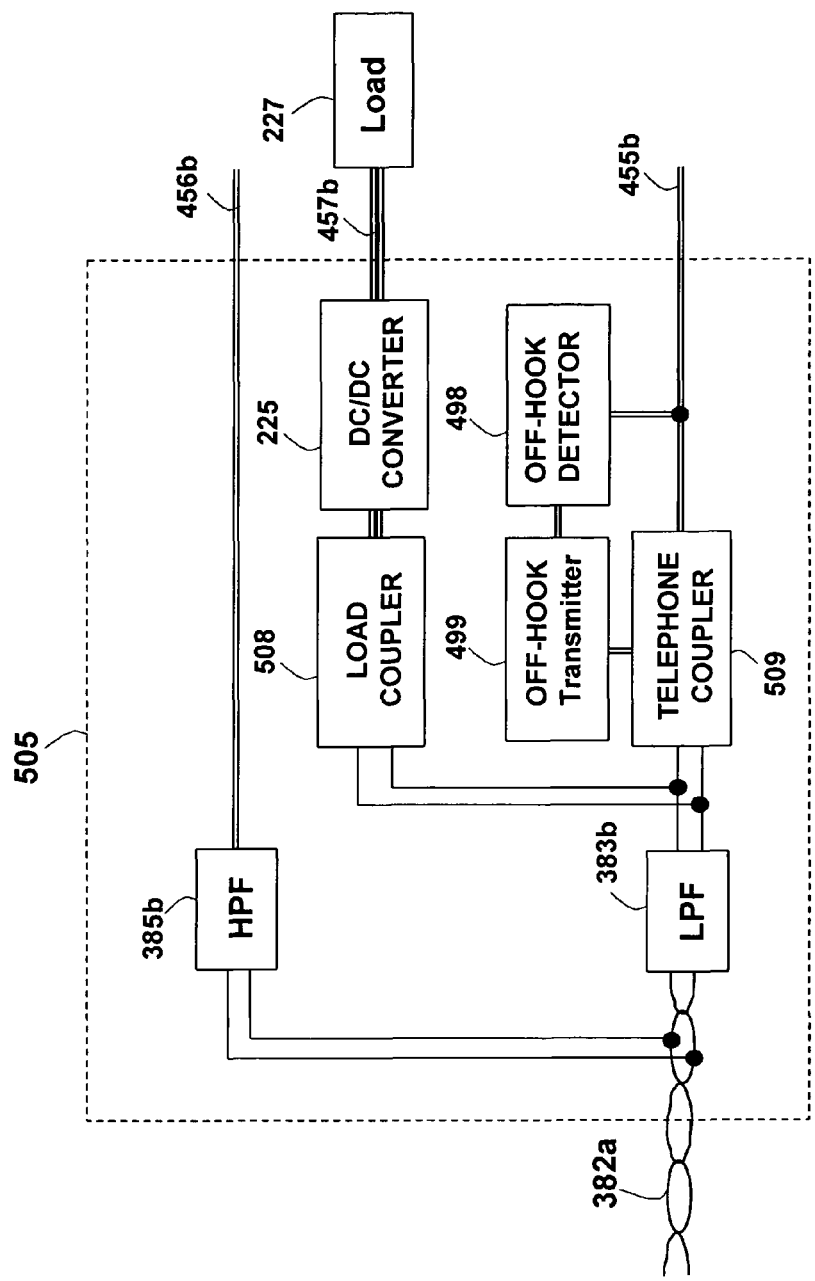

The remote location arrangement of a system implementing a DC powering scheme according U.S. Patent Application Publication '1305 is shown as DC-Sink arrangement 505 in FIG. 50b, which may be used as a substitute to arrangement 459 of FIG. 45. The arrangement 505 provides a port 455b for connecting an analog telephone set 384. The DC power and the telephone related signals are passed from the wire pair 382a through the LPF 383b and the telephone coupler 509 (designated as numeral 36 in Publication '1305), mainly comprising a current limiter. The Off-Hook Detector 498 (designated as numeral 41 in Publication '1305) detects the hook state of the telephone set connected to port 455b, and notify this status (or its changes) to the Off-Hook Transmitter 499 (designated as numeral 42 in Publication '1305), which in turn send transmit this status information using a non-DC signal such as tones to the wire pairs 382a. The Load coupler 508 (designated as numeral 31 in Publication '1305) pass the DC power signal to the DC/DC converter 225 (designated as numeral 76 in Publication '1305) for converting to the voltages required in the remote location, and feed the load 227 via port 457b. Similar to the above, an HPF 385b isolates the data signals, and substantially blocks the power and analog telephony signals.

The center/powering location arrangement of a system implementing a DC powering scheme according to U.S. Patent Application Publication '1305 is shown as DC-Source arrangement 501 in FIG. 50a, which may be used as a substitute to arrangement 458 of FIG. 45. The arrangement 501 provides a port 455a for connecting a CO/PBX 381. The non-DC components of the telephone signal in this port are passed to and from the telephone wire pair 382 via the AC Pass/DC Stop 506 (designated as numeral 34 in Publication '1305). The signals representing the hook status from the remote location 505 are carried over the wire pair 382a (e.g., tones) and. are received by the Off-Hook receiver 502 (designated as numeral 44 in Publication '1305). The status is fed to the Off-Hook simulator 503 (designated as numeral 43 in Publication '1305), which represent the appropriate DC load via the DC Pass/AC Stop 504 (designated as numeral 35 in Publication '1305). DC power is received from the AC/DC power supply 454 (fed from the AC plug 229*a*) via port 457*a*, and is inserted to the telephone wire pair 382*a* via Power Supply Coupler 507 (designated as numeral 33 in Publication '1305) and the LPF 383*a*. The shifted wireless signal is coupled between the port 456*a* and the wire pair 382*a* via HPF 385*a*.

Figure 51:
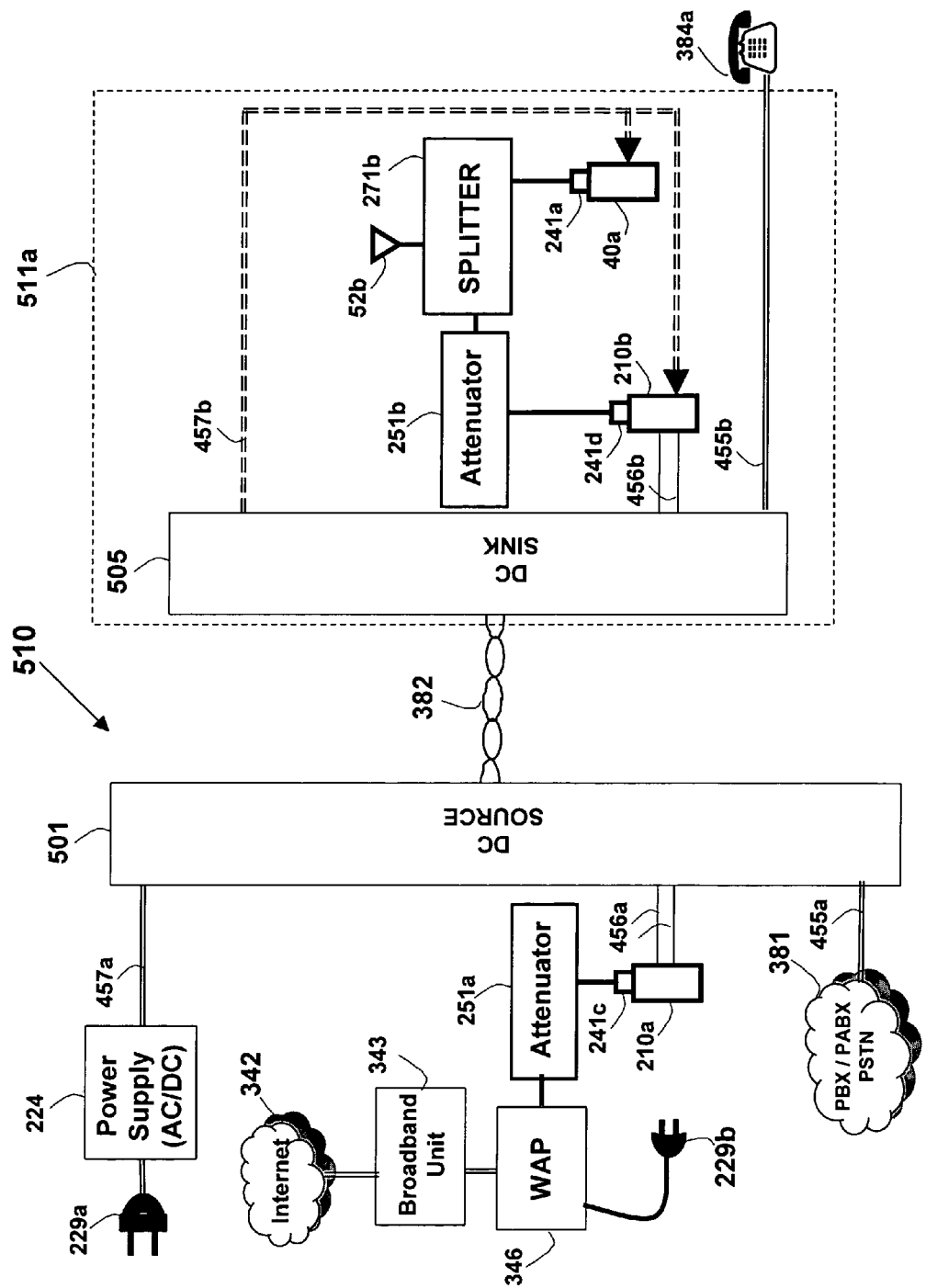
FIG. 51 illustrates schematically a simplified general network using DC powering provided over a telephone wire pair according to the invention.

Replacing the units 458 and 459 of system 450 with the respective units 501 and 505 enables the same functionality of carrying power, telephone and shifted wireless signals over a single wire-pair, however using a DC powering scheme over the medium. Such substitution can be implemented in any of the systems described above. A non-limiting example is system 510 shown in FIG. 51, which is based on system 460 shown in FIG. 46 above. In the powering site, the AC/AC power supply 454 is replaced with a DC power supply 224. The filters set BPF 451*a*, HPF 385*a* and LPF 383*a*, containing filters set 458, is substituted with the DC Source unit 501, thus enabling inserting DC power to the remote end 511*a*. In the remote site 511*a*, the signals separations filters set 459 containing LPF 383*b*, HPF 385*b* and the BPF 451*b*, as well as AC/DC 453 device, are substituted with a DC Sink device 505.

Power and Multiple Remote Locations.

Figure 52:
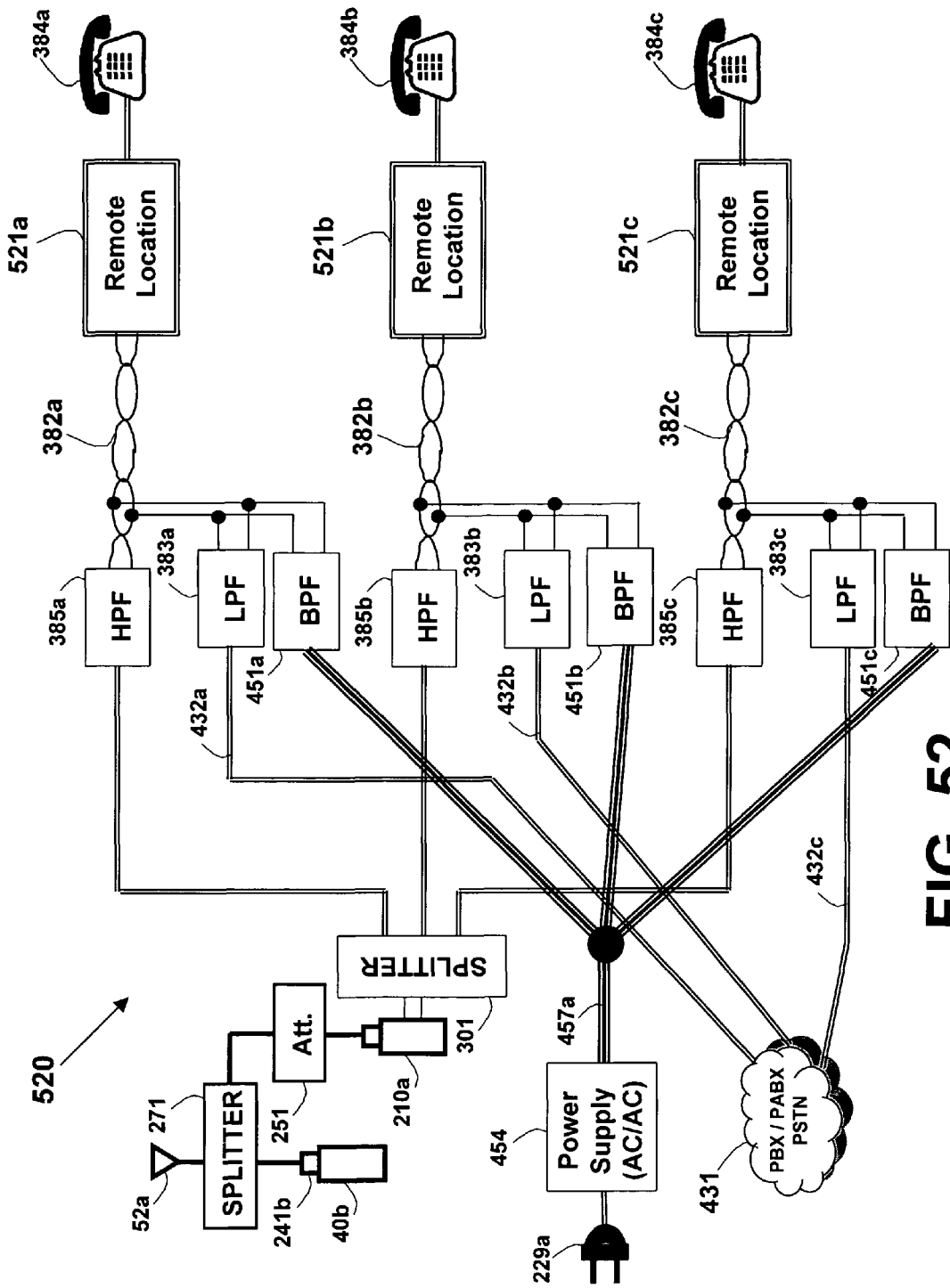
FIG. 52 illustrates schematically a simplified general network provided over multiple telephone wire pairs using an AC powering scheme according to the invention.

System 440 was described above for supporting multiple remote locations using a centralized shifter 210*a* using a splitter 301. Such multi-remote location environments may also be used to also power the remote locations via the wire pairs. An AC powering scheme of such configuration is shown as system 520 in FIG. 52. Similar to the above description regarding arrangement 450, each telephone wire pair 382 also concurrently carries an AC power signal using FDM. The AC power signal is supplied by AC/AC Power Supply 454 through port 457*a*, and is coupled to the wire pairs 382*a*, 382*b* and 382*c* via the respective BPF 451*a*, 451*b* and 451*c*. Remote locations 521*a*, 521*b*, and 521*c* are connected to the respective wire pairs 382*a*, 382*b* and 382*c*, and are connected (or connectable) to the respective telephone sets 384*a*, 384*b* and 384*c*. Each such remote location 521 comprises the circuits similar to the remote site shown as part of system 460 shown in FIG. 46, including BPF 451, HPF 385 and LPF 383, all connected to the respective wire pair 382, A shifter 210, attenuator 251, splitter 271, antenna 52 and WLAN unit 40, are all coupled to the HPF 385. Power Supply AC/AC 453 connected to being powered from the BPF 451 (as in FIG. 47), and powers the remote location power-consuming elements. The telephone set 384 is connected to the LPF 383.

Figure 53:
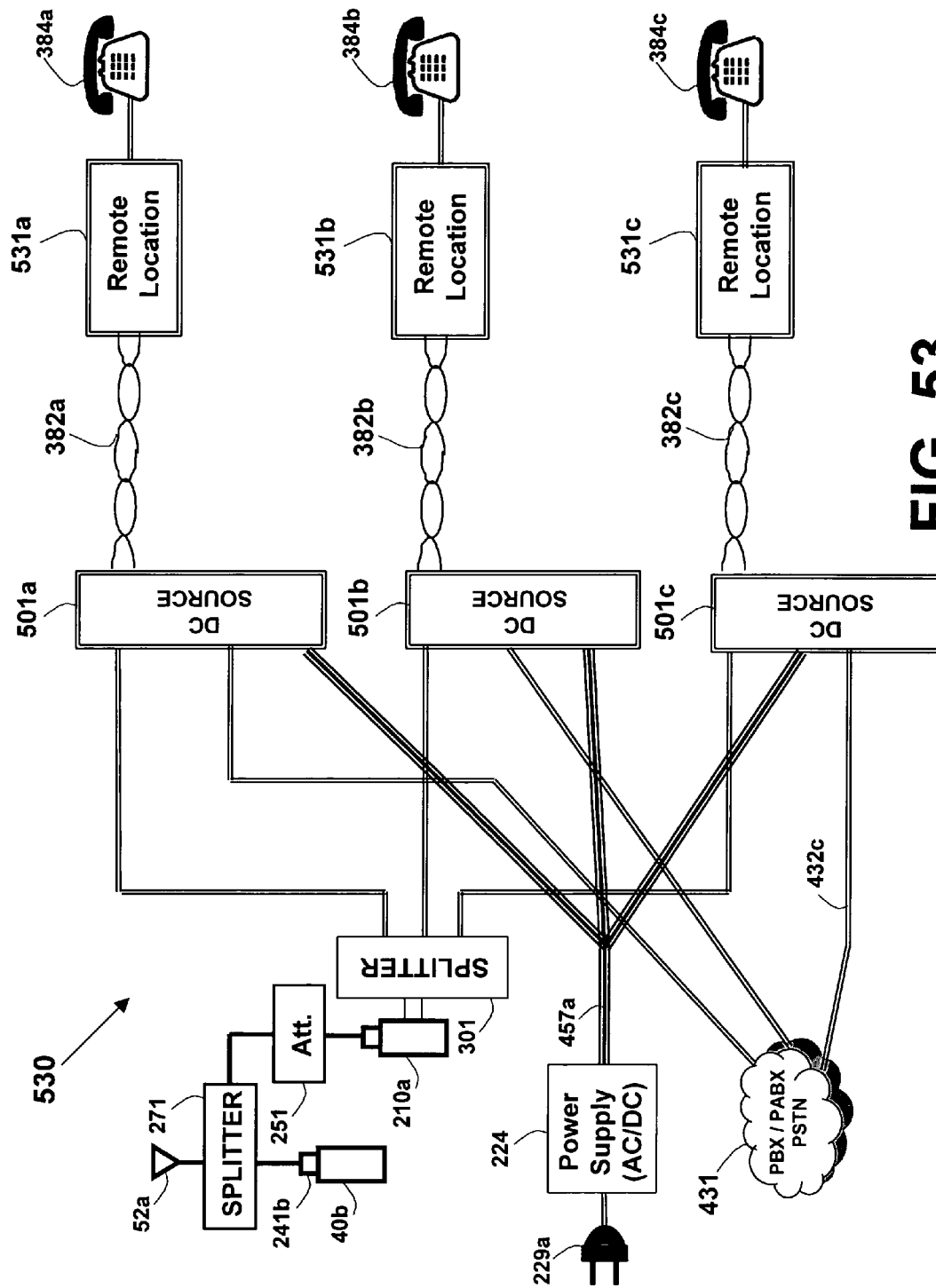
FIG. 53 illustrates schematically a simplified general network provided over multiple telephone wire pairs using a DC powering scheme according to the invention.

Similarly, a DC powering scheme may be used, as described for a single remote location in system 510. Such a system 530 is shown in FIG. 53. In the powering site, the DC source unit 501 replaces the filters set including the HPF 385, LPF 383 and BPF 451. Similarly, in each remote site 531 a DC Sink unit 505 (of FIG. 51) replaces the corresponding filters set.

Telephone Plug-In unit.

In the case wherein the telephone wire pair 382 is an in-building wiring accessed via telephone outlet, the remote location device or the center/powering device may be enclosed in plug-in form as described above. Such plug-in unit 540 is shown in FIG. 54*a*, also showing a typical North-American type telephone outlet 541 having an RJ-11 jack 542 for connecting to the in-wall telephone wire pair. The unit 540 may enclose part or all of any of the above systems or sub-systems connecting to the telephone wire pair 382. The unit 540 electrically connects to the outlet 541 via RJ-11 plug 544 shown in FIG. 54*b*. The unit 540 may also be mechanically attached to the outlet 541. Antenna 52*a* and rotary switch 139*a* are shown as part of the plug-in unit 540. In order for allowing a telephone set 384 to couple to the telephone signal carried over the wire pair 382, a RJ-11 jack connector 543 is provided, implementing connector 388*a* or port 455*b*, for example.

CATV/Coaxial Cable.

Figure 55:
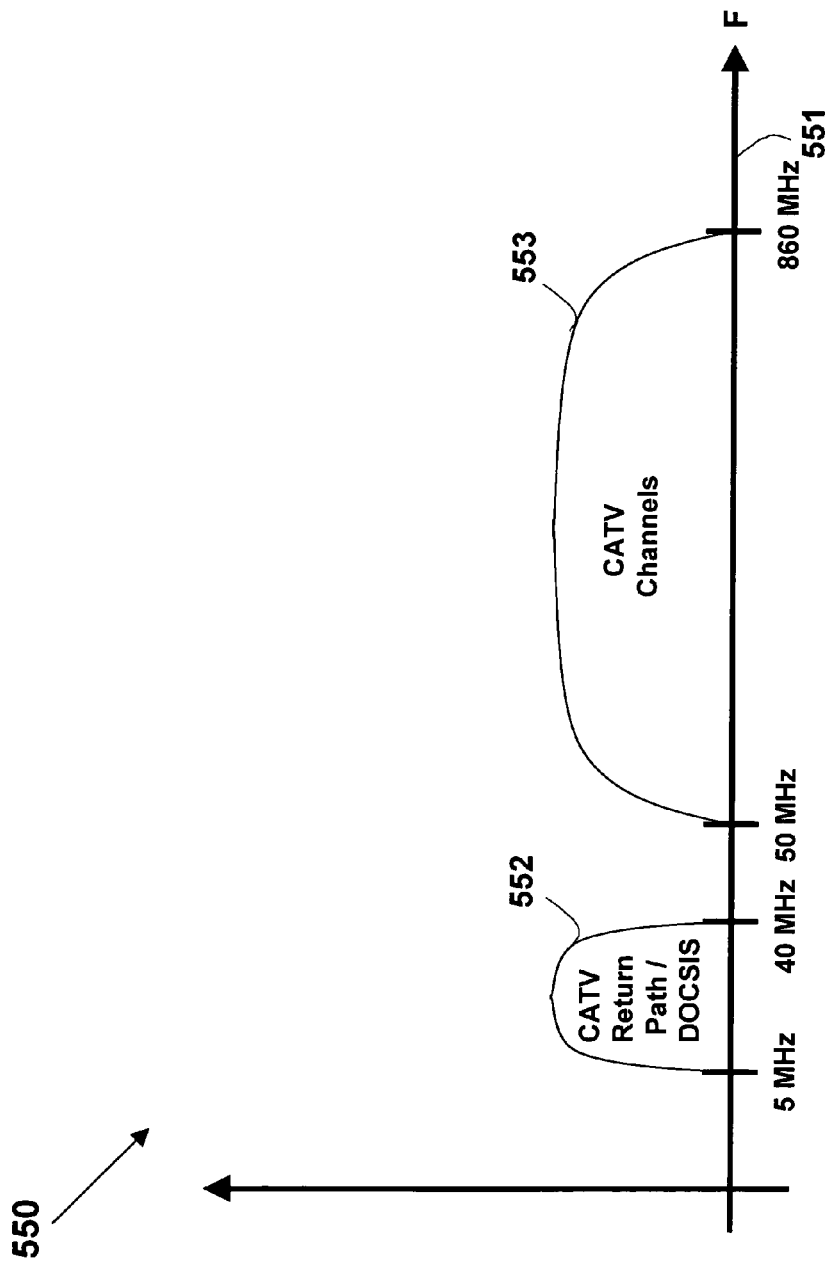
FIG. 55 illustrates schematically the prior-art frequency spectrum allocations in a CATV system.

While the invention was exemplified above with regard to using a POTS-oriented telephone wire pair 382 and with regard to carrying a POTS-oriented analog telephone signal 391, it is apparent that other wiring types, as well as carrying other service signals, may be equally used, including any PAN, LAN and WAN wiring. In one or more embodiments according to the present invention, a coaxial cable 568 is used as the conductive medium. The superior communication characteristics of a coaxial cable can result in longer distance and better communication performance than other wiring mediums. In one or more embodiments according to the present invention, the service signal carried together with the shifted wireless signal is CATV-oriented channels service. A typical frequency band allocation used in a CATV environment in North-America over a coaxial cable is shown as graph 550 in FIG. 55, showing the frequency allocations versus the frequency axis 551. The frequency band 552, ranging from 5 MHz to 40 MHz, is reserved for a CATV return channel or the DOCSIS (Data Over Cable Service Interface Specification) service. The video channels are carried as a broadcast service using 6 MHz channels spaced from 50 MHz up to 860 MHz.

Carrying the shifted wireless signal over a CATV service carrying coaxial cable, involving the example of a single 22 MHz IEE802.11 channel, may use three distinct frequency bands. In one embodiment, part or all of the DOCSIS/return channel 552 is used for carrying the shifted wireless signal. Yet in another embodiment, four adjacent 6 MHz channels in the video distribution band 553 are vacated from the video content thus creating a single 24 MHz (4 times 6 MHz) channel that may carry the shifted wireless signal. However, employing the above CATV bands may result in service degradation. In another embodiment, the shifted wireless signal is carried in a band above 860 MHz, hence not overlapping with the other CATV service signals over the coaxial cable. Using any of the above frequency bands for the shifted wireless signal typically involves a Band Pass Filter 561 passing the frequency band allocated for carrying the shifted wireless signal and substantially rejecting the other CATV-related signals carried simultaneously over the same cable. Similarly, a single BPF 562 may be used for passing the CATV signals and substantially stopping the band allocated for the shifted wireless signal. The BPFs 561 and 562 may each be implemented as LPF or as HPF, depending upon the location of the respective bands.

Figure 56:
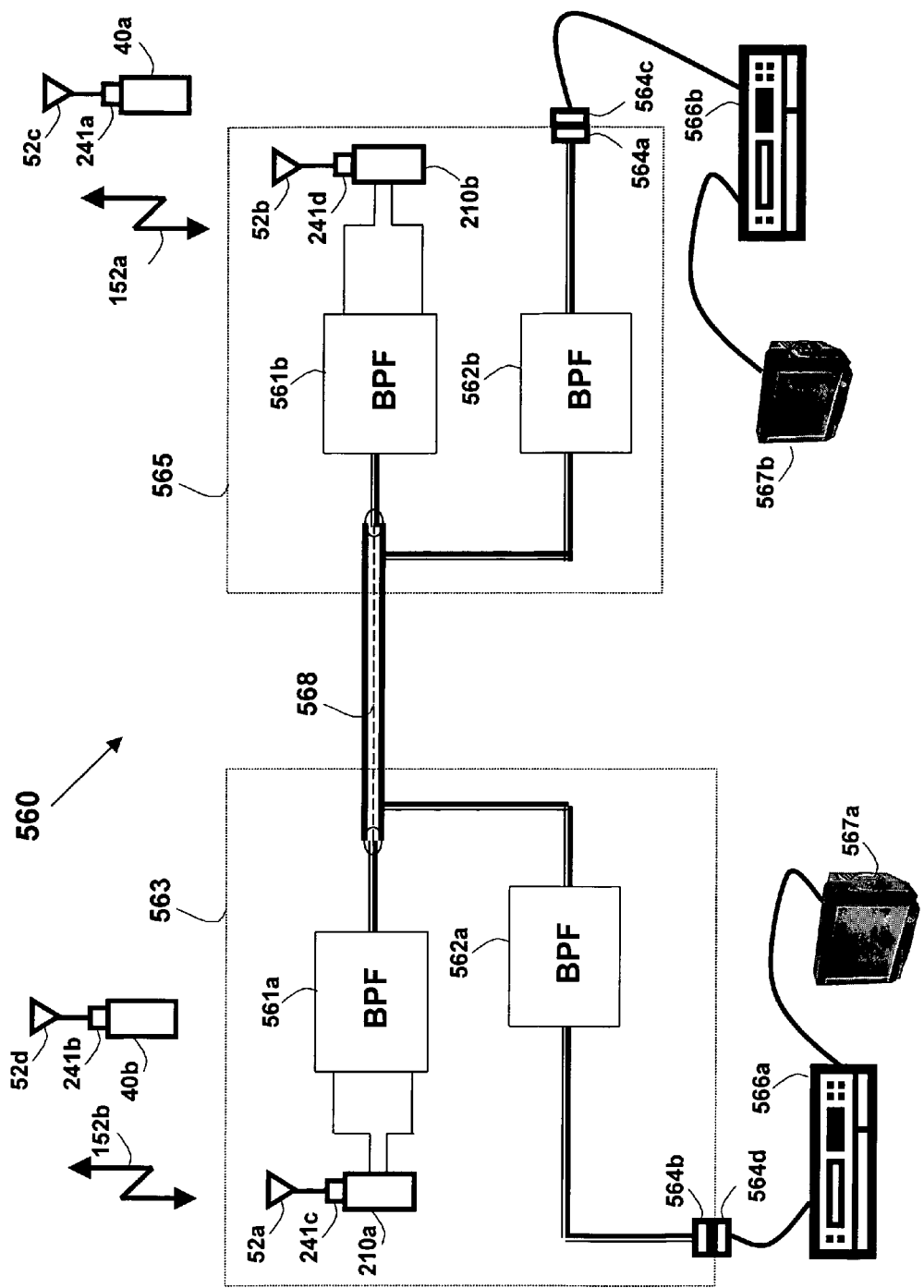
FIG. 56 illustrates schematically a simplified general network provided over a CATV coaxial cable according to the invention.

System 560 in FIG. 56 describes a coaxial cable 568 based network, which is based on the above system 380 in FIG. 38 adapted for CATV rather than a telephone environment. Coaxial cable 568 serves as the wiring medium (substituting telephone wire pair 382 above). The HPFs 385*a* and 385*b* of system 380 are respectively replaced with BPFs 561*a* and 561*b*, which are designed to pass only the frequency band allocated for the shifted wireless signal. Similarly, LPFs 383*a* and 383*b* shown as part of system 380 and oriented for passing the analog telephone signal are respectively substituted with BPFs 562*a* and 562*b*. The telephone connectors 388 are replaced with CATV related connectors 564, commonly F-Type, BNC, and similar RF connectors. Access to the CATV service signals over the coaxial cable 568 is achieved via CATV units 566*a* and 566*b*, wherein each may be a DOCSIS Cable Modem, set-top-box or any other equipment commonly used in conjunction with CATV services. Television sets 567*a* and 567*b* are shown as respectively connected to the CATV units 562*a* and 562*b*, representing CATV end units such as television sets and personal computers or any other video receiver.

In a similar way, all above systems may be adapted to use coaxial cable 568 as a substitute to the telephone wire pair 382 or to any other wired medium. The filter 385 is substituted with filter 561 and filter 383 is substituted with filter 562. Similarly, a coaxial connector 564 is required instead of the telephone connector 388 described above. Similar to the above discussion regarding housing of shifter 210, and connected functions and circuits may be embedded (in part or in full) in a CATV outlet or in a module mechanically and electrically attachable/detachable to a CATV outlet.

AC Power.

While the invention was exemplified above with regard to using a POTS-oriented telephone wire pair 382 and with regard to carrying a POTS-oriented analog telephone signal 391, as well as with regard to a coaxial cable 568 carrying a CATV service signals, it is apparent that other wiring type as well as carrying other service signals may be equally used. In one or more embodiments according to the present invention, the power wiring used to distribute AC power as part of the power grid is used as the conductive medium. The superior communication characteristics of the wireless signals, which are retained while being frequency shifted, result in a communication path even over such power wiring that was primarily installed to carry high AC power signals. In one or more embodiments according to the present invention, a low-voltage wiring is involved, while carrying 110 VAC/60 Hz AC power signal as is common in North America, or 240 VAC/50 Hz as is common in Europe.

Figure 57:
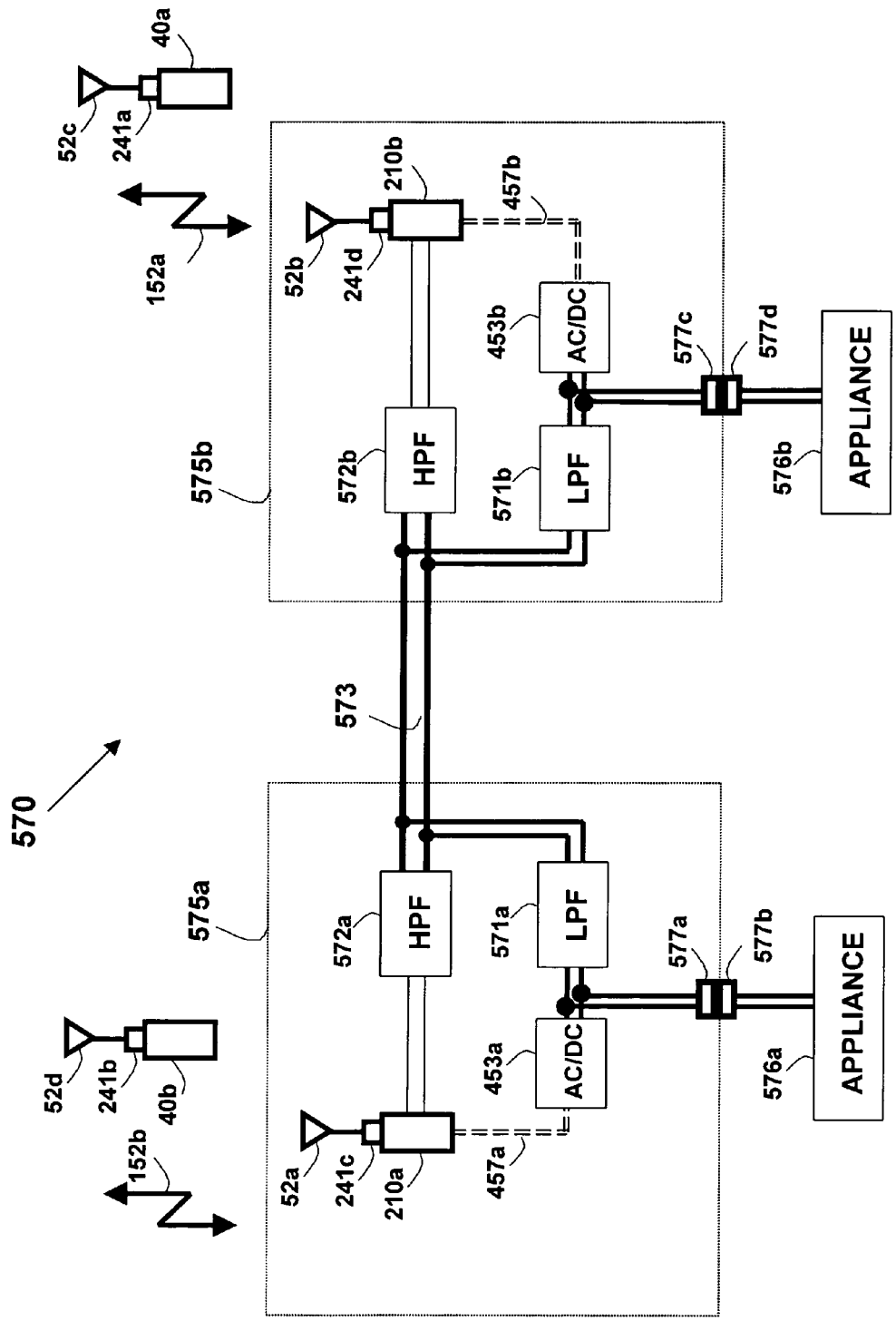
FIG. 57 illustrates schematically a simplified general network provided over an AC power wire pair according to the invention.
Figure 58:
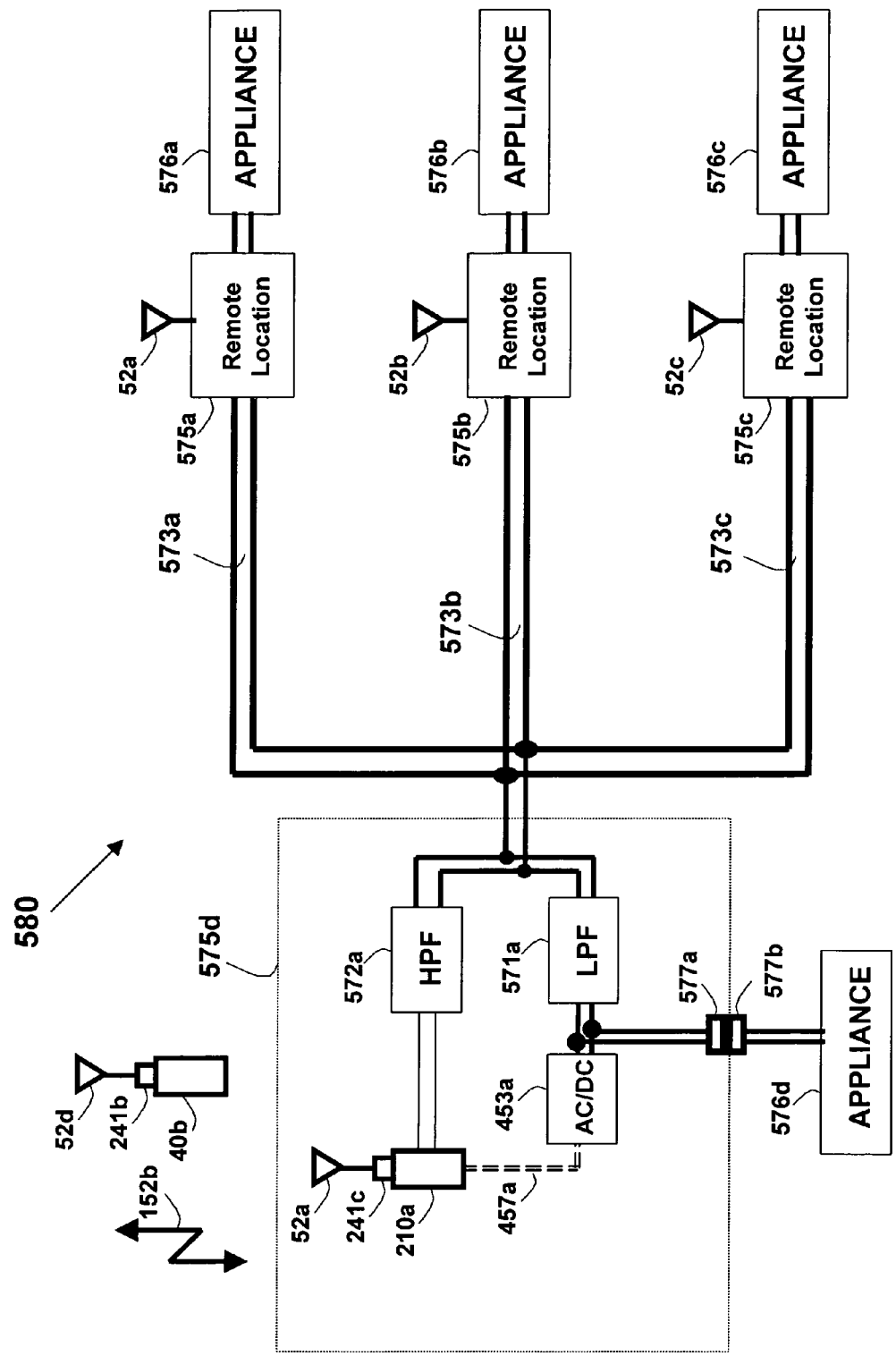
FIG. 58 illustrates schematically a simplified general network provided over multiple AC power wire pairs according to the invention.
Figure 59:
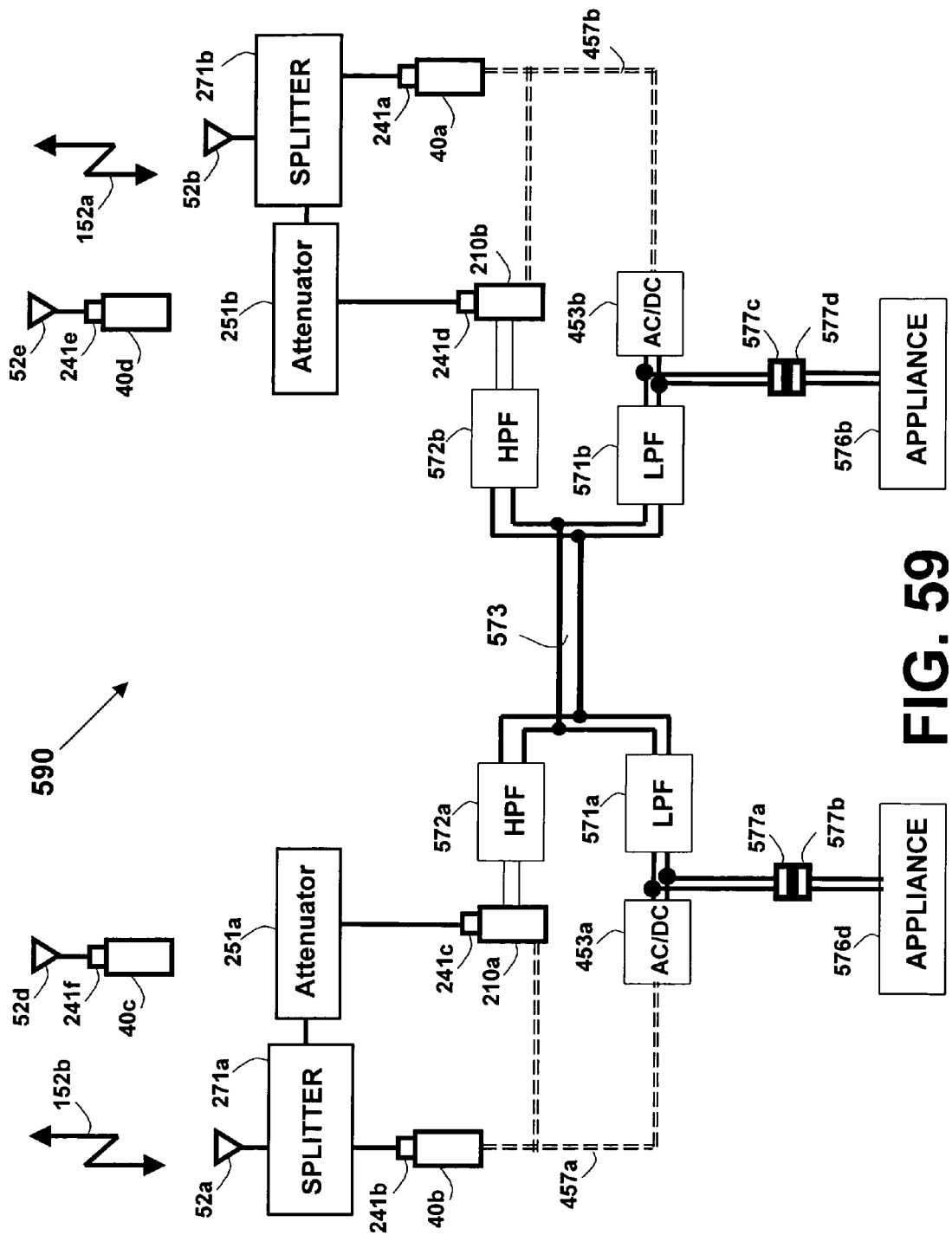
FIG. 59 illustrates schematically a simplified general wired and wireless network provided over an AC power wire pair according to the invention.
Figure 60:
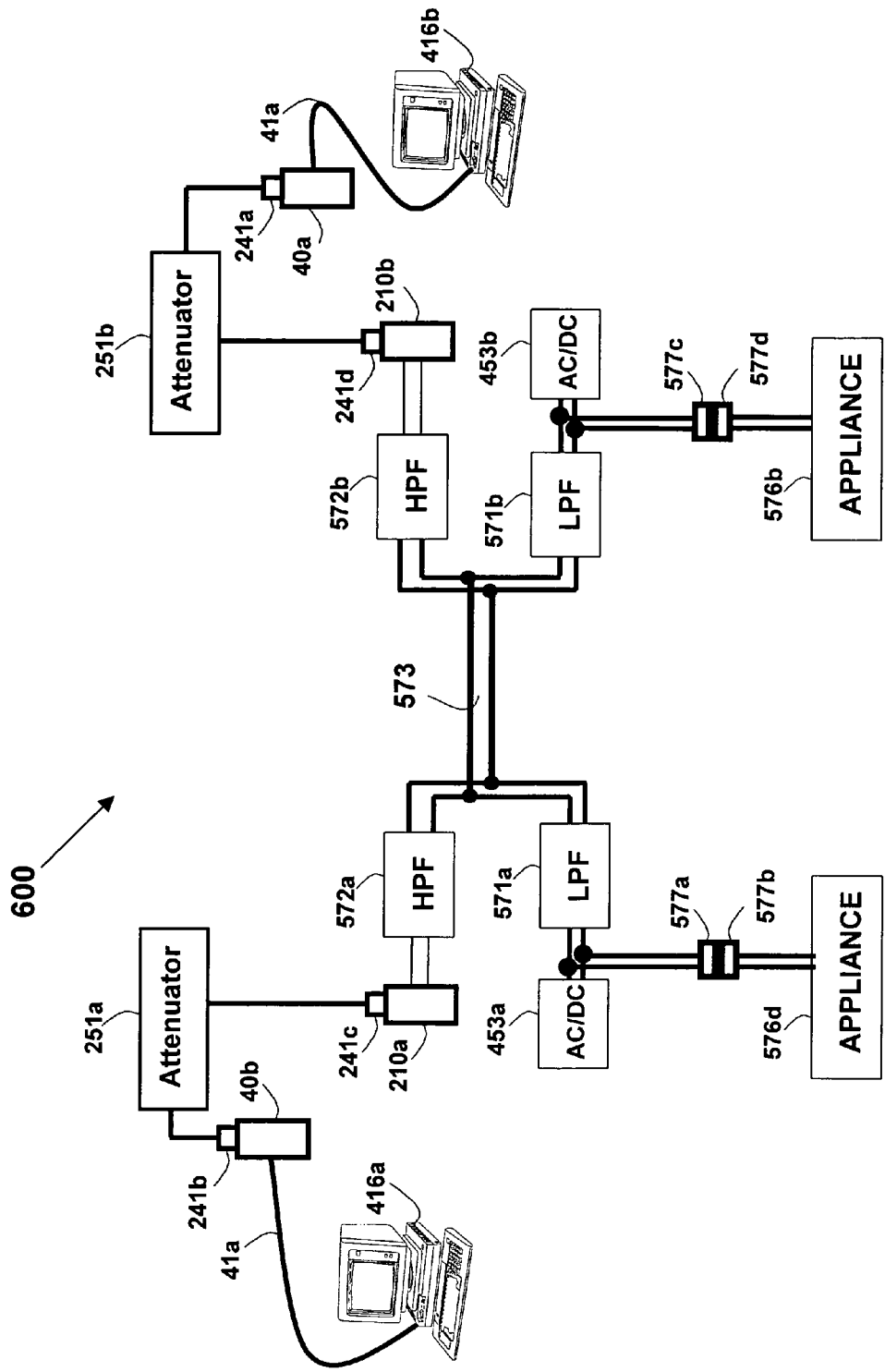
FIG. 60 illustrates schematically a simplified general wired only network provided over an AC power wire pair according to the invention.

System 570 shown in FIG. 57 is conceptually similar to system 380 shown in FIG. 38, however adapted to use AC power wire pair (commonly referred to as powerline) 573 instead of the telephone wire pair 382. The shifted wireless signal is coupled to and from the AC wire pair 573 through a HPFs 572*a* and 572*b*. HPF 572 is designed to pass the shifted wireless signal and to substantially block the AC power related signals, which include its harmonics, spurious and other signals which may exist over the power wire pair 573. Receiving the AC power signal from the power pair 573 involves using a LPF 571. The LPF 571 passes the AC power signal, while rejecting signals in the shifted wireless signal frequency band. The LPF 571 also serves to block noises and other unwanted signals to be inserted to the powerlines. System 570 shows two locations 575*a* and 575*b* both connected to communicate and be powered from the powerline 573. The AC power signal received after being filtered by LPF 571 is used to feed an AC/DC power supply 453, which DC power output may be used to power the location power consuming elements such as shifter 210 via DC power bus or connection 457. The filtered AC signal may also be connected to any AC-powered appliance 576*a*, via common AC power plug 577*b* and AC power jack 577*a*. Similarly, The filtered AC signal may also be connected to any AC-powered appliance 576*b*, via common AC power plug 577*d* and AC power jack 577*c*. System 580 shown in FIG. 58 is similar to system 400 shown in FIG. 40 above, however adapted to use powerline segments 573*a*, 573*b*, and 573*c* connected is a 'star' topology. Similarly, systems 590 and 600 (shown in the respective FIGS. 59 and 60) are based on the respective systems 410 and 415 (shown in FIGS. 41 and 41*a* respectively).

Figure 61C:
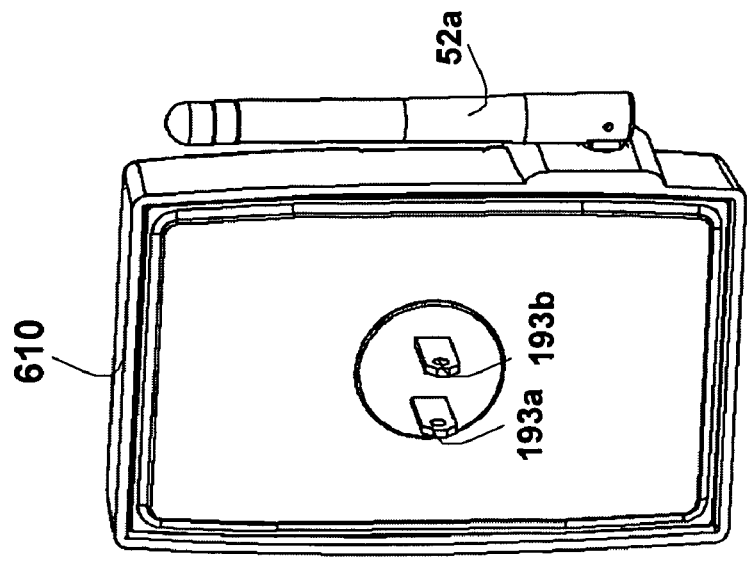
Figure 61B:
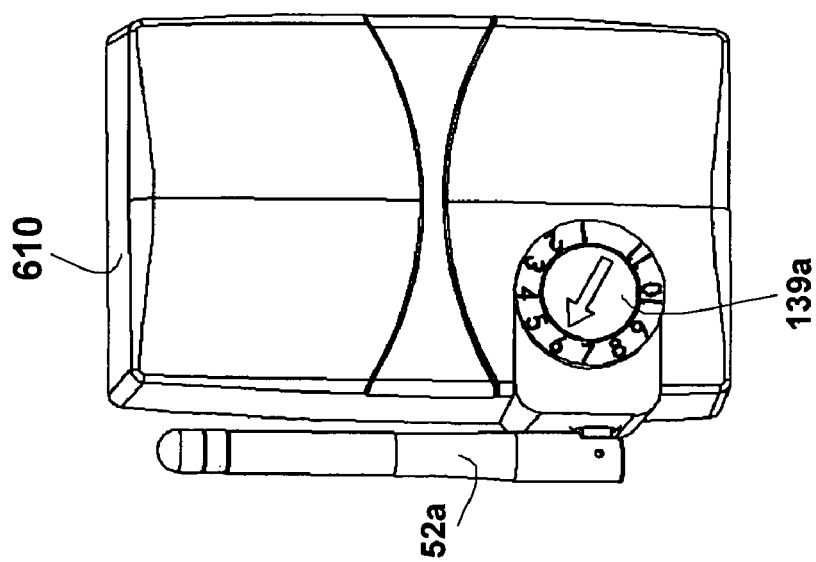

In the case wherein the AC power wire pair 573 is an in-building wiring accessed via a common AC power outlet, the device such as 575*a* (FIG. 57) or any device including part or all of the components connected or coupled to the power-line 573 may be enclosed in plug-in form as described above. Such plug-in unit 610 is shown is perspective view in FIG. 61*a*, also showing a typical North-American type AC power outlet 191 is shown, having two power sockets 192*a* and 192*b*. Front view and rear view of the plug-in unit 610 are respectively shown in FIGS. 61*b* and 61*c*. The device 575*a* (FIG. 57), for example, or any other device including the frequency shifter 210, is enclosed as plug-in module 610 shown to have two power prongs 193*a* and 193*b* (FIG. 61*c*) respectively mating with sockets 192*a* and 192*b*, providing electrical connection (for both receiving AC power and communication using the frequency-shifted wireless signal) as well as mechanical support, enabling the plug-in unit 610 to be easily attached to the outlet 191. Antenna 52*a* is shown, as well as a channel selecting mechanical rotary switch 139*a* having 11 positions for selecting one out of the 11 channels of the IEEE802.11g. In the example shown, rotary switch 139*b* is set to channel 6.

Similar to the above mentioned, the wired medium 201, being either a general twisted-pair, a telephone wire pair 382, AC power wiring 573, or coaxial cable 568 may be used for coupling the WLANs, (W)PANs, (W)MANs (Metropolitan area Network) such as HIPERMAN or WiMAX, and may be based on IEEE 802.16, or any wireless WAN (Wide Area Network).

Similar to that discussed above, attenuators may be inserted in either the radio receive path, the transmit path or both, as described above with regard to sub-system 'A' of systems 130*b* and 130*c*, in order to overcome part or all of the above described disadvantages.

Wireless units include any devices which use non-conductive medium for receiving of transmitting (or both) information, being analog or digital information. By way of example, wireless units may encompass mobile units such as laptop computers, handheld remote controls and Personal Digital Assistants (PDA) as well as any other wireless-enabled handheld devices such as cellular telephone handset and cordless telephone sets.

The frequency shifters 120 and 210 (as well as system 260) have been described above as a physical layer supporting only devices, wherein higher OSI layers such as protocol converting or format changing do not take place along the signal path. It is apparent that functions such as protocol converting and other higher OSI layers handling may be added anywhere along the signal path.

The systems and network according to the invention may be used outdoors to allow increased free-air propagation coverage, or may be used indoors to allow wireless communication between rooms and floors in a building. Similarly, the arrangements may allow for communication between buildings. Furthermore, the methods described may be used to allow bridging between outdoor and indoor communication. In the latter case and in other embodiments, part of the system may be housed in the NID or be attached to the external wall of a building.

While the invention has been exampled above with regard to using standard IEEE 802.11g technology, signals and components, it will be appreciated that the invention equally applies to any other wireless based technology, using either single or multi carrier signals for implementing either spread spectrum or narrowband, using either unlicensed bands (such as ISM) or licensed spectrum. Such technology may be part of the IEEE 802.11 (such as IEEE 802.11b or IEEE 802.11a), ETSI HiperLAN/2, or any technology used for WLAN, home networking or PAN (Personal Area Network). One non-limiting example is using IEEE 802.11b based on CCK (Complementary Code Keying). Other non-limiting examples are BlueTooth™, ZigBee, UWB, and HomeRF™. Furthermore, WAN (Wide Area Network) and other wireless technologies may be equally used, such as cellular technologies (e.g., GSM, GPRS, 2.5 G, 3G, UMTS, DCS, PCS and CDMA) and Local Loop oriented technologies (WLL—Wireless Local Loop) such as WiMAX, WCDMA, and other Fixed Wireless technologies, including microwave based. Similarly, satellite based technologies and components may be equally used. While the technologies mentioned above are all standards-based, proprietary, and non-standards technologies may be equally used according to present invention. Furthermore, the invention may equally apply to using technologies and components used in non-radio based through-the-air wireless systems such light (e.g. infrared) or audio (e.g., ultrasonic) based communication systems.

The frequency shifters 120 and 210 (as well as system 260) have been described above as using I/Q demodulating and modulating as described in systems 110 and 120 above. It is apparent that such frequency shifters in all above systems may equally use any frequency-shifting scheme, such as mixer/filter, heterodyne or super-heterodyne, or any other frequency shifting scheme known in the art. In particular, any frequency shifting scheme which does not require encoding and decoding of the digital data carried by the wireless signal or any scheme involving digital data processing may be equally used.

The invention has been described above referring to using a wireless backbone (such a system 150) or using a wired medium (such as systems 220 and 230) for carrying a wireless signal over a wireless band to another location, in which the wireless signal is reconstructed and restored to the same wireless signal over the same band. However, the invention may be equally applied to any arrangement wherein the different frequency band (such as different channels) are used, wherein the system also serves to shift the wireless signal from one band in one location to another band (such as another channel) in another location.

Similarly, the system may use a cellular communication as the wireless backbone. By way of example, wireless communication link 152b forming coverage area 151b may use cellular networking, either as a dedicated link or as part of a cellular network. Alternately, a wired backbone such as 201 may be used in order to interconnect cellular coverage area represented by the links 152a and 152b in system 220 shown in FIG. 22 above. The cellular technology used in both cases may be analog or digital. Such digital technologies include GSM (Global System for Mobile Communications), GPRS (General Packet Radio Service), CDMA (Code Division Multiple Access), EDGE (Enhanced Data Rates for GSM Evolution), 3GSM, DECT (Digital Enhanced Cordless Telecommunications), Digital AMPS (per IS-136/TDMA, for example) and IDEN (Integrated Digital Enhanced Network). The service carried over the cellular network may be voice, video or digital data such as the recently introduced EVDO (Evolution Data Only).

In one preferred embodiment according to the invention, isolated or separated areas using short-range wireless technology are connected using wired or wireless medium having a longer range. For example, two or more non-overlapping PAN or WPAN networks may be interconnected by a backbone (either wired or wireless) using either LAN or WLAN schemes. Similarly, two or more non-overlapping LAN or WLAN networks may be interconnected by a backbone (either wired or wireless) using either WAN or MAN schemes. In another preferred embodiment according to the invention, isolated or separated areas are interconnected using LOS communication (such as light or electromagnetic transmission using spectrum above 3 GHz. Similarly, isolated or separated areas using LOS for communication within the location may be interconnected using non-LOS communication means.

Non-wired Medium.

The invention has been described above referring to one or more wireless communication links 152 using radiation of electromagnetic waves or radio signals propagating over the air. However, the invention may be equally applied to any other types of non-conductive or through-the-air communication mediums, technologies, and frequencies. Using the alternatives for radio-based communication described herein may be a substitute for a single wireless communication link 152. In the case wherein two or more such wireless communication links are described, such as links 152a, 152b and 152c in system 150 shown in FIG. 15, one, two or all of the links may be substituted.

In one embodiment according to the invention the non-conductive and through the air communication makes use of light as the communication signal. Light may be considered as electromagnetic transmission using the very high electromagnetic spectrum. The systems may use a human visible light or non-visible light such as IR (Infra-Red) or UV (Ultra-Violet). Employing light communication will contemplate the use of light transmitters such as LED (Light Emitting Diode) and laser diodes, and light receivers or sensors such as photo-diodes, as a substitute to the antenna 52, and part or all of the connected components and functions. Typically light based communication is based on Line-Of-Sight (LOS), and using the above-described embodiments may enable proper accommodating with the LOS limitation.

In one embodiment according to the invention the non-conductive medium is based on a wave-guide and not based on free air propagation. An example may be a fiber-optic medium. In such configuration the antenna 52 is replaced with a fiber-optic connector, added to laser diode for transmitting to the medium and photo-diode or photo-cell for receiving from the medium.

Similarly, a sound or an audio-based communication through the air may be used as a substitute to the electromagnetic waves based communication described above. The communication link may use audible sound (typically 20-20,000 Hz), inaudible sound (ultrasonic, above 20,000 Hz) and infrasonic (below 20 Hz). In this case, the antenna 52 will be substituted with a microphone or a similar device converting the sound signal into an electrical signal, and a speaker or a similar device for generating the audio signal and transmitting it to the air. A transducer combining into a single device both the speaker and the microphone functionalities may as well be used.

While the invention has been described with regard to IEEE802.11g wireless signals and systems carrying digital data, it will be appreciated that the invention equally applies to other embodiments wherein the wireless signals (and system) are used to carry analog signals. One non-limiting example involves cordless telephony. Cordless telephones are known to carry telephone (and control) signals over the air using ISM bands.

While the invention has been exampled above with regard to using standard IEEE 802.11g technology, signals and components, it will be appreciated that the invention equally applies to any other wireless based technology, using either single or multi carrier signals for implementing either spread spectrum or narrowband, using either unlicensed bands (such as ISM) or licensed spectrum. Such technology may be part of the IEEE 802.11 (such as IEEE 802.11b or IEEE 802.11a), ETSI HiperLAN/2 or any technology used for WLAN, home networking or PAN (Personal Area Network). One non-limiting example is using IEEE 802.11b based on CCK (Complementary Code Keying). Other non-limiting examples are BlueTooth™, ZigBee, UWB and HomeRF™. Furthermore, WAN (Wide Area Network) and other wireless technologies may be used, such as cellular technologies (e.g., GSM, GPRS, 2.5 G, 3 G, UMTS, DCS, PCS and CDMA) and Local Loop oriented technologies (WLL—Wireless Local Loop) such as WiMax, WCDMA and other Fixed Wireless technologies, including microwave based technologies. Similarly, satellite based technologies and components may be equally used. While the technologies mentioned above are all standards-based, proprietary and non-standards technologies may be equally used according to present invention. Furthermore, the invention may equally apply to using technologies and components used in non-radio based through-the-air wireless systems such as light (e.g., infrared) or audio (e.g., ultrasonic) based communication systems.

While the invention has been exampled above with regard to using standard IEEE 802.11g technology wherein packets are communicated over the wireless medium, it will be appreciated that the invention equally applies to a continuous signal, being digital or analog. By way of example, the invention may apply to a cordless telephone system, allowing for the base-unit and the mobile handset to be distant from each other but yet to offer a proper wireless communication between them.

Housing.

A location according to the invention typically includes a frequency shifter 120 bridging between two wireless signals or a frequency shifter 210 bridging between wireless and wired signals. Similarly, system 260 above was shown as bridging between two wired signals. Such a location also includes all the functions conductively coupled to the frequency shifter 120 or 210 (as well as system 260). Such added functions may involve powering, and carrying additional service signals such as CATV and telephone signal. A device including all or part of the frequency shifter and other connected circuits and functions may be enclosed or housed and/or integrated within an enclosure (in part of in full) as warranted by the application. In some embodiments, the device will be housed as a distinct, separately packaged and stand-alone device. Such single enclosure may be a stand-alone unit, which may be configured as a desktop or wall mounted unit. In some embodiments, the device may be integrated with connected equipment or coupled equipment such as a WLAN unit or a data unit. In the cases wherein such a device is to be used in an outdoor environment, commonly a hardened mechanical design is to be contemplated.

In many scenarios the device is used in a building environment (in-door). Since in most cases the device couples wirelessly with WLAN units (such as WAP and clients) it may be advantageous to wall mount the device in order to save desk space and avoid non-aesthetic and non-safe cabling. In particular, mounting the device in a ceiling or over a wall may be required in order to get optimum wireless coverage in the site.

According to one aspect of the invention in-wall hidden power carrying conductors or wire-pairs are used to power the device. Such cabling may contain AC power wiring or other wirings that were primarily installed and used for carrying power, such as in-vehicle power carrying conductors. Alternatively, power may be carried over wirings oriented toward carrying analog service signals or digital data signals. For example, LAN cables carrying PoE (e.g., as per IEEE802.3af) or a telephone wire pair carrying a power signal may be contemplated. An example of a scheme for carrying AC power over a telephone wire pair with a telephone signal is described in the '353 patent.

According to one aspect of the invention in-wall hidden wire pairs may comprise telephone, AC power, or CATV wiring infrastructure. The wire pair may be carrying service signals (such as telephone, AC power or CATV signals), and may be accessed via outlets (such as telephone, AC power or CATV outlets).

In the above cases of connecting to in-wall wirings through an outlet, it may be contemplated to enclose the device as a single enclosure that plugs into the appropriate outlet, for receiving or inserting power thereto and/or for coupling to the service signal and/or for coupling the shifted wireless signal thereto. Such plug-in modules are known in the art to include a dedicated modem (such a powerline modem or telephone line modem), however are not disclosed to include a frequency shifting function. The plug-in device may be simply plugged in to the outlet, sometimes referred to as 'wall-wart' (supported only by the mating connectors), or may be contemplated to include a mechanical fastening means in order to enable reliable and secured mechanical attachment to the outlet and to allow reliable and secured connecting to the plug-in module. Patent Application '0561 suggests multiple designs of such a plug-in unit, which are all applicable to a device according to the present invention. In one or more embodiments, the medium modem 254 in Patent Application '0561 is to be substituted with the frequency shifter 210 (or 120 or 260) described above.

Outlets in general (to include LAN structured wiring, electrical power outlets, telephone outlets, and cable television outlets) have traditionally evolved as passive devices being part of the wiring system house infrastructure and solely serving the purpose of providing access to the in-wall wiring. However, there is a trend toward embedding active circuitry in the outlet in order to use them as part of the home/office network, and typically to provide a standard data communication interface. In most cases, the circuits added serve the purpose of adding data interface connectivity to the outlet, added to its basic passive connectivity function.

An outlet supporting both telephony and data interfaces for use with telephone wiring is disclosed in U.S. Pat. No. 6,549,616 entitled 'Telephone outlet for implementing a local area network over telephone lines and a local area network using such outlets' to Binder. Another telephone outlet is described in U.S. Pat. No. 6,216,160 to Dichter, entitled 'Automatically configurable computer network'. An example of home networking over CATV coaxial cables using outlets is described in US Patent Application Publication 2002/0194383 to Cohen et al. entitled: 'Cableran Networking over Coaxial Cables' to Cohen et aL. Such outlets are available as part of Home RAN™ system from TMT Ltd. of Jerusalem, Israel. Outlets for use in conjunction with wiring carrying telephony, data and entertainment signals are disclosed in US Patent Application Publication 2003/0099228 to Alcock entitled 'Local area and multimedia network using radio frequency and coaxial cable'. Outlets for use with combined data and power using powerlines are described in US Patent Application Publication 2003/0062990 to Schaeffer et al. entitled 'Powerline bridge apparatus'. Such power outlets are available as part of PlugLAN™ by Asoka USA Corporation of San Carlos, Calif. USA.

While the active outlets have been described above with regard to networks formed over wiring used for basic services (e.g., telephone, CATV and power), it will be appreciated that the invention can be equally applied to outlets used in networks using dedicated wiring. In such a case, the outlet circuitry is used to provide additional interfaces to an outlet, beyond the basic service of single data connectivity interface. As a non-limiting example, it may be used to provide multiple data interfaces wherein the wiring supports single such data connection. An example of such an outlet is the Network JackTm product family manufactured by 3Com™ of Santa-Clara, Calif., U.S.A. In addition, such outlets are described in U.S. Pat. No. 6,108,331 to Thompson entitled 'Single Medium Wiring Scheme for Multiple Signal Distribution in Building and Access Port Therefor' as well as U.S. Patent Application 2003/0112965 Published Jun. 19, 2003 to McNamara et al. entitled 'Active Wall Outlet'.

According to one aspect of the invention, part or all of a device in a location is enclosed as an outlet. In this case, the single enclosure is constructed to be in a form identical or substantially similar to that of a standard outlet or having a shape allowing direct mounting in an outlet receptacle or opening. Such an enclosure may be in the form to fully or in part substitute for a standard outlet, and may include wall mounting elements substantially similar to those of a standard wall outlet. Patent Application '0954 suggests multiple designs of such outlets including electronic circuitry, which are all applicable of a device according to the present invention. In one or more embodiments, the medium modem 54 in Patent Application '0954 is to be substituted with the frequency shifter 210 (or 120 or 260) described above.

Those of skill in the art will understand that the various illustrative logical blocks, modules and circuits described in connection with the embodiments disclosed herein may be implemented in any number of ways including electronic hardware, computer software, or combinations of both. The various illustrative components, blocks, modules and circuits have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

Although exemplary embodiments of the present invention have been described, this should not be construed to limit the scope of the appended claims. Those skilled in the art will understand that modifications may be made to the described embodiments. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

It will be appreciated that the aforementioned features and advantages are presented solely by way of example. Accordingly, the foregoing should not be construed or interpreted to constitute, in any way, an exhaustive enumeration of features and advantages of embodiments of the present invention.

The present invention may be embodied in other specific forms without departing from its spirit or essential characteristics. The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

PUBLIC NOTICE REGARDING THE SCOPE OF THE INVENTION AND CLAIMS

While the invention has been described in terms of preferred embodiments and generally associated methods, the inventor contemplates that alterations and permutations of the preferred embodiments and methods will become apparent to those skilled in the art upon a reading of the specification and a study of the drawings.

Accordingly, neither the above description of preferred exemplary embodiments nor the abstract defines or constrains the invention. Rather, the issued claims variously define the invention. Each variation of the invention is limited only by the recited limitations of its respective claim, and equivalents thereof, without limitation by other terms not present in the claim. In addition, aspects of the invention are particularly pointed out in the claims using terminology that the inventor regards as having its broadest reasonable interpretation; the more specific interpretations of 35 U.S.C. section. 112 (6) are only intended in those instances where the term "means" is actually recited. The words "comprising," "including," and "having" are intended as open-ended terminology, with the same meaning as if the phrase "at least" were appended after each instance thereof.

The invention claimed is:

1. An apparatus for frequency shifting without any protocol conversion between a wireless signal in a wireless frequency band carried by a wireless medium and a wired signal in a wired frequency band carried by a wired medium, said apparatus comprising:

an antenna for receiving and transmitting the wireless signal;

a wiring connector for connecting to the wired medium;

a down frequency shifter for down frequency shifting a signal from the wireless frequency band to the wired frequency band;

an up frequency shifter for up frequency shifting of a signal from the wired frequency band to the wireless frequency band;

an RF switch coupled between said antenna, said down frequency shifter and said up frequency shifter, said RF switch having first and second states, wherein in the first state said antenna is coupled to said down frequency shifter and in the second state said antenna is coupled to said up frequency shifter; and a wired frequency band switch coupled between said wiring connector, said down frequency shifter and said up frequency shifter, said wired frequency band switch having first and second states, wherein in the first state said wiring connector is coupled to said down frequency shifter and in the second state said connector is coupled to said up frequency shifter; wherein said apparatus is switchable into distinct first and second states, wherein in the first state of said apparatus, said RF switch is in its said first state and said wired frequency band switch is in its said first state for receiving the wireless signal from the antenna, down frequency shifting the wireless signal and transmitting the shifted wireless signal to the wiring connector; and wherein in the second state of said apparatus, said RF switch is in its said second state and said wired frequency band switch is in its said second state for receiving the frequency shifted wireless signal from said wiring connector, up frequency shifting to reconstruct the wireless signal and transmitting the wireless signal to the antenna.

2. The apparatus according to claim 1, further comprising:
a first signal detector coupled to said wiring connector for sensing the presence of a signal in the wired frequency band; and
a second signal detector coupled to said antenna for sensing the presence of a signal in the wireless frequency band; wherein said apparatus is operative to shift to its said first state upon sensing the presence of a signal in the wireless frequency band and to shift to its said second state upon sensing the presence of a signal in the wired frequency band.

3. The apparatus according to claim 1, wherein at least one out of said up frequency shifter and down frequency shifter comprises one out of a mixer/filter, a heterodyne circuit, or a super-heterodyne circuit.

4. The apparatus according to claim 1, wherein said up frequency shifter comprises:
an I/Q demodulator coupled to receive the wired signal in the wired frequency band, for deriving the I and Q component signals of the wired signal; and
an I/Q modulator coupled to receive said wired signal I and Q component signals, said I/Q modulator being operative to up frequency shift the wired signal to the wireless frequency band.

5. The apparatus according to claim 4, wherein said I/Q modulator or said I/Q demodulator are part of a wireless transceiver component.

6. The apparatus according to claim 1, wherein said down frequency shifter comprises:
an I/Q demodulator coupled to receive the wireless signal in the wireless frequency band, for deriving the I and Q component signals of the wireless signal; and
an I/Q modulator coupled to receive said wireless signal I and Q component signals, said 1/Q modulator being operative to down frequency shift the wireless signal to the wired frequency band.

7. The apparatus according to claim 1, further comprising, between said wiring connector and said wired frequency band switch:
a protector for absorbing and protecting against transients, over-voltage and lightning; a filter for substantially passing only signals in the wired frequency band; and a signal transformer for providing isolation between said apparatus and the wired medium.

8. The apparatus according to claim 1, further comprising an equalizer between said wiring connector and said wired frequency band switch for compensating for the frequency characteristics of the wired medium.

9. The apparatus according to claim 1, wherein the wireless signal is a spread spectrum multi-carrier signal based on one of OFDM, DMT and CDMA modulations.

10. The apparatus according to claim 1, further comprising an attenuator connected for attenuating a signal to or from said antenna.

11. The apparatus according to claim 10, wherein said attenuator produces an attenuation of more than 10 dB.

12. The apparatus according to claim 1, wherein the wireless frequency band is selectable from a plurality of adjacent frequency bands.

13. The apparatus according to claim 12, wherein the wireless frequency band is selected by a switch.

14. The apparatus according to claim 1, wherein the wireless signal conforms to at least one of the following standards: WPAN, WLAN, WMAN, WAN, BWA, LMDS, MMDS, WiMAX, HIPERMAN, IEEE802.16, Bluetooth, IEEE802.15, UWB, ZigBee, cellular, IEEE802.11 standards, GSM, GPRS, 2.5G, 3G, UMTS, DCS, PCS and CDMA.

15. The apparatus according to claim 1, wherein one of the frequency bands is an ISM frequency band.

16. The apparatus according to claim 1, further comprising a single enclosure housing said up and down frequency shifters, said antenna, said connector, said RF switch and said wired frequency band switch, and wherein said single enclosure is wall mountable.

17. The apparatus according to claim 16, wherein said single enclosure is shaped to plug- into an outlet.

18. The apparatus according to claim 16, wherein said single enclosure is further shaped to mechanically attach and electrically connect to an outlet.

19. The apparatus according to claim 16, wherein said single enclosure is constructed to have at least one of the following:
a form substantially similar to that of a standard outlet;
wall mounting elements substantially similar to those of a standard wall outlet;
a shape allowing direct mounting in an outlet opening or cavity; and
a form to at least in part substitute for a standard outlet.

20. The apparatus according to claim 1, wherein the wireless signal is transmitted in the wireless frequency band in a MAN or WAN network.

21. The apparatus according to claim 1, wherein the wired medium is one of: a twisted wire pair; UTP; STP; a telephone wire pair; RC power wires; a coaxial cable; and a LAN cable, and said wiring connector is operative to connect to the wired medium.

22. The apparatus according to claim 1, wherein the wired medium is further connected to carry a DC or AC power signal, and said apparatus further comprises:
a high pass filter for substantially passing signals in the wired frequency band coupled between said wired frequency band switch and said wiring connector;
a power connector for connecting to an AC power source;
a power supply, including one of an AC/DC or an AC/AC converter, connected to be powered via said power connector; and
a low pass or band pass filter coupled between said power supply and said wiring connector for substantially passing the power signal.

23. The apparatus according to claim 1, wherein the apparatus is further connected to be powered by a DC or AC power signal carried over the wired medium, and said apparatus further comprises:
a high pass filter coupled between said wired frequency band switch and said wiring connector for substantially passing signals in the wired frequency band;
a power supply, including an AC/DC or DC/DC converter, coupled to power at least said up frequency shifter and said down frequency shifter; and
a low pass or band pass filter coupled between said power supply and said wiring connector for substantially passing the power signal.

24. The apparatus according to claim 1, wherein the wired medium is further connected to carry an analog telephone signal, and said apparatus further comprises:
a high pass filter coupled between said wired frequency band switch and said wiring connector for substantially passing signals in the wired frequency band;
a telephone connector for connecting to a telephone set or to a PBA/PABX/CO; and
a low pass filter coupled between said wiring connector and said telephone connector for substantially passing the telephone signal.

25. The apparatus according to claim 1, wherein the wired medium is a coaxial cable that is further connected to carry a CATV signal, and said apparatus further comprises:

a band pass filter coupled between said wired frequency band switch and said wiring connector for substantially passing signals in the wired frequency band;

a coaxial connector for connecting to a CATV appliance; and a band pass filter coupled between said wiring connector and said coaxial connector for substantially passing the CATV signal.

\* \* \* \* \*